US006819303B1

(12) United States Patent
Berger et al.

(10) Patent No.: US 6,819,303 B1
(45) Date of Patent: Nov. 16, 2004

(54) CONTROL SYSTEM FOR AN ELECTRONIC SIGN (VIDEO DISPLAY SYSTEM)

(75) Inventors: Brent Henry Berger, Brookings, SD (US); Reece Alan Kurtenbach, Brookings, SD (US); Daniel Anthony Schulte, Volga, SD (US); Joseph Gerard Schulte, Brookings, SD (US); Brett David Wendler, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 09/135,944

(22) Filed: Aug. 17, 1998

(51) Int. Cl.[7] ............................ G09G 5/00; G06T 1/00

(52) U.S. Cl. .......................... 345/1.1; 345/2.1; 345/3.1; 345/3.4; 345/501; 345/903

(58) Field of Search ................................ 345/441, 501, 345/150, 82, 520, 1, 204, 113, 1.1, 2.1, 3.1, 3.4; 348/52

(56) References Cited

U.S. PATENT DOCUMENTS

| | | | | | |
|---|---|---|---|---|---|
| 4,145,685 | A | * | 3/1979 | Farina | 345/82 |
| 5,629,798 | A | * | 5/1997 | Gaudreau | 348/58 |
| 5,790,096 | A | * | 8/1998 | Hill, Jr. | 345/150 |
| 5,796,376 | A | * | 8/1998 | Banks | 345/82 |
| 5,949,436 | A | * | 9/1999 | Horan et al. | 345/501 |
| 5,969,704 | A | * | 10/1999 | Green et al. | 345/113 |
| 6,014,120 | A | * | 1/2000 | Chiu et al. | 345/82 |
| 6,057,863 | A | * | 5/2000 | Olarig | 345/520 |
| 6,078,318 | A | * | 6/2000 | Mori et al. | 345/204 |
| 6,104,414 | A | * | 8/2000 | Odryna et al. | 345/1 |
| 6,118,486 | A | * | 9/2000 | Reitmeier | 348/441 |

* cited by examiner

*Primary Examiner*—Bipin Shalwala
*Assistant Examiner*—David L. Lewis
(74) *Attorney, Agent, or Firm*—Hugh D. Jaeger

(57) ABSTRACT

A video display system including an electronic sign, a electronic sign control system utilizing a general purpose personal computer, having a video interface card, controlled by clock and command signals from said personal computer, containing a plurality of video and digital input ports and a high speed output port, a transmitter link control card, also under the control of clock and command signals from said personal computer, for transmitting video display, clock, and command signals to a remote data receiver and distributor associated with the electronic sign, which converts said signals into device control signals for controlling individual sign display elements.

29 Claims, 159 Drawing Sheets

| | | | | |
|---|---|---|---|---|
| FIG. 3a | FIG. 3b | FIG. 3c | FIG. 3d | FIG. 3e |
| FIG. 3f | FIG. 3g | FIG. 3h | FIG. 3i | FIG. 3j |
| FIG. 3k | FIG. 3L | FIG. 3m | FIG. 3n | FIG. 3o |

FIG. 2

| | | | | | | |
|---|---|---|---|---|---|---|
| FIG. 9a | FIG. 9b | FIG. 9c | FIG. 9d | FIG. 9e | FIG. 9f | FIG. 9g |
| FIG. 9h | FIG. 9i | FIG. 9j | FIG. 9k | FIG. 9L | FIG. 9m | FIG. 9n |
| FIG. 9o | FIG. 9p | FIG. 9q | FIG. 9r | FIG. 9s | FIG. 9t | FIG. 9u |
| FIG. 9v | FIG. 9w | FIG. 9x | FIG. 9y | FIG. 9z | FIG. 9aa | FIG. 9ab |

FIG. 8

| | | | | | | |
|---|---|---|---|---|---|---|
| FIG. 11a | FIG. 11b | FIG. 11c | FIG. 11d | FIG. 11e | FIG. 11f | FIG. 11g |
| FIG. 11h | FIG. 11i | FIG. 11j | FIG. 11k | FIG. 11L | FIG. 11m | FIG. 11n |
| FIG. 11o | FIG. 11p | FIG. 11q | FIG. 11r | FIG. 11s | FIG. 11t | FIG. 11u |
| FIG. 11v | FIG. 11w | FIG. 11x | FIG. 11y | FIG. 11z | FIG. 11aa | FIG. 11ab |

FIG. 10

| | | | | |
|---|---|---|---|---|
| FIG. 13a | FIG. 13b | FIG. 13c | FIG. 13d | FIG. 13e |
| FIG. 13f | FIG. 13g | FIG. 13h | FIG. 13i | FIG. 13j |
| FIG. 13k | FIG. 13L | FIG. 13m | FIG. 13n | FIG. 13o |

FIG. 12

| | | | | | | |
|---|---|---|---|---|---|---|
| FIG. 17a | FIG. 17b | FIG. 17c | FIG. 17d | FIG. 17e | FIG. 17f | FIG. 17g |
| FIG. 17h | FIG. 17i | FIG. 17j | FIG. 17k | FIG. 17L | FIG. 17m | FIG. 17n |
| FIG. 17o | FIG. 17p | FIG. 17q | FIG. 17r | FIG. 17s | FIG. 17t | FIG. 17u |

FIG. 16

| | | | |
|---|---|---|---|
| FIG. 21a | FIG. 21b | FIG. 21c | FIG. 21d |
| FIG. 21e | FIG. 21f | FIG. 21g | FIG. 21h |

FIG. 20

Sample Rate, Pulse Time (ns)
In Standard Mode

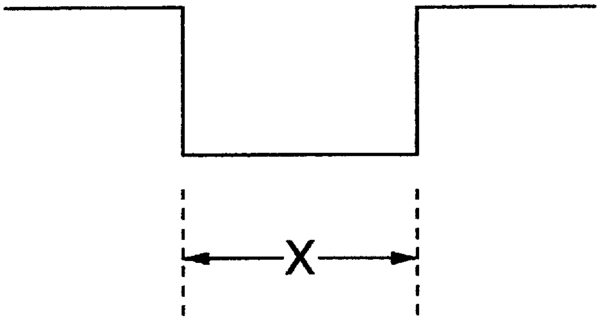

X can equal one of the following:

- Data Clock
- LC Latch
- CD Latch
- Command Mode

| | |
|---|---|
| If X = Data Clock: | Minimum X Pulse Width = 120 ns<br>Maximum X Pulse Width = 240 ns |
| If X = LC Latch: | Minimum X Pulse Width = 380 ns<br>Maximum X Pulse Width = 620 ns |
| If X = CD Latch: | Minimum X Pulse Width = 760 ns<br>Maximum X Pulse Width = 990 ns |
| If X = Command Mode: | Minimum X Pulse Width = 1140 ns |

FIG. 23A

In Command Mode

X can equal one of the following: Command Clock
Frame Latch

If X = Command Line: Minimum X Pulse Width = 120 ns
Maximum X Pulse Width = 240 ns If X = Frame Latch: Minimum X Pulse Width = 1140 ns On a Frame Latch, return to Standard Mode

CONTROL SYSTEM FOR AN ELECTRONIC SIGN (VIDEO DISPLAY SYSTEM)

CROSS REFERENCES TO CO-PENDING APPLICATIONS

None.

BACKGROUND OF THE INVENTION

1. Field of the Invention

This invention relates to a remote control system for an electrically controlled sign. The system accepts input data in analog video, digital video, digital or similar forms, converts it to sign and control signals, and transmits the converted signal 2. Description of the Prior Art Prior art display sign control systems have been technology dependent and have not provided sharply defined images when combining animation or other signals developed in a character generator and video. The problem arises when the sign control system attempts to fit the digitized version of the original analog character generator signal into the pixel matrix elements of the sign. Since there is not an exact match between the digitized version and the available pixels, the resulting output signal to the individual pixels varies from the optimum representation. The resulting display provided images in which the character generator output looked “fuzzy”.

Further, prior art sign control systems did not accommodate different sizes of signs, but were generally limited to a specific size and/or type of sign. The prior art systems did not always provide for the combination of live video, graphics, animation, real time data, information such as sports statistics, text information, or such features as instant replay. Prior art sign control systems usually represented a highly specialized, specific control system and did not use, as an example, an off-the-shelf personal computer as a primary element of the control system.

The present invention overcomes the disadvantages of the prior art by providing an advanced video display control system for displaying live video, graphics, animation, real time data, informational, such as sports statistics, text information, and instant replay, alone or in combinations.

SUMMARY OF THE INVENTION

The general purpose of the present invention is to provide a dynamic sign control system including; a personal computer or similar device for supplying digital display data in a format which corresponds exactly to the pixels available in the sign, a video link controller, which accepts sign display data from the personal computer and other sources in a variety of analog and digital formats, generates clock and command signals which are converted and combined to provide sign data signals in a format suitable for transmission over a high speed data transmission link such as a fiber optic system to a data receiver and distributor, located at the sign site, which receives the transmitted signals and converts them into sign display device control signals for controlling the individual display (pixel) elements of the sign.

The video link controller, preferably implemented by a programmed personal computer and several special purpose cards, includes a control program executed on the personal computer, a video interface card having, for example, provisions for three composite video inputs and two S-video inputs, which may selected, processed and converted to digital form by a dedicated video processor, and sent, over a fiber optic cable, to the transmitter link control card, where the selected video signal may be combined with digital signals representing text, graphics, and other digital data signals provided from the personal computer, or other suitable source, over an RS232 interface line, where it is buffered prior to high speed optical transmission to the data receiver and distributor located in, or at the site of, the controlled sign. The transmitter link control card has an RS232 line interface which is connected to an RS232 output line of the personal computer. Depending on the commands received by the transmitter link control over the RS232 line, any one of the five video input lines, or the data signals provided to the RS232 input from the personal computer, may be individually selected for conversion and transmission to the data receiver and distributor through a fiber optic cable connected to a modulator which is driven by the selected signal.

Alternatively, in overlay mode, the data signals may be combined with a selected digitized video signal and sent to the data receiver and distributor through the fiber optic cable connected to a modulator which is driven by the combined signal.

It will be appreciated that, as previously mentioned, the digital display signals from the personal computer correspond exactly to the individual display elements of the sign.

The data receiver and distributor includes an optical sensor connected to the fiber optic cable, a receiver for converting the signals to digital form, a programmable logic array, a dedicated microprocessor for configuring the programmable logic array and executing commands sent to the device and contained in the programs which run on the microprocessor, a flash memory, which stores certain program data for use in configuring the system at start-up, a plurality of FIFO buffer devices, an EPROM memory for storing the configuration of the programmable logic arrays, and associated I/O devices for interfacing the receiver and distributor to the various input and output lines and devices. Typically, on power-up, the dedicated microprocessor will configure the programmable logic arrays and the output devices according to the program data stored in the flash memory.

The receiver and data distributor is configured according to data and display intensity dimming data supplied from the sign configuration selected from flash memory in response to the command signal portion of the TAXI signal sent to the data receiver and distributor from the video link controller over the fiber optic cable.

The receiver board receives a serial TAXI encoded signal, via the fiber optic cable, and uses the TAXI receiver chip to decode the signal. The TAXI signal includes two types of information: one is a command signal and the other is display data.

The command bytes are used to receive sign configuration data and display intensity dimming information. When new sign configuration information is received, the dedicated microprocessor activates the appropriate programming sequence, reads the selected sign configuration program out of FLASH, and programs the receiver board and the output cards. The display intensity dimming information is passed on to the output cards which then distribute it out throughout the display.

Display data is received and then organized to be passed on to the addressed output card address. The received display data is stored in the RAM located on the output cards.

The data receiver and distributor also includes an RS232 port that can be accessed from the personal computer to directly interact with the dedicated microprocessor, a light detector input for automatic display dimming, a relay output to control the display fans, and a fan/temperature detector input to blank the display in the case of a failure.

It is an object of the invention to provide an improved remote controller for an electronic sign.

Another object of the invention is to provide a remote electronic sign controller including a personal computer.

Still another object of the invention is to provide a remote electronic sign controller having the ability to select from a variety of video inputs and transmit the selected video input in digital form to a remote sign.

A still further object of the invention is to provide a input remote electronic sign controller having the ability to combine a selected input from a variety of video inputs and data inputs, combine the selected inputs into a single composite digital signal for transmit the ability to combine a selected input from a variety of video inputs and data inputs, combine the selected inputs into a single composite digital signal for transmission to a remote sign location and transmit the single composite signal video to a remote sign over a high speed fiber optic cable.

A still further object of the invention is to provide a remote electronic sign controller having the ability to combine a selected input from a variety of video inputs and data inputs, combine the selected inputs into a single composite digital signal for transmission to a remote sign location and transmit the single composite signal video to a remote sign over a high speed fiber optic cable where the signal is received, buffered and distributed to the individual display elements of the electronic sign.

Still another object of the invention is to provide remote electronic sign controller having the ability to combine a selected input from a variety of video inputs and data inputs, combine the selected inputs into a single composite digital signal for transmission to a remote sign location and transmit the single composite signal video to a remote sign over a high speed fiber optic cable where the signal is received, buffered and distributed to the individual display elements of the electronic sign in accordance with a command signal representing the type of electronic sign being controlled.

Other objects, features and advantages of this invention will become apparent from the following, more detailed, description of an embodiment of the invention.

The Venus 7000 also has the ability to communicate with the V-LINK through a standard COM port on the computer. Through this communication the Venus 7000 has the ability to control the video input selection on the V-LINK, as well as other display adjustments such as brightness, contrast, saturation, etc.

VMAX3 Transmitter Card

The VMAX3 transmitter card was developed by Daktronics to provide a means of transmitting large volumes of data from a control computer to the sign. It is designed to operate on a PCI bus. The transmitter card has a programmable logic device that is programmed. The card receives data through the PCI bus from software, such as the Venus 7000, and organizes it to send it out on a high speed serial line. A TAXI transmitter chip is used to make the 8 bit parallel to serial conversion at data rates up to and exceeding 175 Mbaud. This serial signal is transmitted out of the card via fiber optic cable.

V-LINK II

The V-LINK II controller is a video interface to provide direct video capability to the VMAX3 display architecture. It is made up of two components: the video interface board and the V-LINK II board. The Video Processor board is a daughter card that is connected the V-LINK II through a header.

The Video interface board has three composite video inputs available and two S-video inputs. The video processor chip on the board receives these inputs, processes them and passes the information on to the V-LINK II board on a bus through the header.

The V-LINK II board has a VMAX3 fiber optic input that receives Venus display data. It also has an RS232 port that allows the V-LINK II to communicate with the Venus 7000. This port allows the Venus 7000 operator to select the display output to be a video input, a Venus input, or a video input with Venus data overlaid. Other display controls such as display brightness, contrast and saturation can be adjusted through this port.

The V-LINK II buffers both the Venus data and the video data as it is received. Depending on the configuration received from the RS232 port, the V-LINK II will either send out the buffered video data, the buffered Venus data, or in overlay mode, buffered data from both the video and the Venus data will be sent out. This data is output as a VMAX3 fiber optic output. This information is intended to be received by the data distributor in the sign. A composite video output of the data is also an option. The V-LINK™ II controller has the ability to receive animation data from the Venus 7000 controller and can also receive data from multiple video sources. An input to the V-LINK II controller is used to select which input should be sent to the display. An additional feature is the ability to overlay the animation data from the Venus 7000 controller over the top of a video source digitally and send the combined information to the display.

Data Distributor—Receiver Board

The data distributor receiver board is a display technology independent component in the VMAX3 system. It is not a standalone unit. At least one data distributor output card must be used with the receiver board to function as a unit, typically located inside the display. The main components of the receiver board include the fiber optic receiver, the TAXI receiver chip, a programmable logic device, a microprocessor, FLASH memory, some FIFOs, an EPROM, and some I/O. On power up the processor programs the programmable logic devices on the receiver board, as well as the devices on the output cards. There is a different program for each technology type. These programs are all stored in the FLASH memory.

Data Distributor—Output Card

The output card is a display technology independent component in the VMAX3 system. It is not a standalone unit. It must be used in conjunction with the data distributor receiver board which is typically located inside the display. The output card uses a connection scheme that is mechanically similar to a PC104 connection, with a proprietary electrical connections, to connect to the data bus on the data distributor/receiver board. The output card has a 16 position rotary switch that sets the address of the card. This card address sets the data that this output card will receive from the data distributor/receiver board. This data is then stored into the on-board RAM.

The output card has two separate data outputs. Each of these outputs include four parallel output ports with identical data. Each output consists of two signal lines, one data line, and one encoded clock line. Additional data lines may be used in future designs. The output card generates an encoded clock signal which includes the following signals:

| Signal | Function |
|---|---|
| data clock | passes through the column director and gates in the pixel data on the data line on the rising edge at the line controller or the dual line controller. |
| command clock | passes through the column director and gates in the dimming data on the data line on the rising edge at the line controller or the dual line controller. |
| line controller latch | passes through the column director and resets the line controller or the dual line controller to accept data for the next column of pixels. |
| column director latch | informs the column director/dual line controller that the line controllers logically below it have received all their data. This latch activates the column director output port so that data will be clocked down to the next column director. |
| frame latch | used to reset the entire display. This signal is sent when the entire data frame has been sent to the display. The column director resets and the column director OUT port becomes inactive. The line controller begins to display the new data frame and resets the input function to prepare to receive the next frame. The dual line controller resets and the column director OUT port becomes inactive, the new data frame is displayed and the input function prepares to receive the next data frame. |

The output card generates these signals at a rate to ensure a display frame rate of 30 frames per second.

Dual Line Controller

The dual line controller (DLC) is a component in the VMAX3 system that combines the functions of the line controller and the column director into one circuit. It is located inside the display. In some cases it may include the combination of several line controllers with a column director. It is a display technology dependent component that replaces the line controller and the column director for some display technologies. For more information regarding its function, refer to "line controller" and "column director."

Column Director

The column director (CD) is a technology independent component in the VMAX3 system located inside the display. Its primary function is to direct the data stream into the correct column of line controllers. Its function is implemented by a programmable logic device and some I/O components. The column director has one input and two outputs. Each of these I/O ports consists of two signal lines, one data line, and one encoded clock line. Additional data lines may be used in future designs. The encoded clock line contains a couple of signals that the column director decodes and uses. They are the column director latch and the frame latch.

The clock decode function watches the encoded clock line on the input port. It ignores the following encoded signals: the data clock, the command clock, and the line controller latch. When a column director latch is decoded, it triggers the output control function. When a frame latch is decoded, the output control function is reset.

The line controller OUT port on the column director passes data to the line controller. This is an unaltered data and clock from the input port.

The column director OUT port passes data on to the next column director. The data line is passed through unaltered from the input port. The encoded clock line is not allowed to pass the clock signal to the next column director until a column director latch is detected. The clock line will then pass through unaltered from the input port until the column director is reset. A reset takes place when a frame latch is detected.

Line Controller

The line controller (LC) is the component at the end of the VMAX3 data stream. It is located inside the display. The line controller receives serial data from the column director and retransmits it out to the next line controller. The line controller is made up from only a few core components including a programmable logic device, RAM and I/O components. The line controller is a technology dependent component in the VMAX3 system; therefore, several models of line controllers will be developed.

The input data is received serially on two signal lines, one data line, and one encoded clock line. Additional data lines may be used in future designs. The encoded clock line contains several signals that the line controller decodes and uses. They include a data clock, a command clock, a line controller latch, and a frame latch. The input function of the line controller uses this information to organize the data received and store it into RAM.

The output function of the line controller reads the data out of RAM and controls the display modules to look like the image that is currently stored in RAM. The methods to control the module vary depending on the display module technology.

The data stream is transmitted from the data distributor output cards to the dual line controller, the column director and the line controller. This data stream is the method to transmit all the data from the data distributor out to all the appropriate locations in the sign. This data stream is transmitted over a Category 5, RJ-45 cable with four twisted pairs of signal wire. This data stream consists of one encoded clock line signal and anywhere from one and three data signal lines. These signal lines are transmitted over a twisted pair in the cable as a RS-422 signal. The function of this encoded clock line would be a big part of this patent idea.

We have no configuration switches in our signs (auto configurable). The dual line controller provides great flexibility for manufacturing and for long term maintenance for the customer.

The dual line controller or line controller is the only technology dependent component in the VMAX3 system. The data distributor receiver card, the data distributor output card, the column director, the V-LINK II controller and the VMAX3 transmitter card are all completely technology independent. This means that the same electronics that are used to run a 16.7 million color RGB LED display can also be used to run a 16.7 million color incandescent display or a 256 color RG LED display, etc.

The data distributor is auto-configurable. The data distributor receives its configuration data from the Venus 7000 controller. The Venus 7000 controller sends command bytes over the VMAX3 fiber optic data transmission. The data distributor then reads these command bytes and configures itself appropriately. This configuration information includes technology type and sign size.

Display Module

RGB Driven or Driver

The display module is actually not a part of VMAX3, but needs to be explained to fully understand how the VMAX3 system interacts with the display. The display module is a technology dependent component which is a part of the actual display. The module contains the light emitting or reflecting components as well as the drive electronics required to activate each pixel in the module. The size of the module is determined by the technology. A 8×16, 8×4, 8×8, 16×32, and 16×16 (# pixels high×# pixels wide) are some examples of the resolution of a module, although others may be developed. The center/center spacing between pixels on the module may vary. The combination of the center/center spacing and the module resolution determine the physical size of the module.

The drive electronics for the module has been designed to receive and retransmit data using a shift register approach.

Module Calibration

Module calibration and pixel to pixel calibration information is stored on each RGB LED driver board. When the system powers up, the dual line controller retrieves the calibration information from the module and stores it. This information is used to help the dual line controller drive the modules in a way that gives the display a nice consistent appearance. The dual line controller can receive an additional module intensity offset from the VMAX3 system to allow the operator some adjustment on a module by module basis.

BRIEF DESCRIPTION OF THE DRAWINGS

FIG. 2 illustrates a layout for FIGS. 3*a*–3*o* drawings;

FIG. 8 illustrates a layout for FIGS. 9*a*–9*ab* drawings;

FIG. 10 illustrates a layout for FIGS. 11*a*–11*ab* drawings;

FIG. 12 illustrates a layout for FIGS. 13*a*–13*o* drawings;

FIG. 16 illustrates a layout for FIGS. 17*a*–17*o* drawings;

FIG. 20 illustrates a layout for FIGS. 21*a*–21*h;*

FIG. 23*a*–23*b* illustrate signal timing diagrams;

DETAILED DESCRIPTION OF THE PREFERRED EMBODIMENTS

Figure 1A:
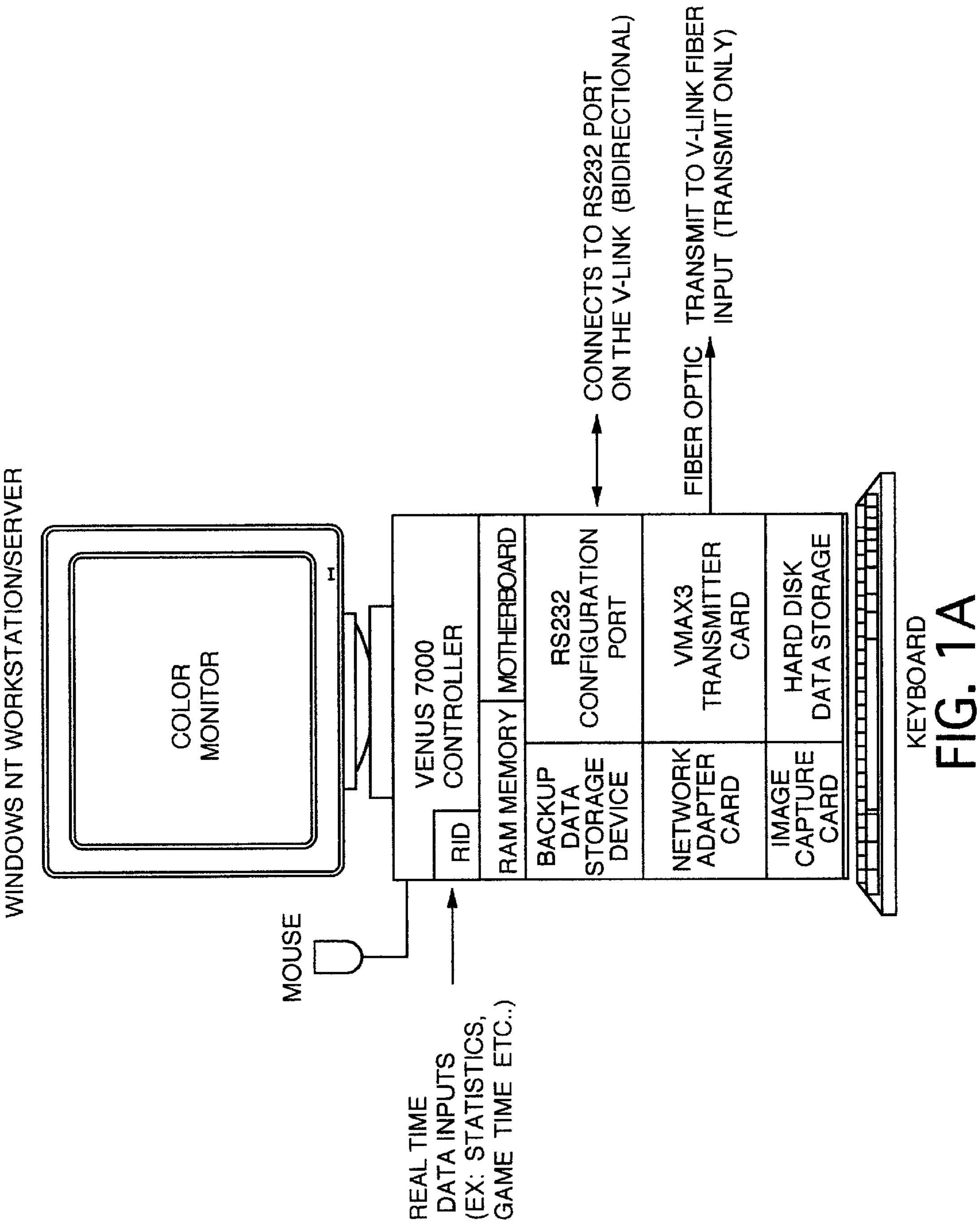
FIGS. 1*a*–1*c* constitute a block diagram of the remote control system for an electronic sign.
Figure 1B:
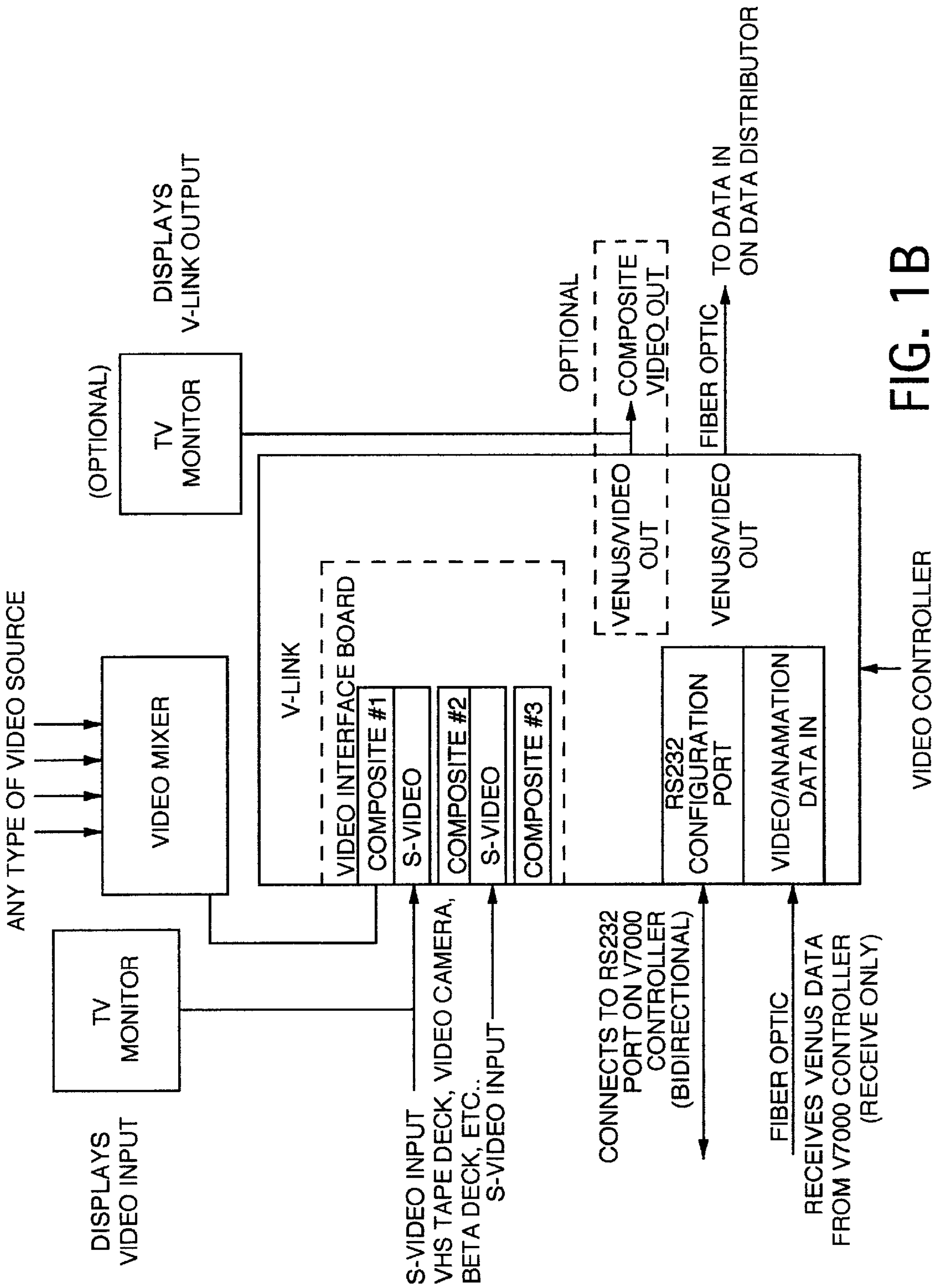
Figure 1C:
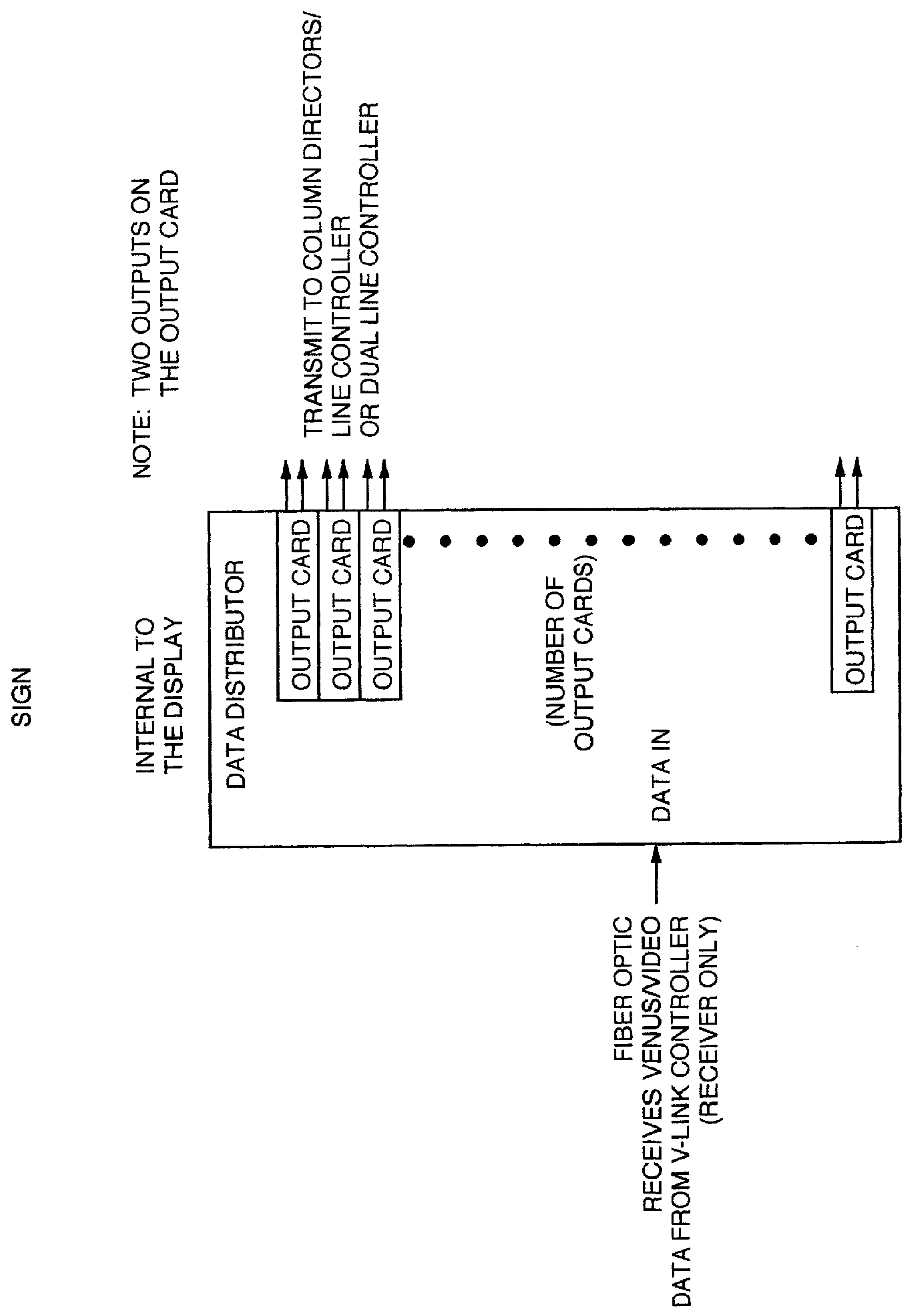

FIGS. 1*a*–1*c* are a block diagram of a control system 10 for a video sign 40, including a controller or computer 12, having a plurality of special purpose cards such as the video interface card 14 and the transmission link control card 16 which are connected to, for example, a personal computer data bus such as the PCI bus 18. Information to be displayed may be supplied to controller 12 through video interface card 14 at composite video inputs 1140, 1141, 1142, S-video inputs 1143, 1144, RGB video input 1145, or the RS 232 input 1146 line. The output signal from a video mixer 1150 may be connected to the composite video input 1140. The output of a VHS tape deck 1153 may be connected to the S-video video input 1143. The RS232 line, connected to serial digital input 1146, carries commands and display data input supplied to the computer 12 from a keyboard 30 or from some other source such as a communication line, not shown.

Similarly, the video interface card 14 may include a parallel digital input line 1147*a* to accommodate a parallel output 1147*b* from computer 12 or other suitable source of parallel digital signals to be displayed. Other suitable signal sources may be connected to the remaining video input lines 1141, 1142, 1144 and 1145 to provide data to be displayed on a selected one of signs 40*a*–40*n*. Additionally, a fiber optic port 148*a* is provided to accommodate the input of data supplied on optical line 1148*b* in the form of an optical signal from computer 12 at optical output port 1148*c*.

As will be described in greater detail, analog video data at the selected of inputs 1140–1145 and 1148 representing information to be displayed on the selected one of signs 40*a*–40*n*, is converted to digital form by an analog to digital converter (ADC) 1–151, and placed in buffer storage 1153 located on video interface card 14.

Buffered data representing information selected for display, is read from buffer storage 1153 and loaded on PCI bus 18 for transfer to the transmission link control card 16 in accordance with the data selection command at the RS232 input 1146 supplied by the operator, or the computer program.

Display data may also be transferred to the fiber optic input 1161 on the transmission link control card 16 from the fiber optic output port 1149 on the video interface card 14 in accordance with commands transferred to the video interface card via an optical cable connected to the fiber optic input port 1148*a*. The optic input port 161 accommodates data transmitted at speeds up to 150 Mbaud using currently available conventional technology.

The transmission link control card 16 includes a programmable logic array 1161 which is configured by microprocessor 1163 according to commands and data supplied from computer 12 over line 1165*a* from the RS232 output 1165*b* to the RS232 input 1165*c*. Data received by programmable logic array 1161 on PCI bus 18 from computer 12, is organized for transmission and supplied to TAXI transmitter 1166, which makes a parallel to serial conversion at data rates up to 175 Mbaud, providing a signal at fiber optic output port 1167*a*, for transmission on fiber optic cable 1167*b* to the optical input 1171 of data distributor/receiver 1170, located a the remote sign location.

Data distributor/receiver 1170 contains an optical receiver 1172 connected to receive display information optical provided at optical input port 1171 and transfer it to TAXI receiver 1173. The decoded output from TAXAI receiver 1173 is processed by programmable logic array 1174, configured by an on-board microprocessor 1175, buffered in a FIFO buffer 1176, and sent to controlled signs 40*a*–40*n* for display, over data lines 41*a*–41*n* connected to output ports 1177*a*–1177*n*.

Data output port 1177*a*–1177*n* consists of two signal line one data line and an encoded clock line. Each of signs 40*a*–40*n* have a line controller and column director, located within the sign, responsive to clock signals and display data, which are effective to decode the display data and generate signals for controlling the intensity of individual pixel display elements in the sign. Further information relating to the elements of the system is provided in the following descriptions thereof.

Figure 3A:
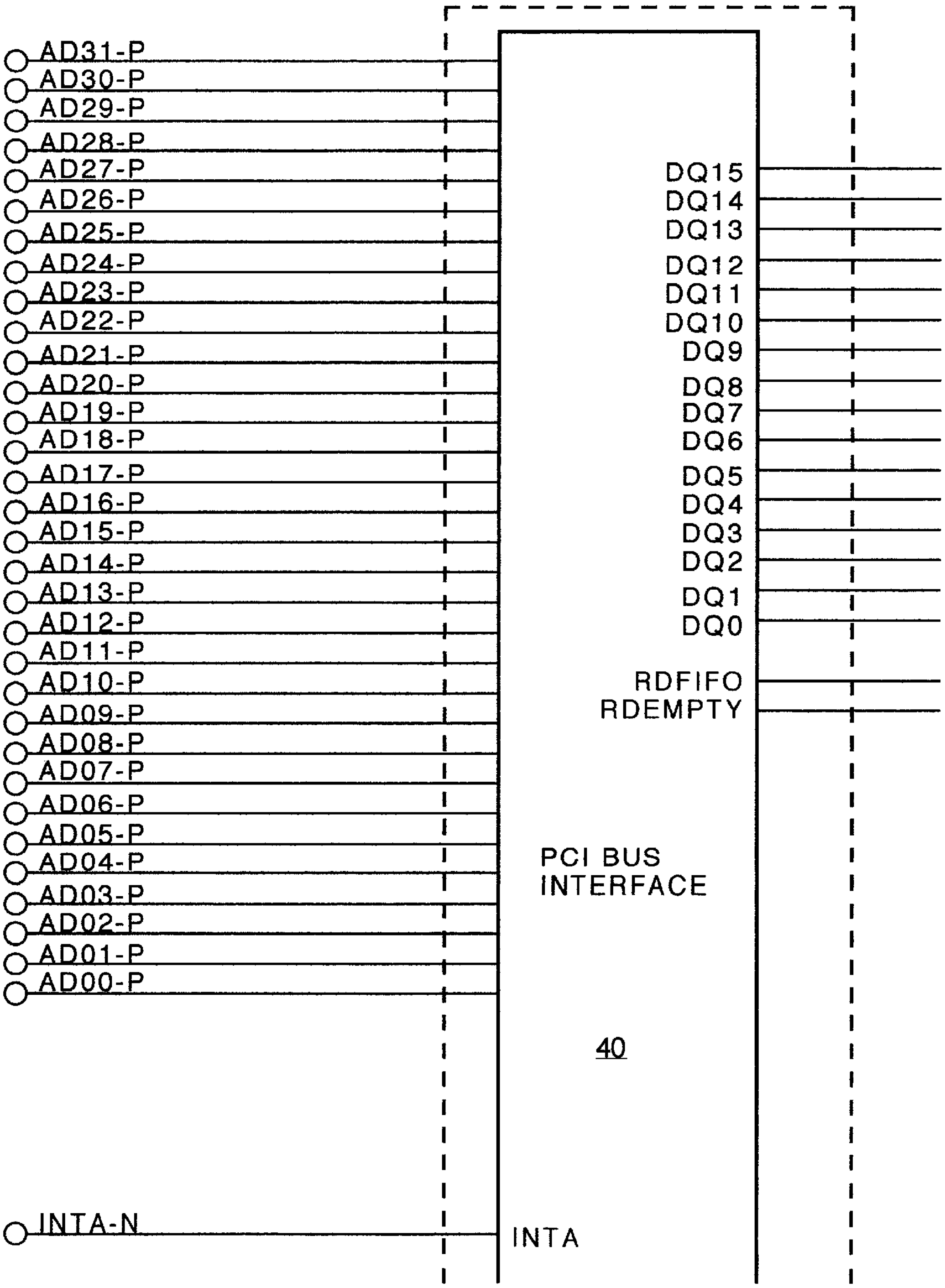
FIGS. 3*a*–3*o* illustrate a sign control electrical circuit schematic diagram.
Figure 3B:
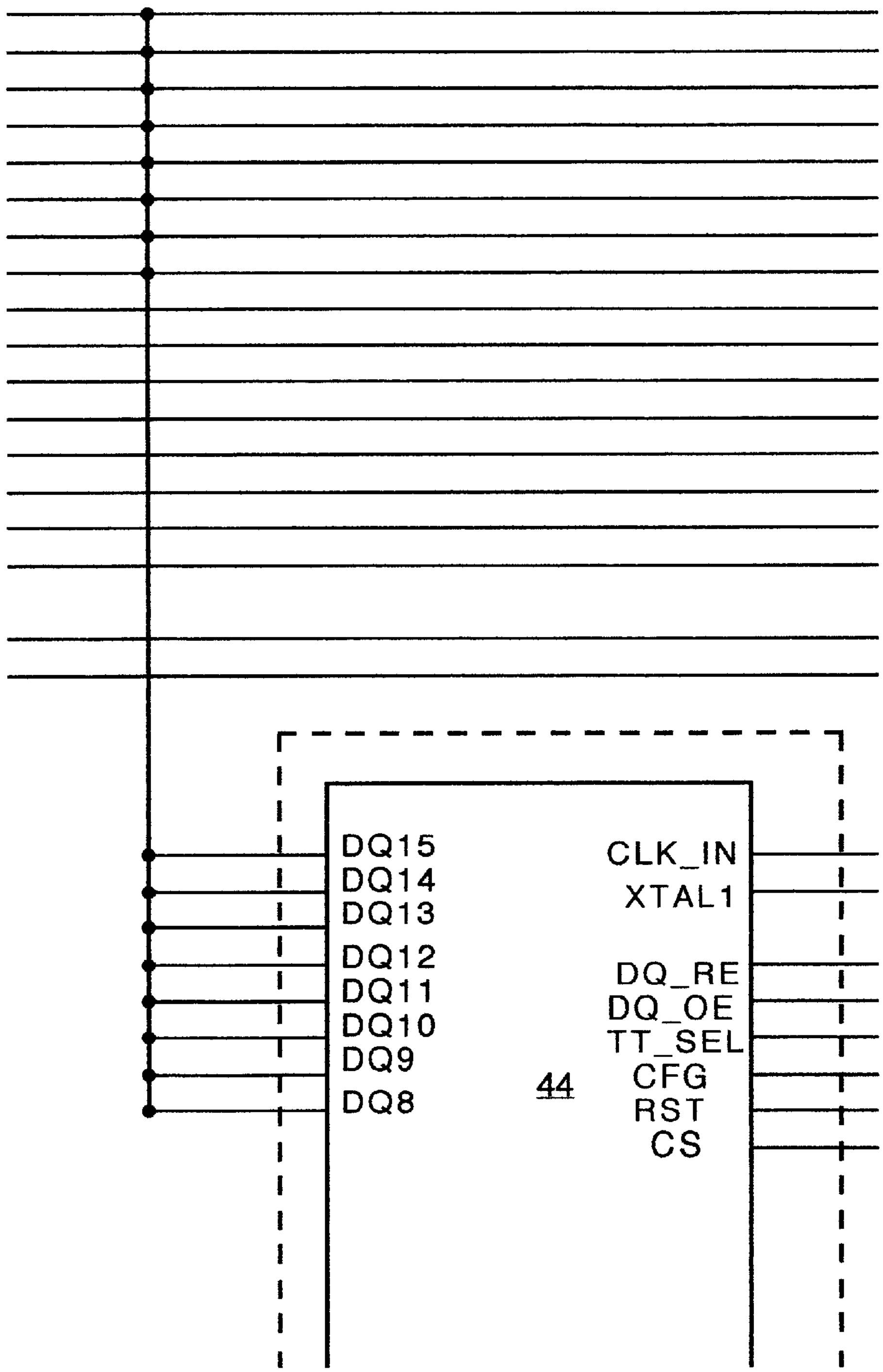
Figure 3C:
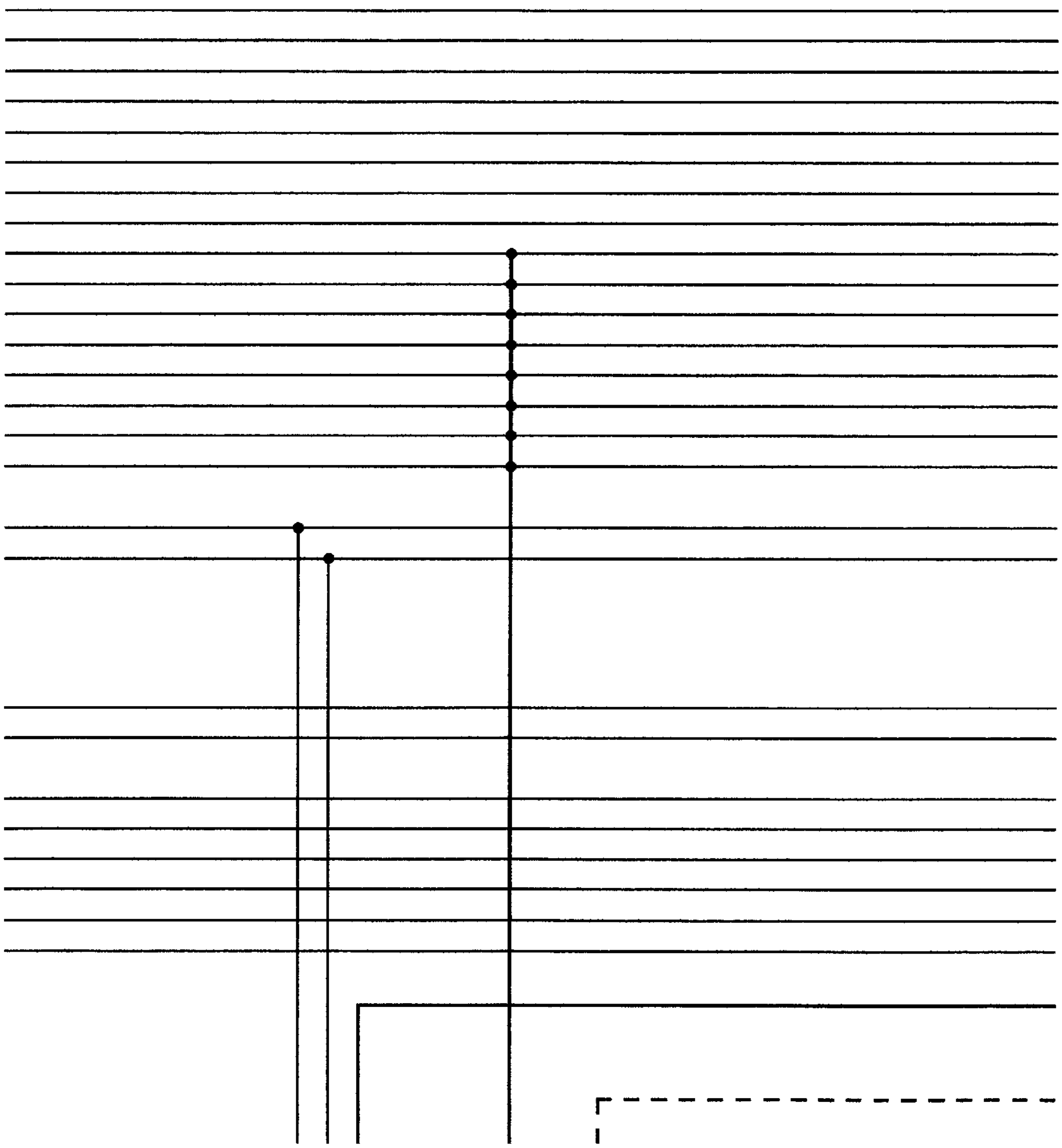
Figure 3D:
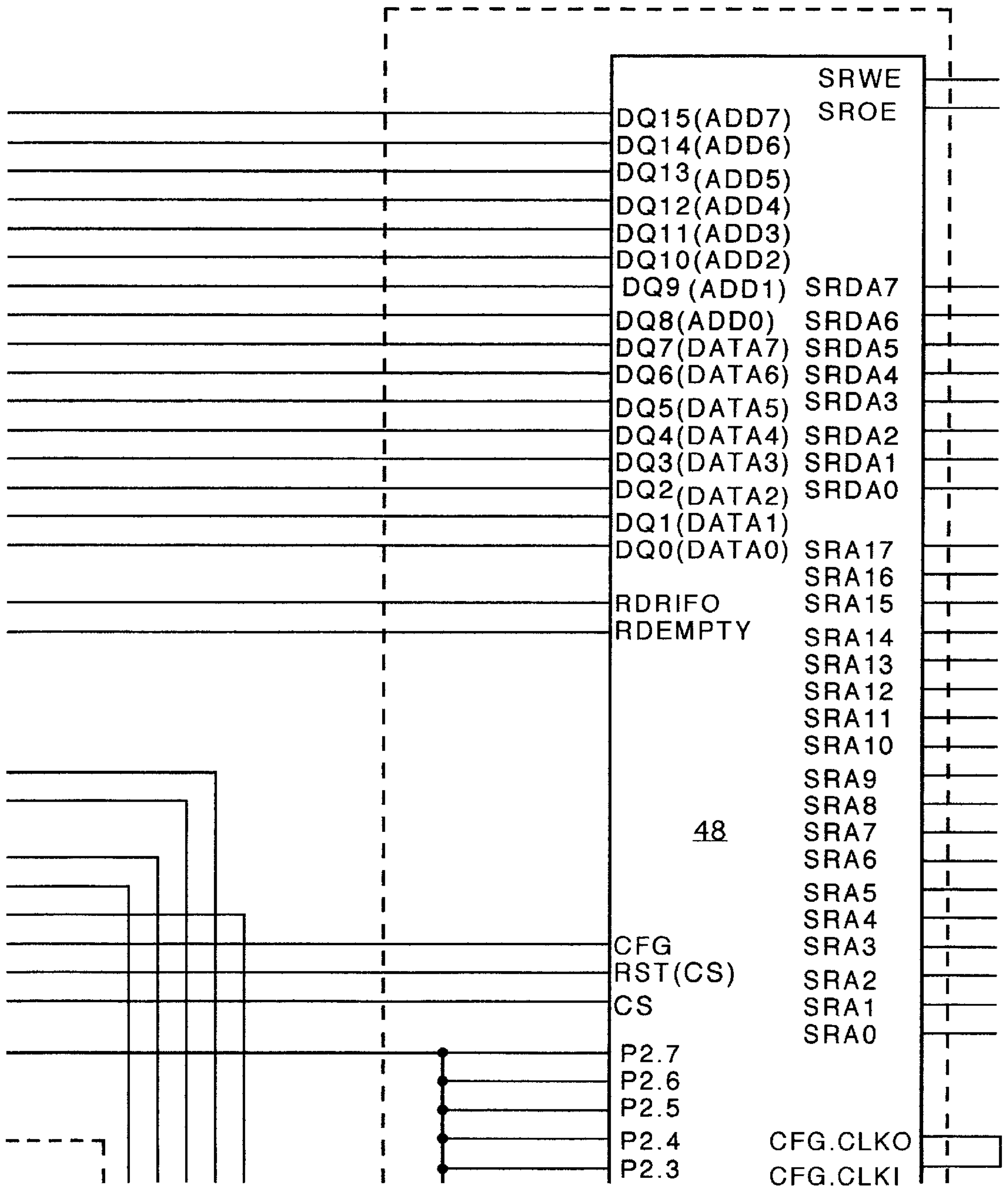
Figure 3E:
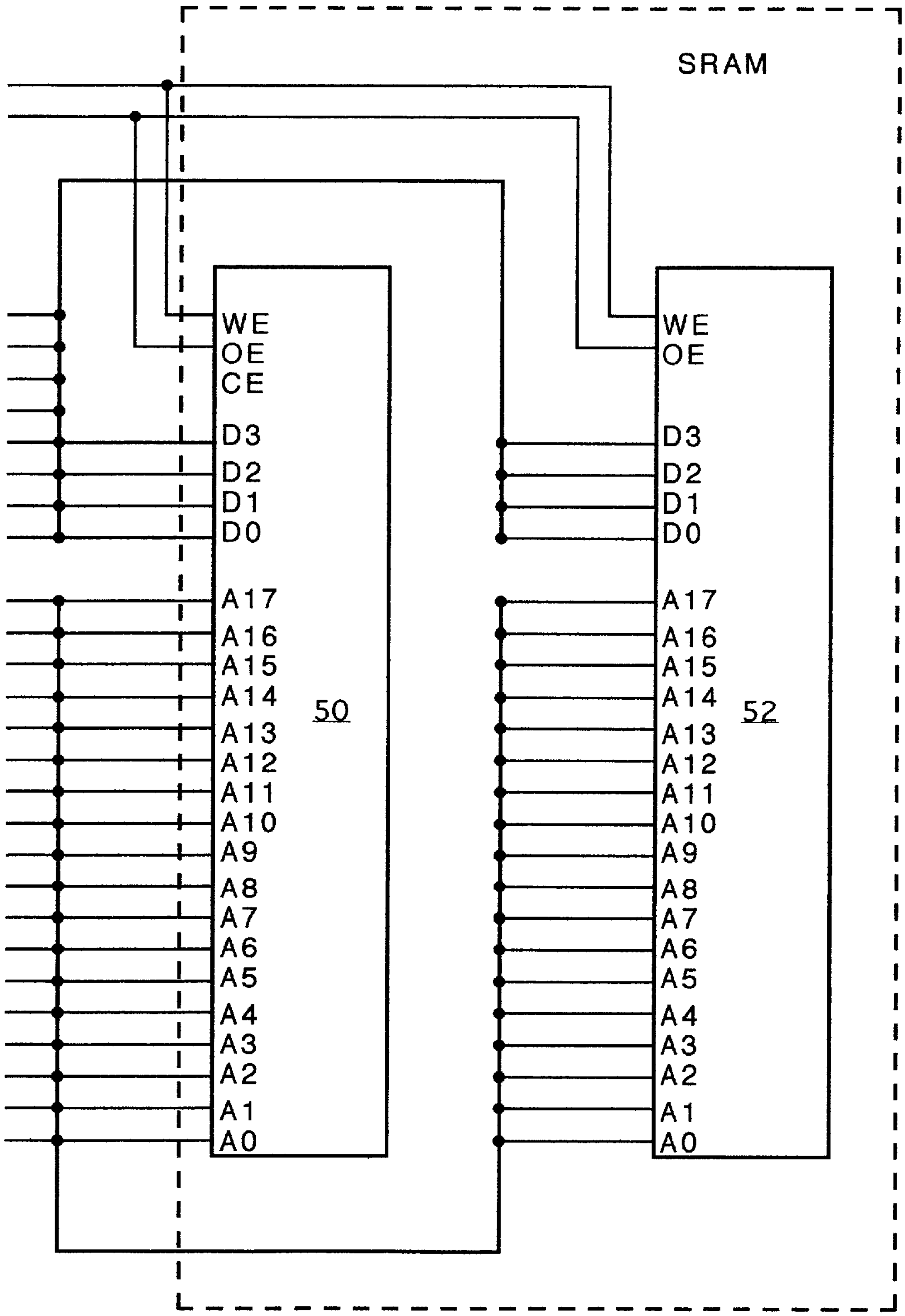
Figure 3F:
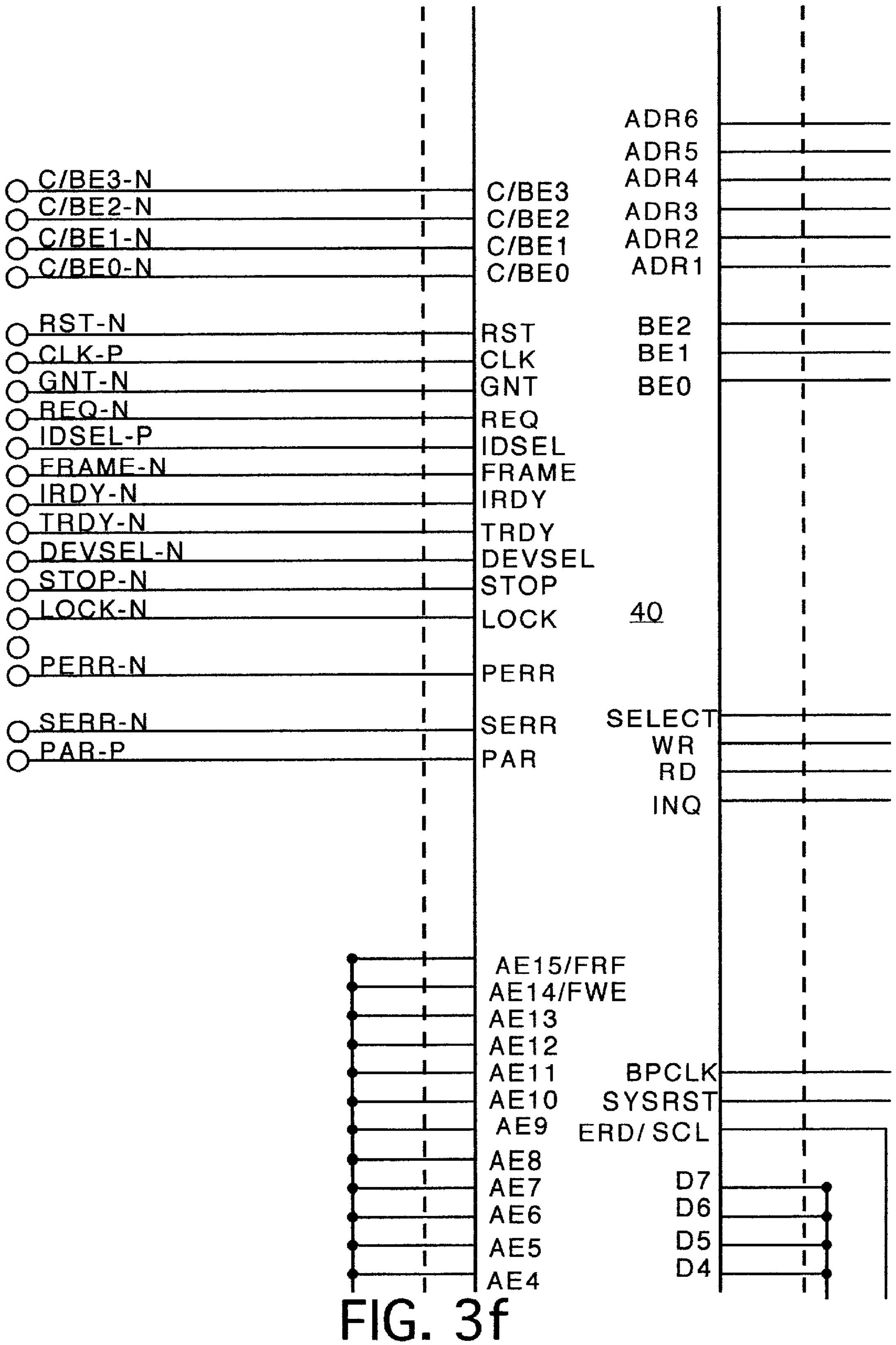
Figure 3G:
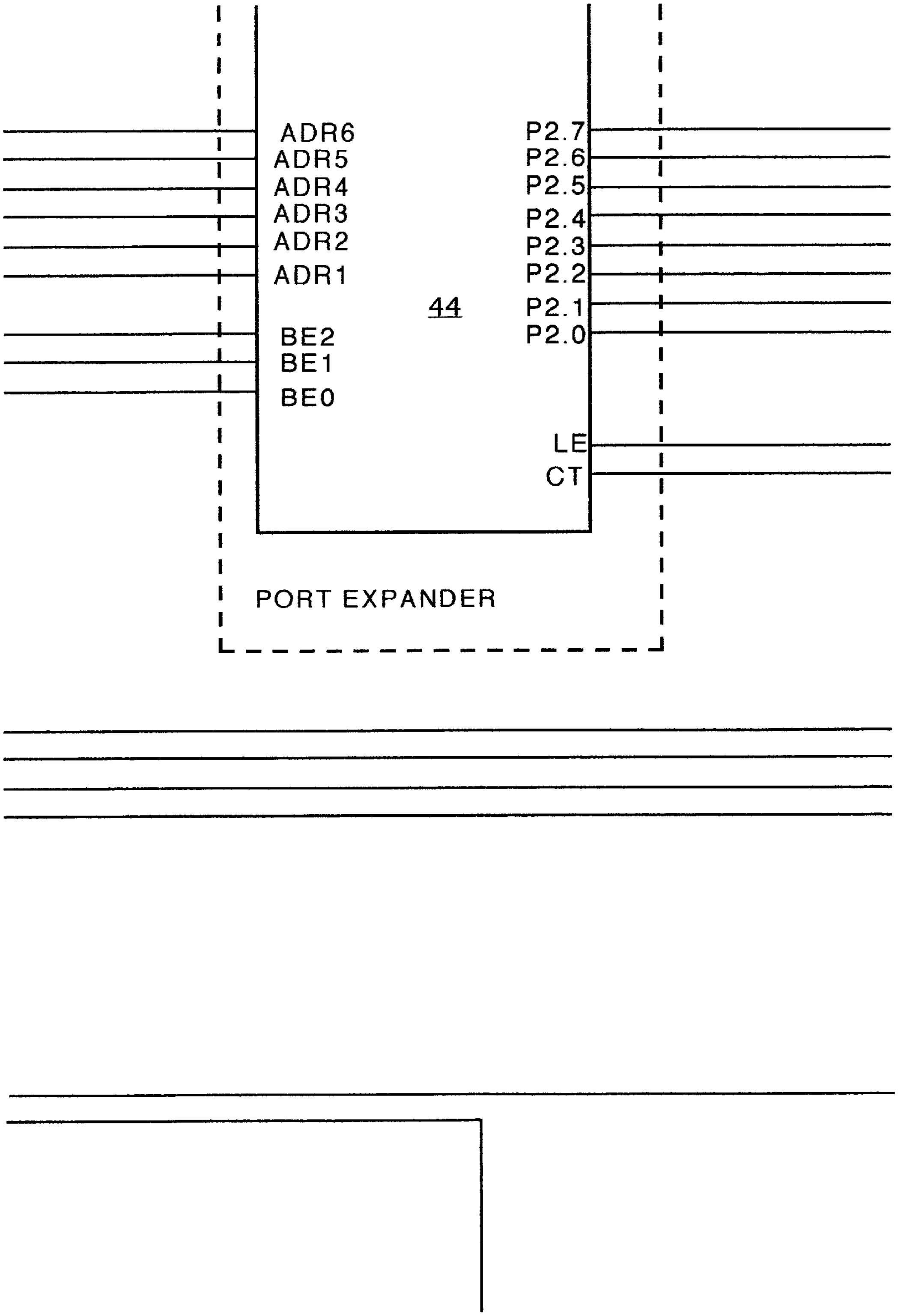
Figure 3H:
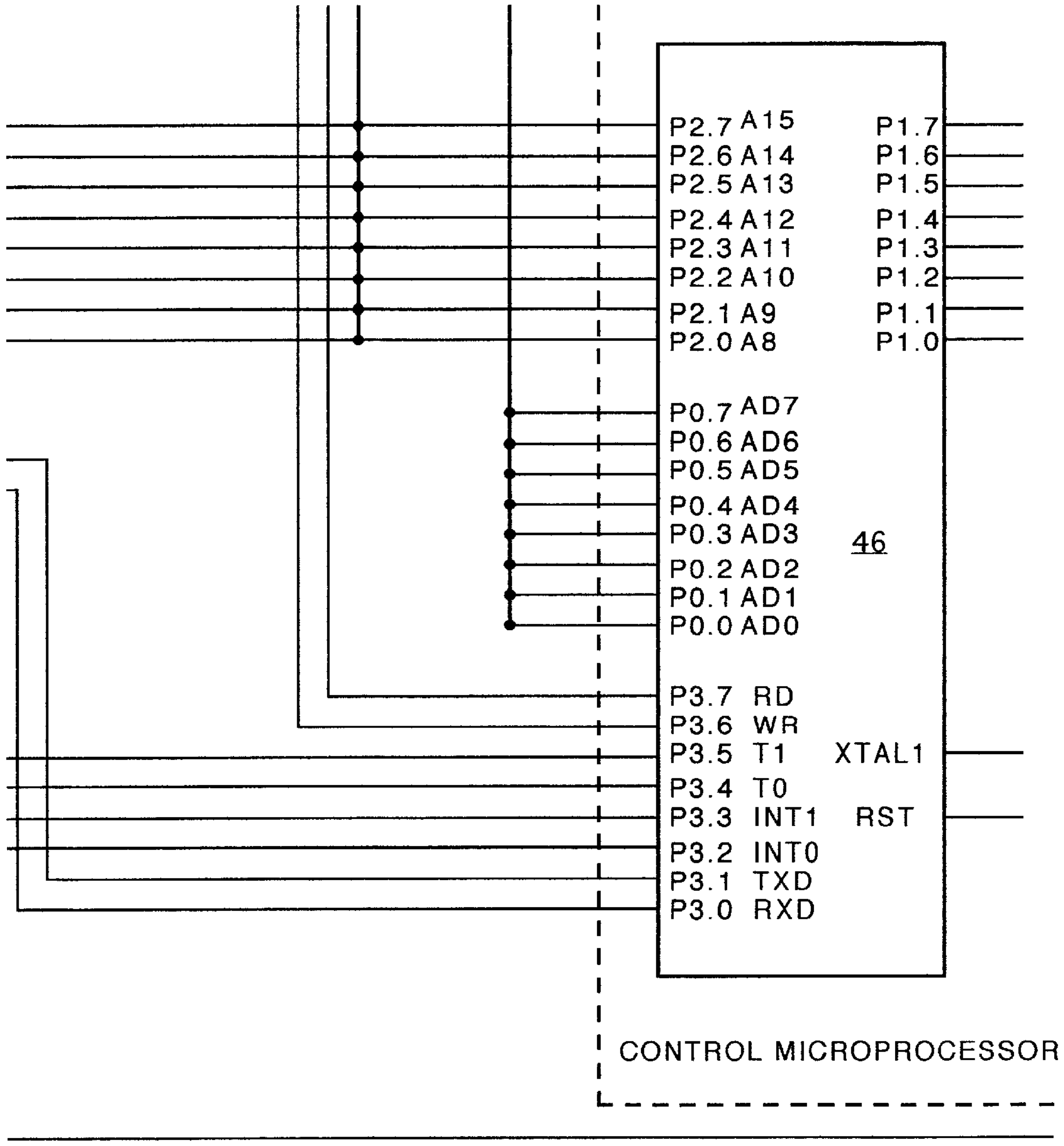
Figure 3I:
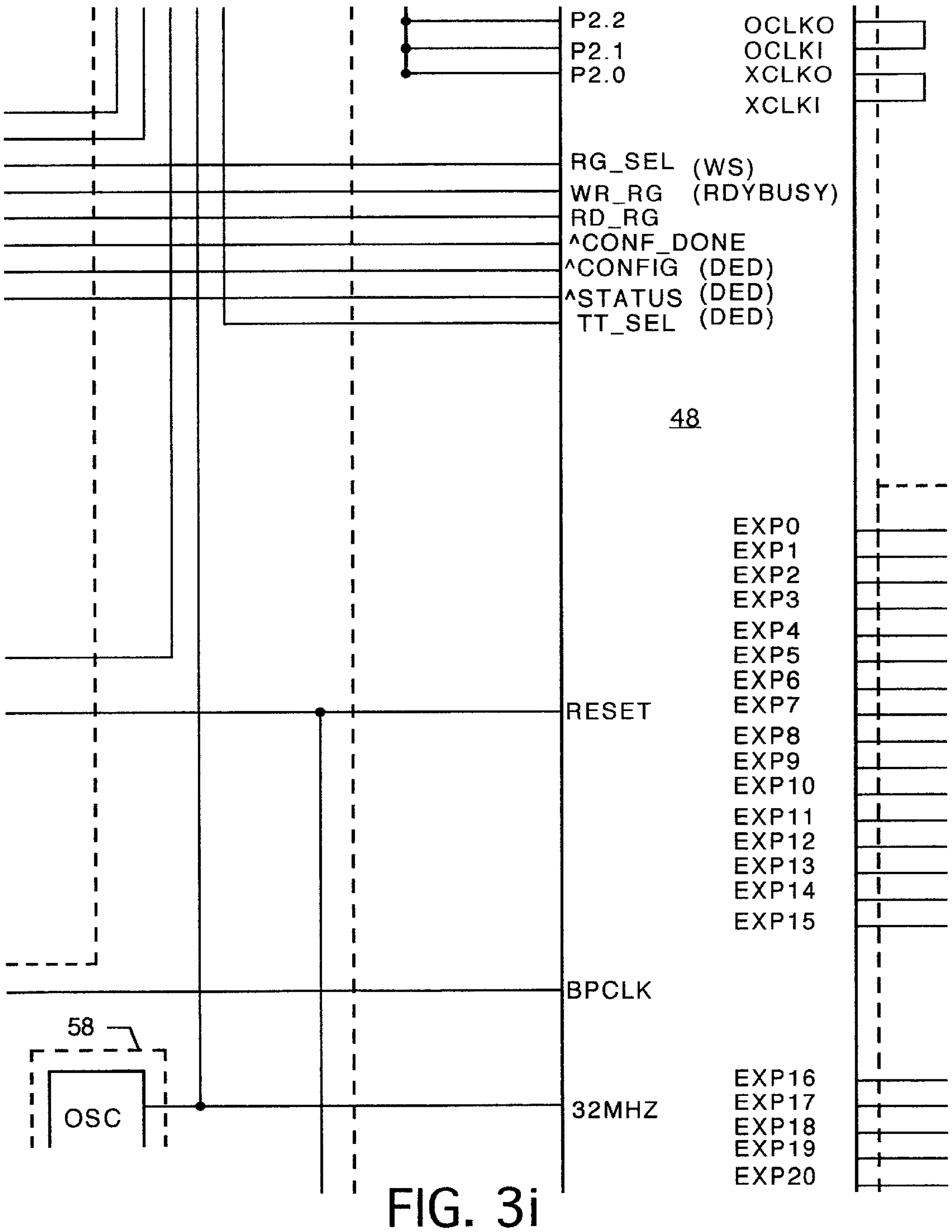
Figure 3J:
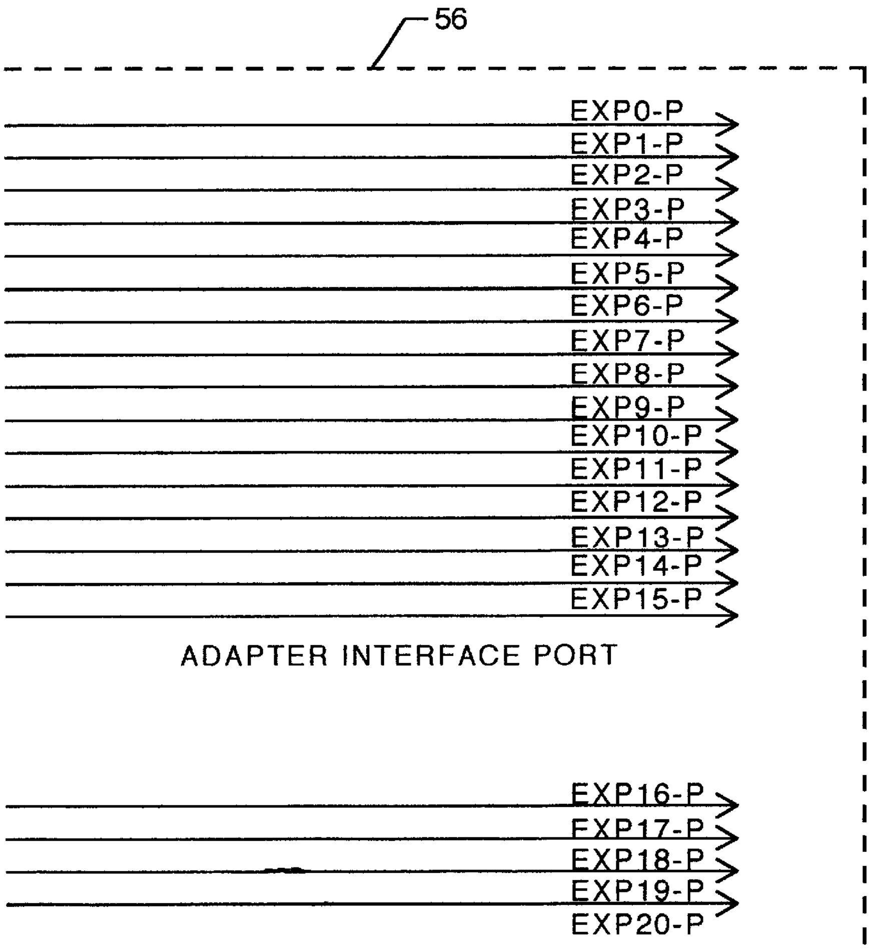
Figure 3K:
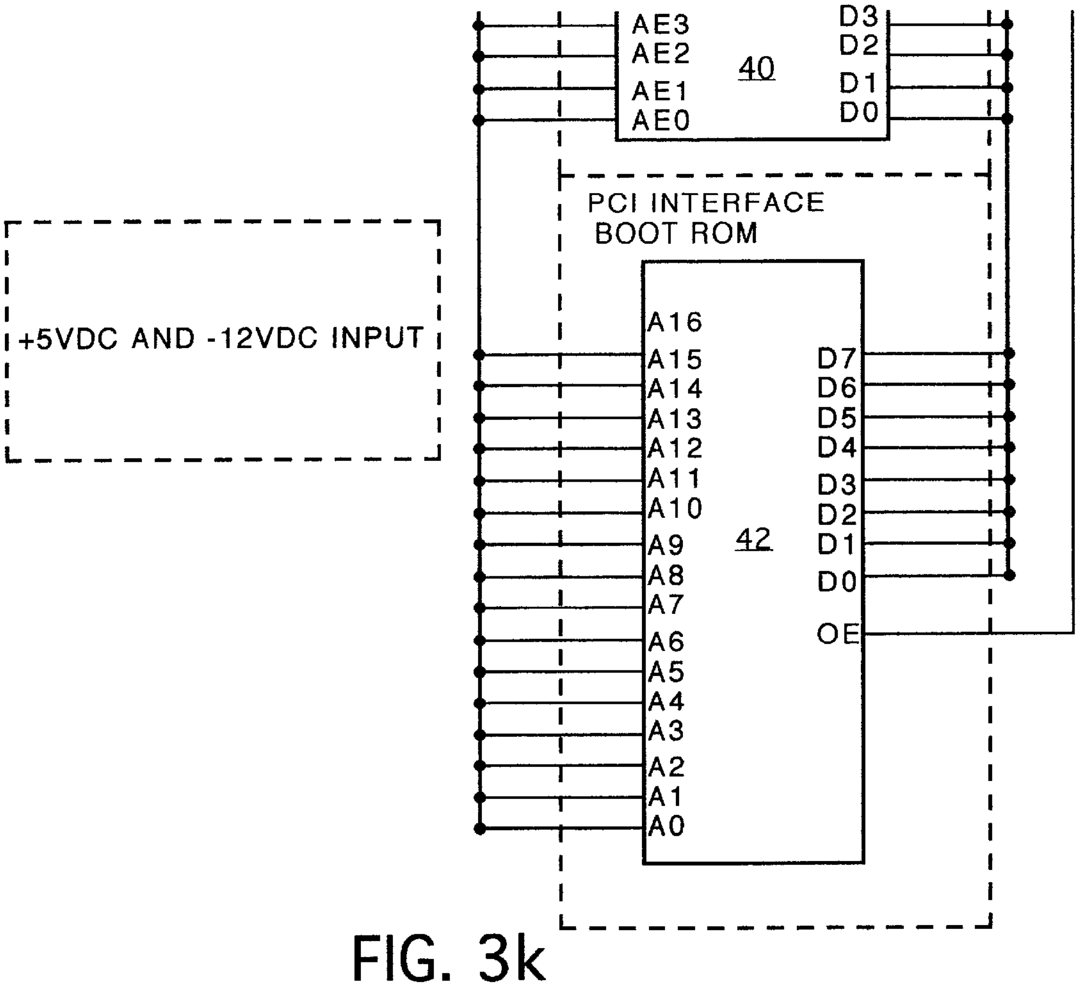
Figure 3L:
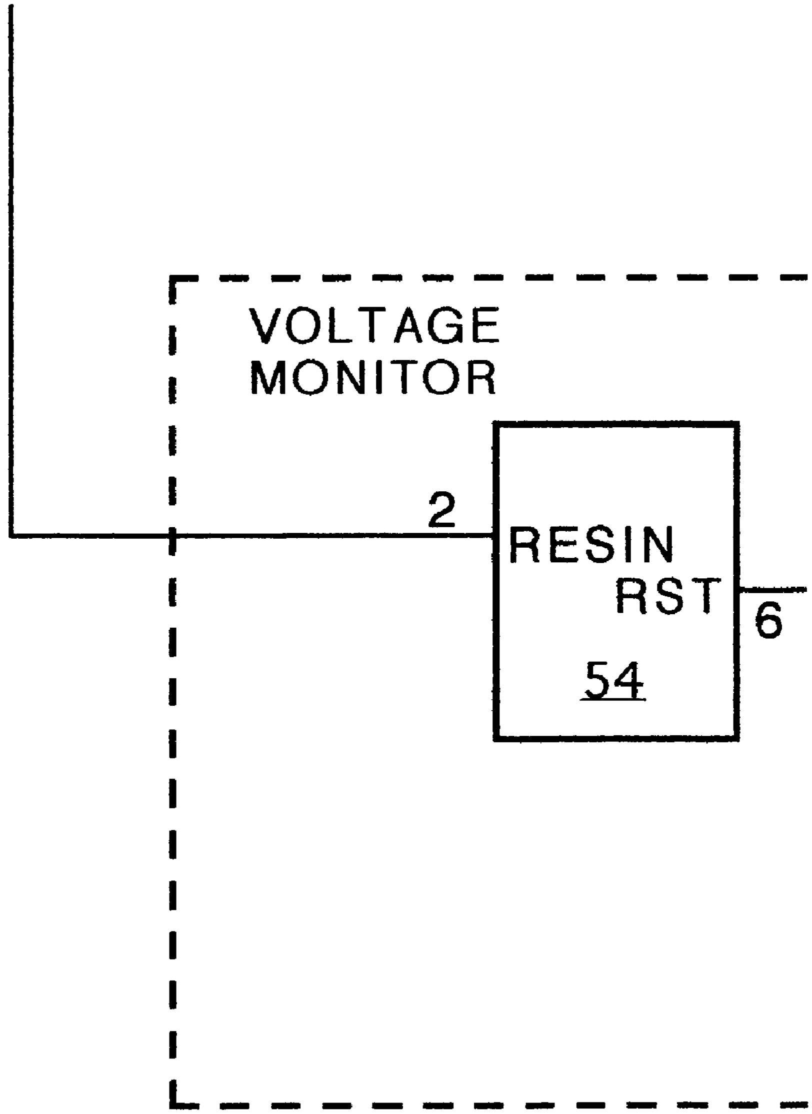
Figure 3M:
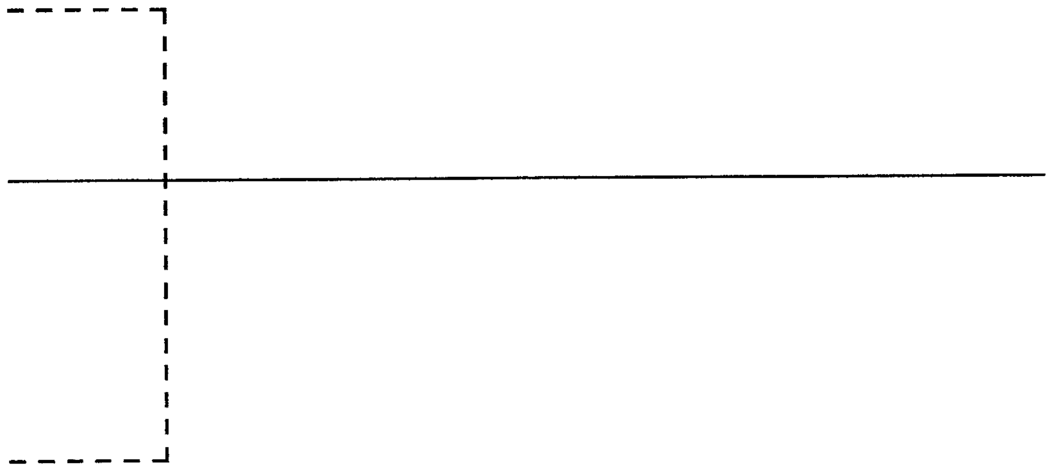
Figure 3N:
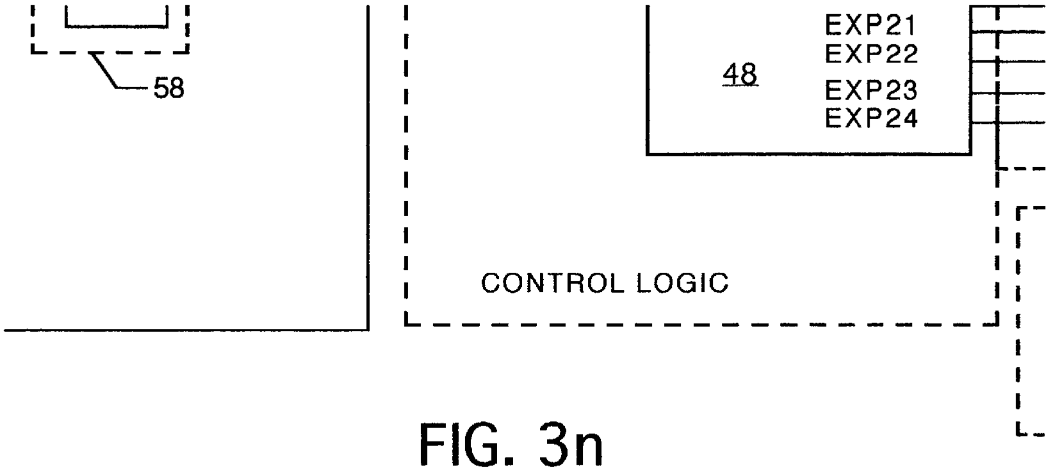
Figure 3O:
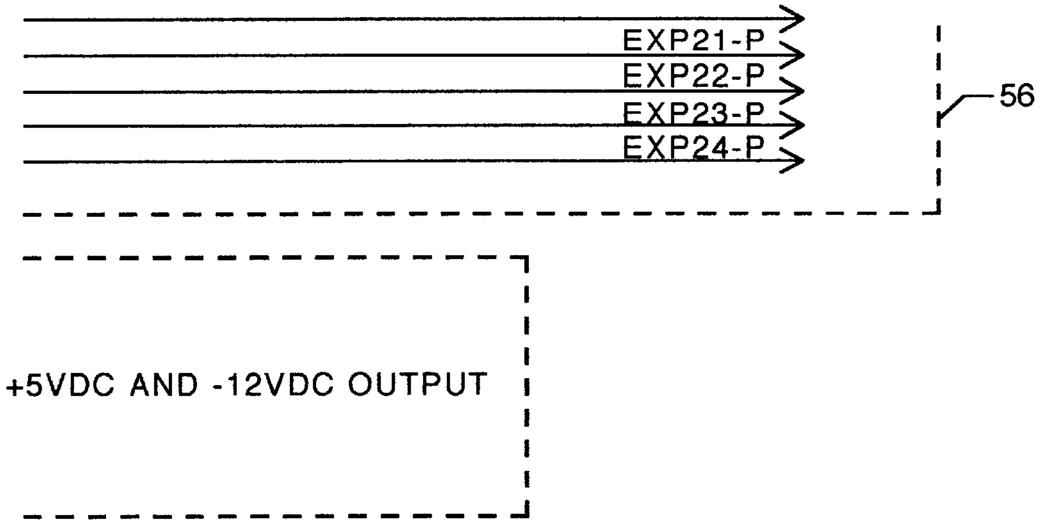

FIG. 2 is a layout of FIGS. 3*a*–3*o*.

FIGS. 3*a*–3*o* illustrate a sign control electrical circuit schematic diagram which is a PCI bus interface card which plugs into the controller or computer 12, comprising a PCI bus interface 40, PCT interface boot ROM 42, port expander 44, control microprocessor 46, programmable control logic 48, SRAMs 50 and 52, voltage monitor 54, adapter interface port 56, and oscillator 58.

Figure 4:
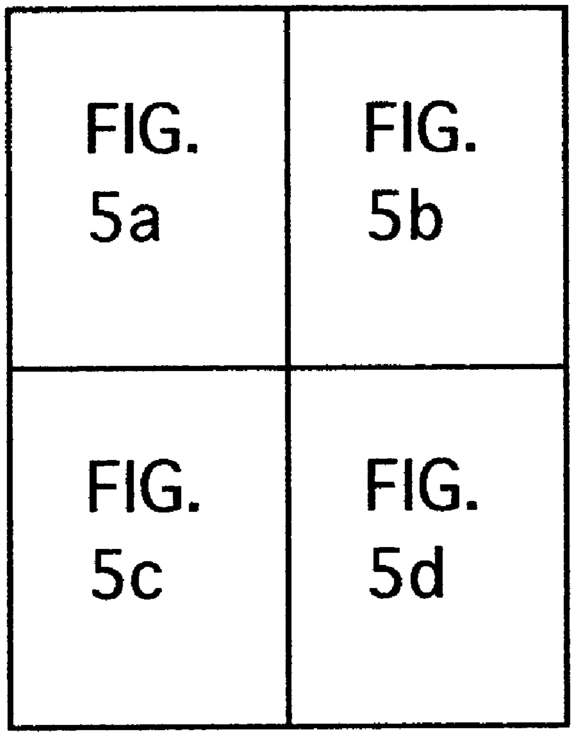
FIG. 4 illustrates a layout for FIGS. 5*a*–5*d* drawings.
Figure 5A:
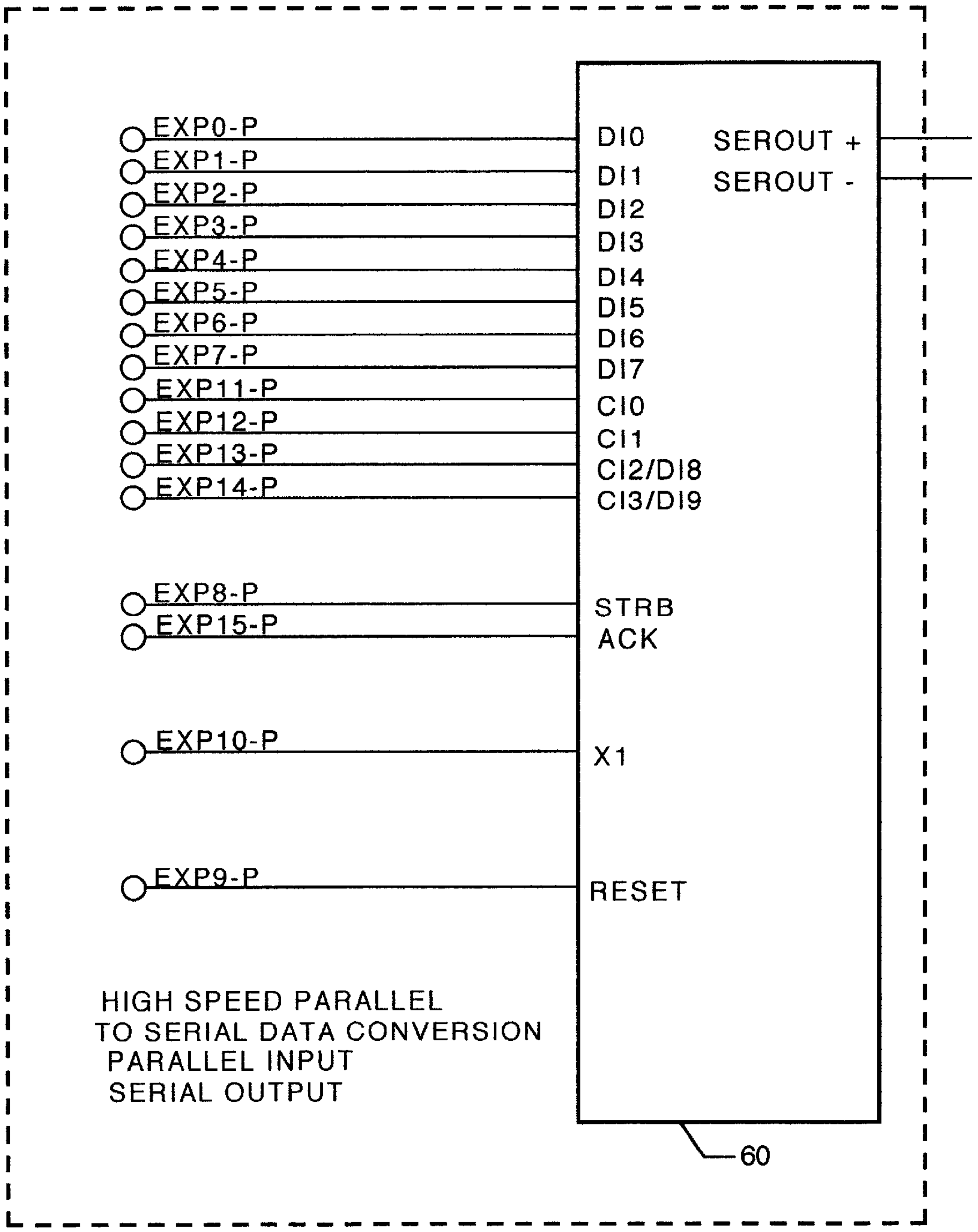
FIGS. 5*a*–5*d* illustrate a transmitter fiber optic electrical circuit schematic diagram.
Figure 5B:
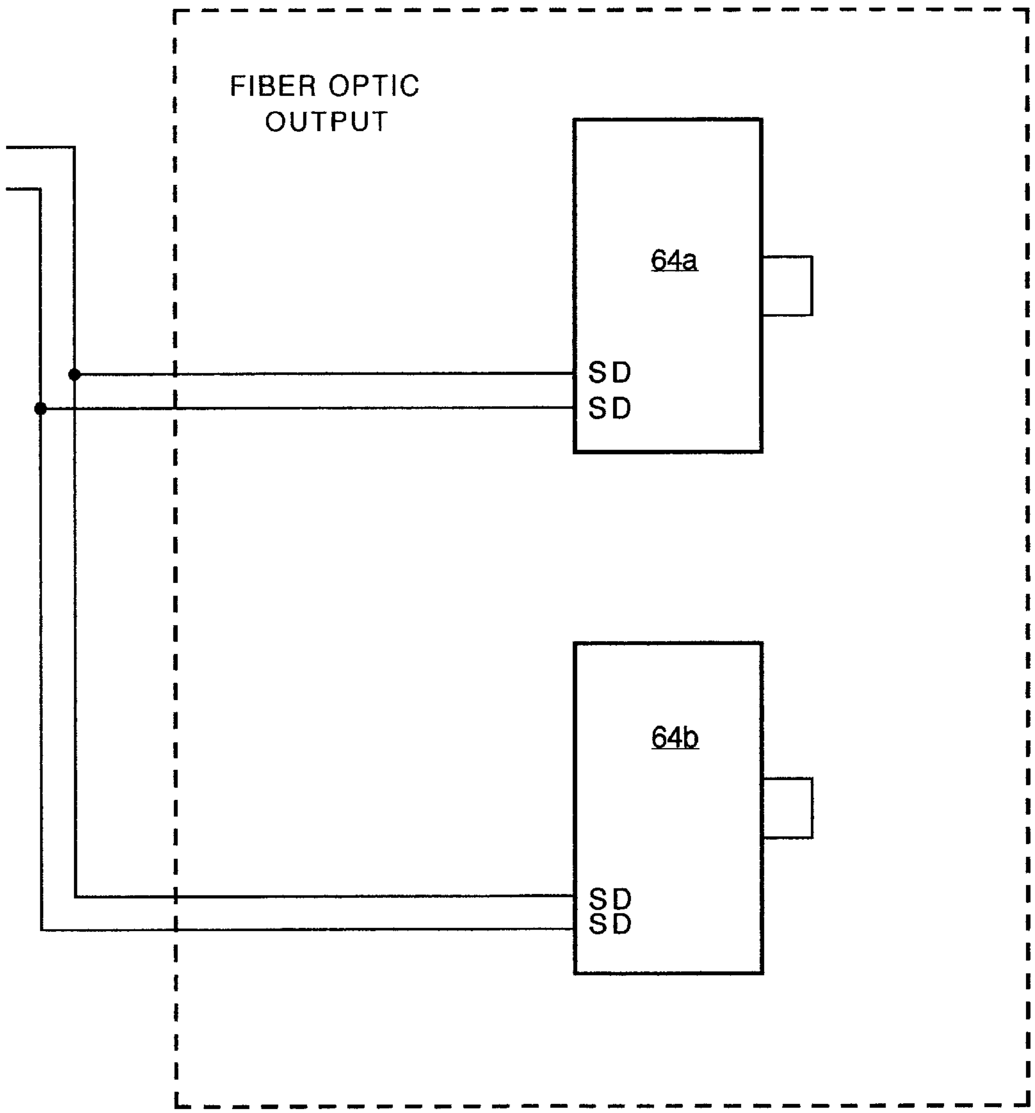
Figure 5C:
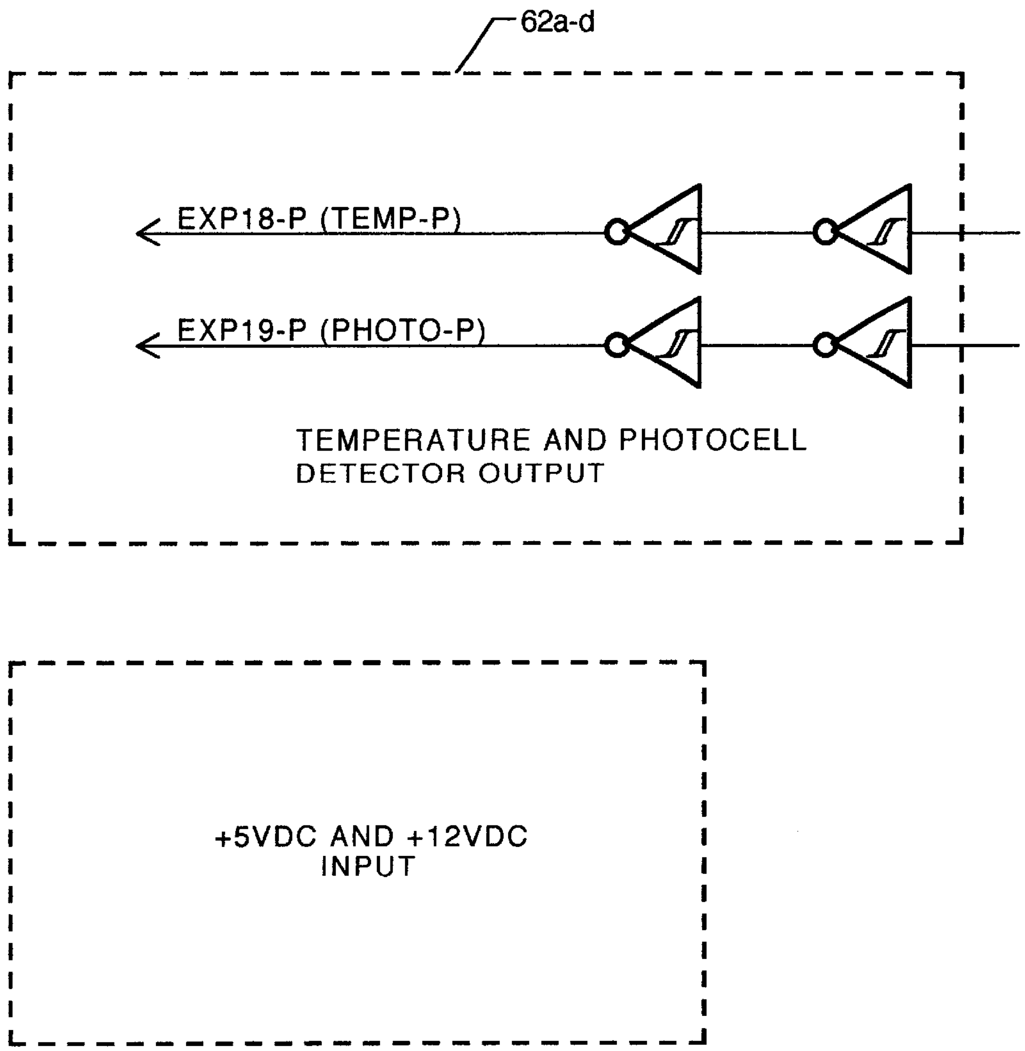
Figure 5D:
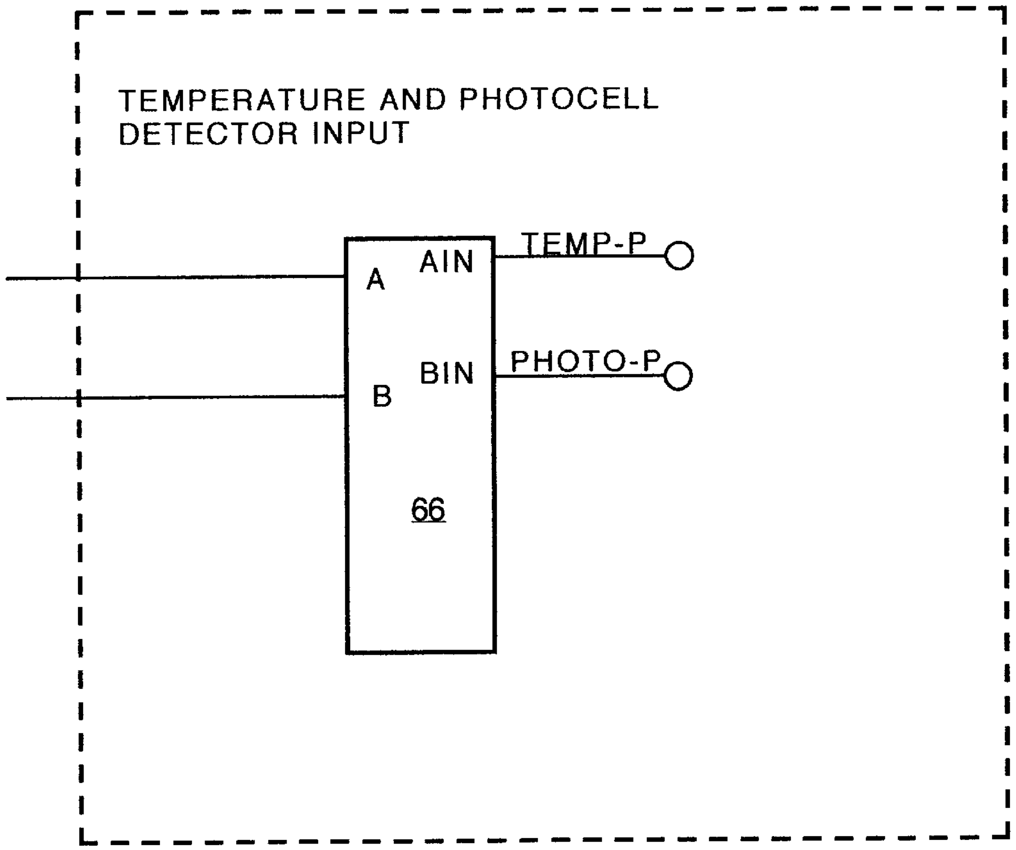

FIG. 4 is a layout of FIGS. 5*a*–5*d*.

FIGS. 5*a*–5*d* illustrate a transmitter fiber optic electrical circuit schematic diagram which is a daughter card onto the PCE bus interface card, comprising a high speed parallel-to-serial data conversation parallel input/serial output (TAXI) 60, schmidt trigger inverters 62, fiber optic output 64, and temperature and photocell detector input 66.

Figure 6:
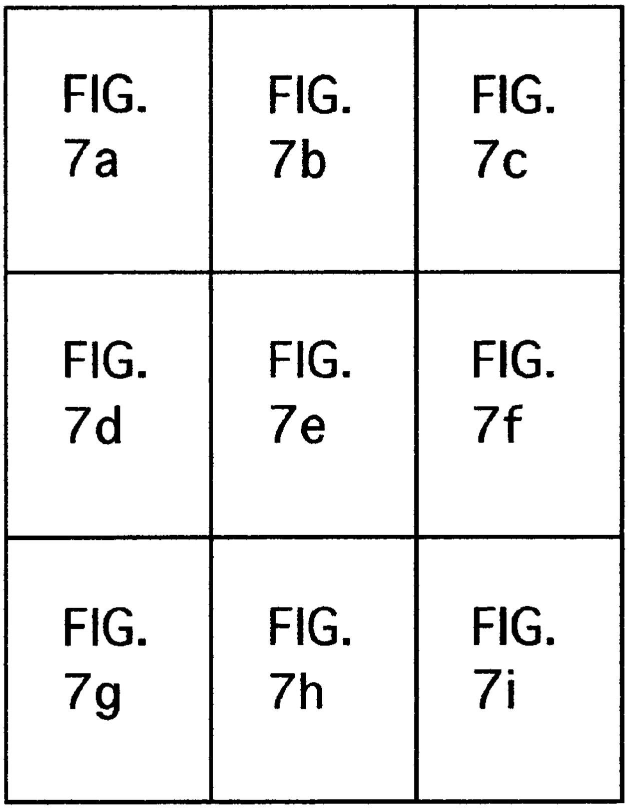
FIG. 6 illustrates a layout for FIGS. 7*a*–7*i* drawings.
Figure 7A:
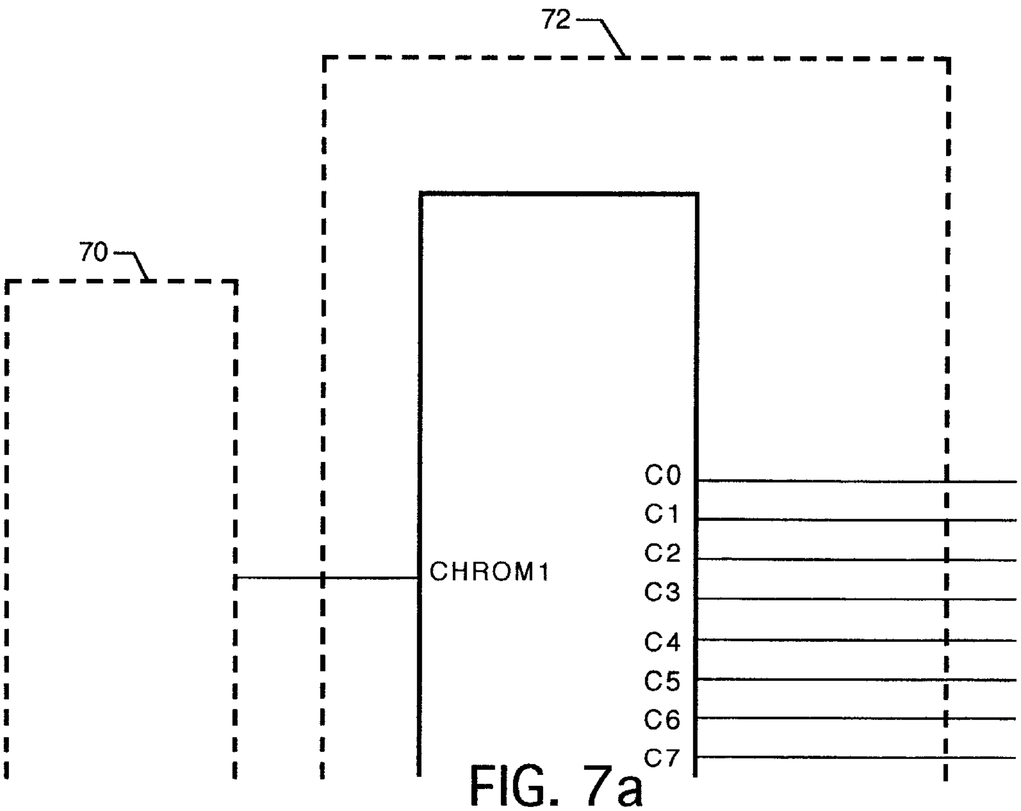
FIGS. 7*a*–7*i* illustrate a video interface electrical circuit schematic diagram.
Figure 7B:
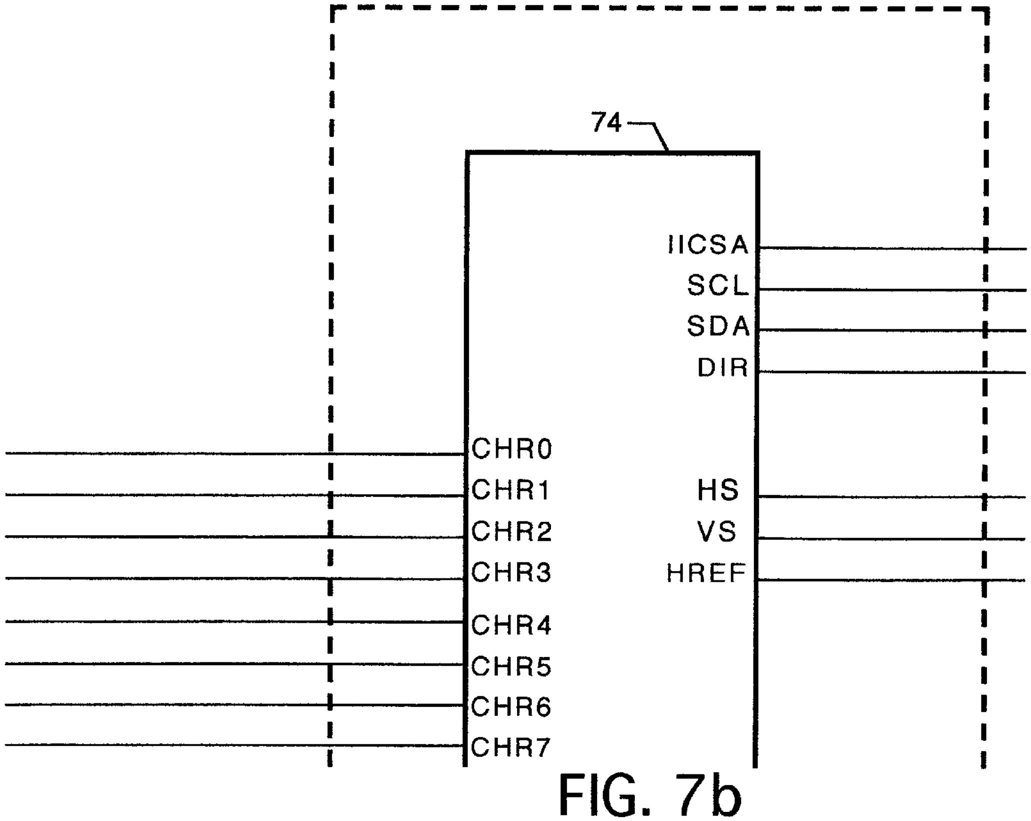
Figure 7C:
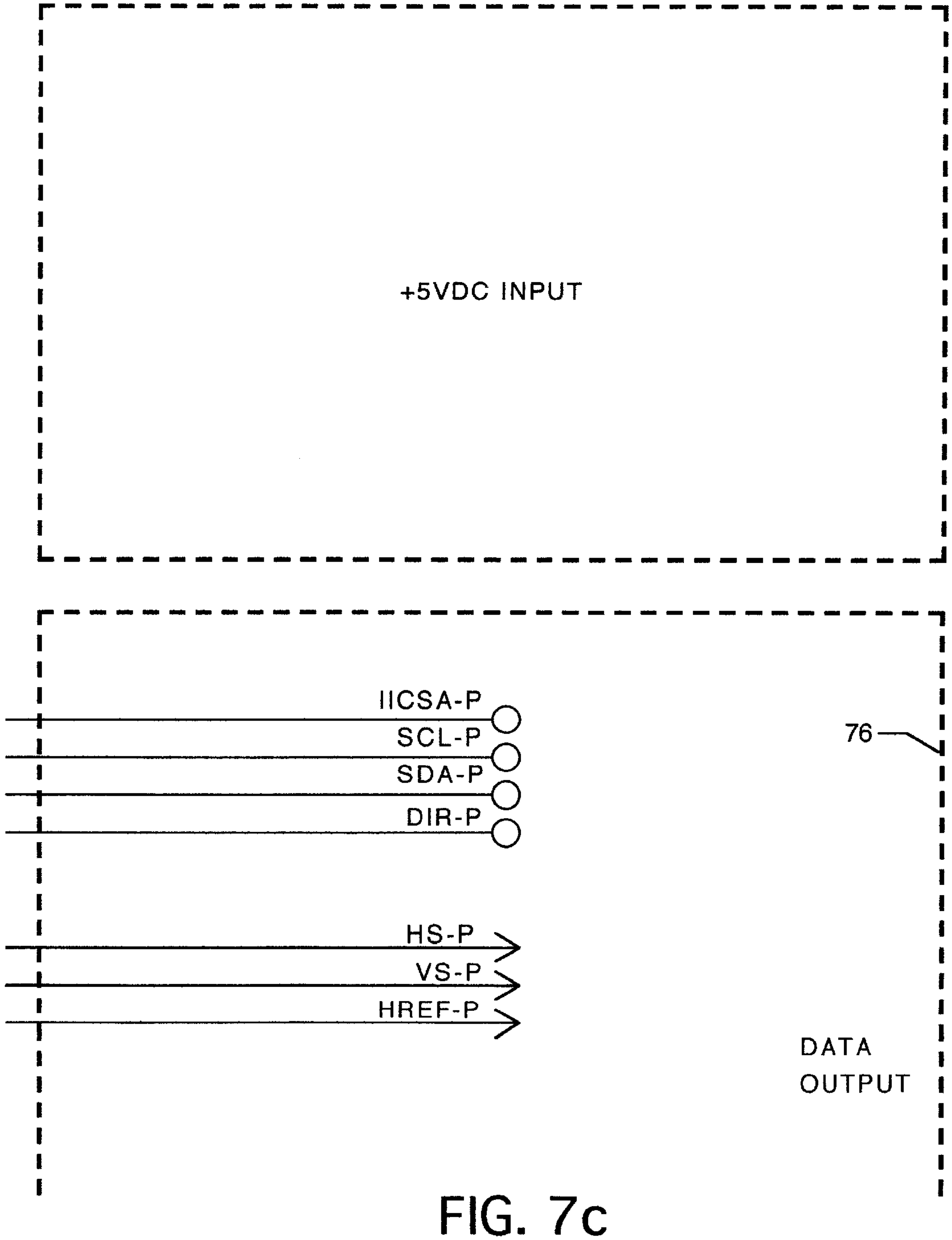
Figure 7D:
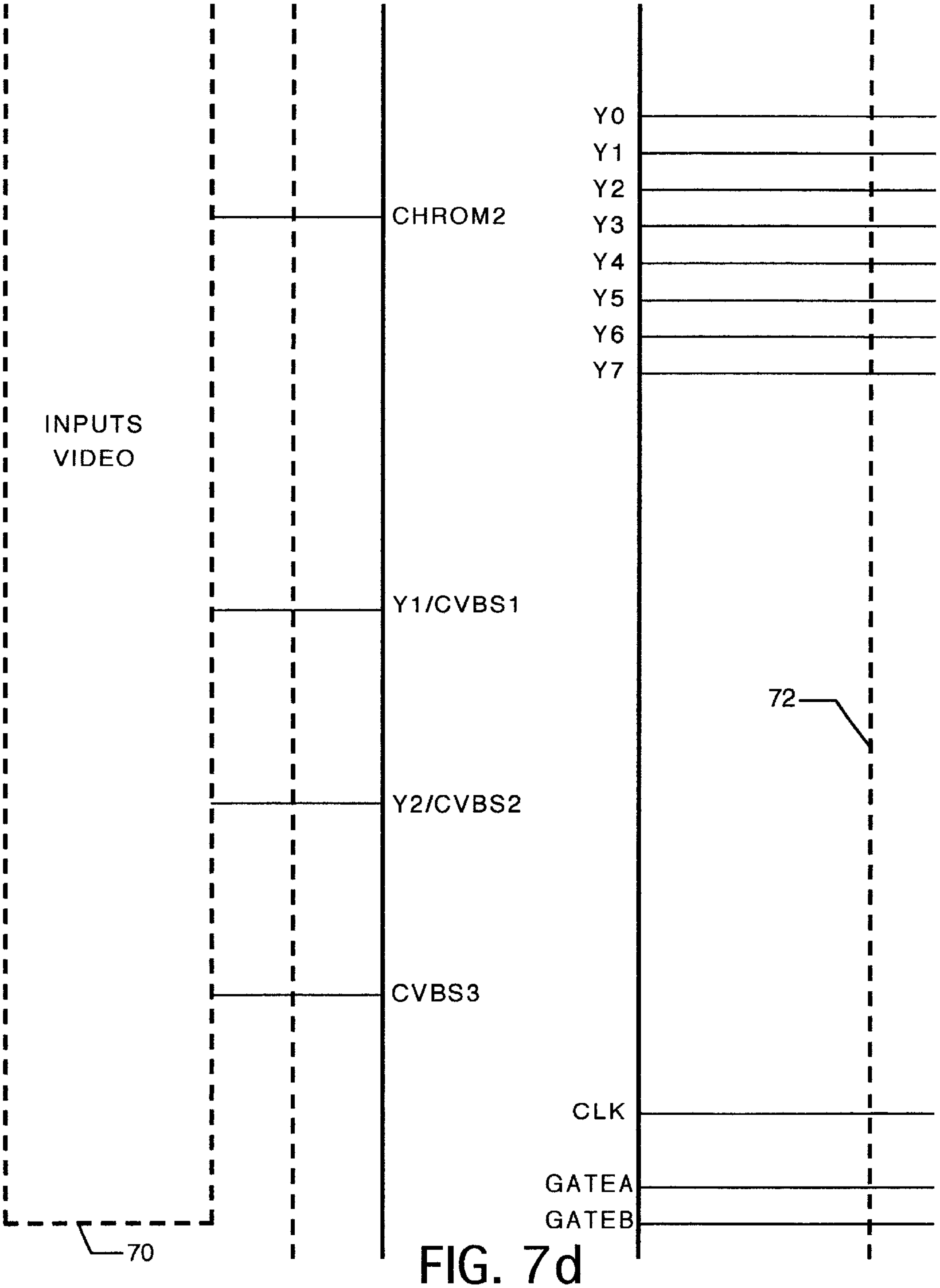
Figure 7E:
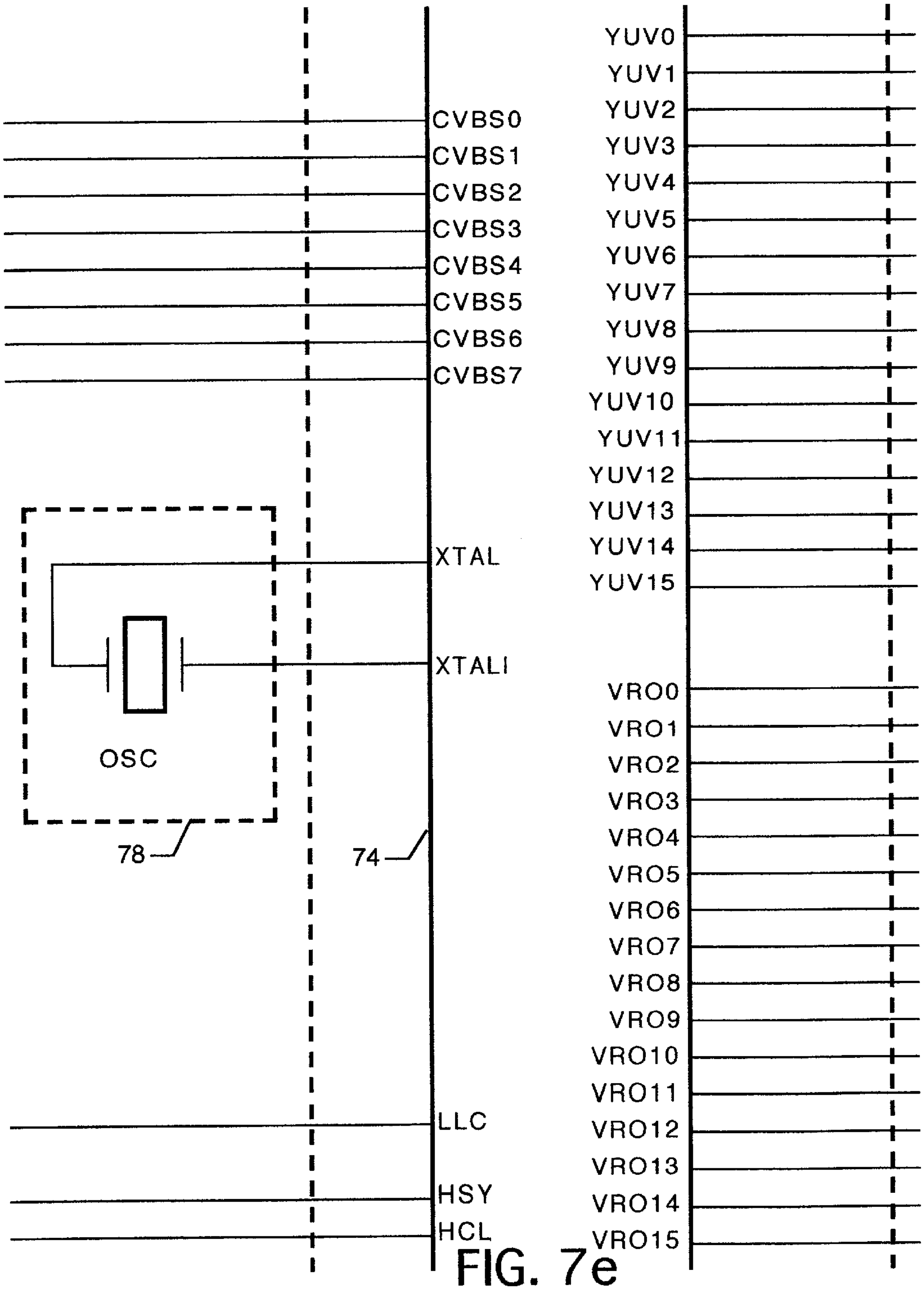
Figure 7F:
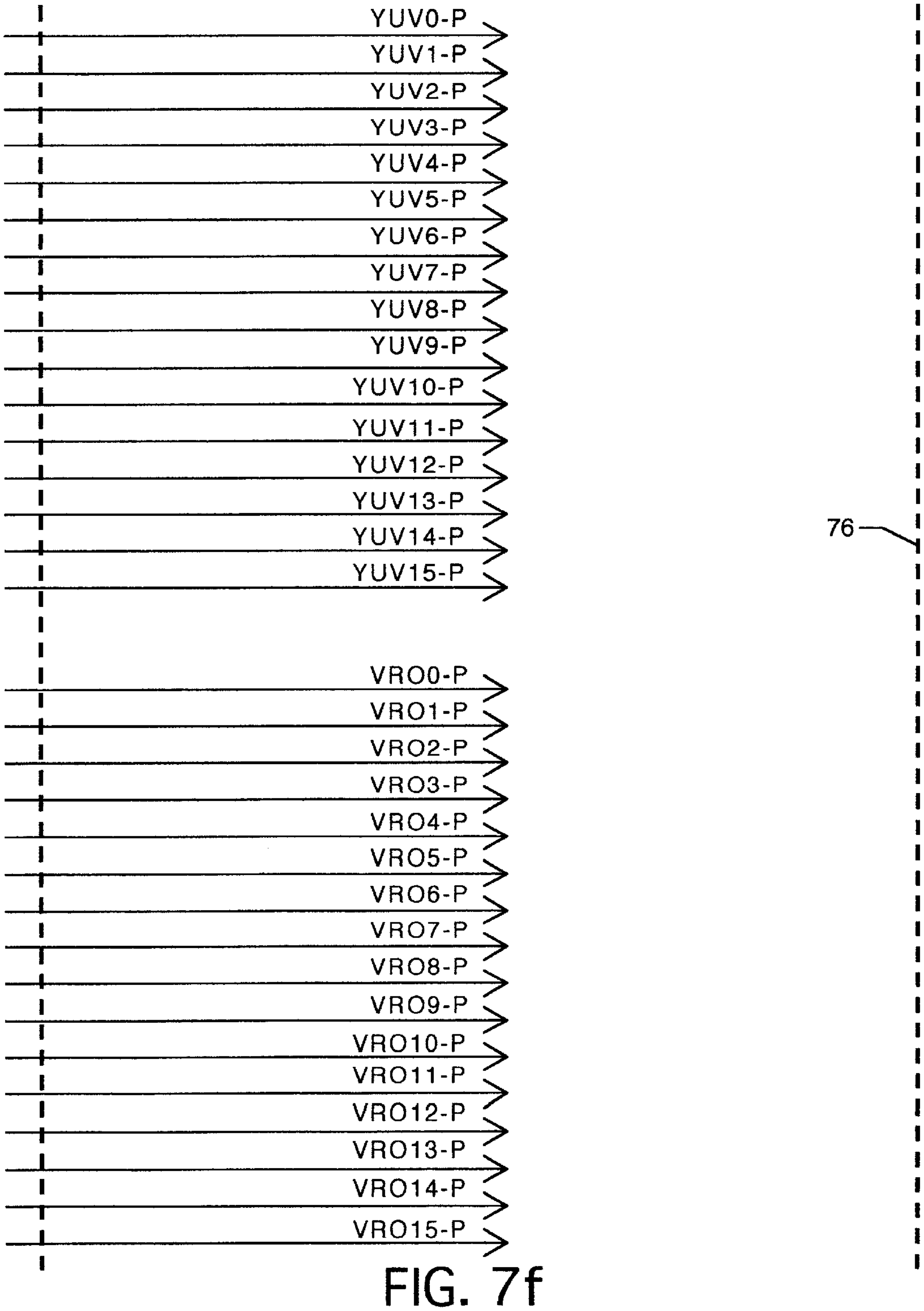
Figure 7G:
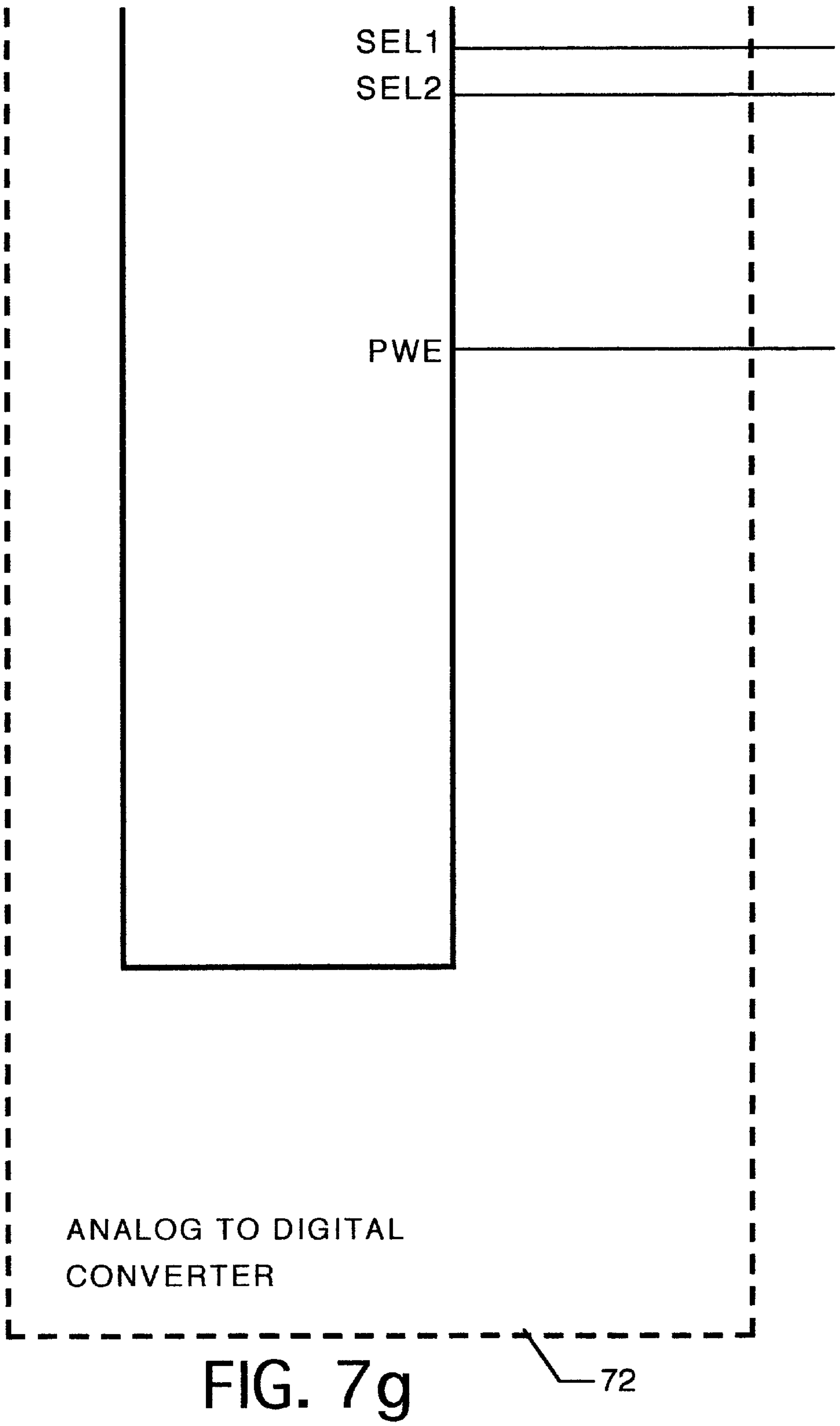
Figure 7H:
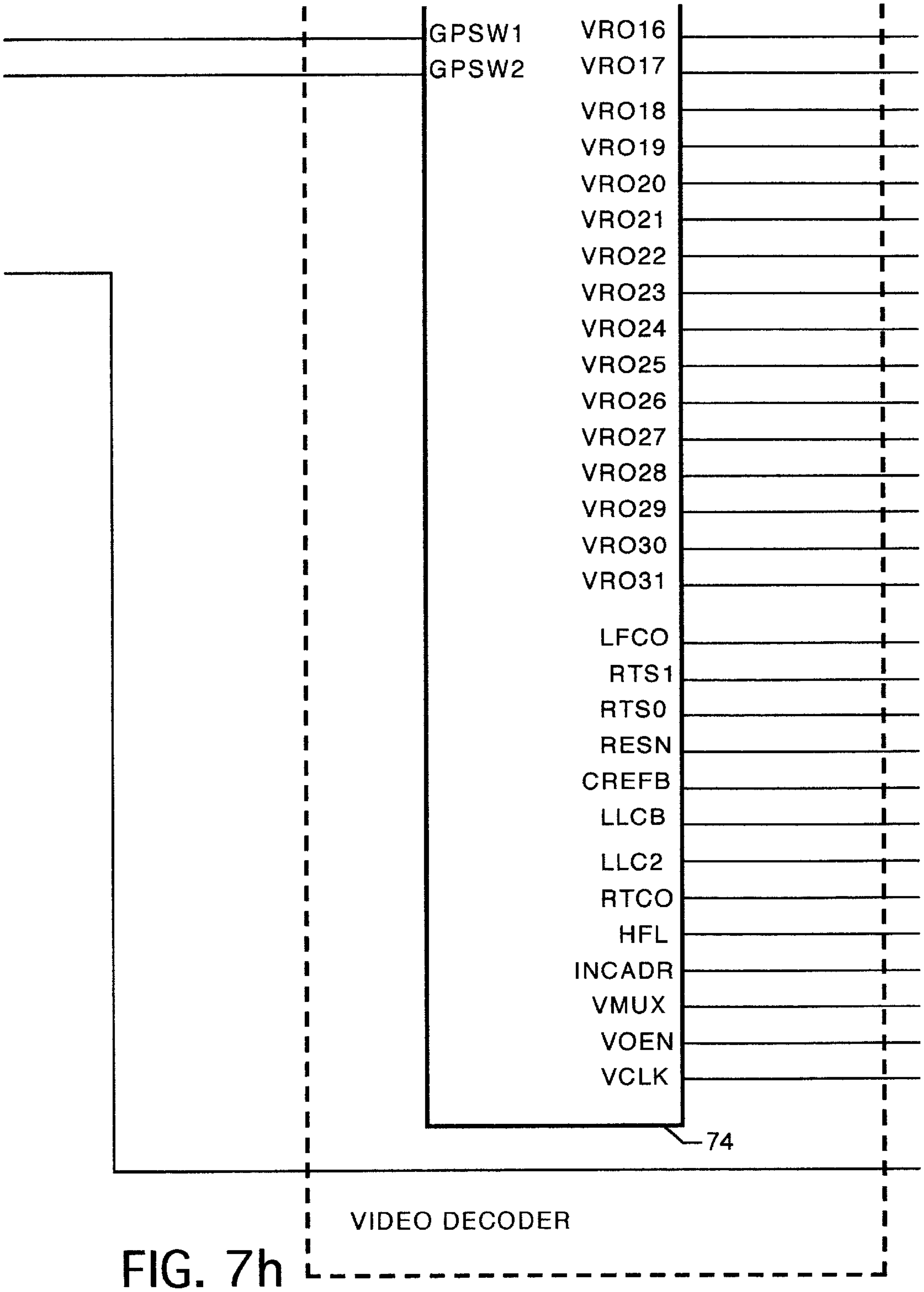
Figure 7I:
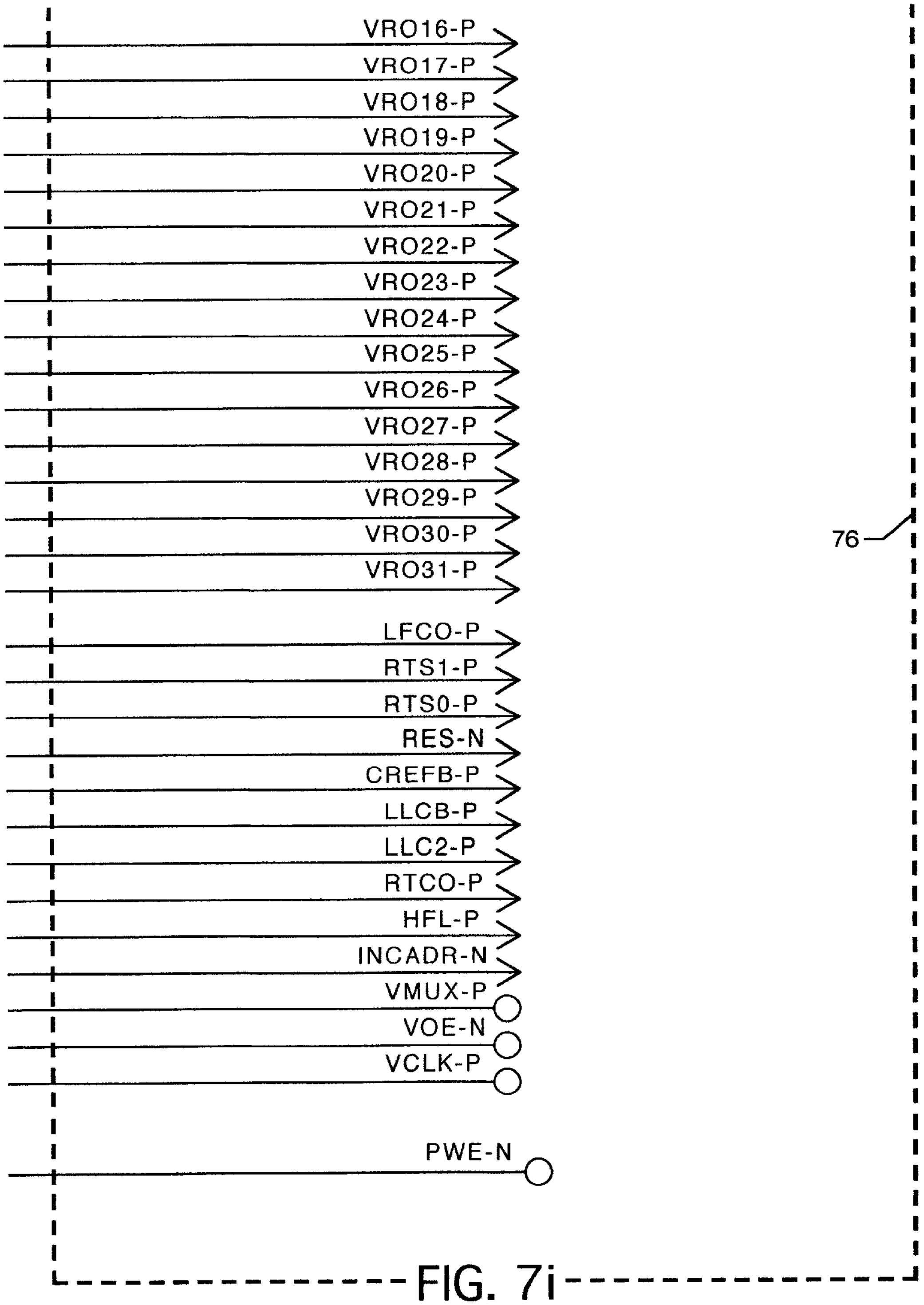

FIG. 6 is a layout of FIGS. 7*a*–7*i*.

FIGS. 7*a*–7*i* illustrate a video interface electrical circuit schematic diagram, comprising video inputs 70, analog-to-digital converter 72, video decoder 74, data output-to-video interface board connection 76, and oscillator 78.

Figure 9A:
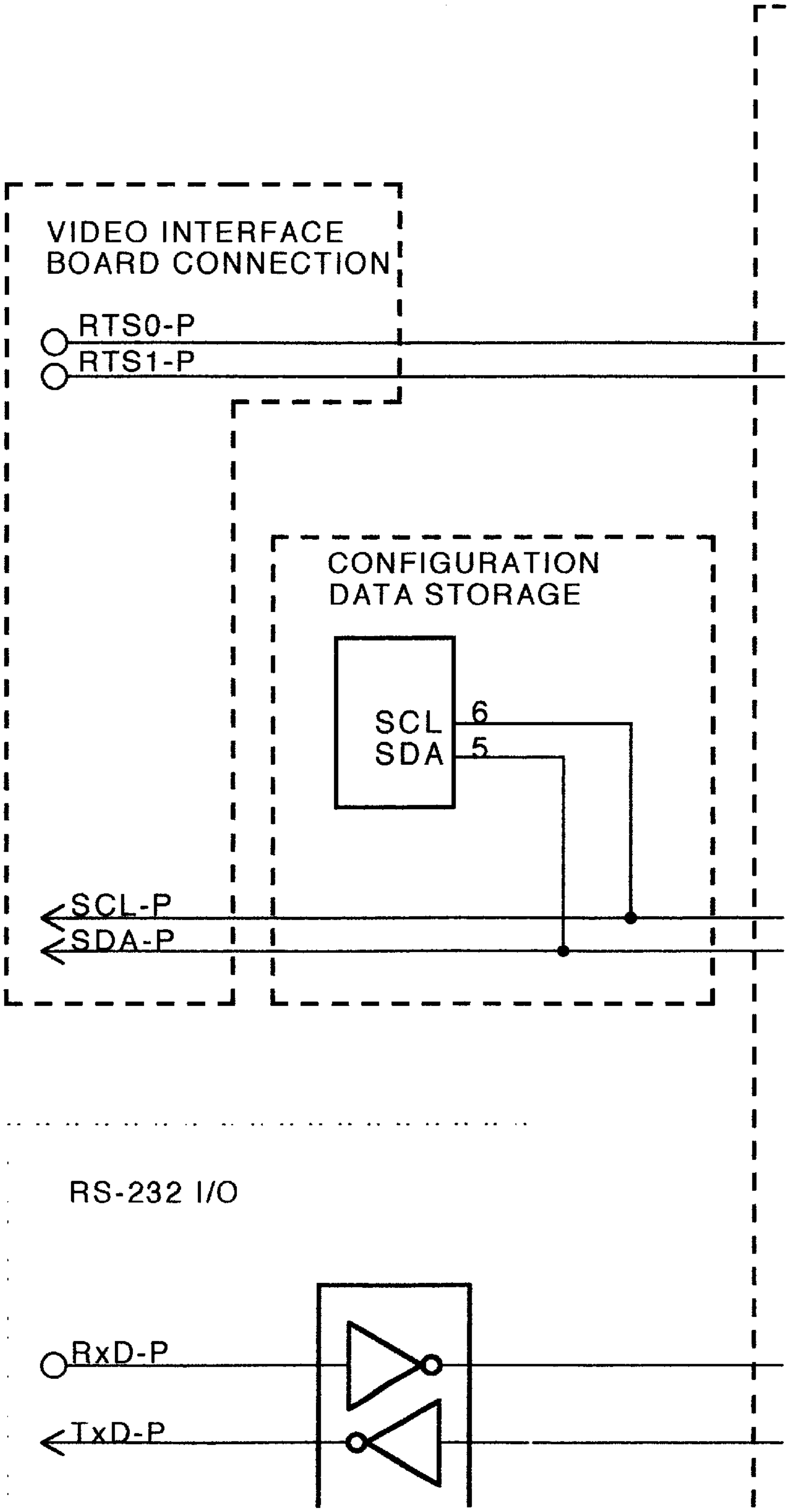
FIGS. 9*a*–9*ab* illustrate a V-LINK.
Figure 9B:
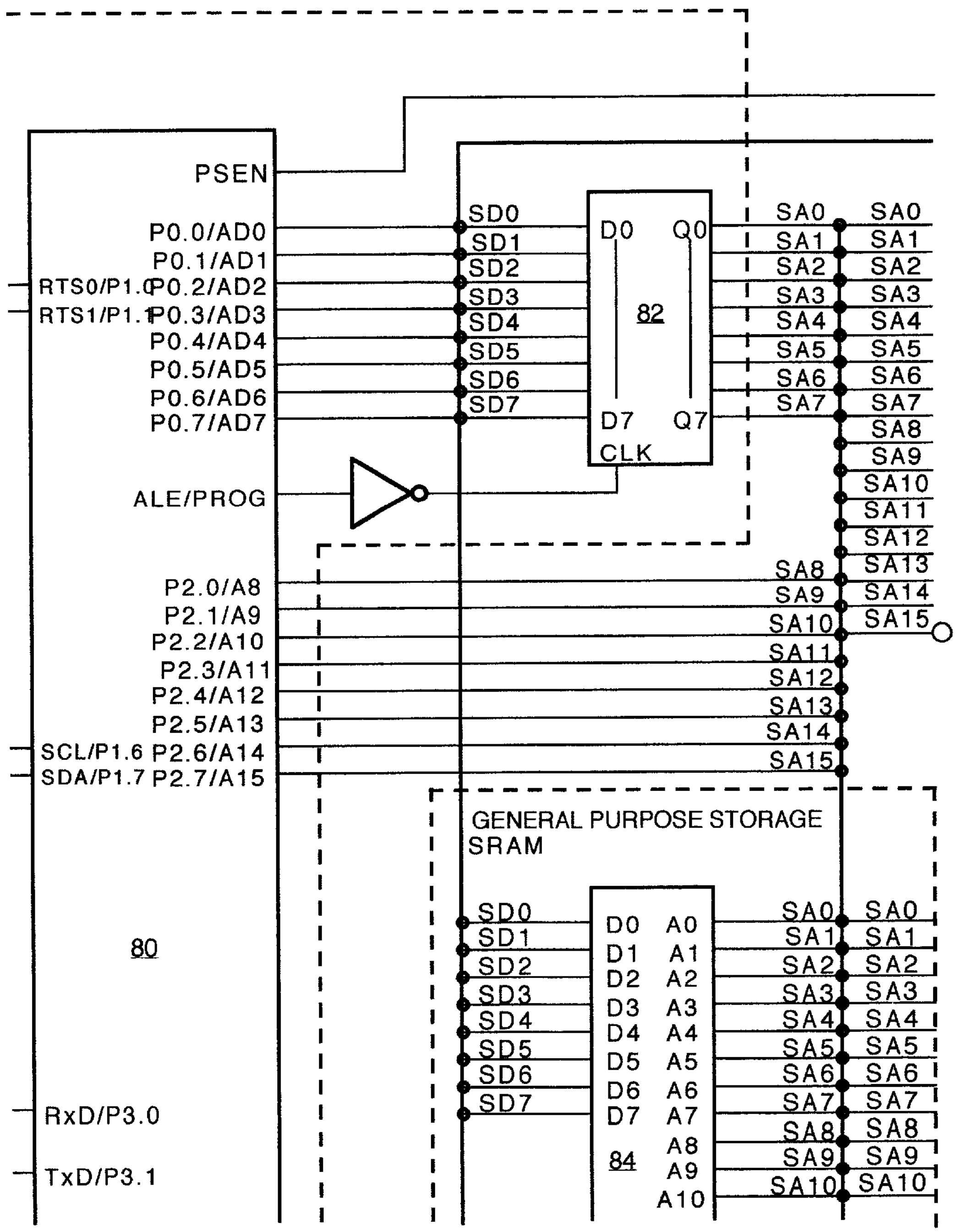
Figure 9C:
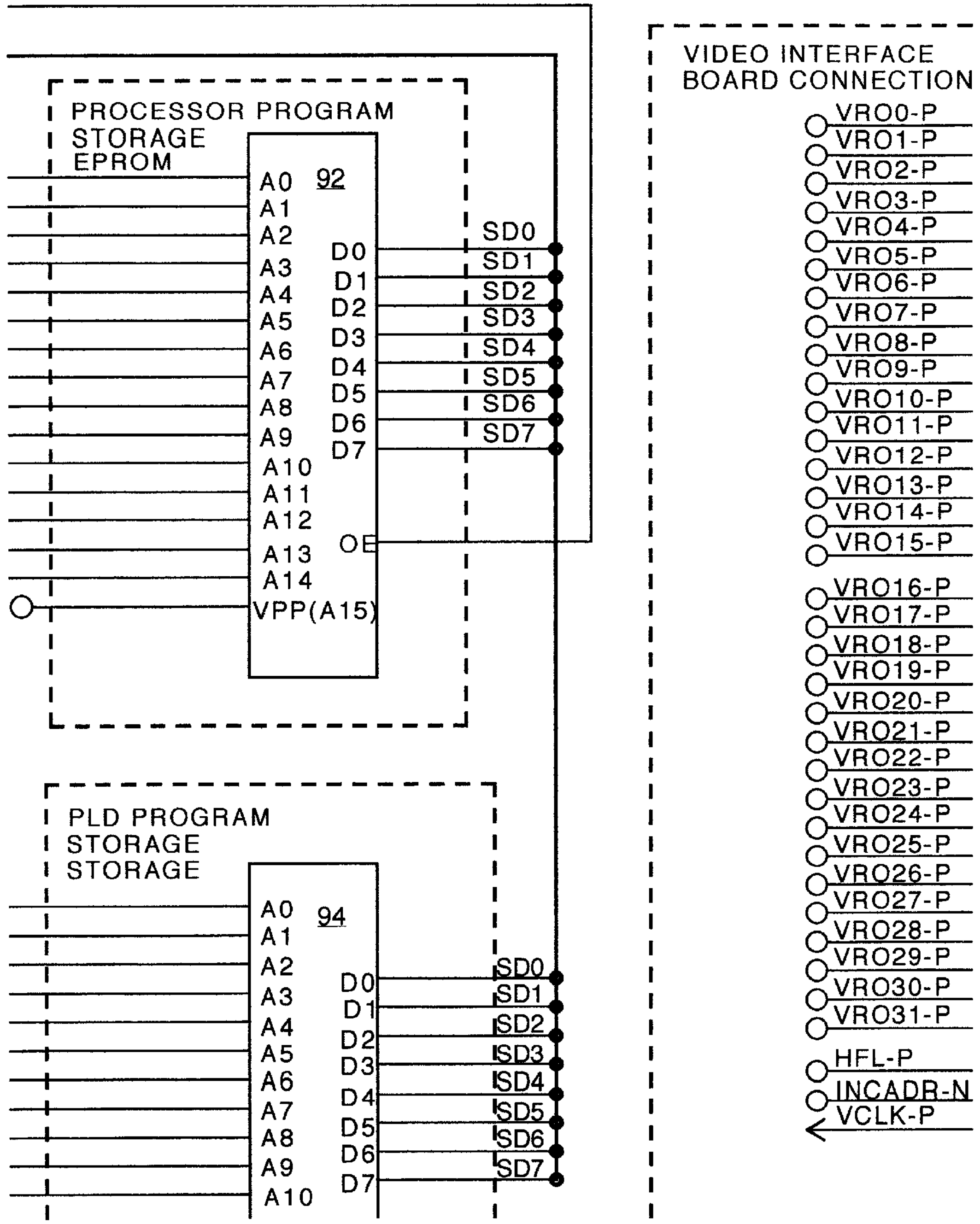
Figure 9D:
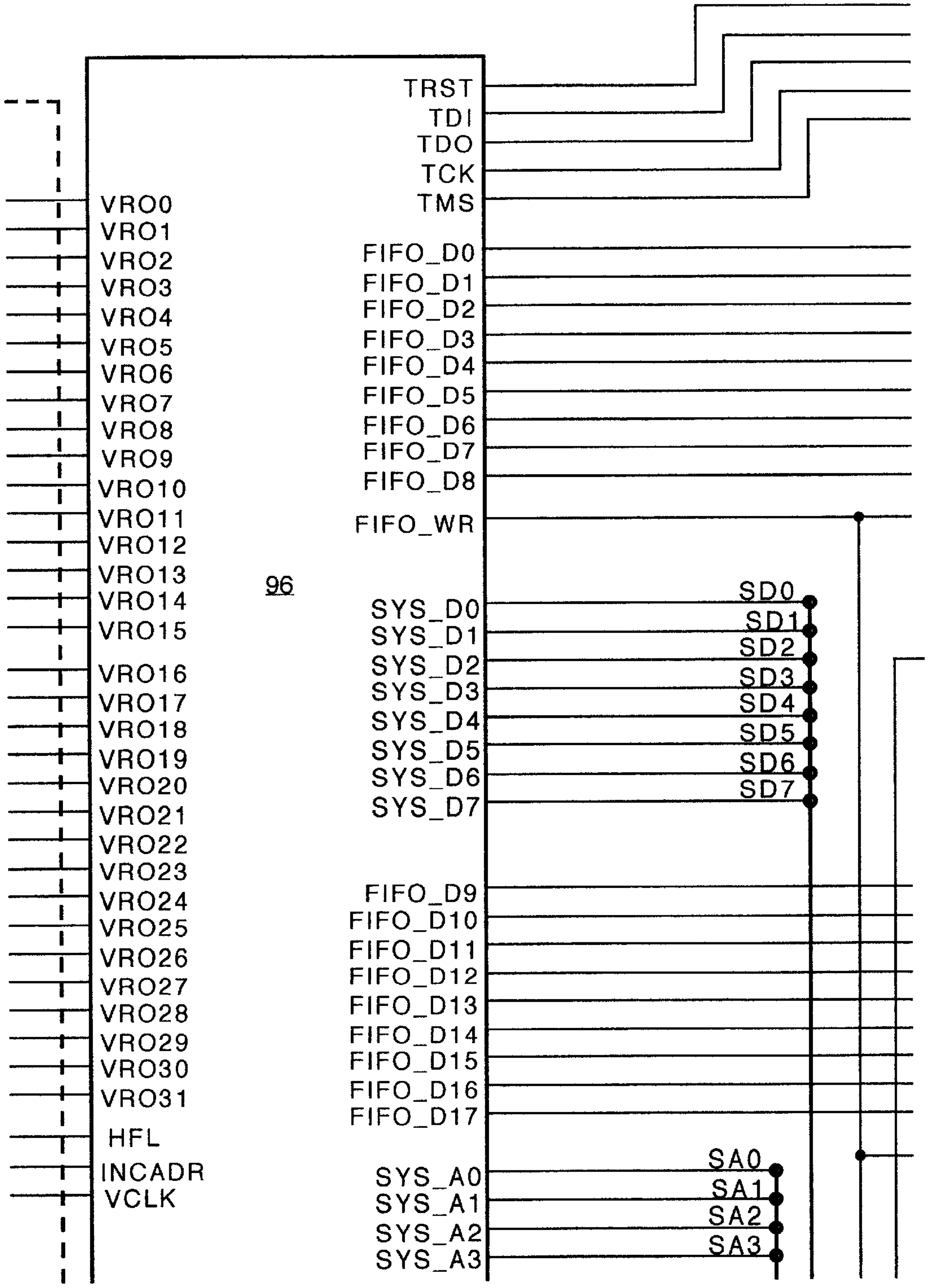
Figure 9E:
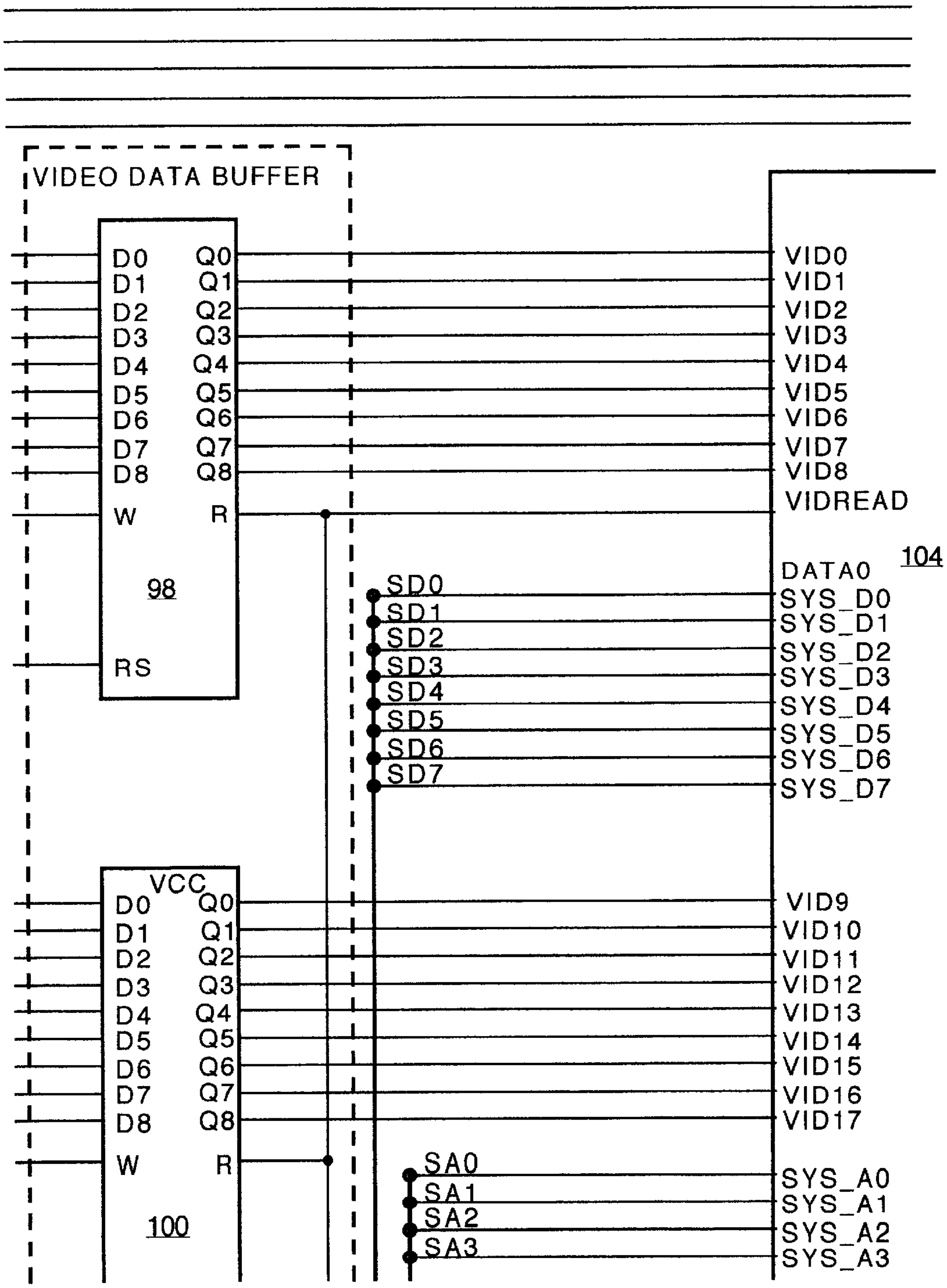
Figure 9F:
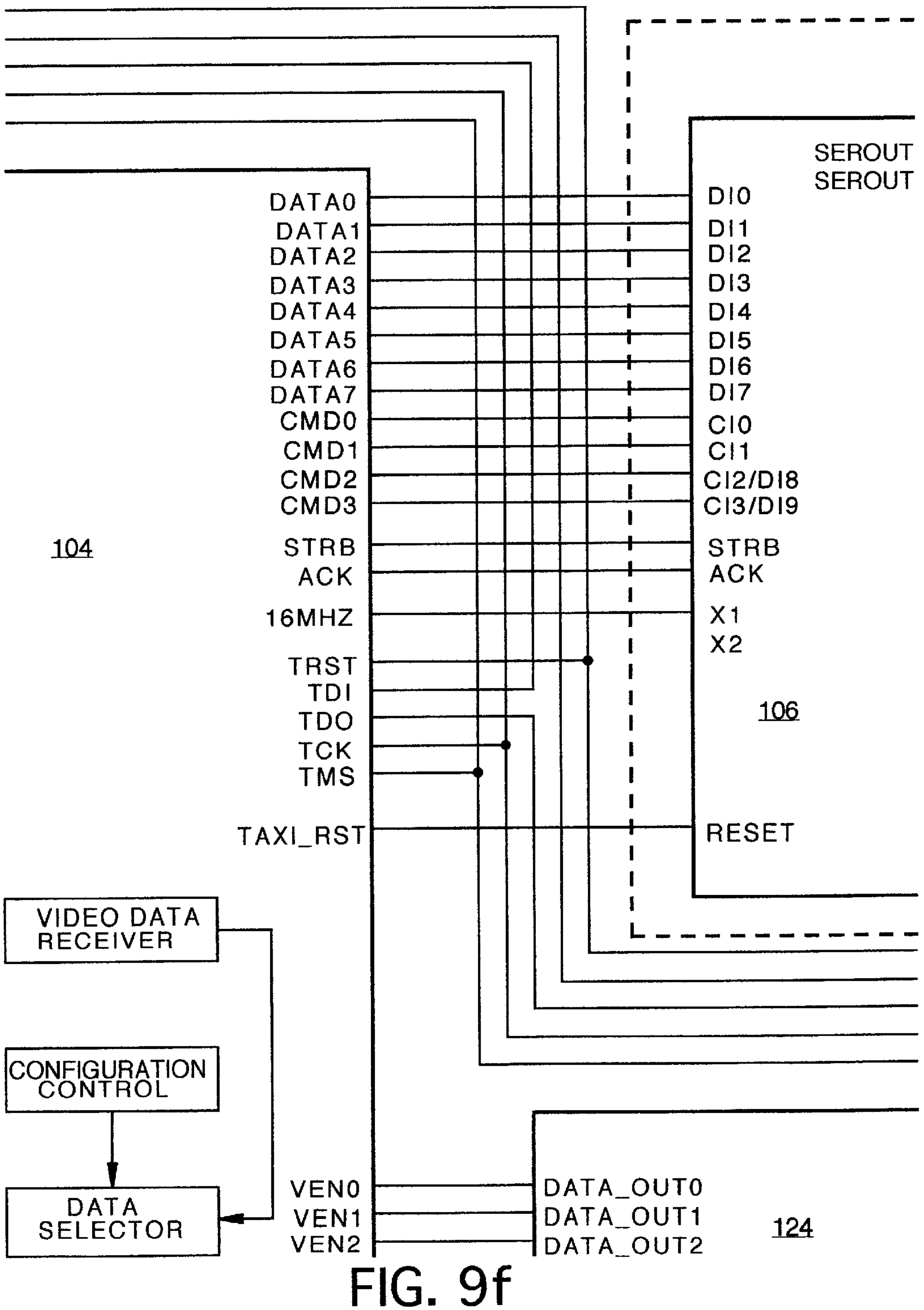
Figure 9G:
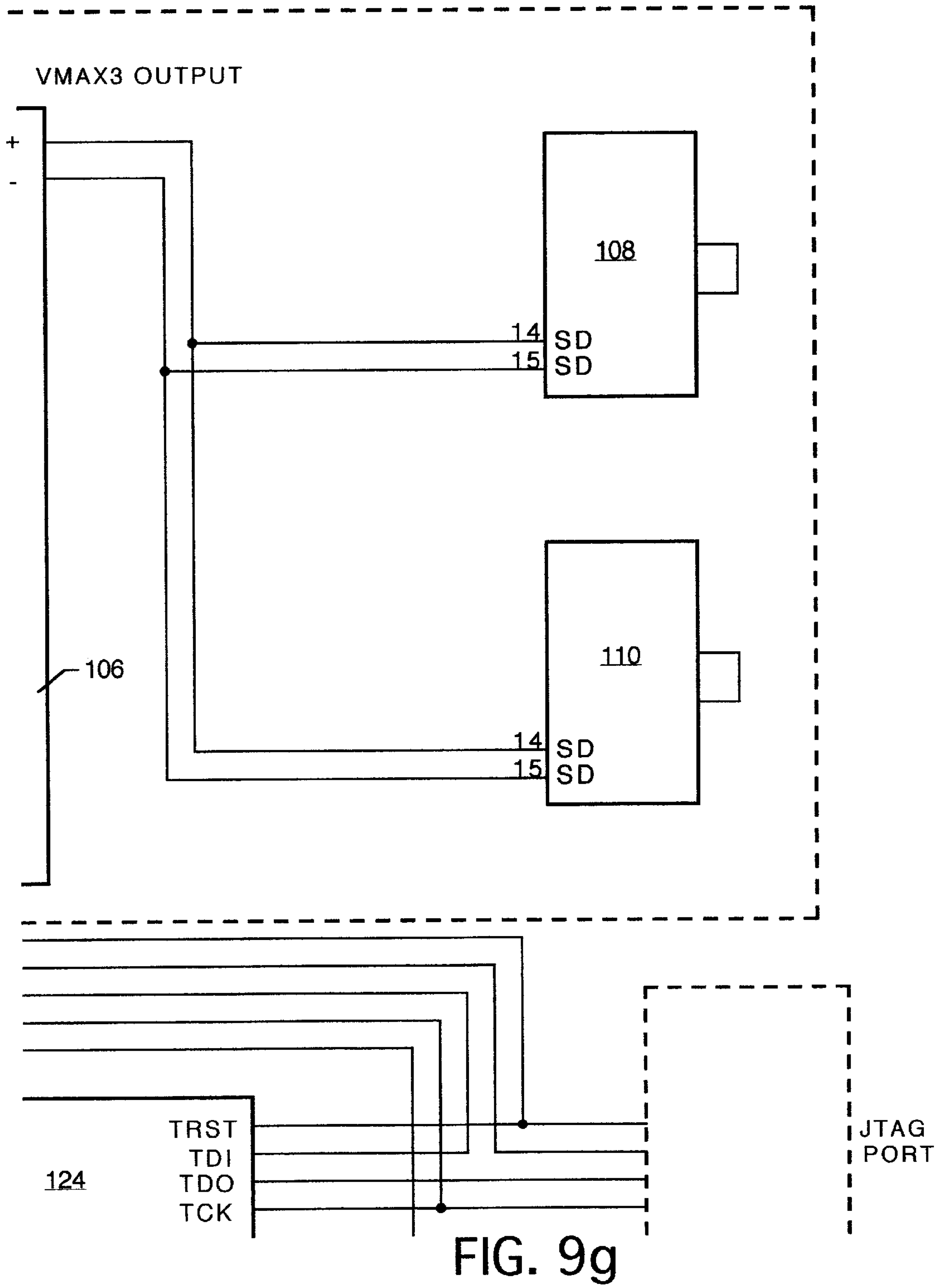
Figure 9H:
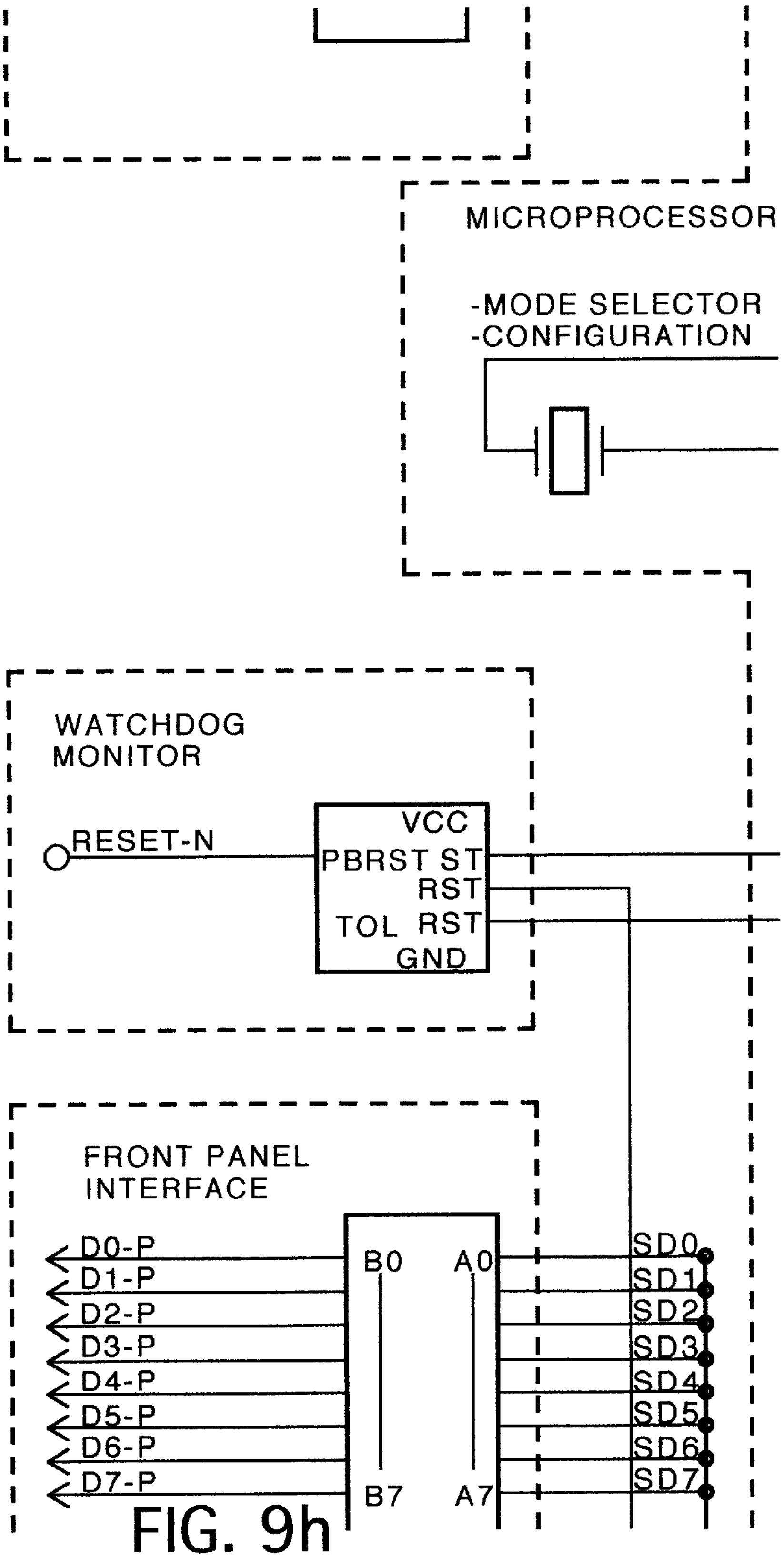
Figure 9I:
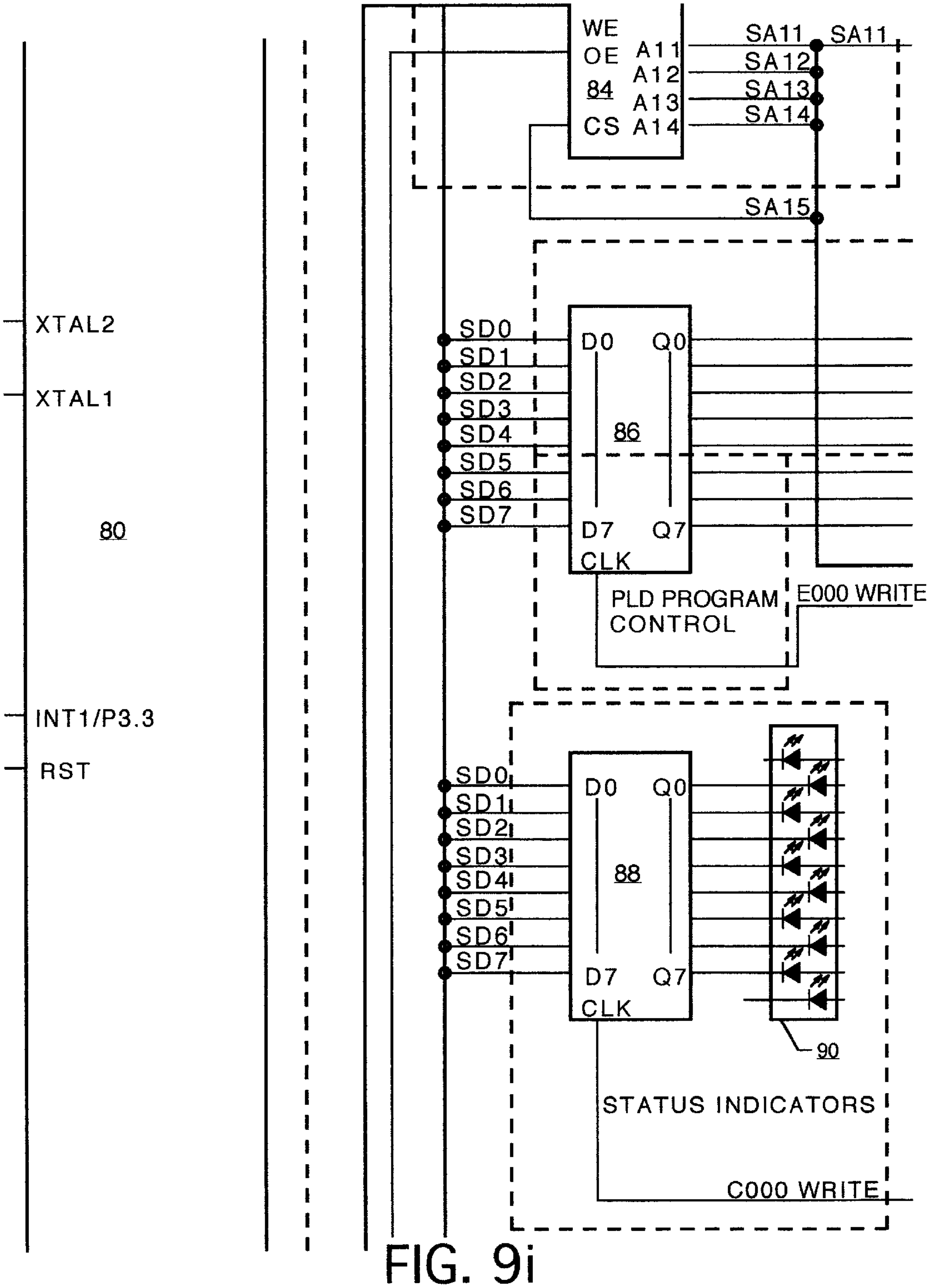
Figure 9J:
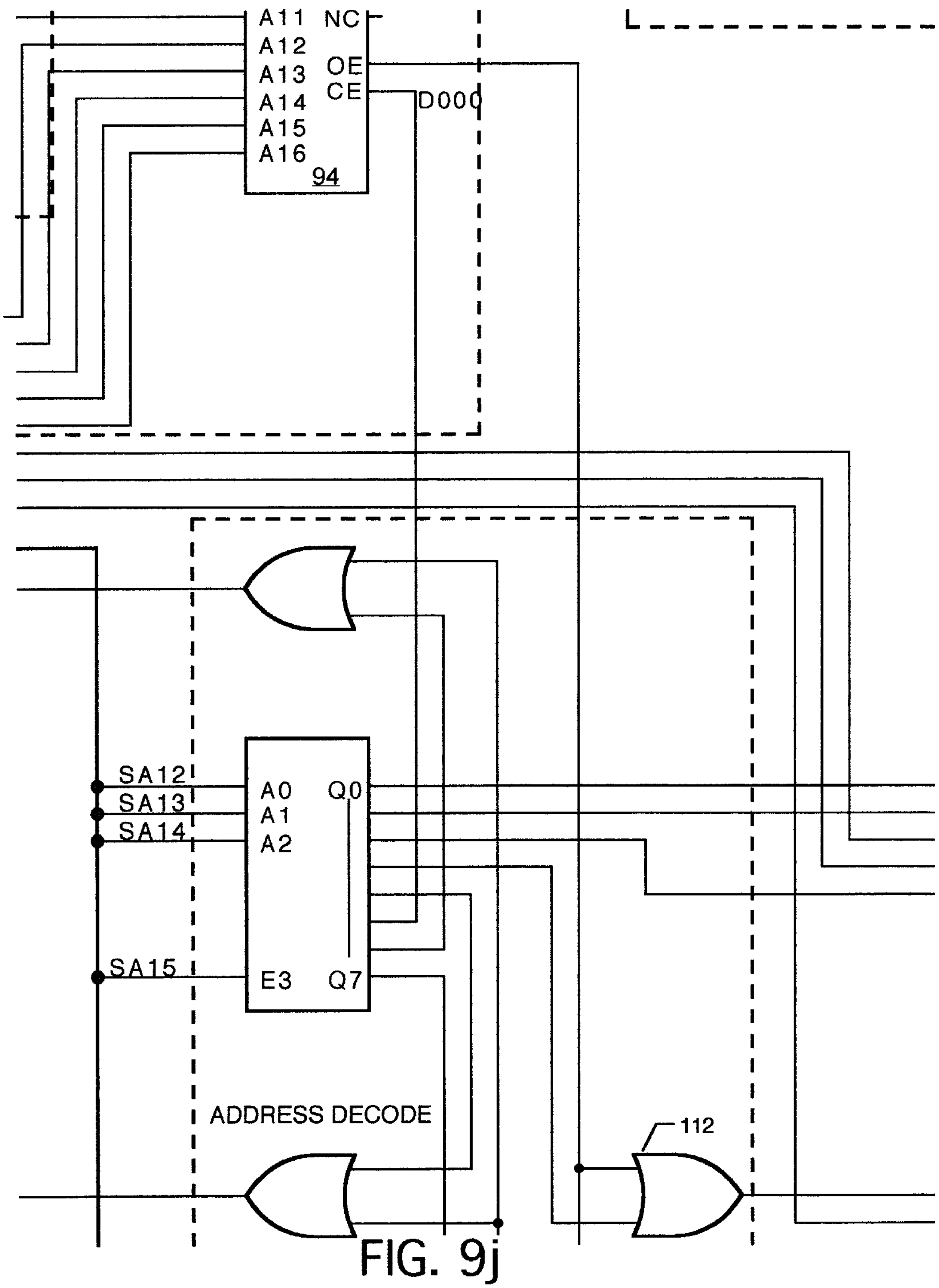
Figure 9K:
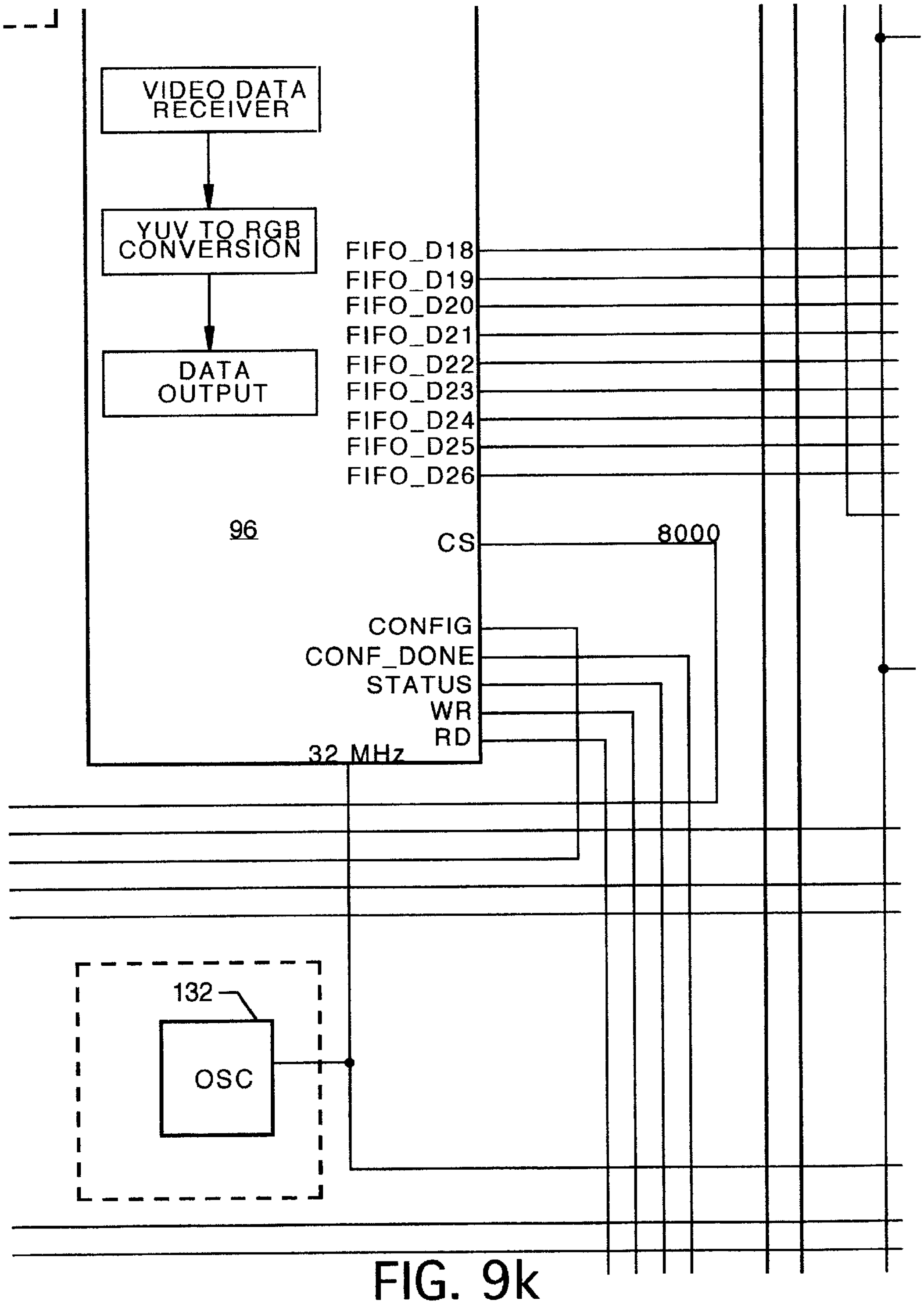
Figure 9L:
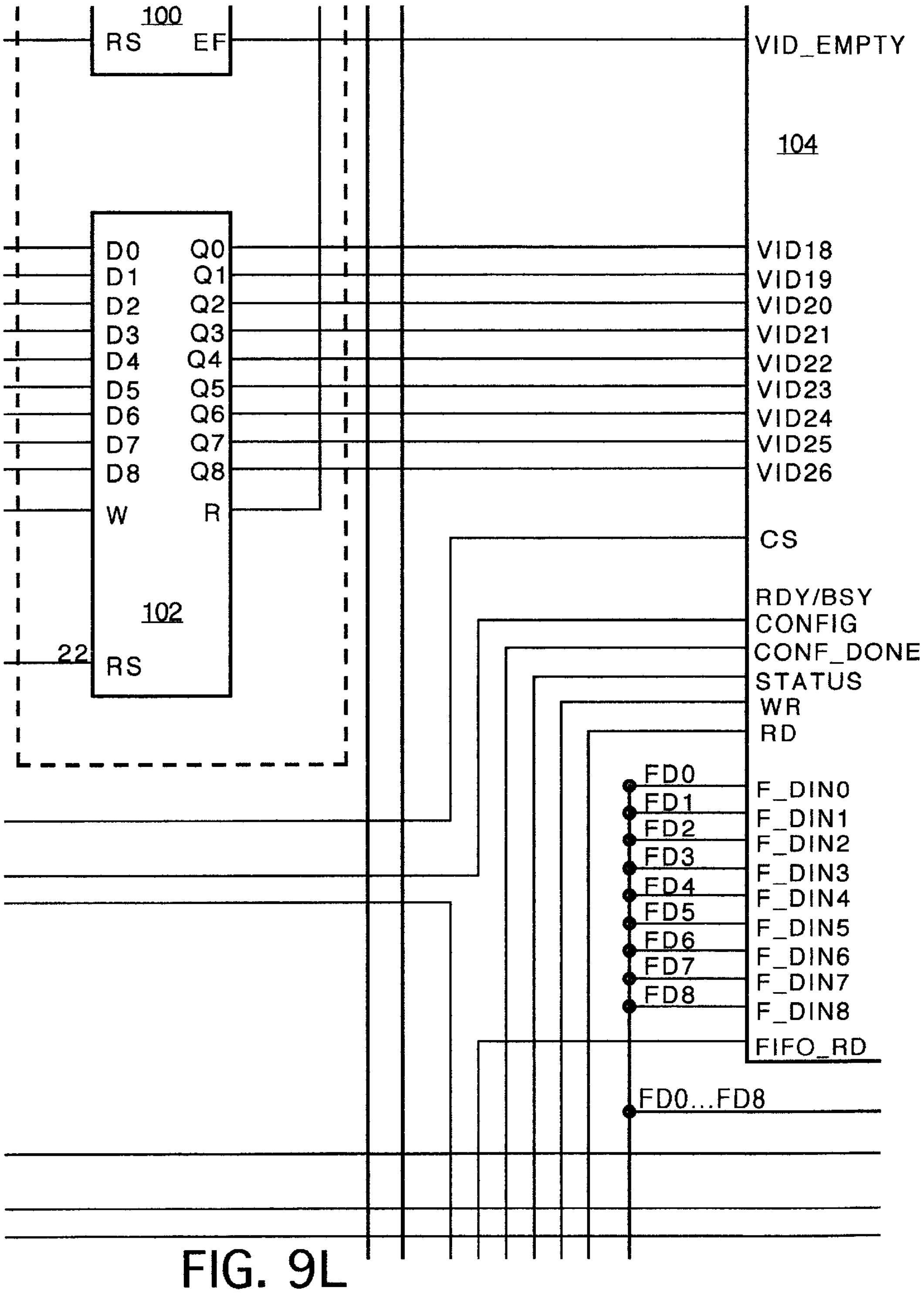
Figure 9M:
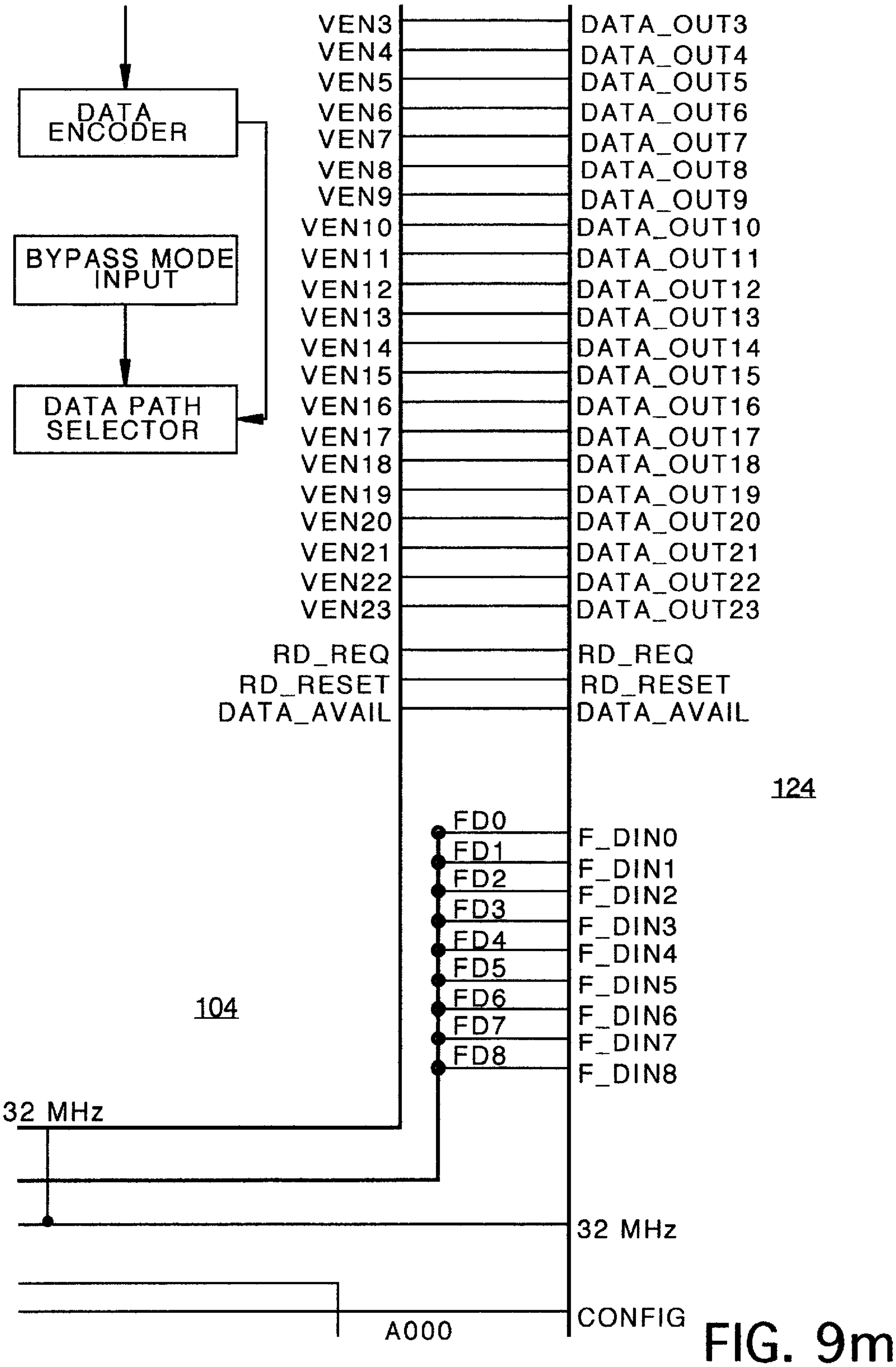
Figure 9N:
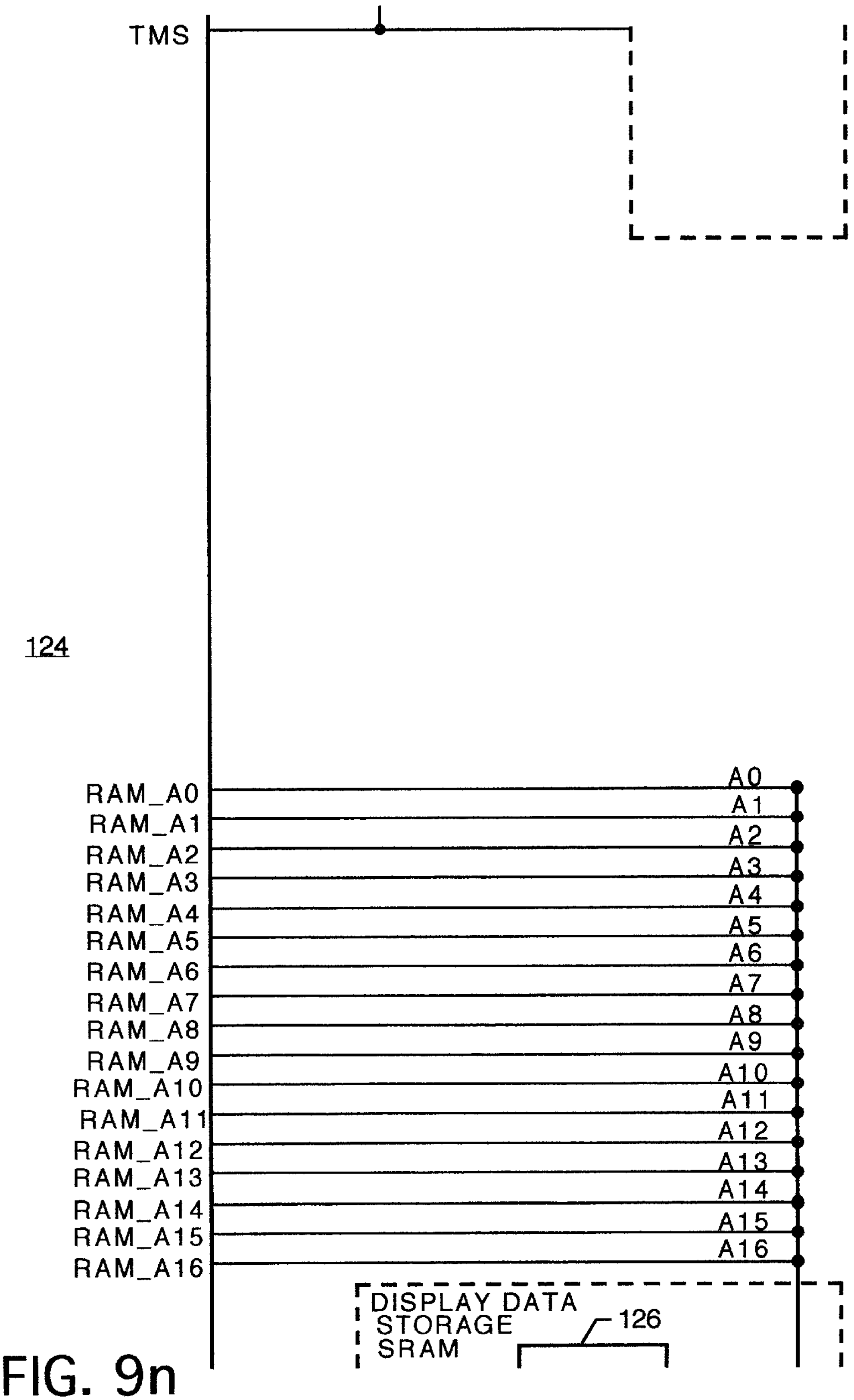
Figure 9O:
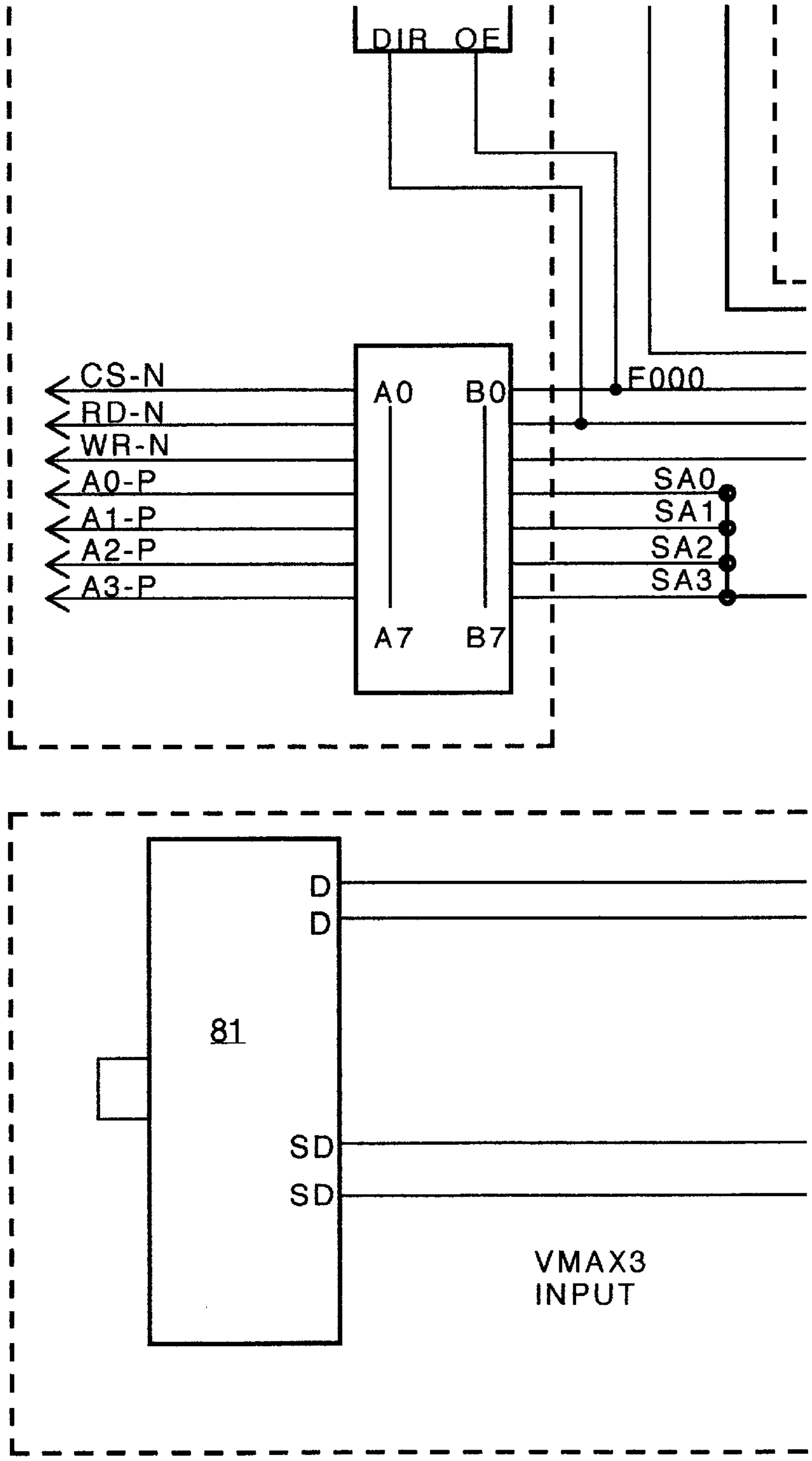
Figure 9P:
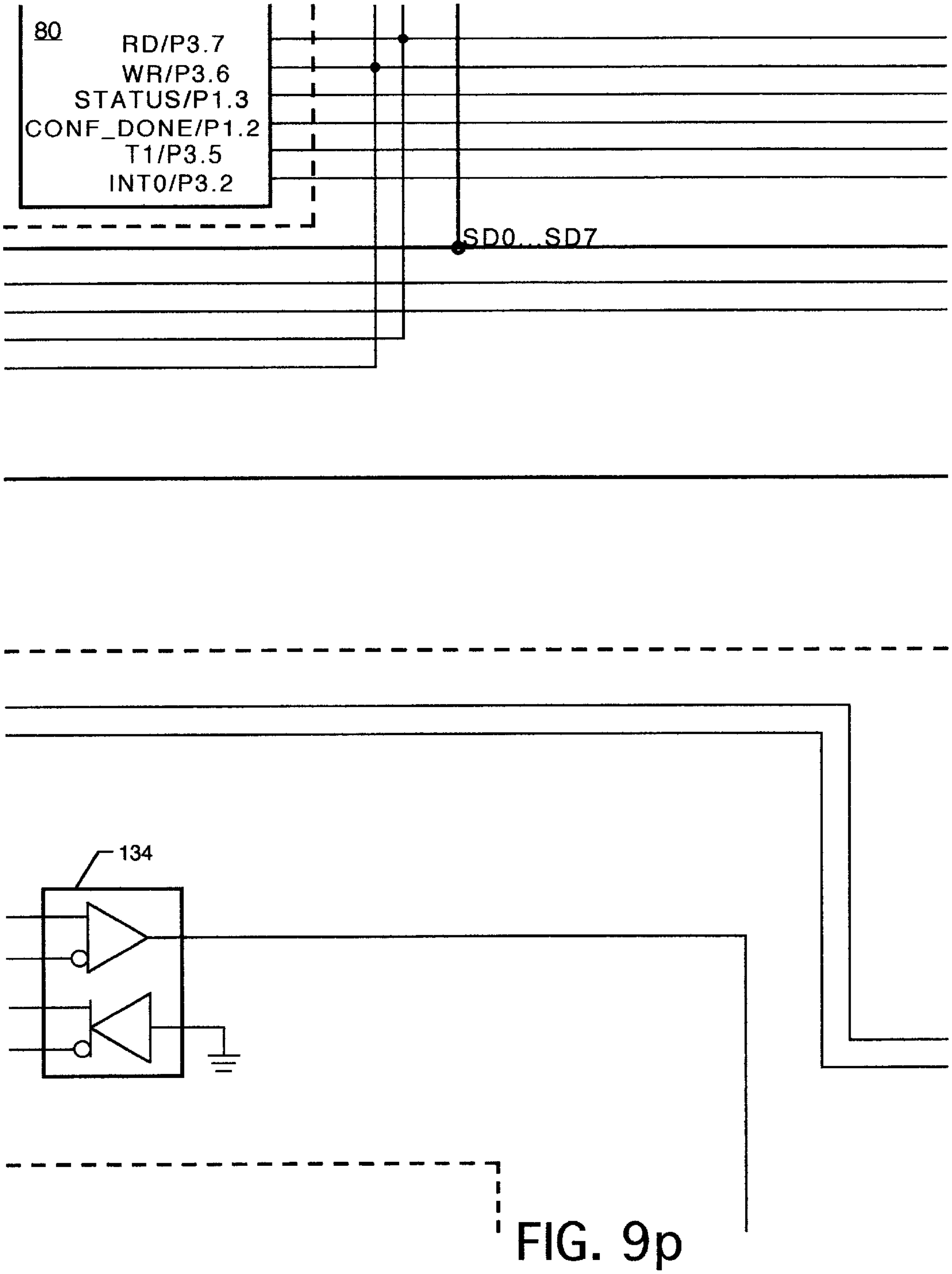
Figure 9Q:
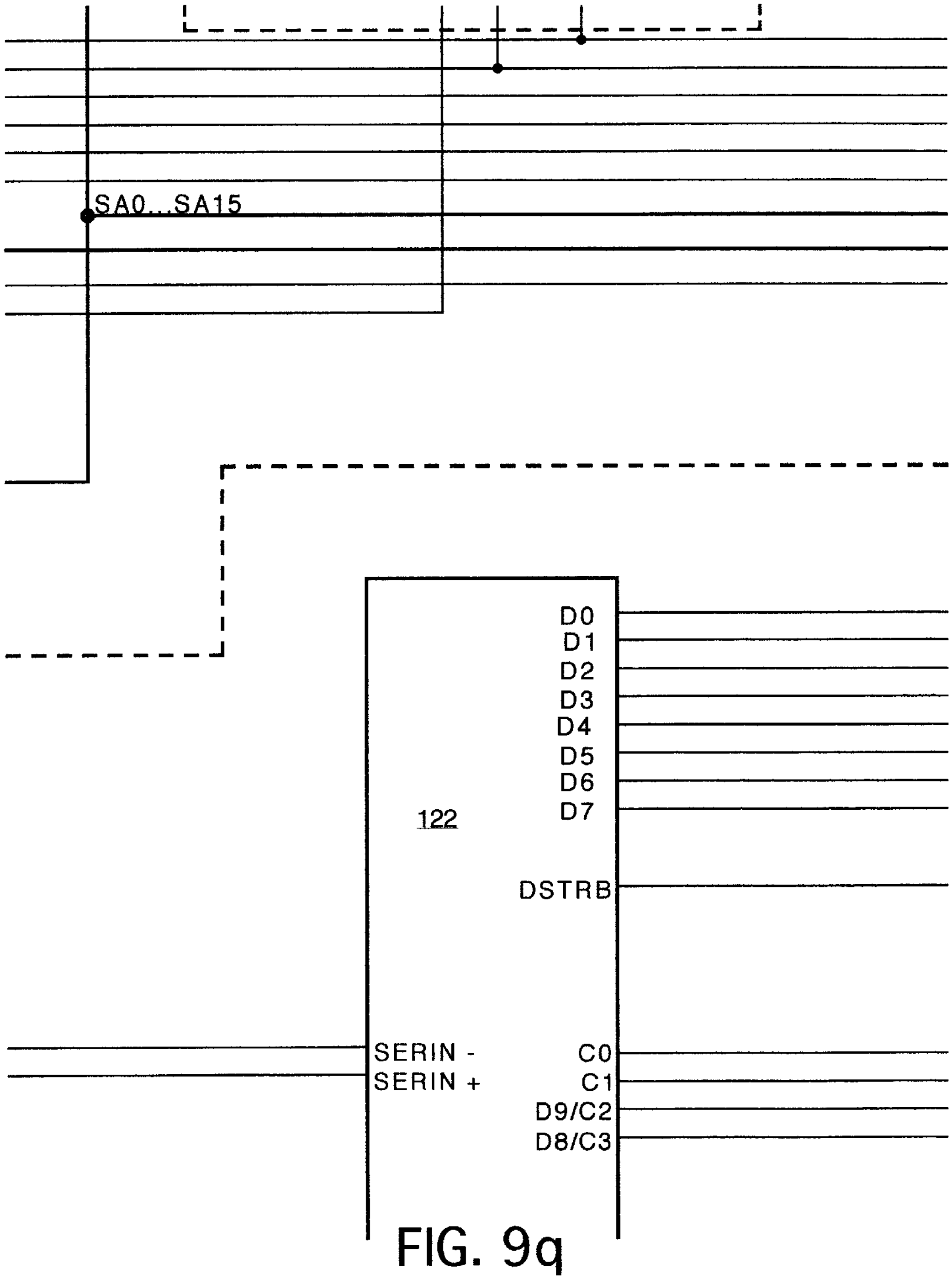
Figure 9R:
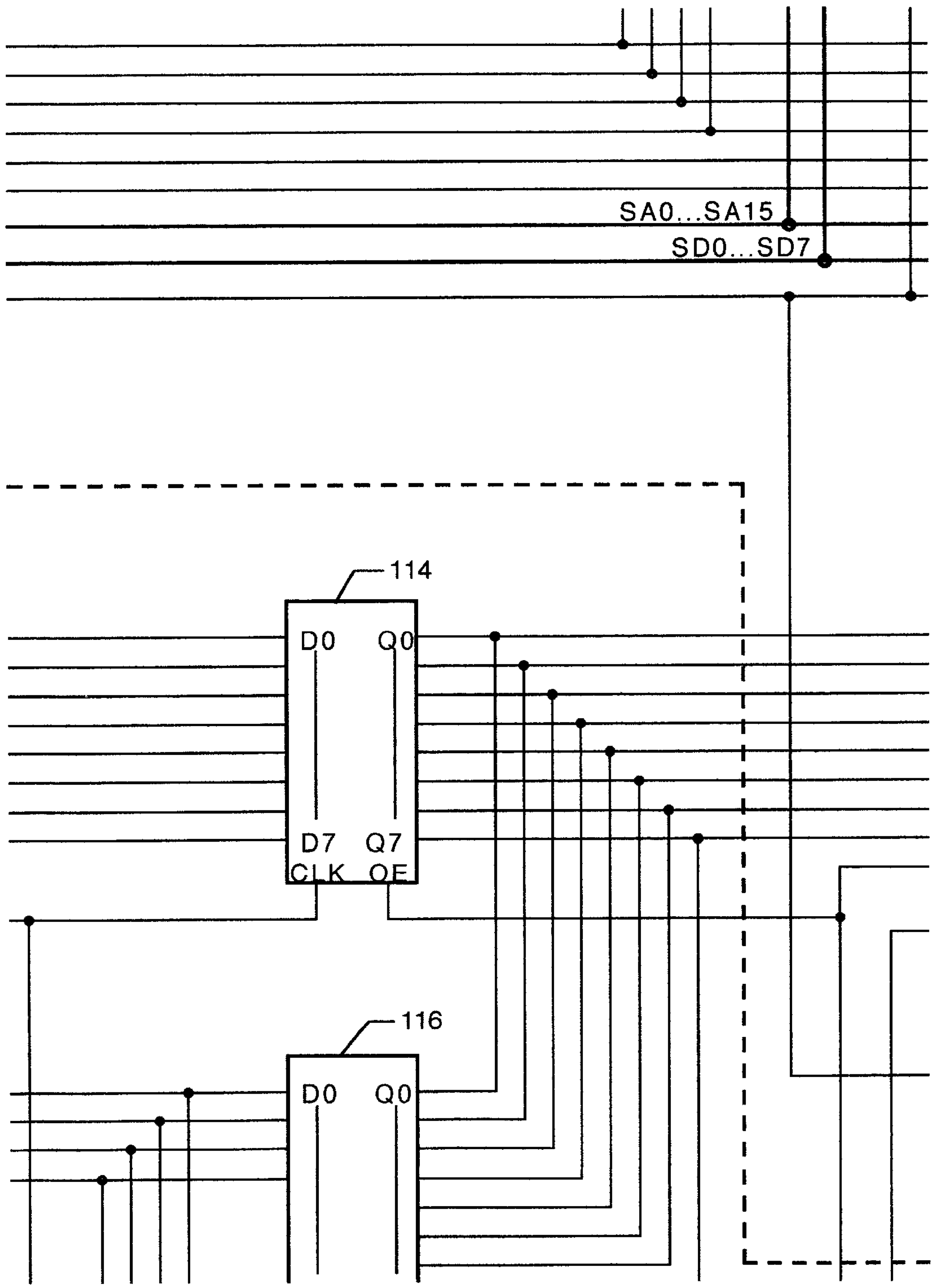
Figure 9S:
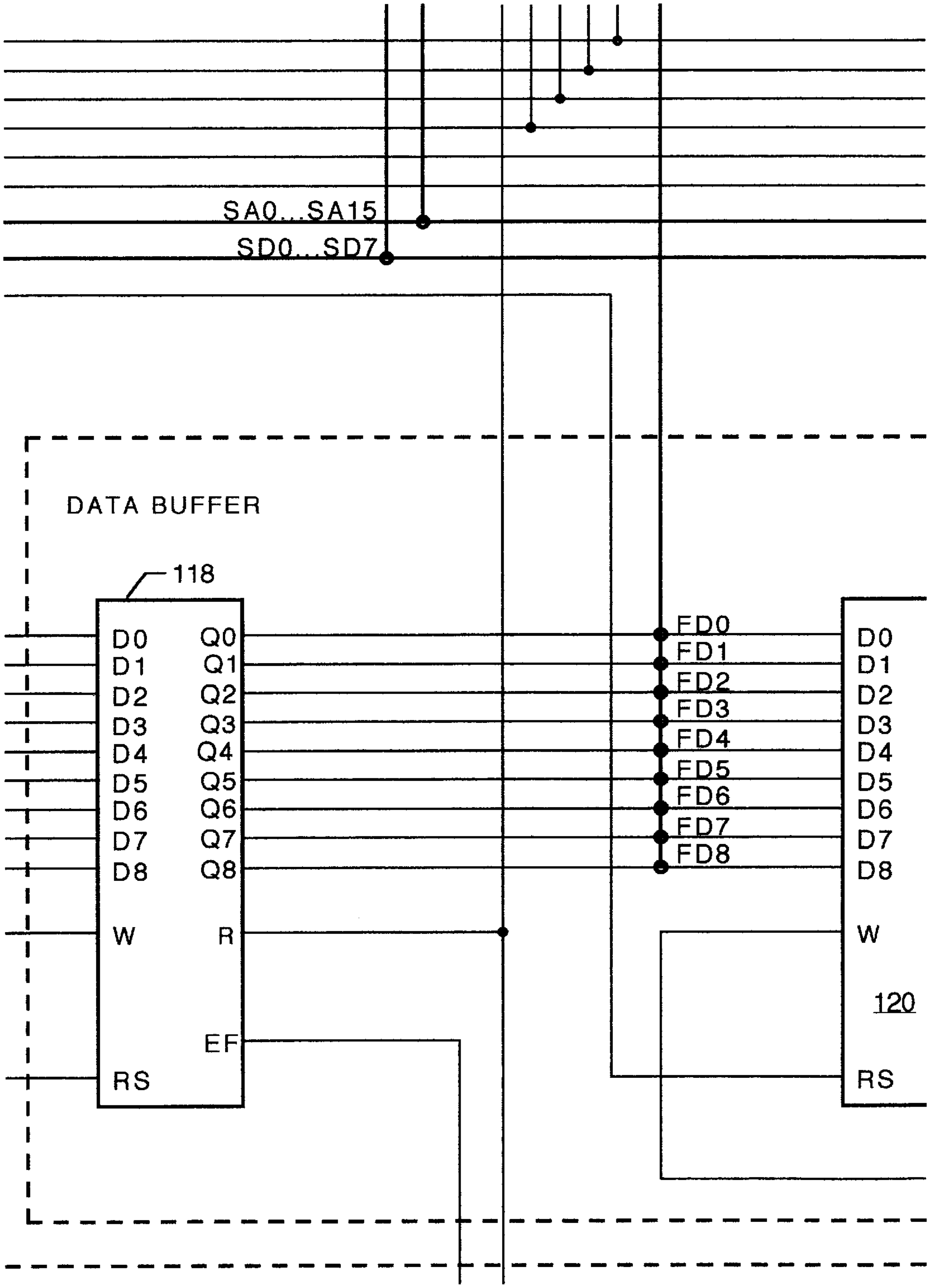
Figure 9T:
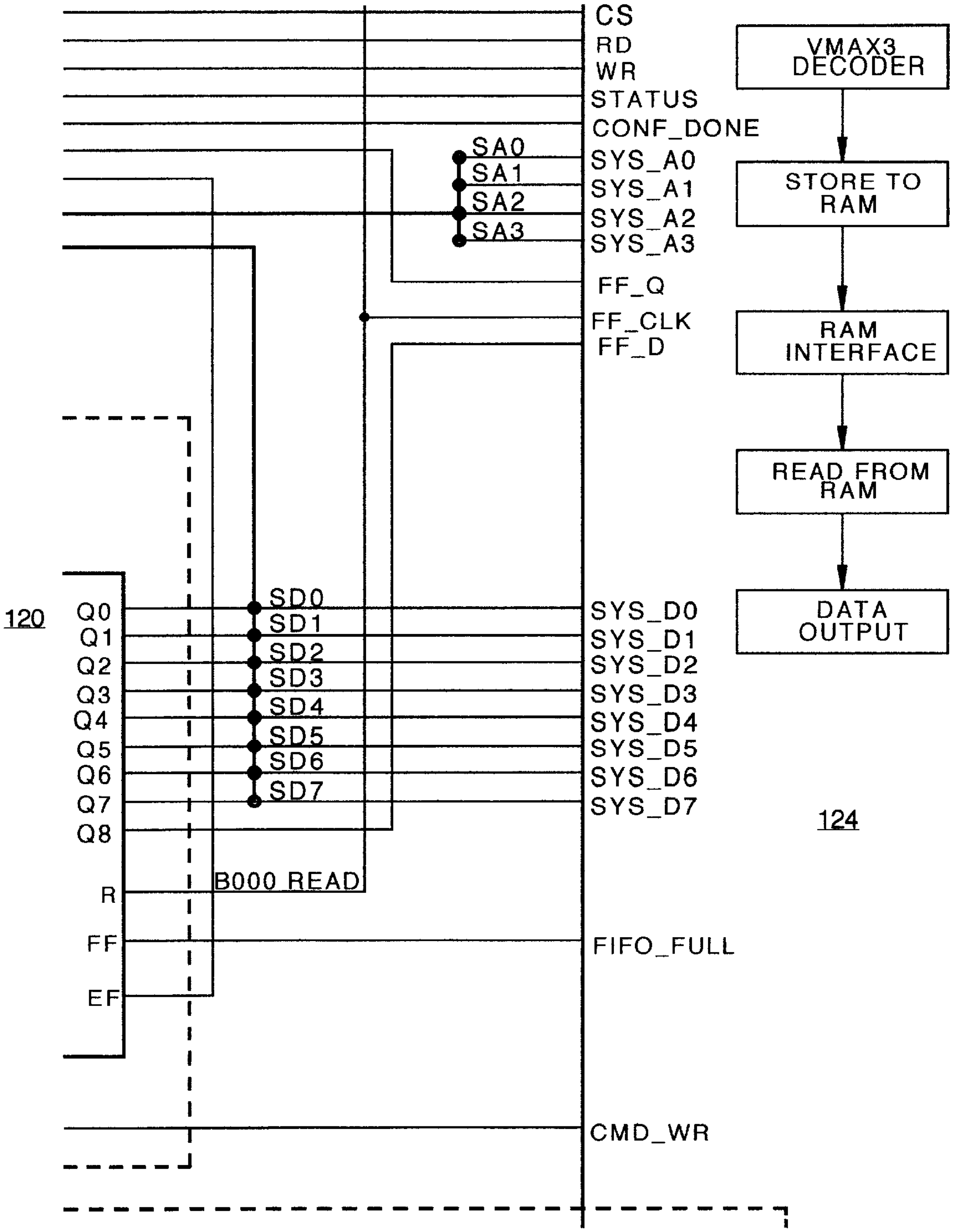
Figure 9U:
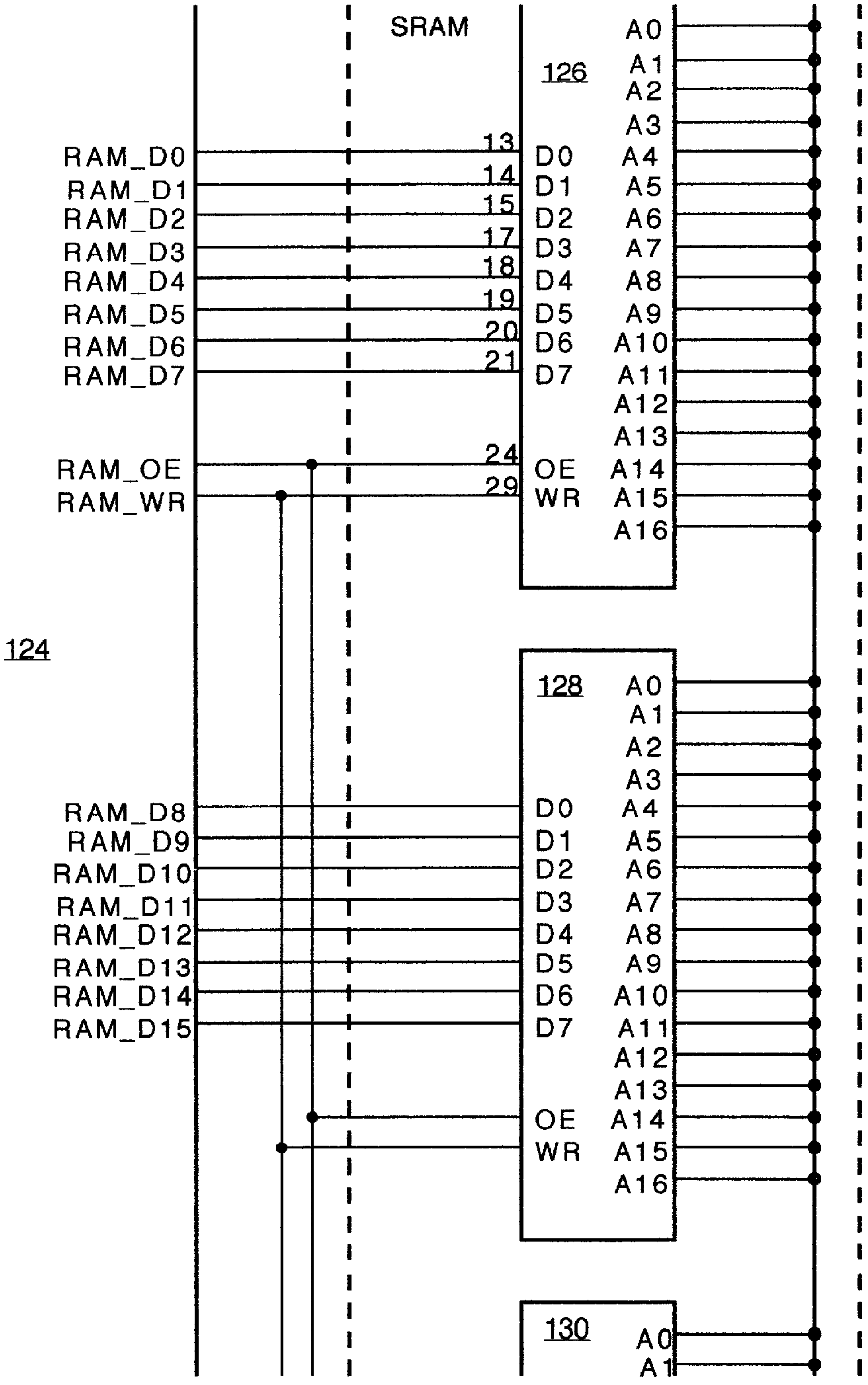
Figure 9V:
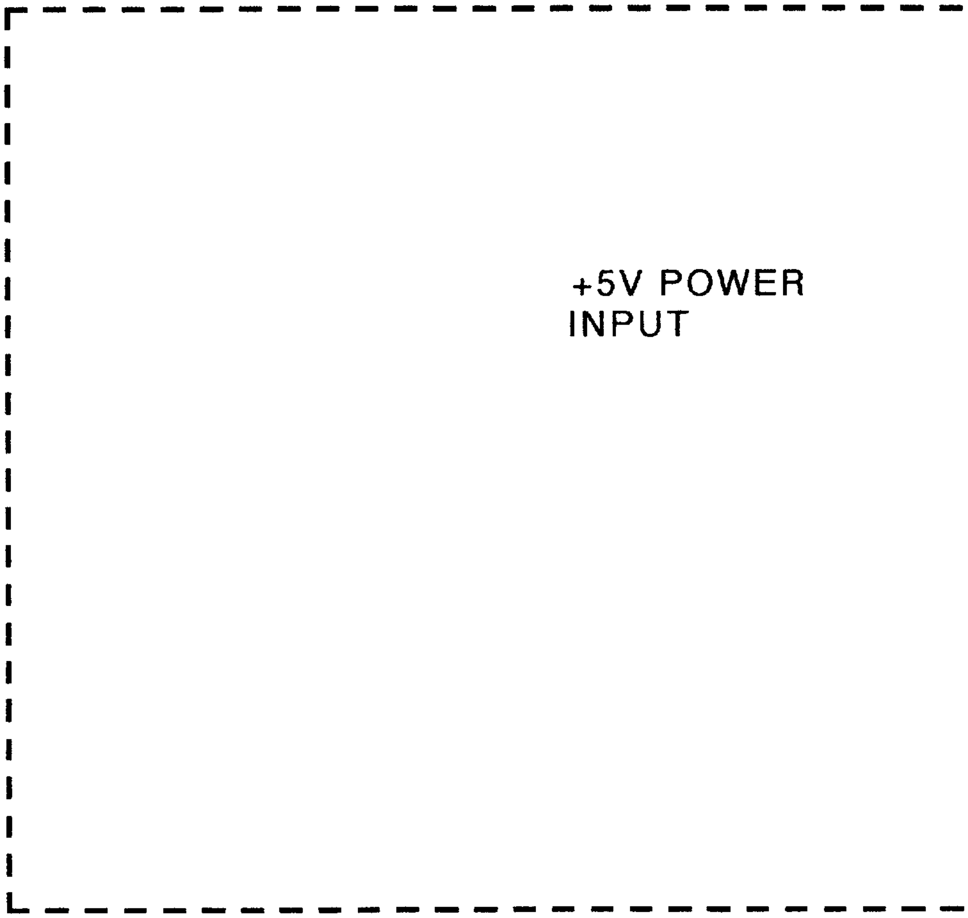
Figure 9W:
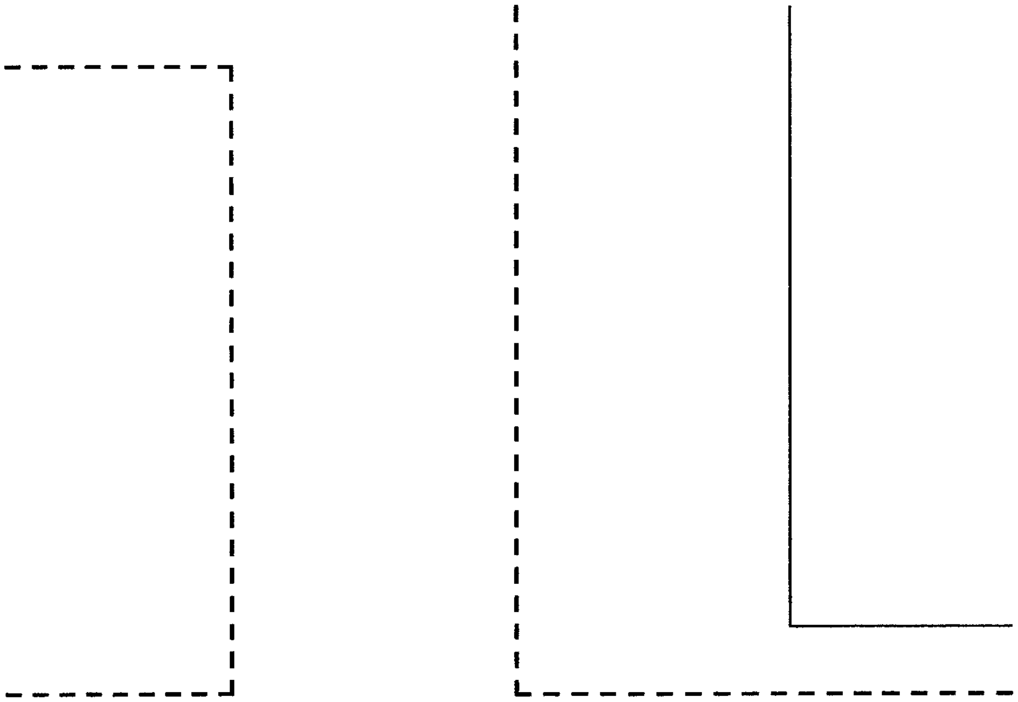
Figure 9X:
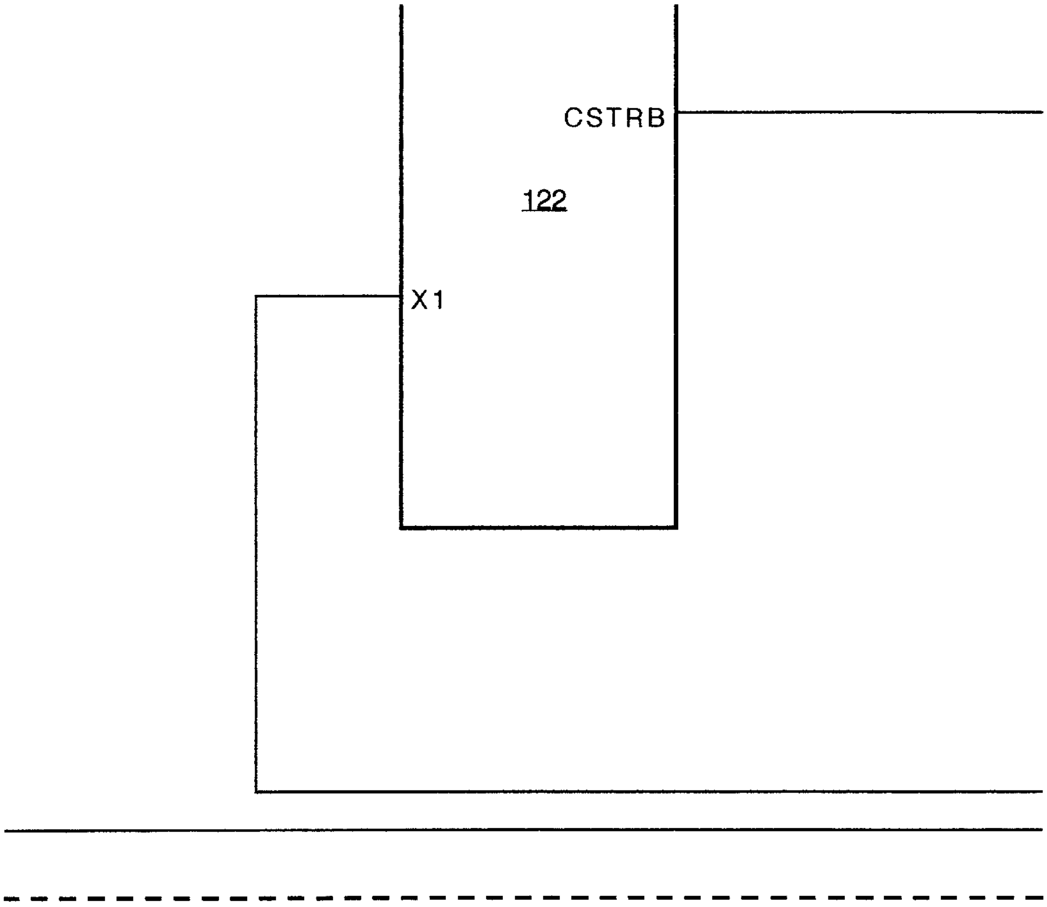
Figure 9Y:
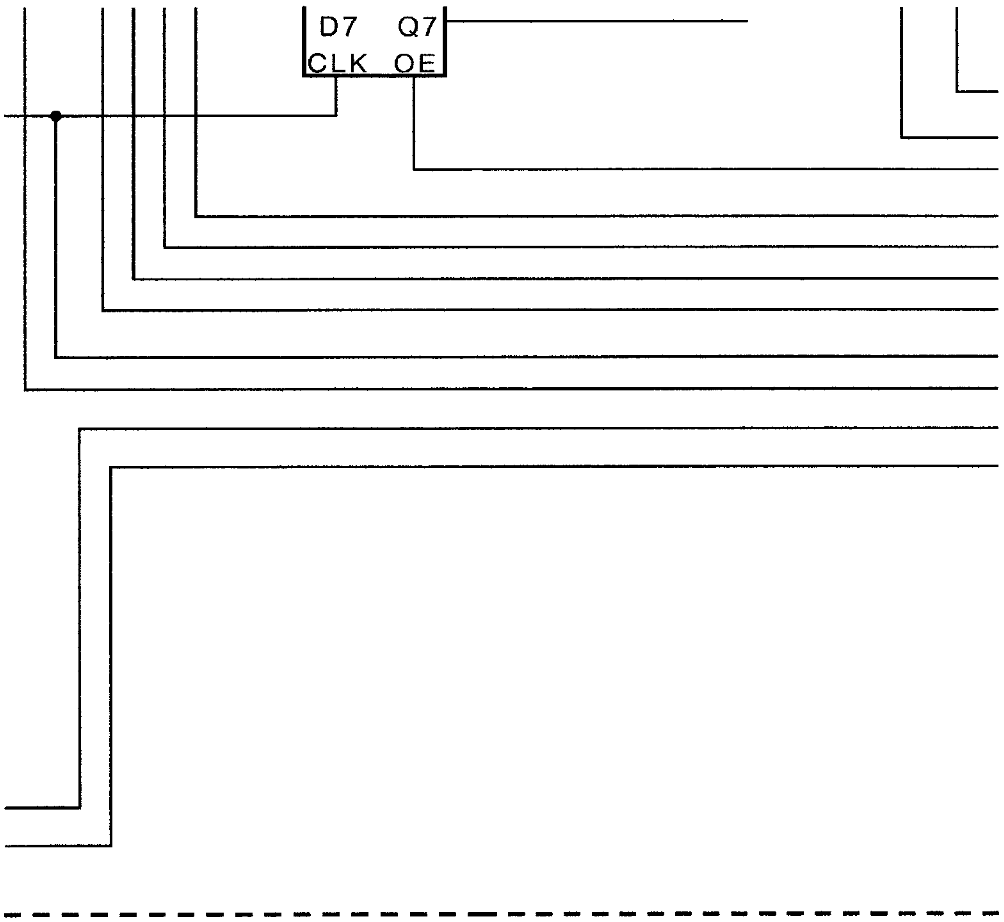
Figure 9Z:
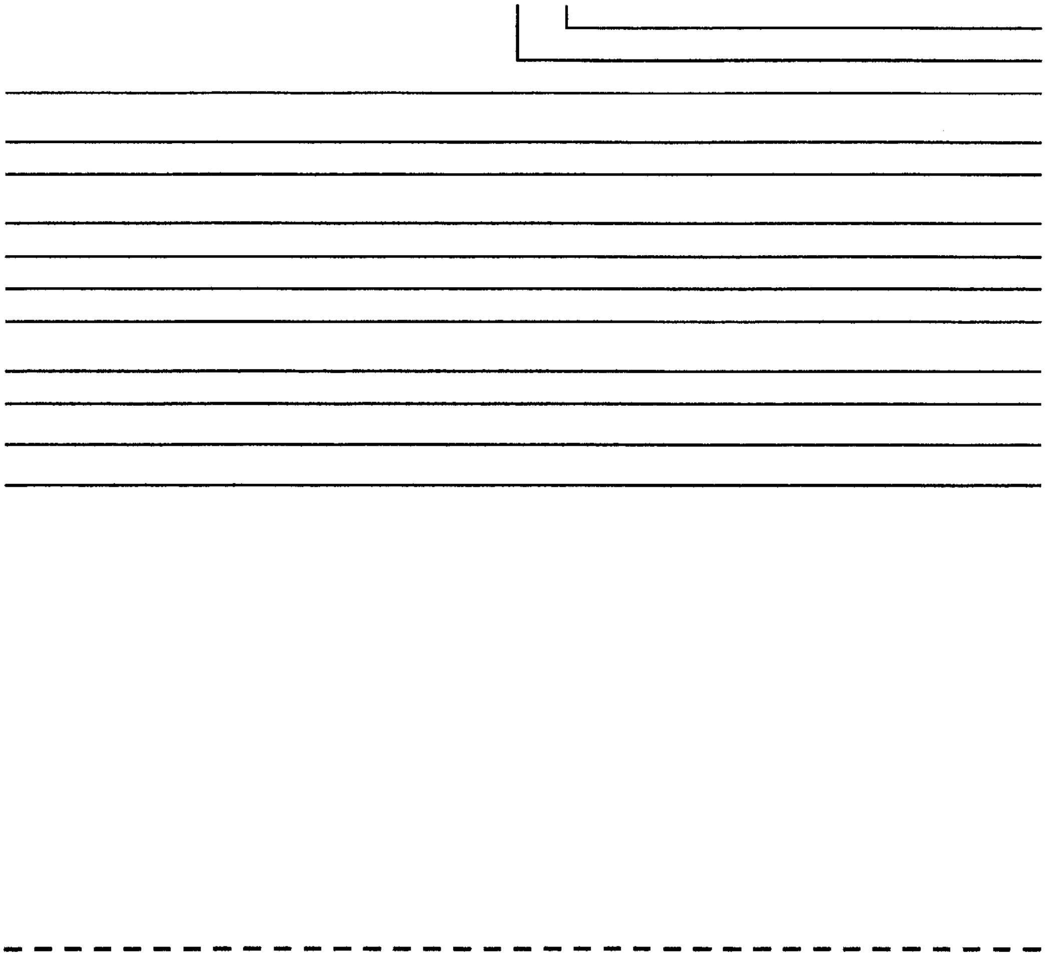
Figure 9A:
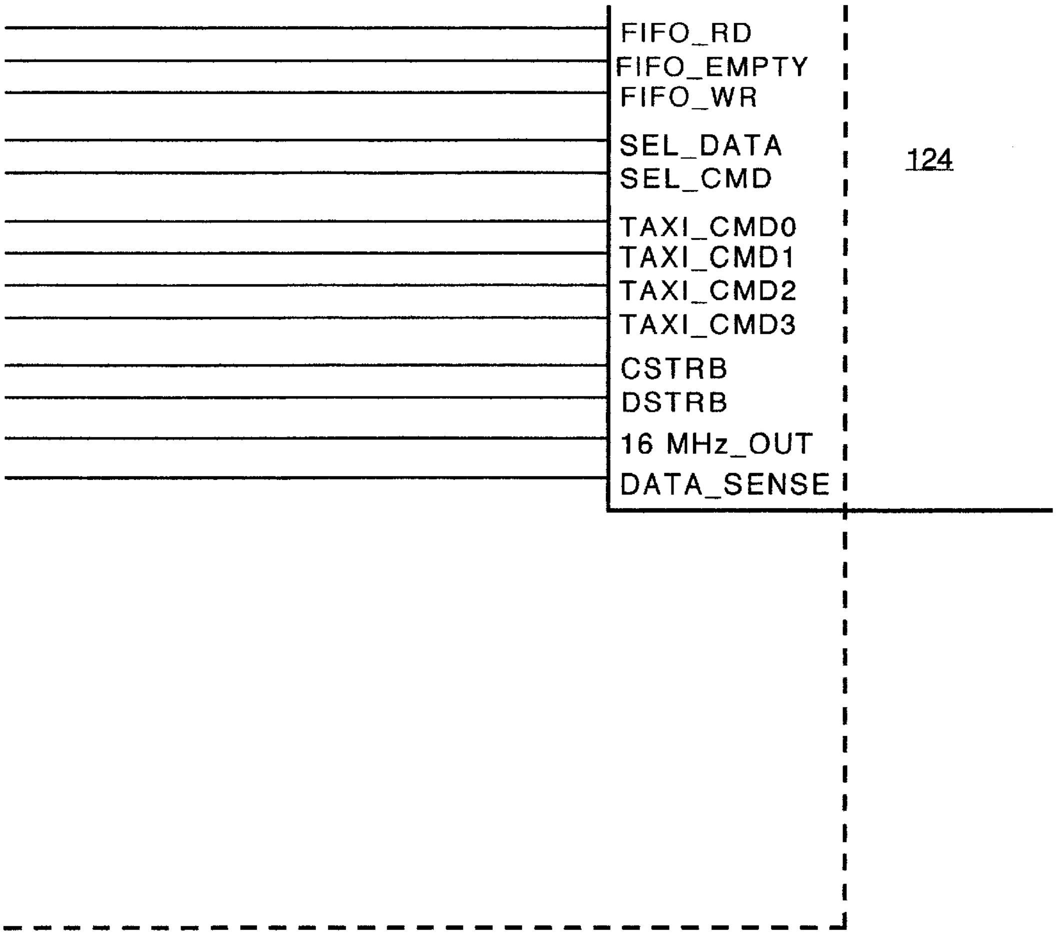
Figure 9A:
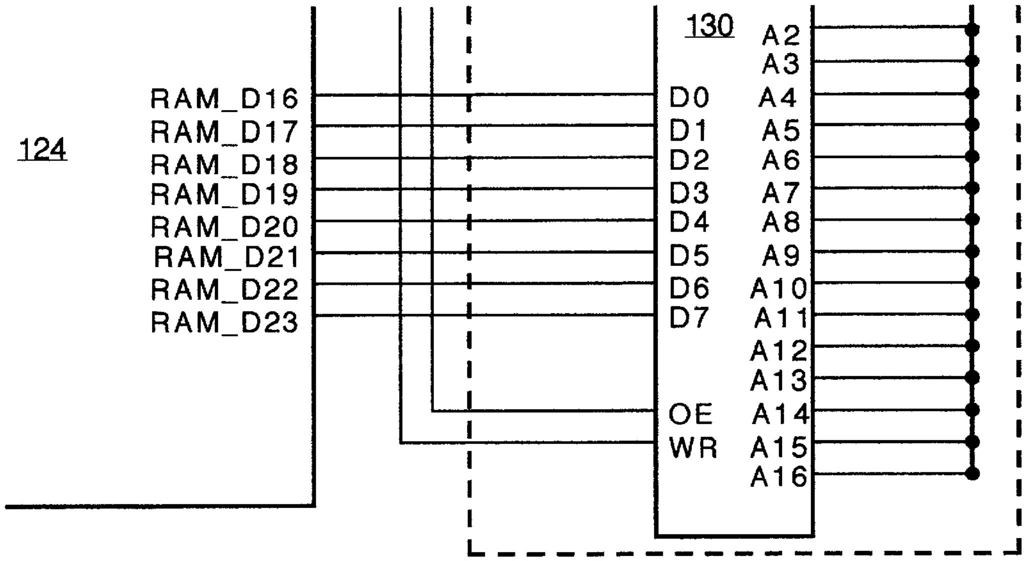

FIG. 8 is a layout of FIGS. 9*a*–9*ab*.

FIGS. 9*a*–9*ab* illustrate a video display interface electrical circuit schematic diagram, comprising a micro processor which communicates with V7000 via RS-232 port and programs all programmable logic 80 (96,104,124), fiber optic input (160 Mbaud) 81, address latch 82, general purpose storage SRAM 84, PLD program control 86, status latch 88, status indicators 90, process program storage EPROM 92, PLD program storage 94, video receiver programmable logic 96, video data buffers (FIFO) 98, 100 and 102, programmable logic transmitter of transmit out device 104, high speed parallel-to-serial data conversion parallel input/serial output (TAXI) 106, fiber data transmitters 108 and 110, high speed serial-to-parallel conversion serial input/parallel output (TAXI) 112, latches 114 and 116, data buffers (FIFO) 118 and 120, Venus receiver with programmable logic 124, display data storage SRAMs 126, 128 and 130, oscillator 132, watchdog monitor 136, and configuration data storage (serial EPROM) 136.

Figure 11A:
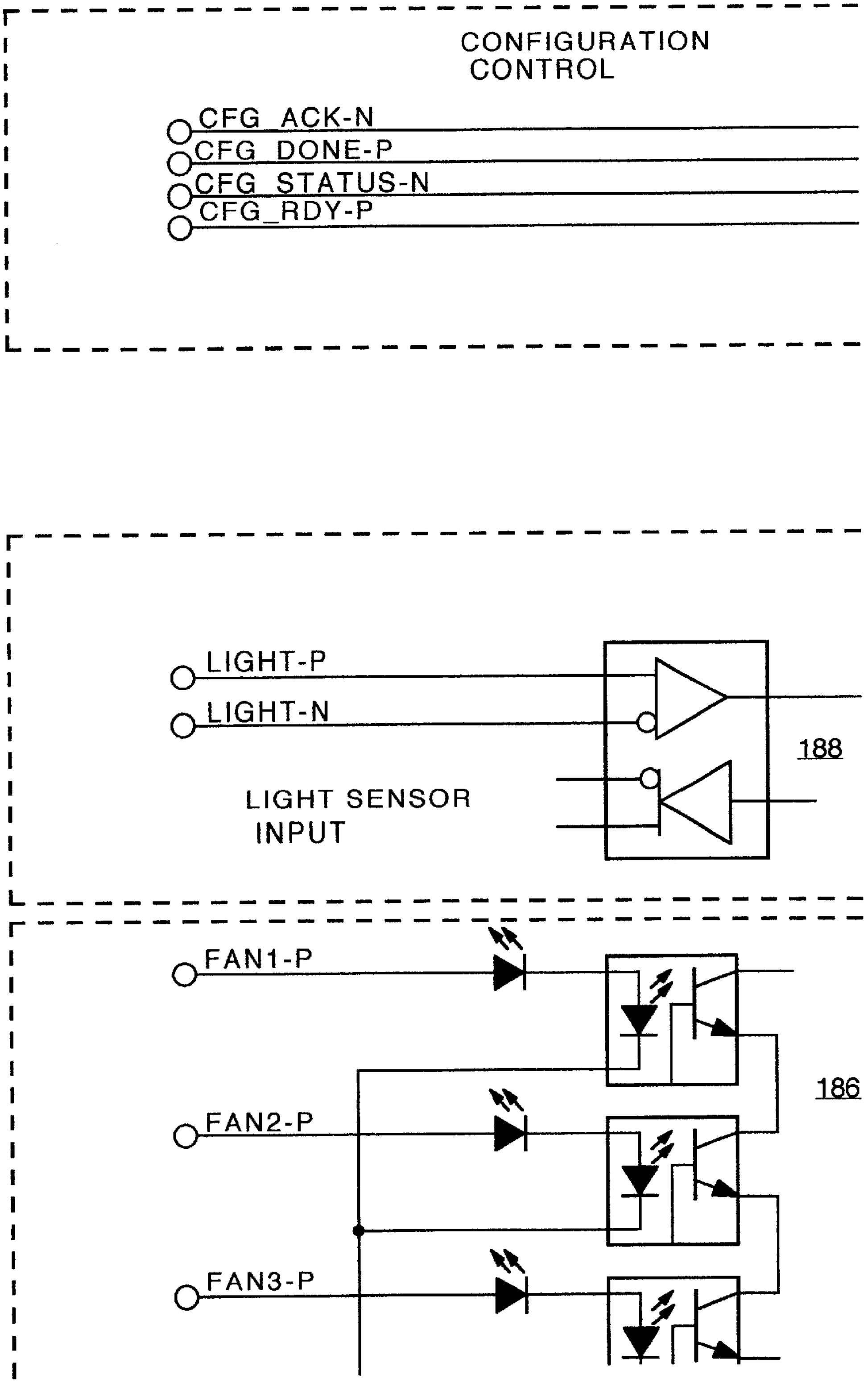
FIGS. 11*a*–11*ab* illustrate a data distributor receiver.
Figure 11B:
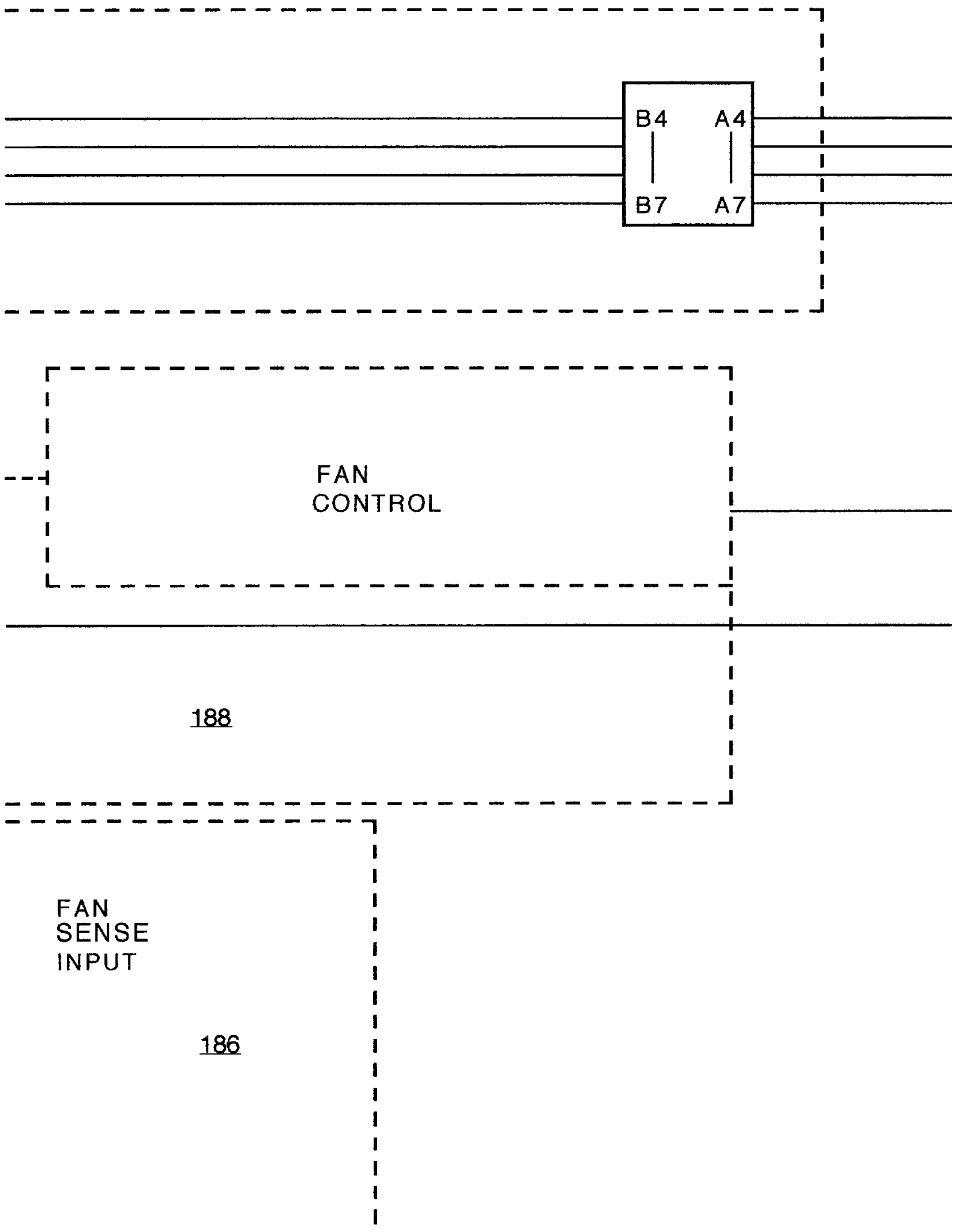
Figure 11C:
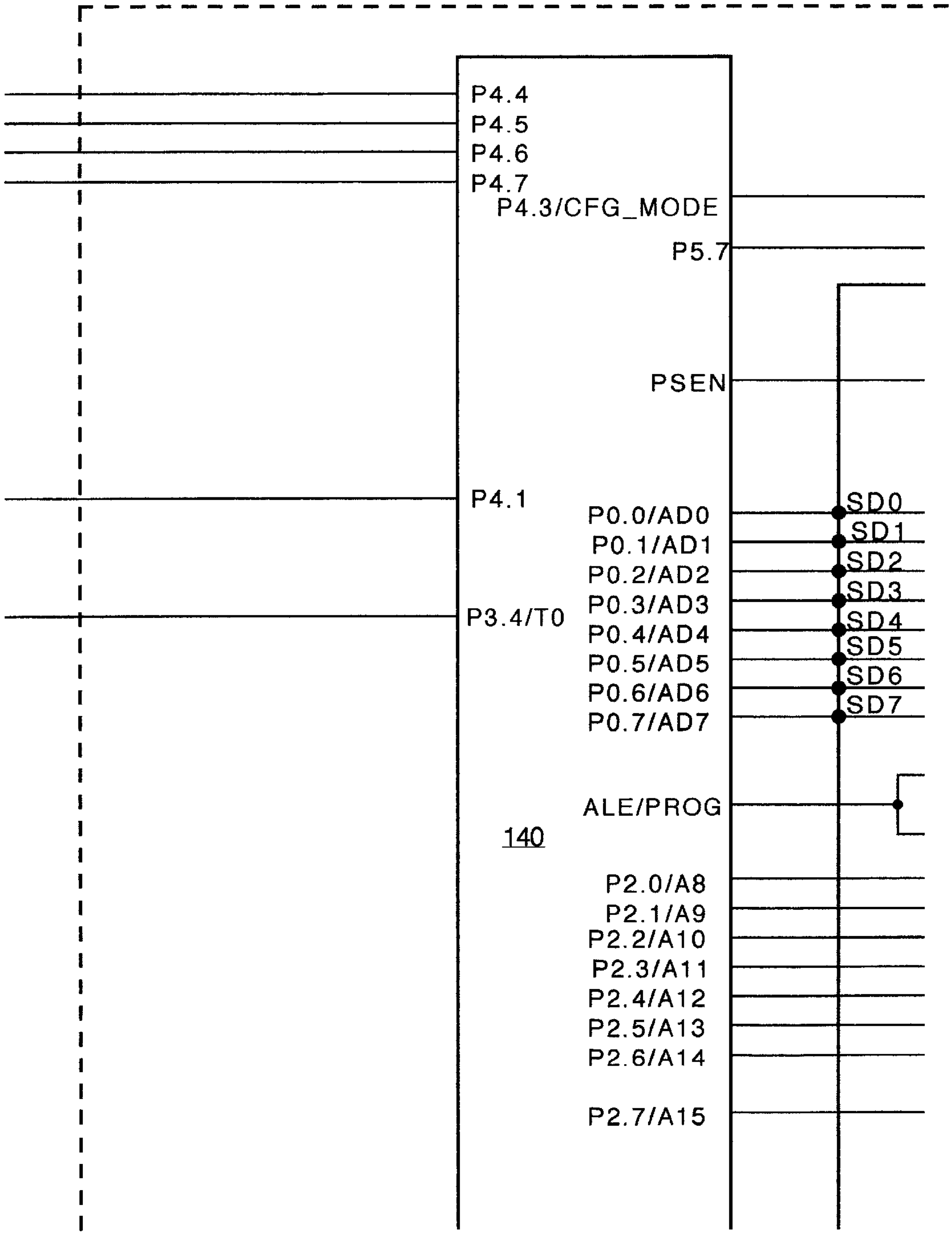
Figure 11D:
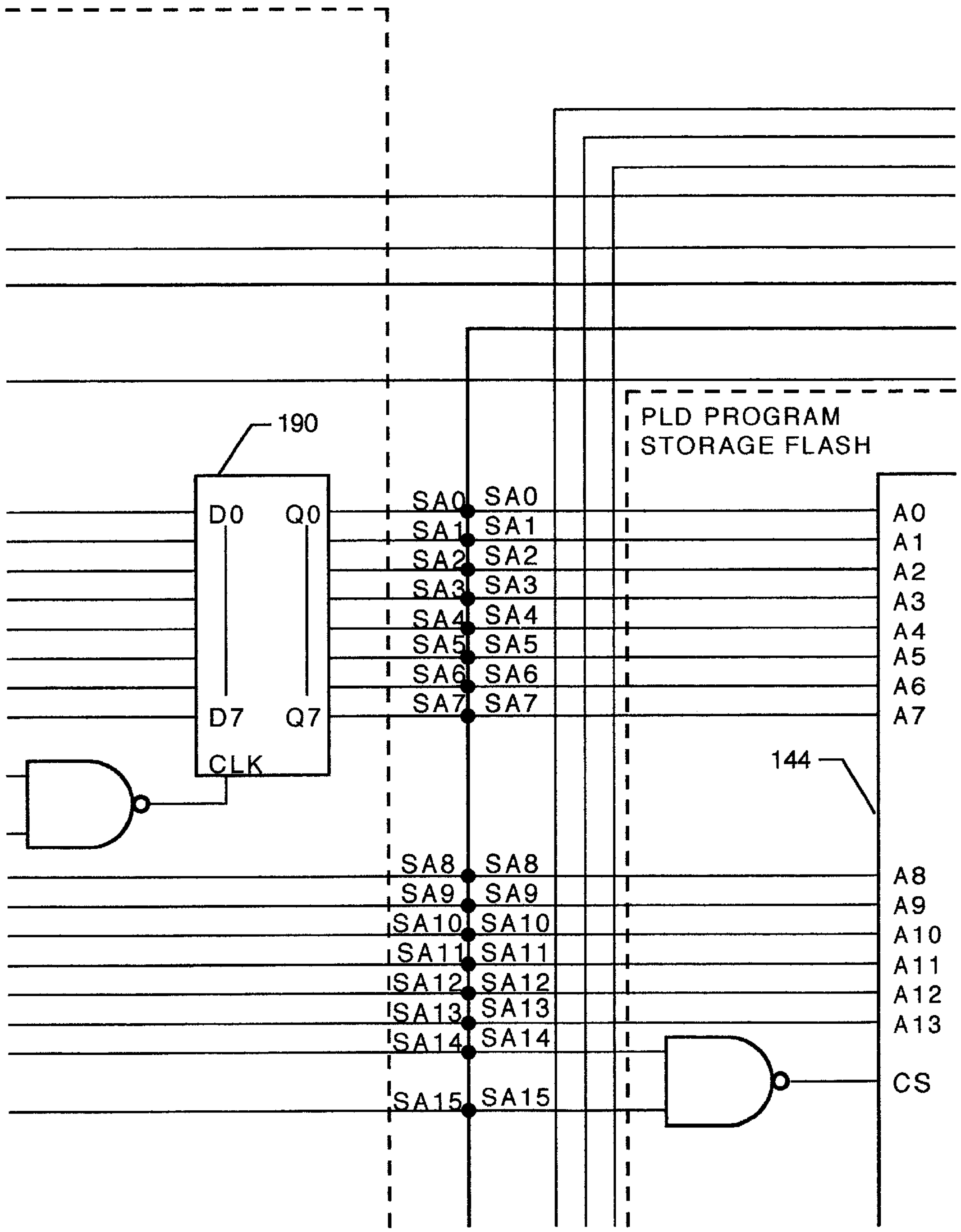
Figure 11E:
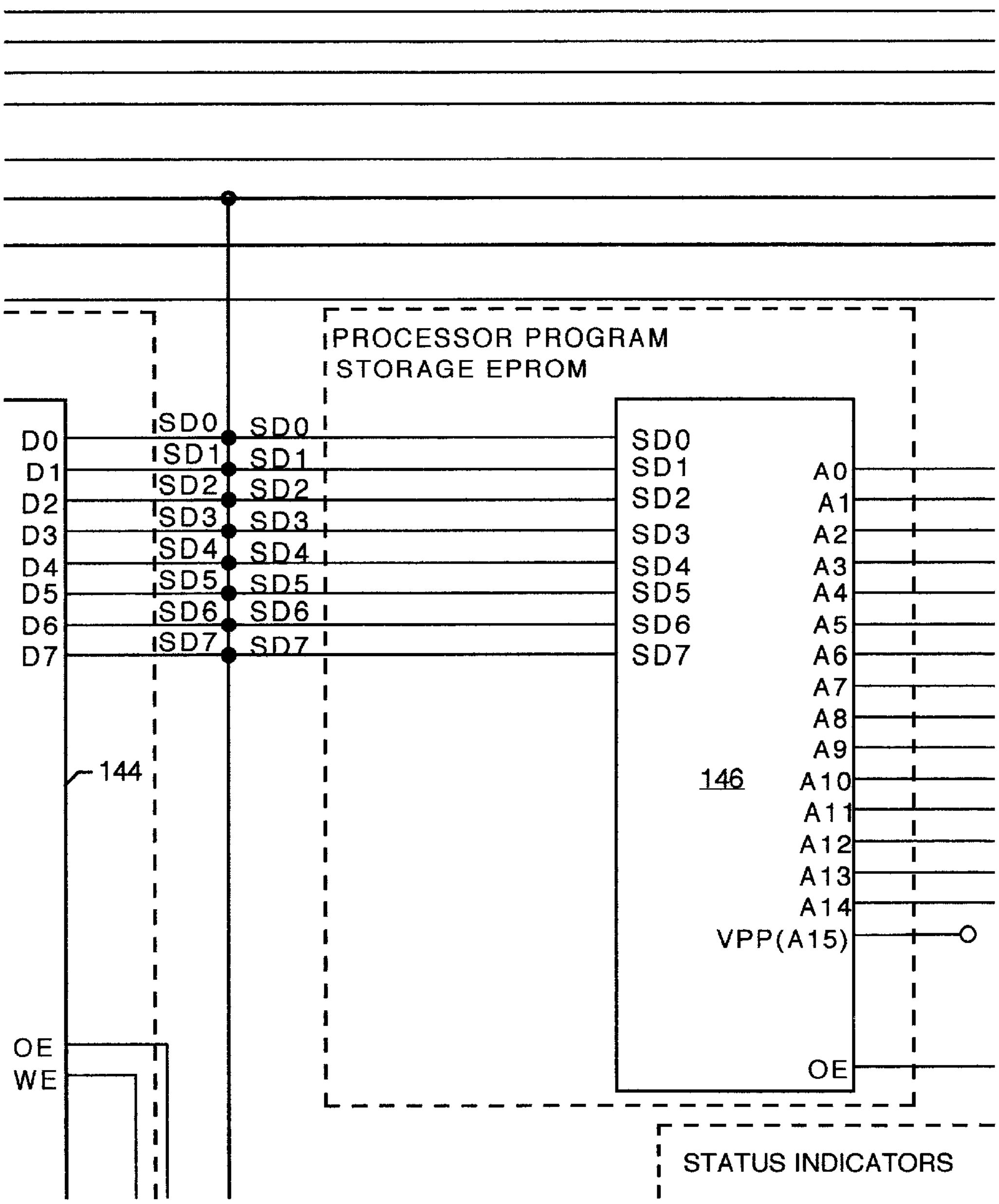
Figure 11F:
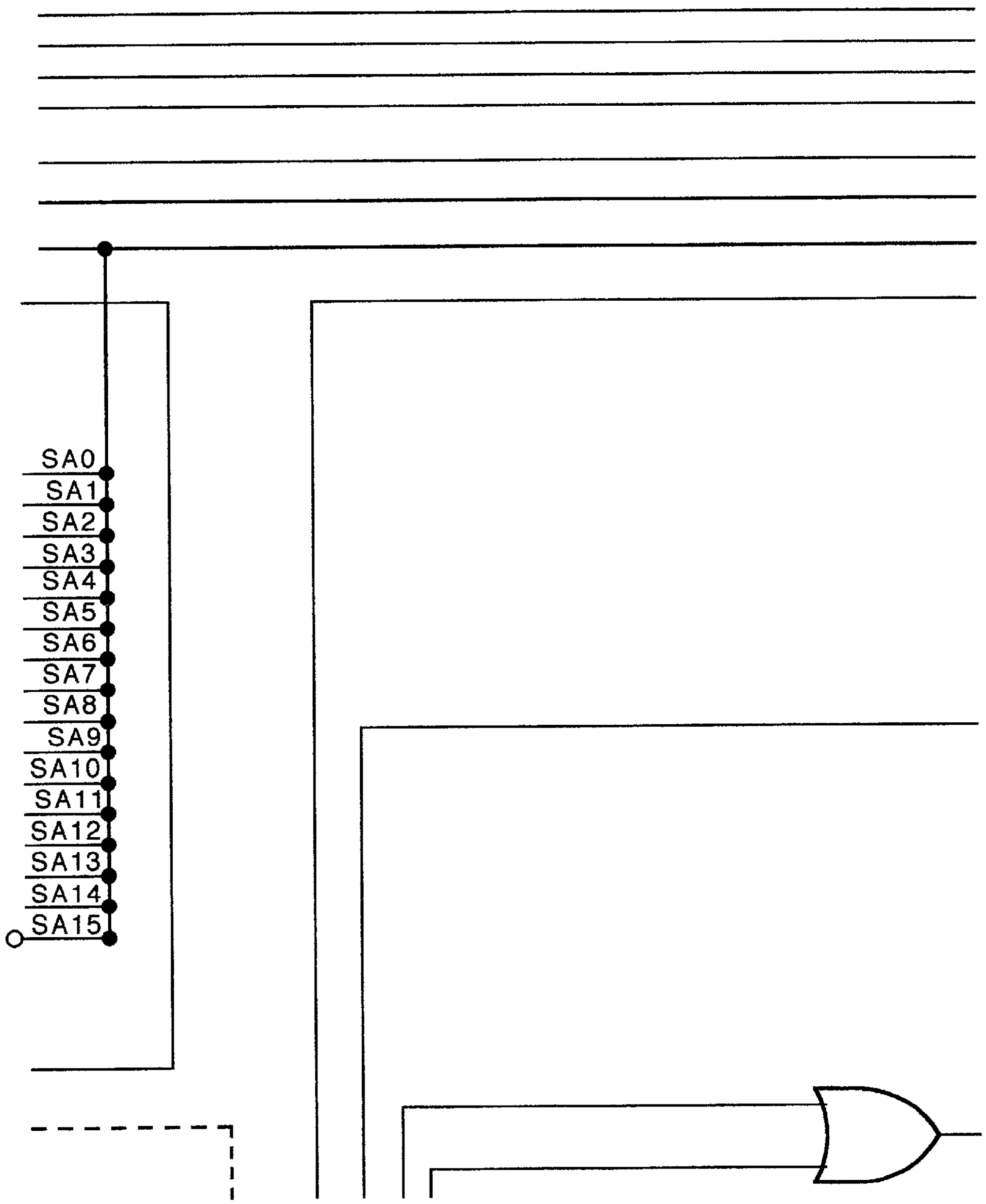
Figure 11G:
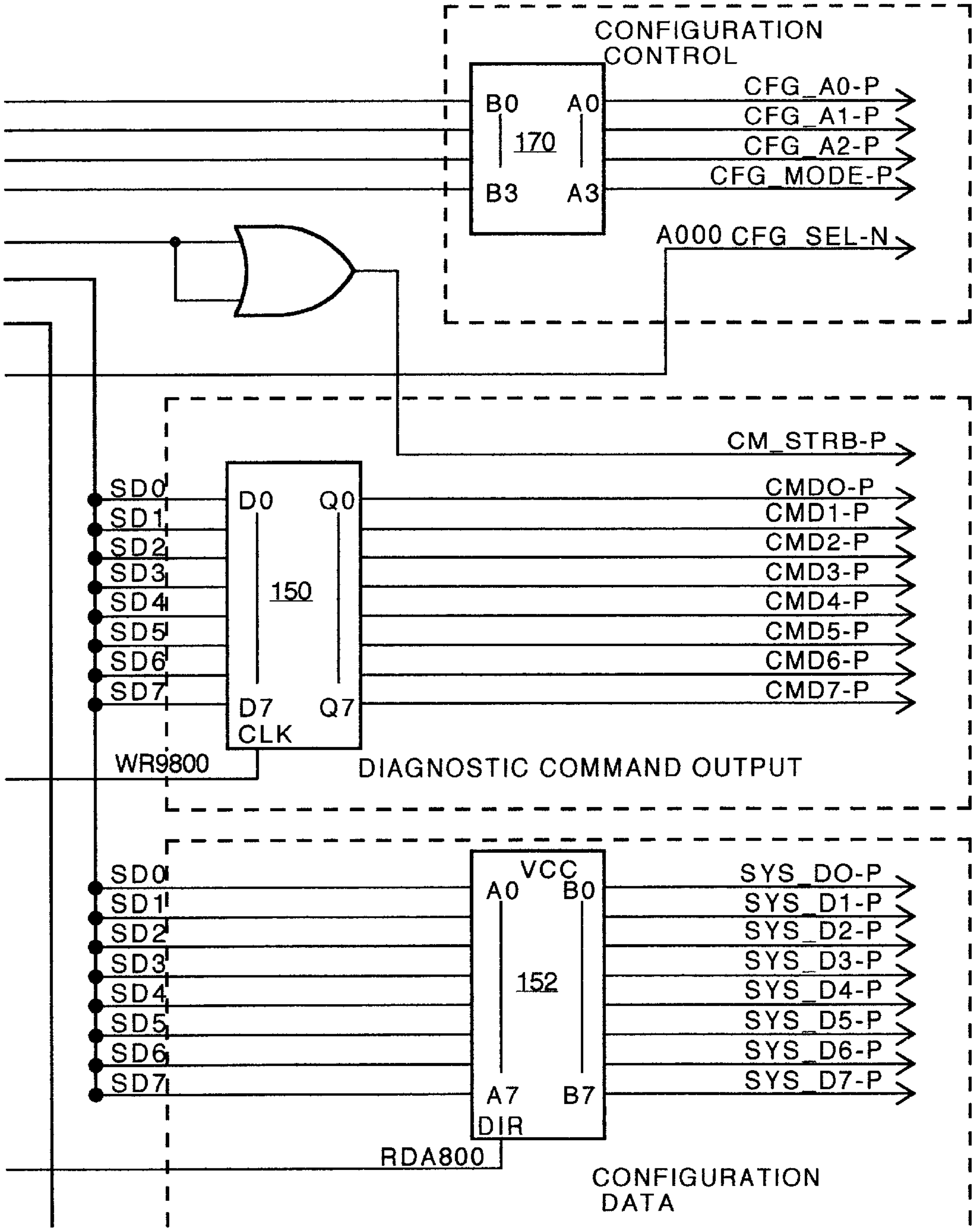
Figure 11H:
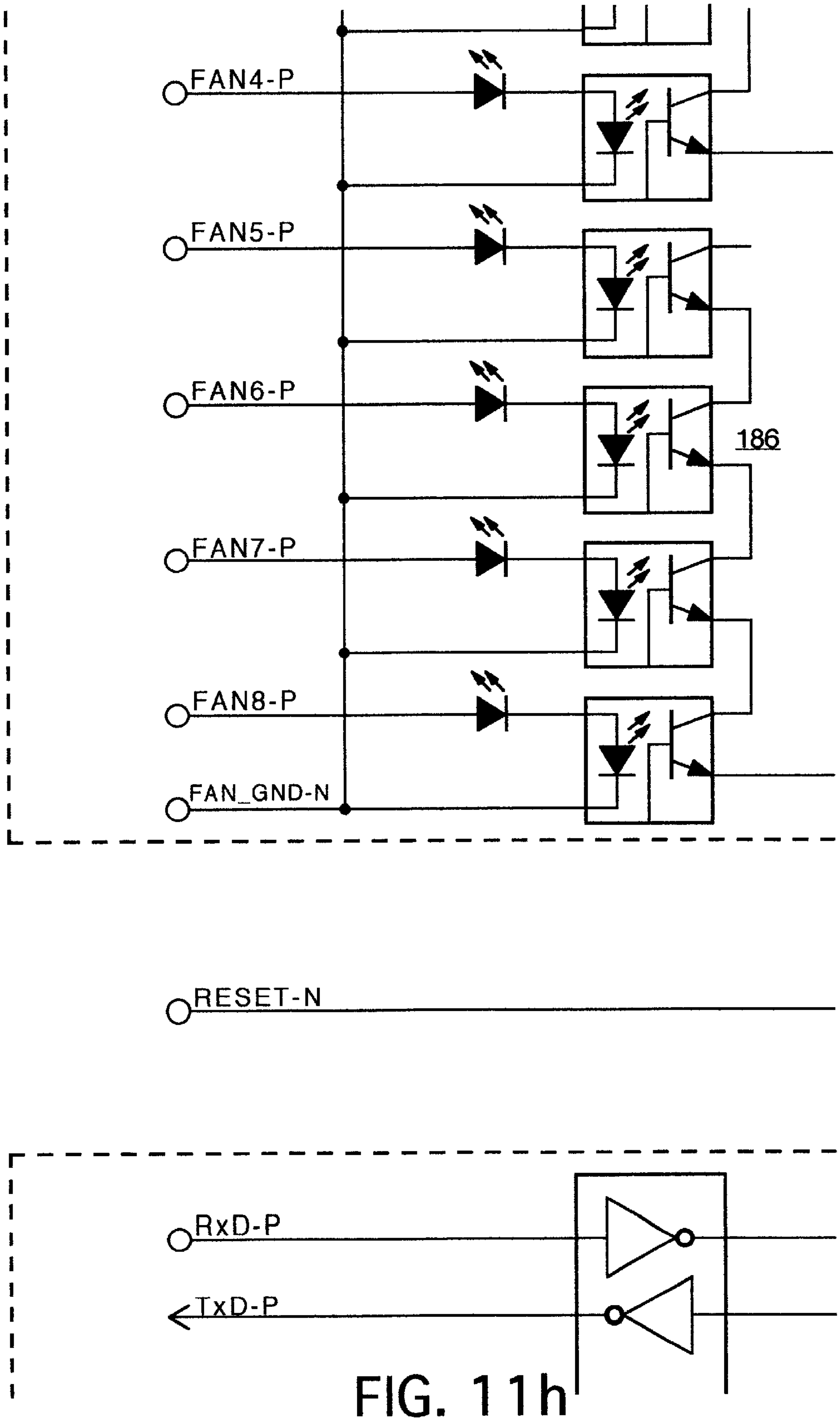
Figure 11I:
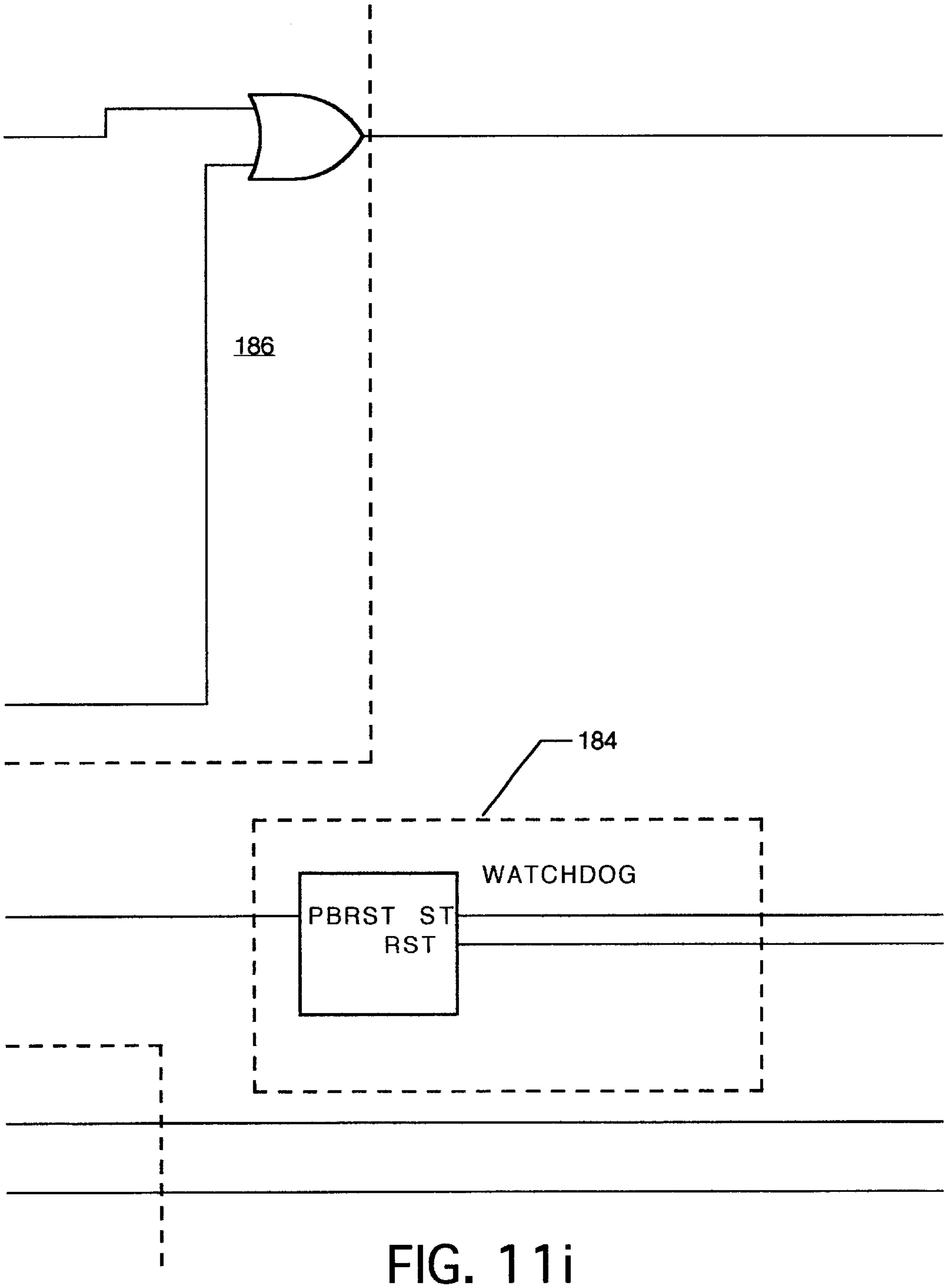
Figure 11J:
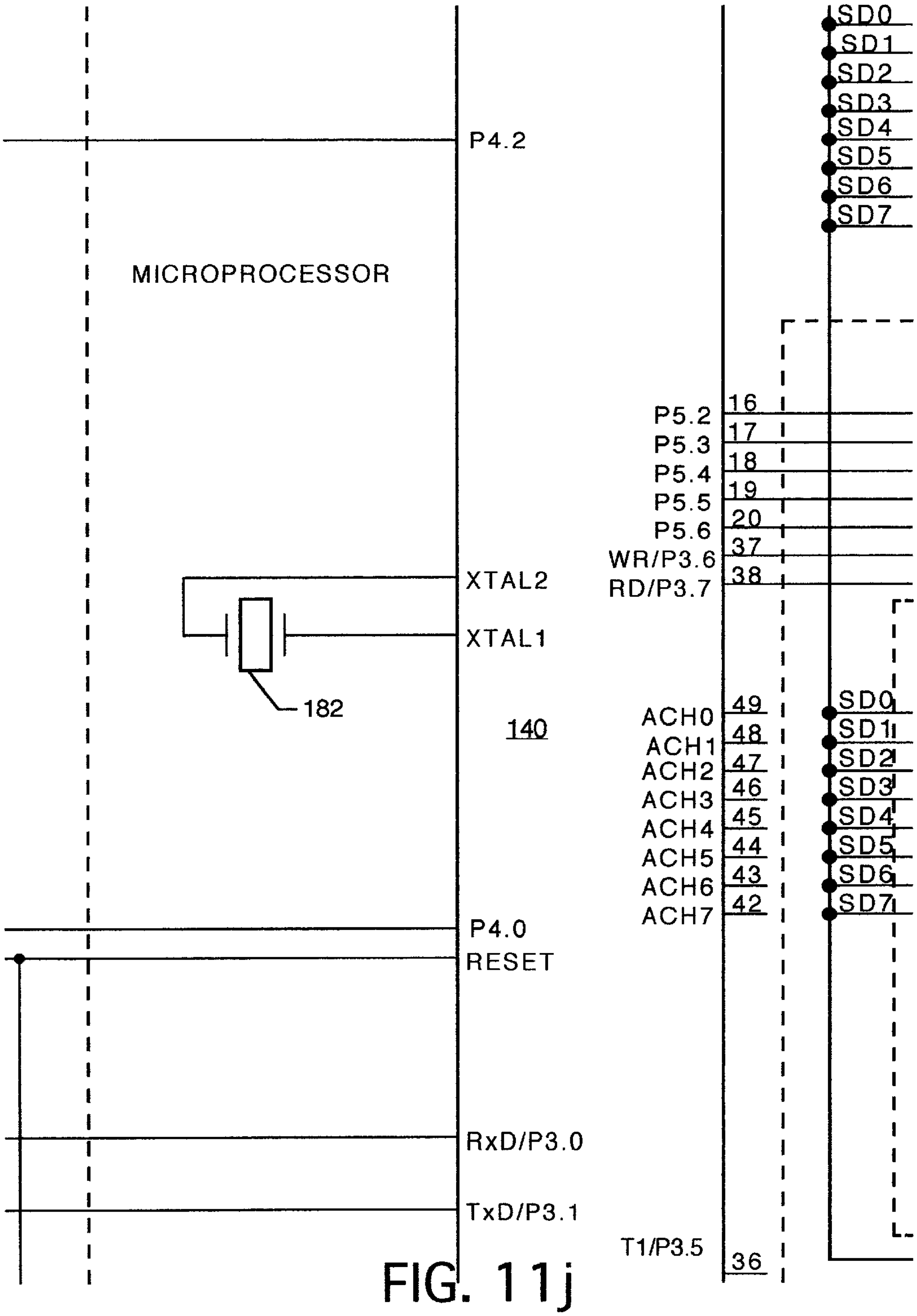
Figure 11K:
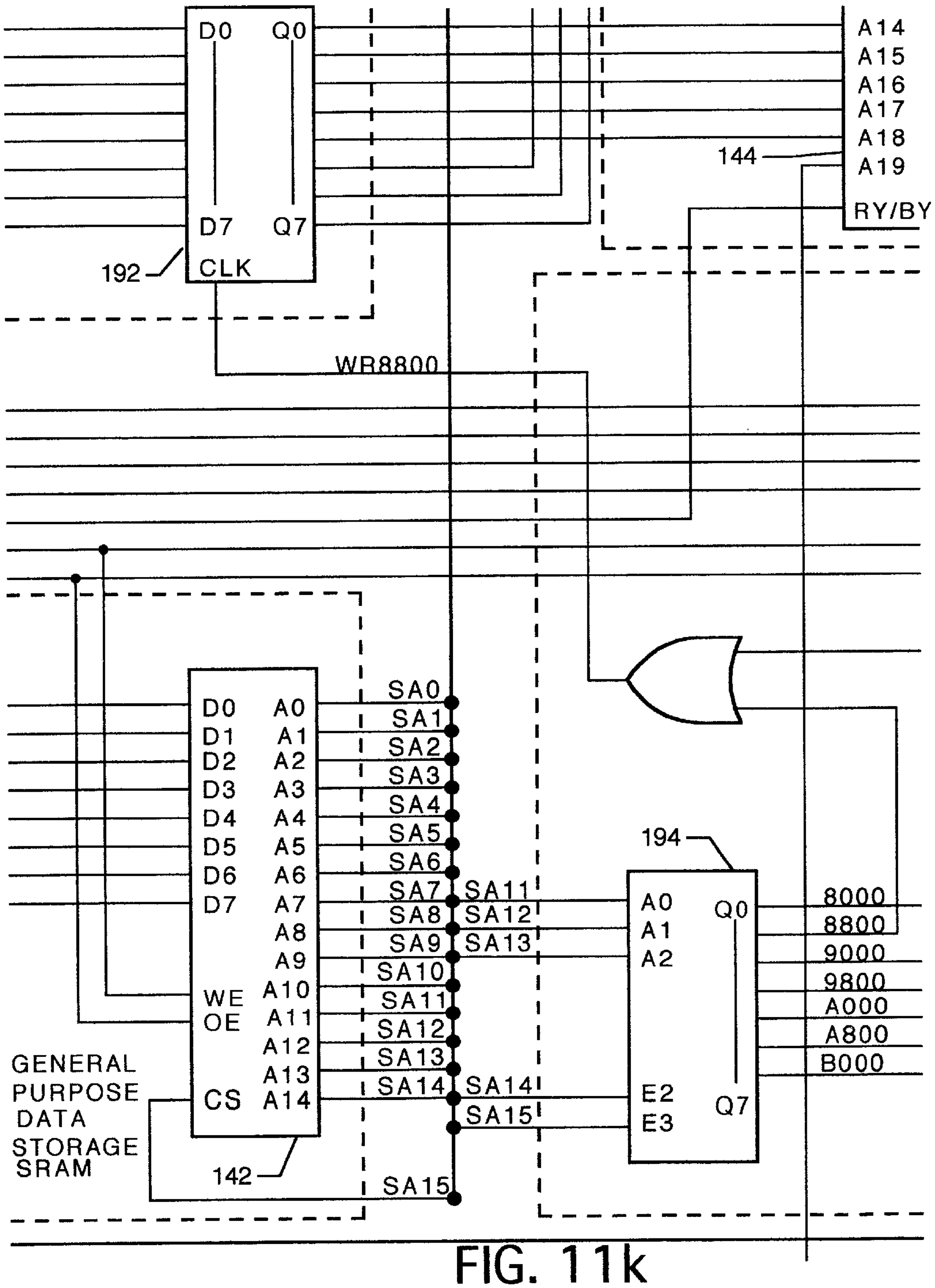
Figure 11L:
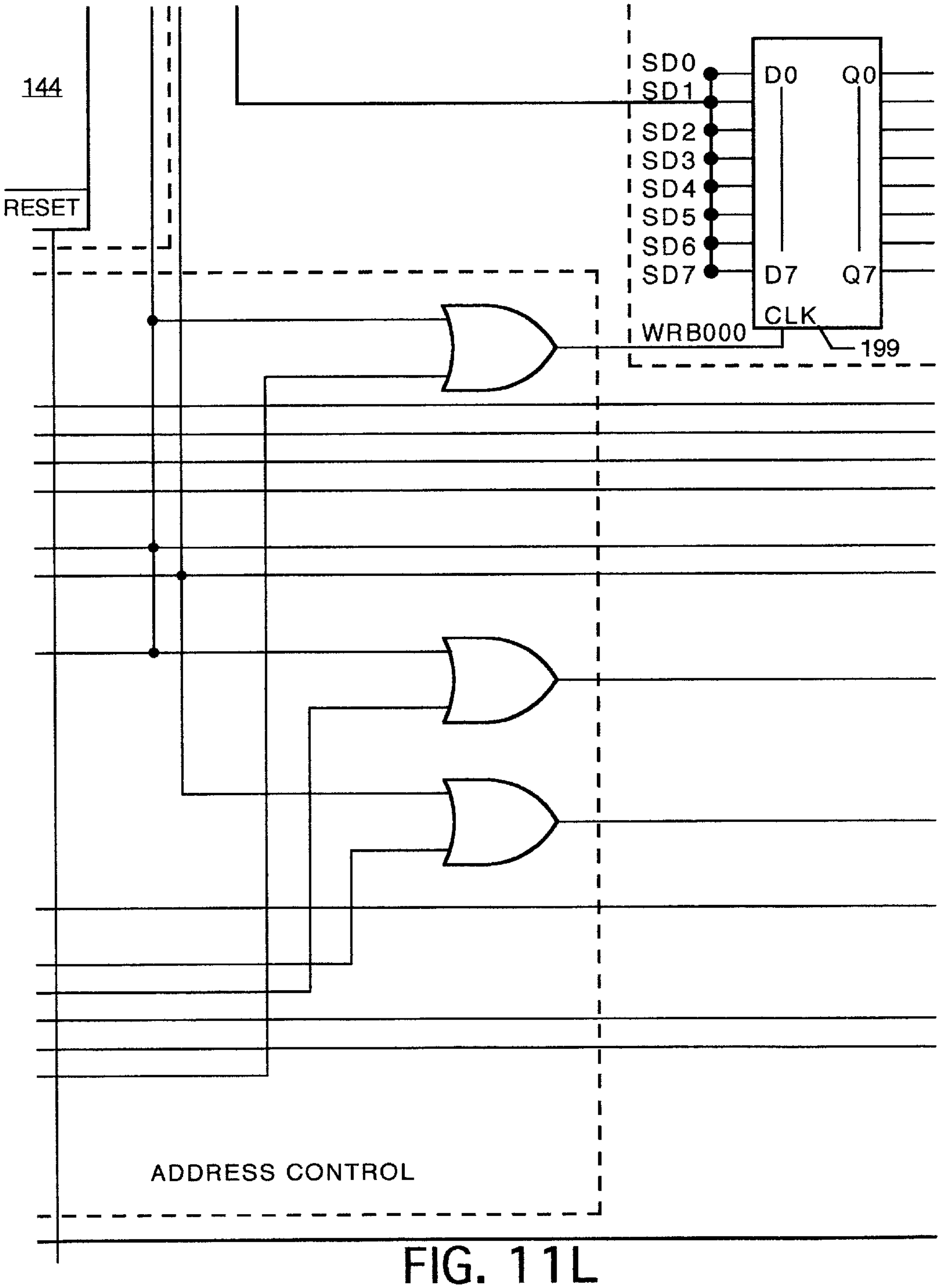
Figure 11M:
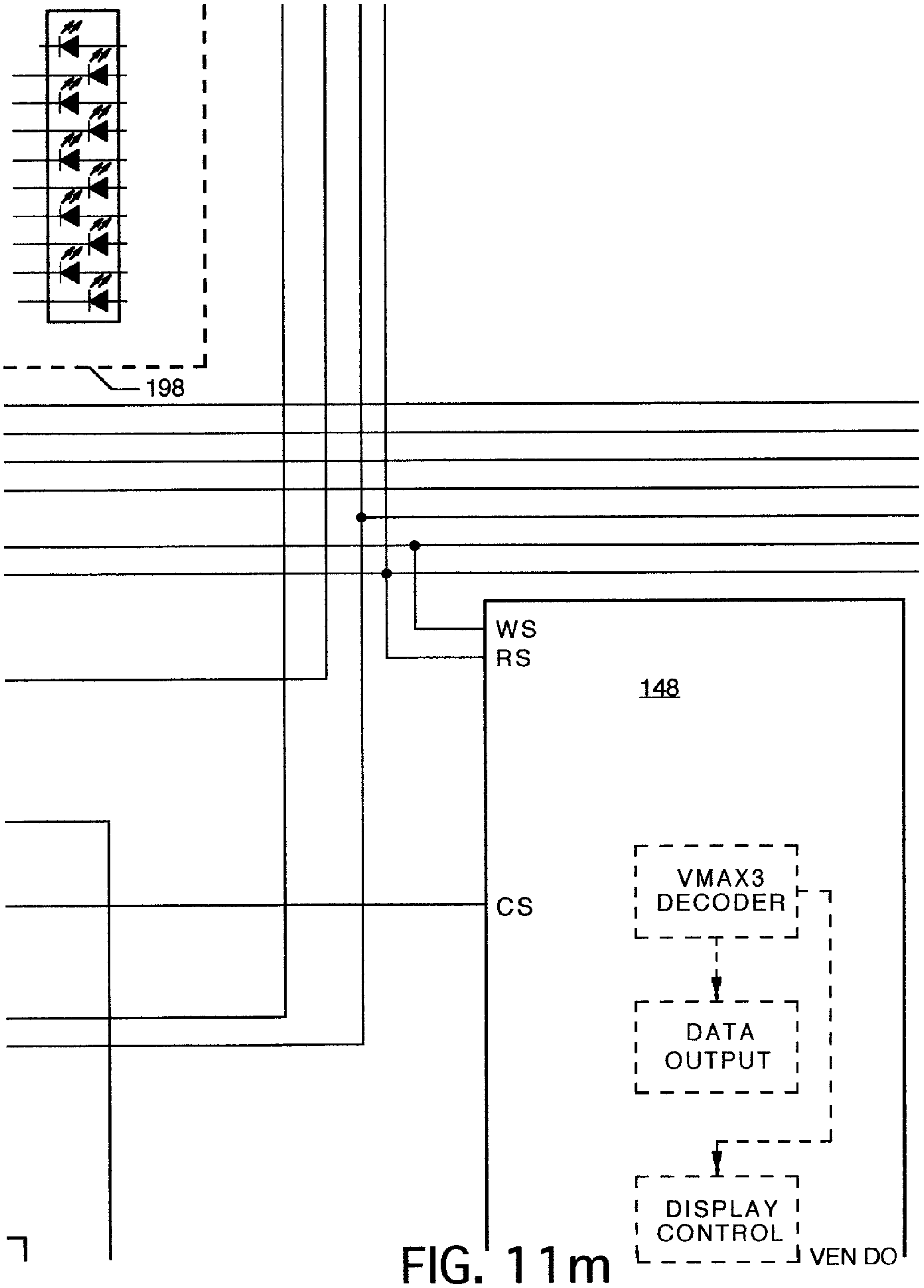
Figure 11N:
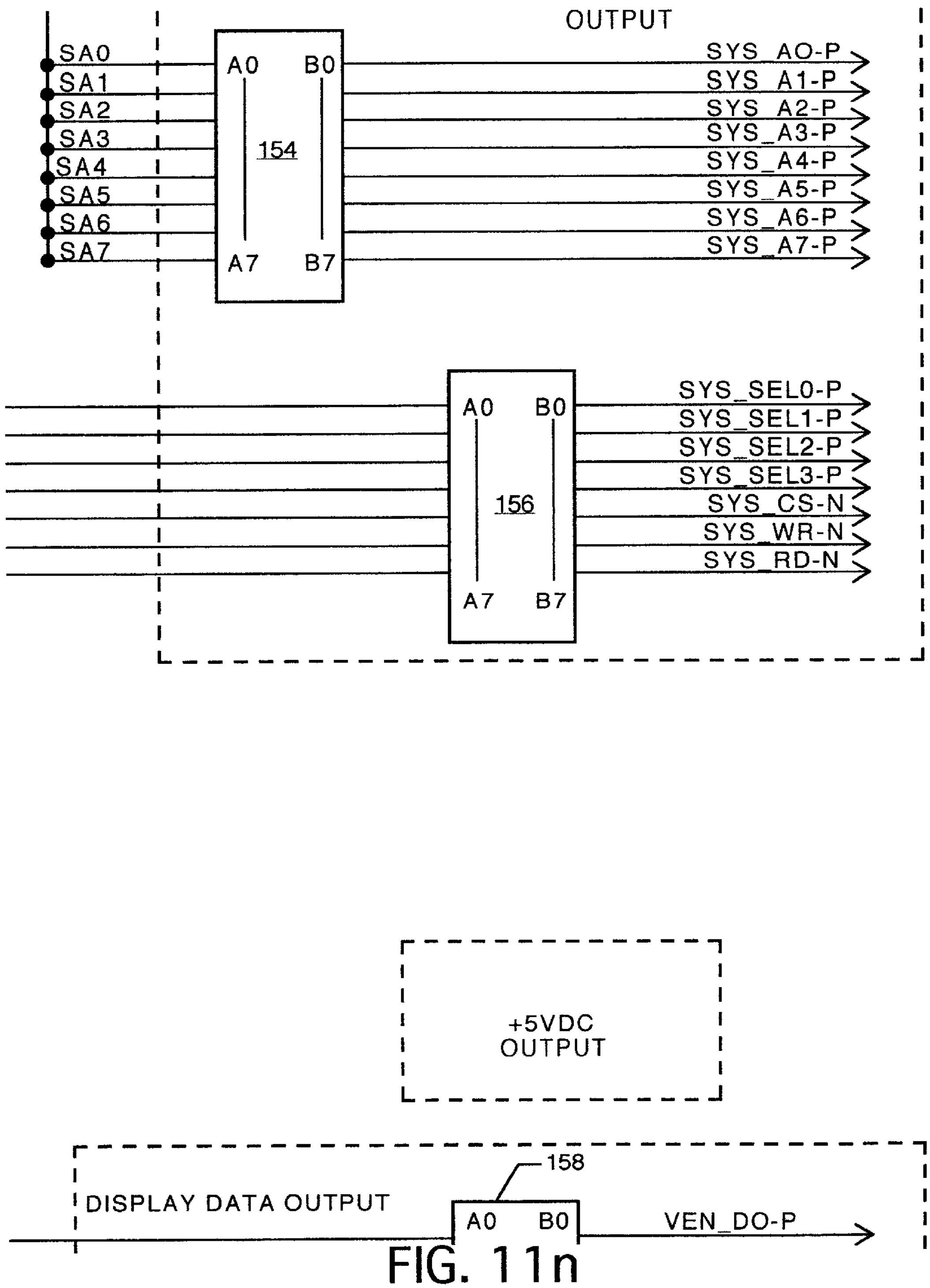
Figure 11O:
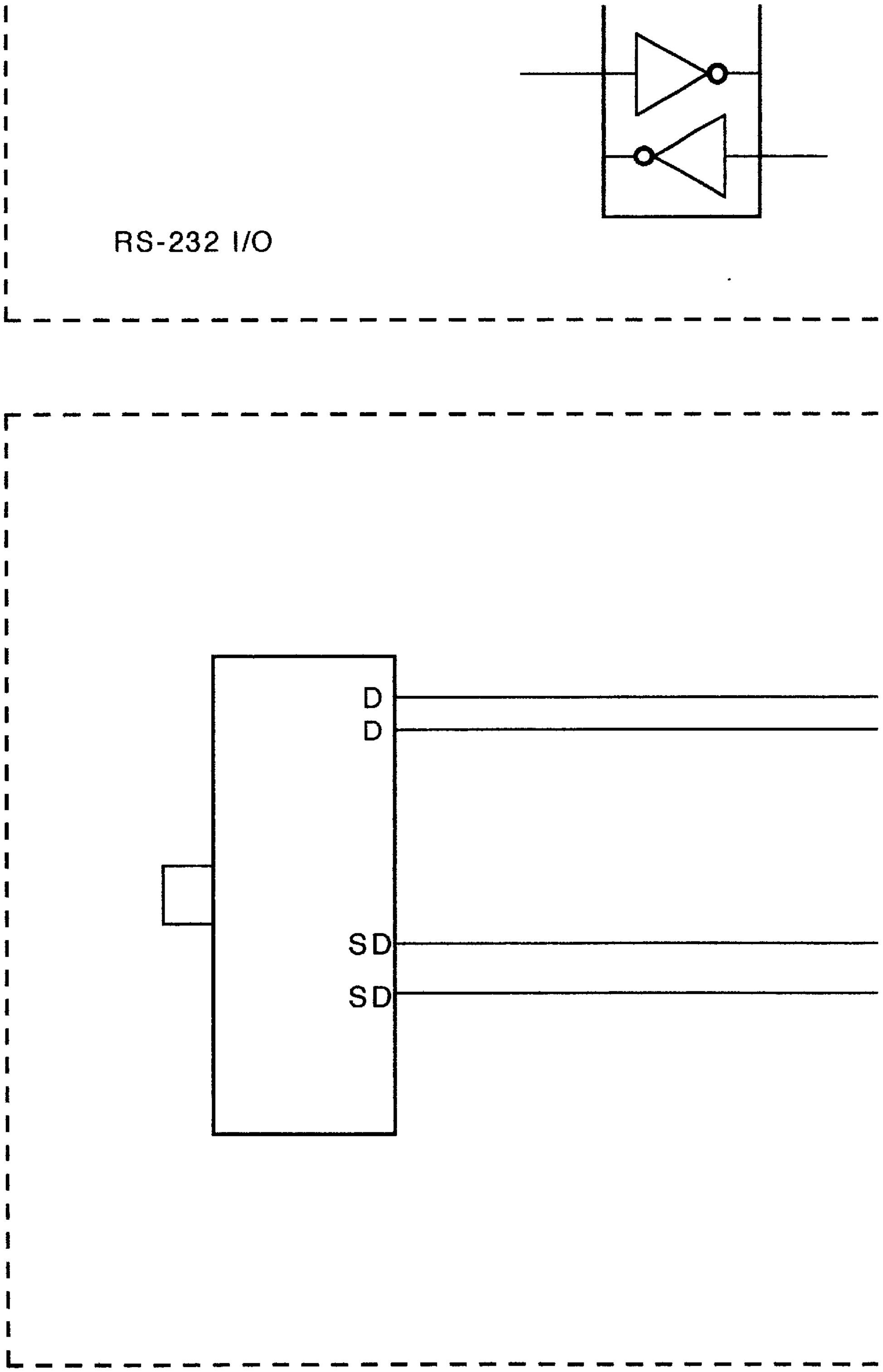
Figure 11P:
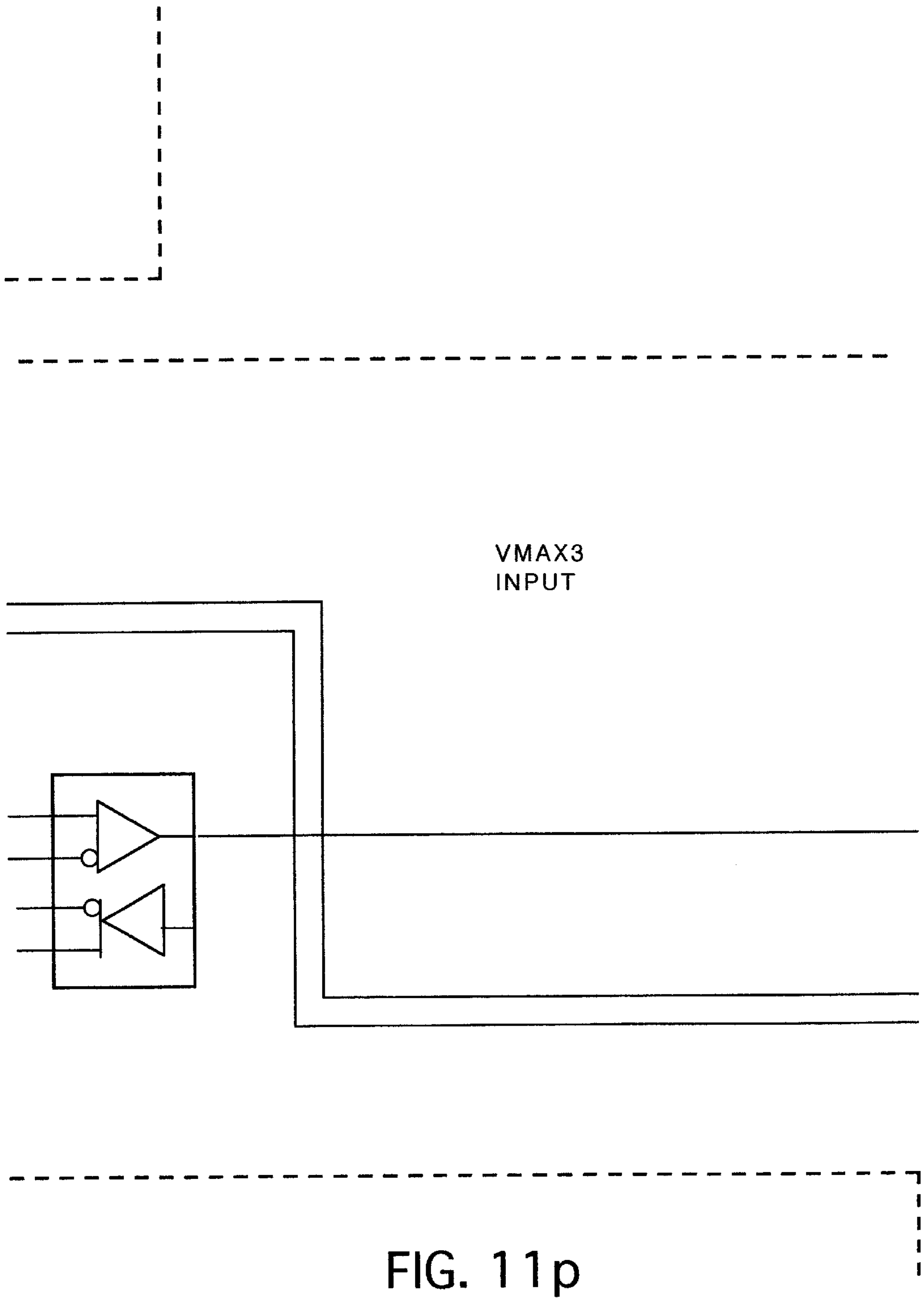
Figure 11Q:
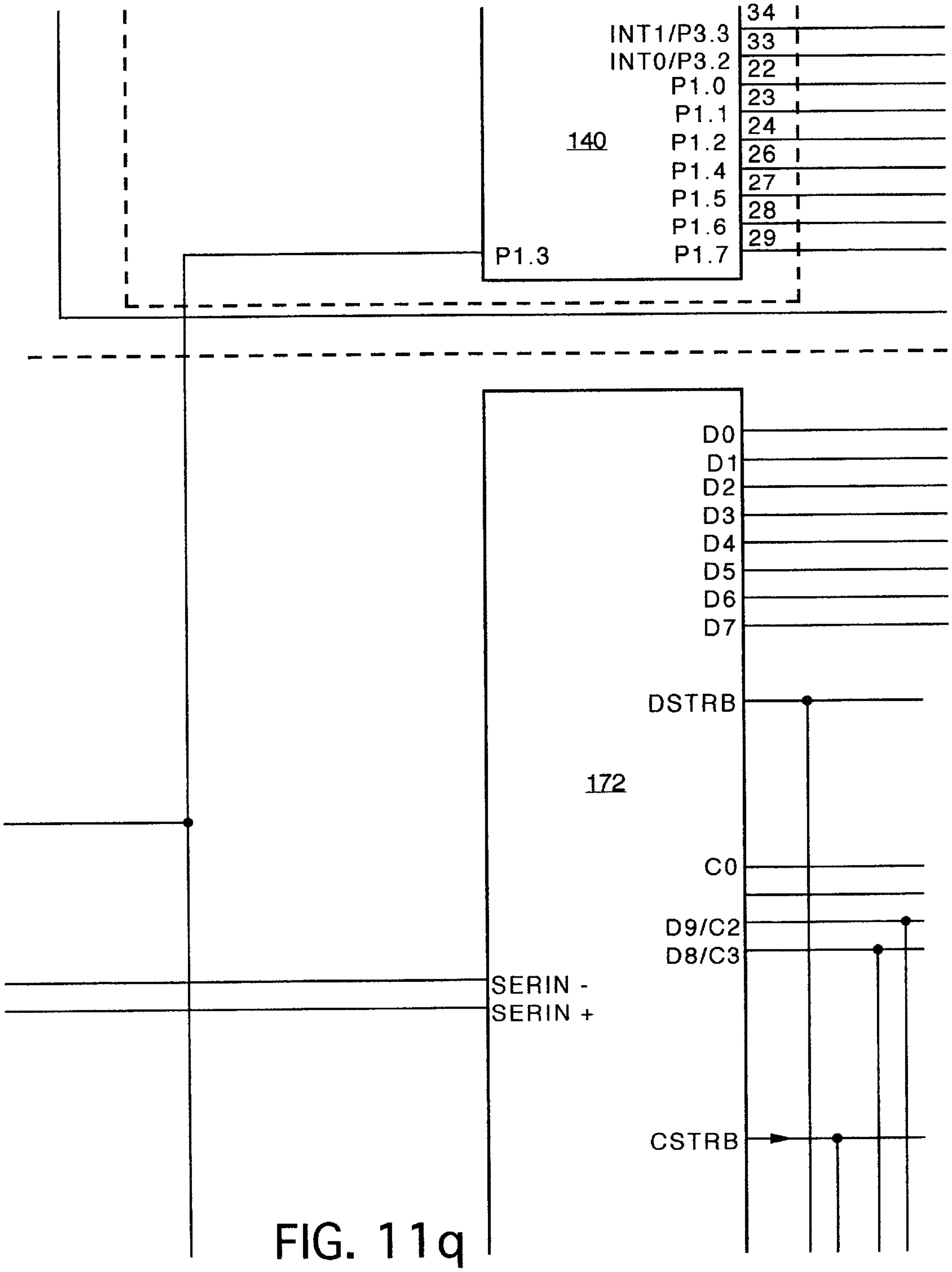
Figure 11R:
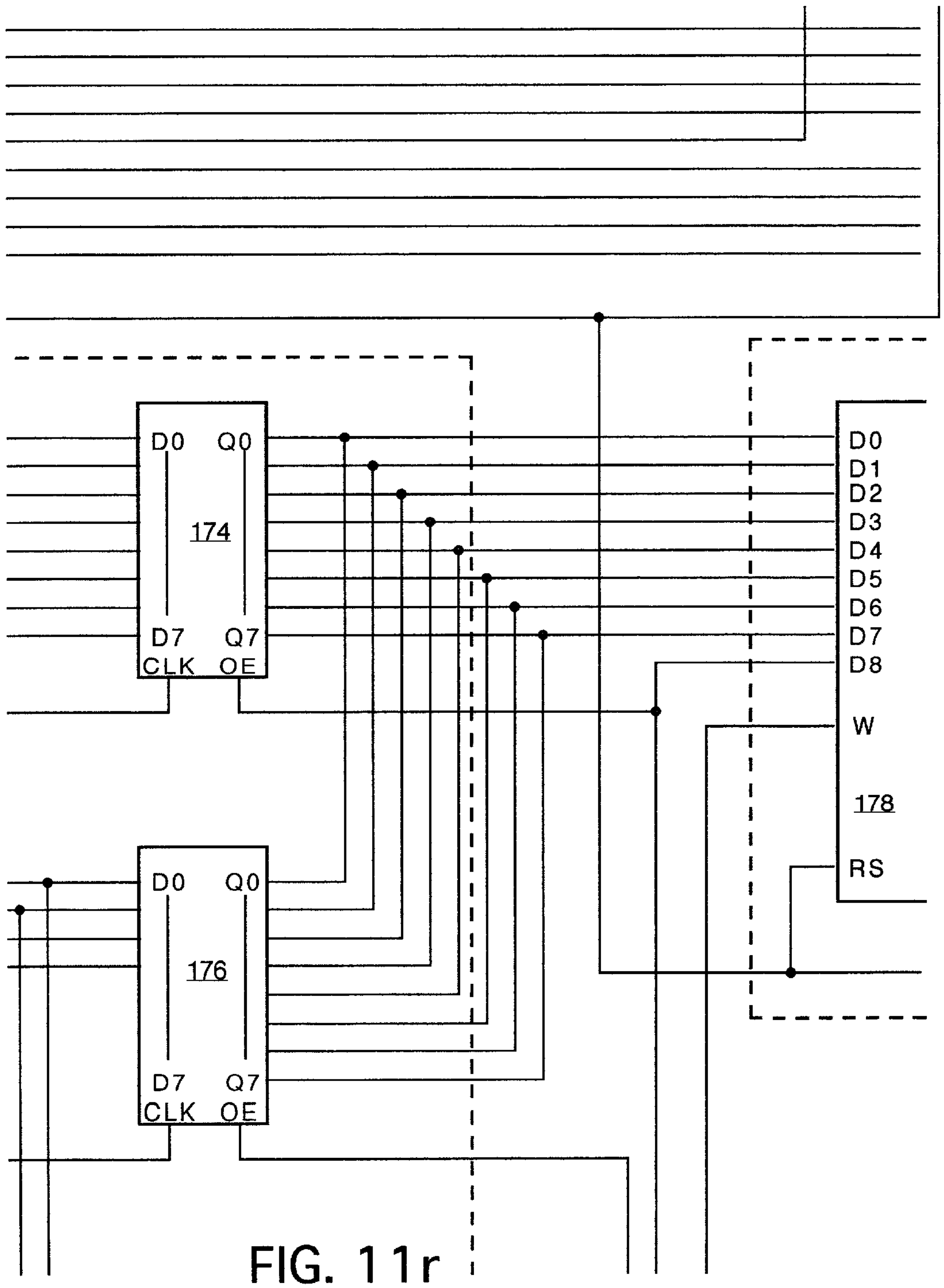
Figure 11S:
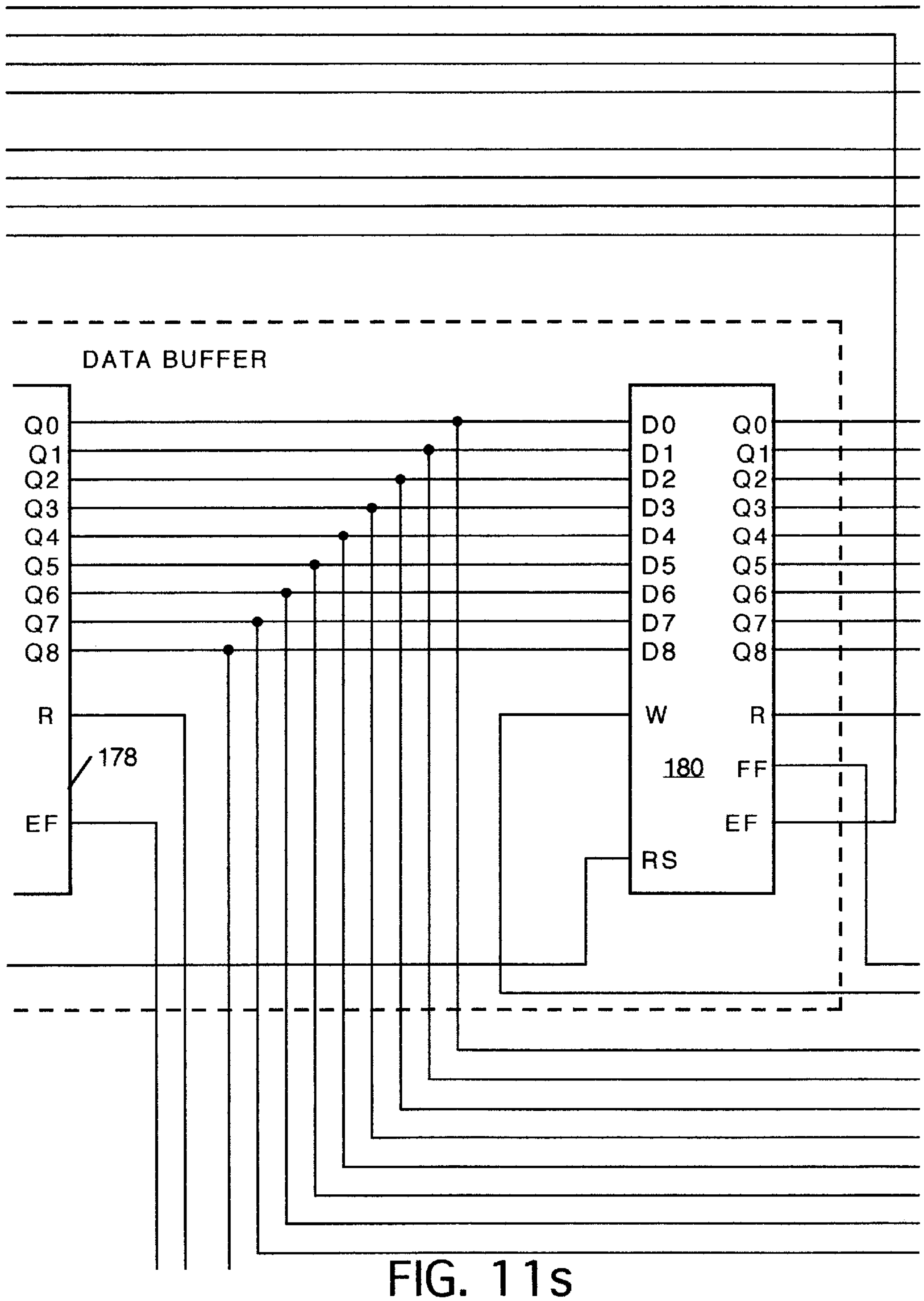
Figure 11T:
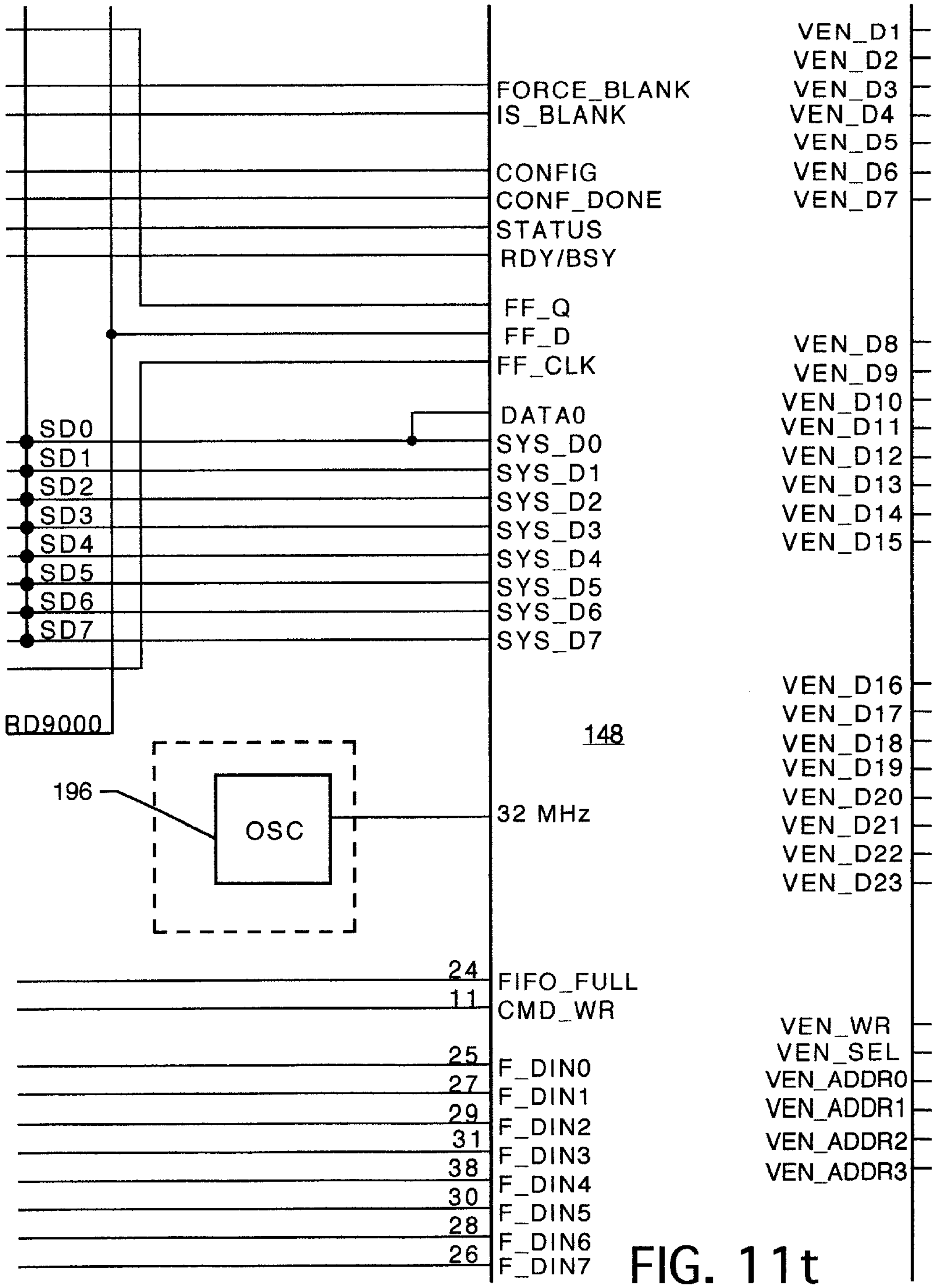
Figure 11U:
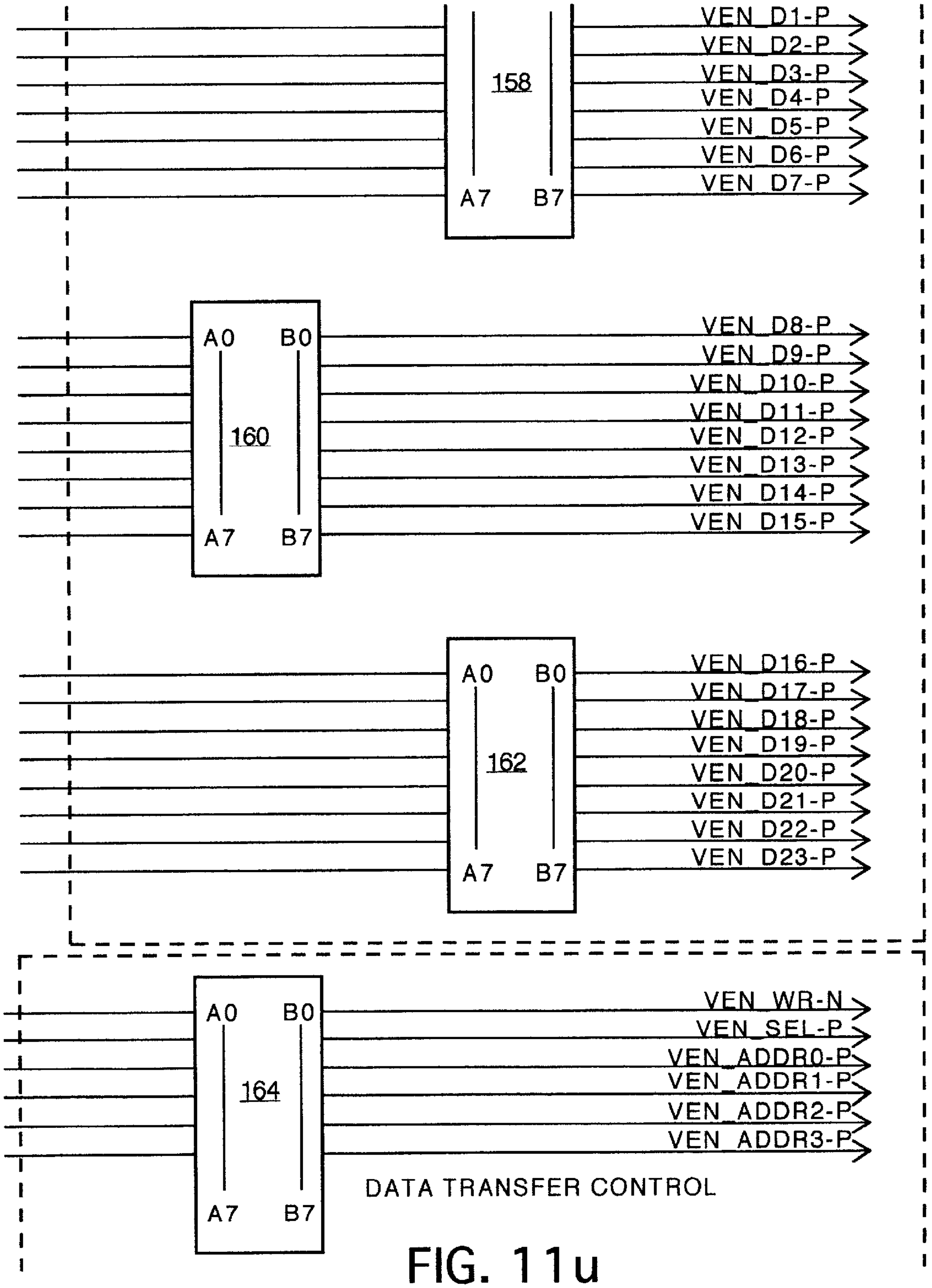
Figure 11V:
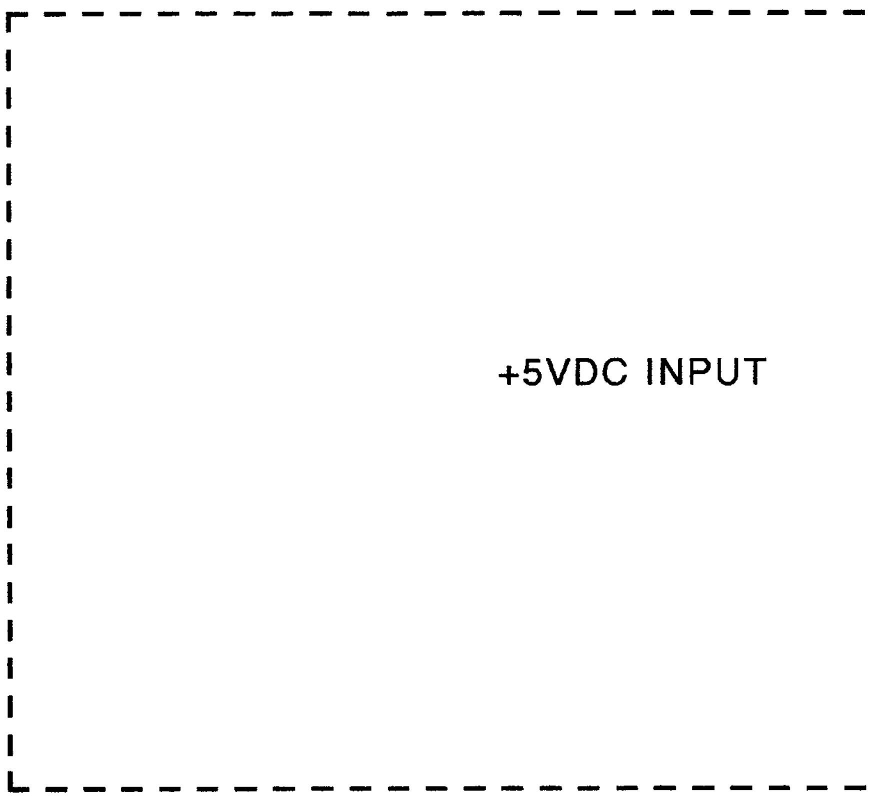
Figure 11W:
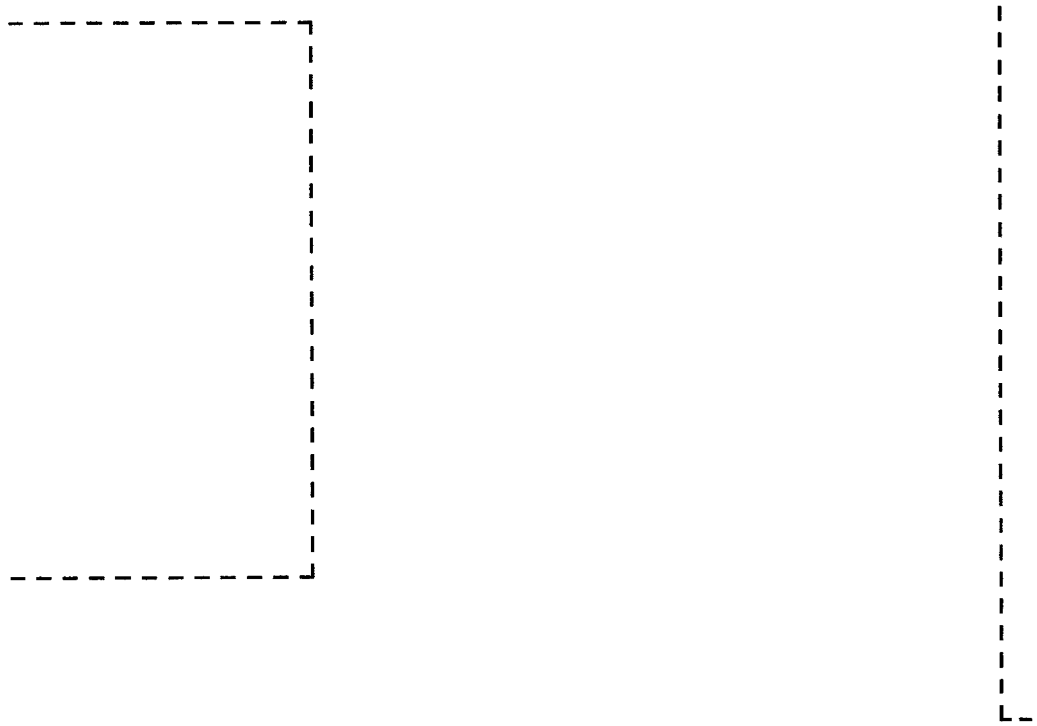
Figure 11X:
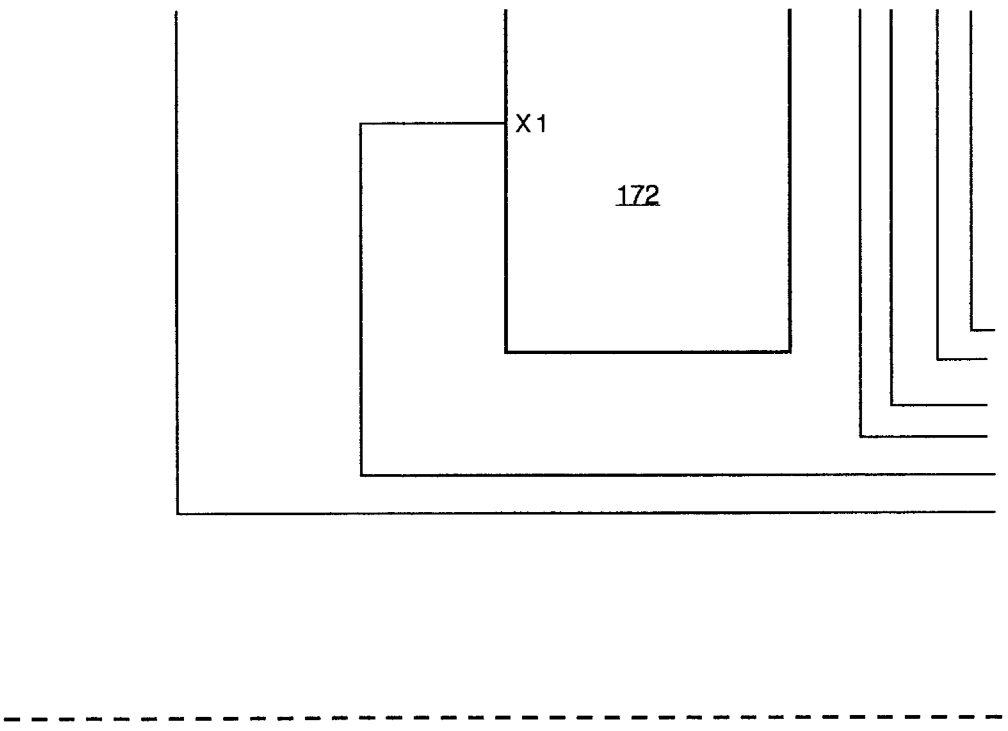
Figure 11Y:
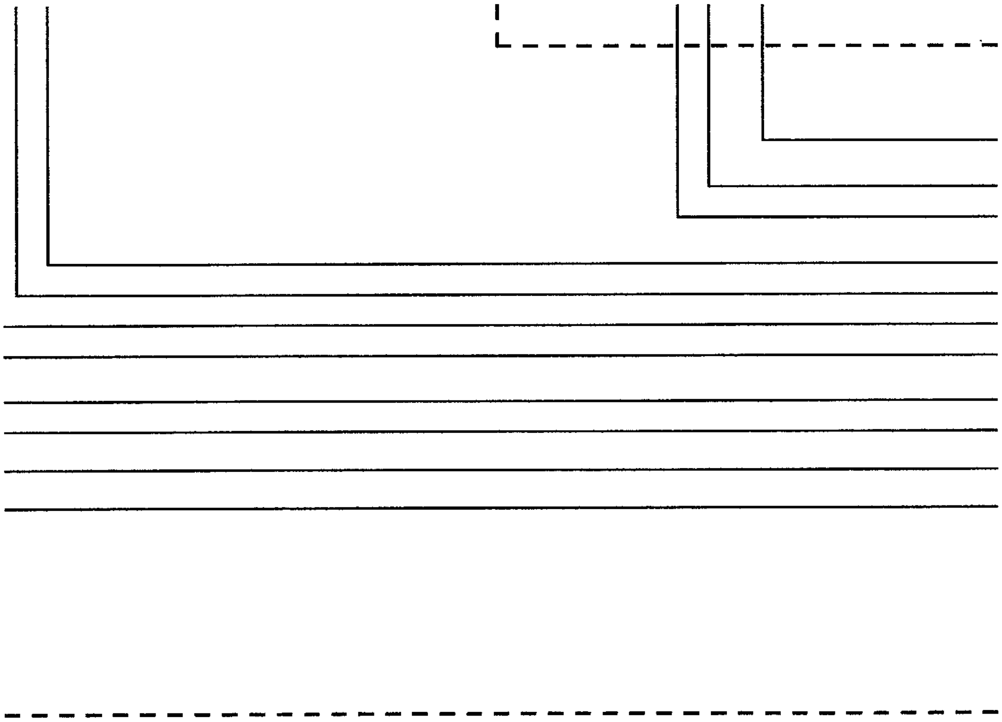
Figure 11Z:
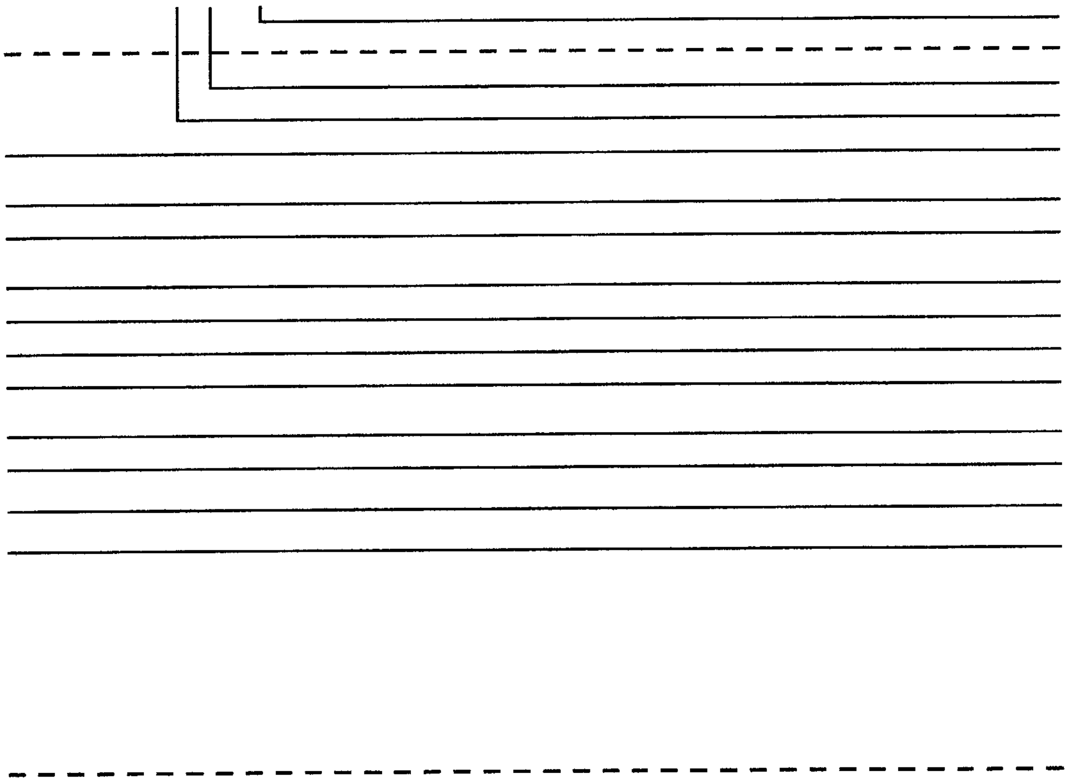
Figure 11A:
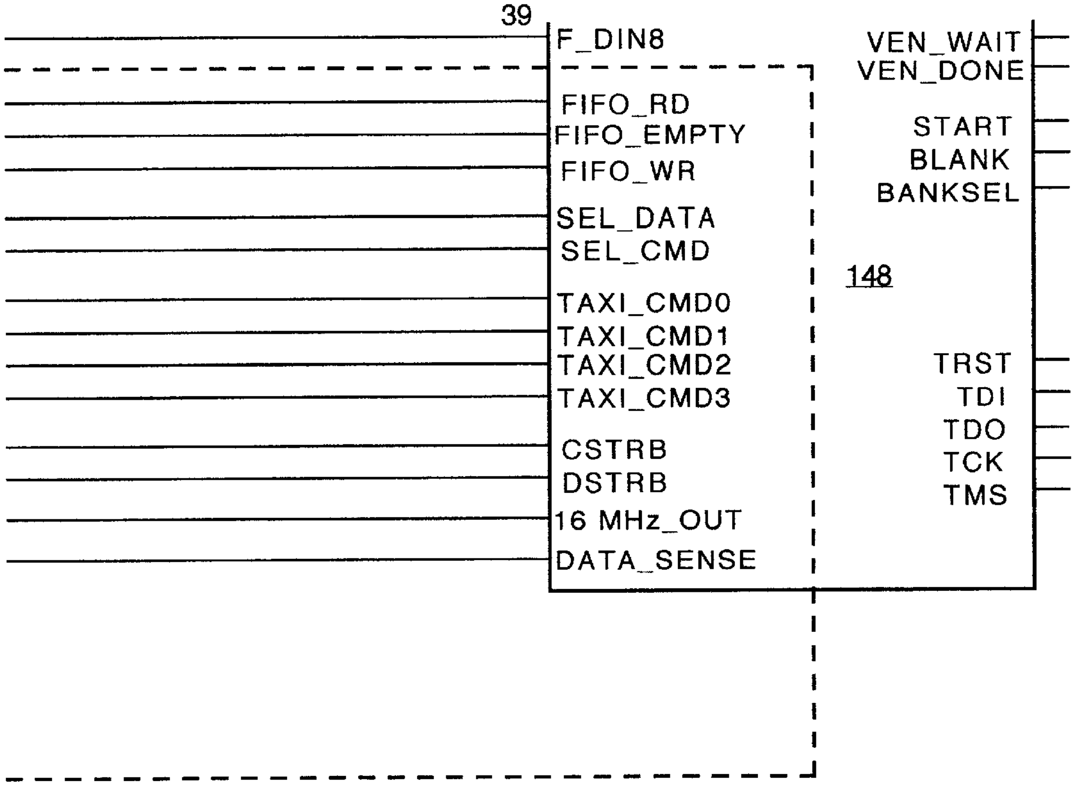
Figure 11A:
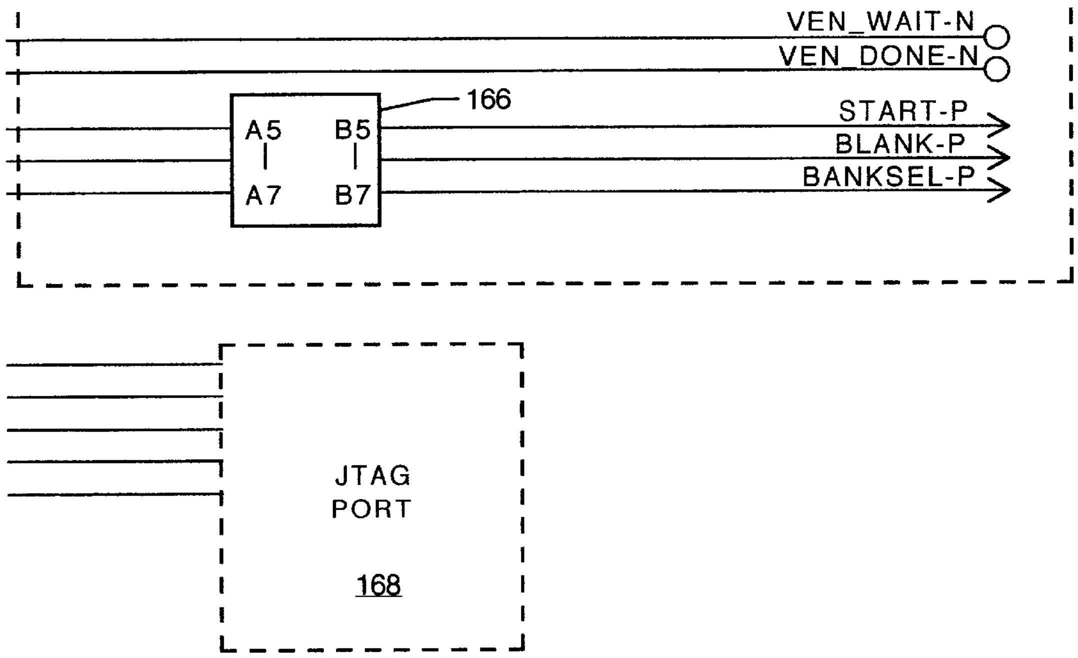

FIG. 10 is a layout of FIGS. 11*a*–11*ab*.

FIGS. 11*a*–11*ab* illustrate a data distribution receiver electrical circuit schematic diagram, comprising a microprocessor used to program (M8 and 200) 140, general purpose data storage SRAM 142, PLD program storage flash 144, processor program storage EPROM 146, programmable logic VMAX3 148, diagnostic command output 150, configuration data outputs (TTL buffer) 152, 154 and 156, display data outputs (TTL buffer) 158, 160 and 162, data transfer controls (TTL buffer) 164 and 166, JTAG port 168, fiber optic in 170, high speed serial-to-parallel conversion serial input/parallel output (TAXI) 172, latches 174 and 176, data buffers (FIFO) 178 and 180, oscillator 182, watchdog 184, fan sense 186, light sensor input 188, latches 190, 192 and 194, and status indicators 198.

Figure 13A:
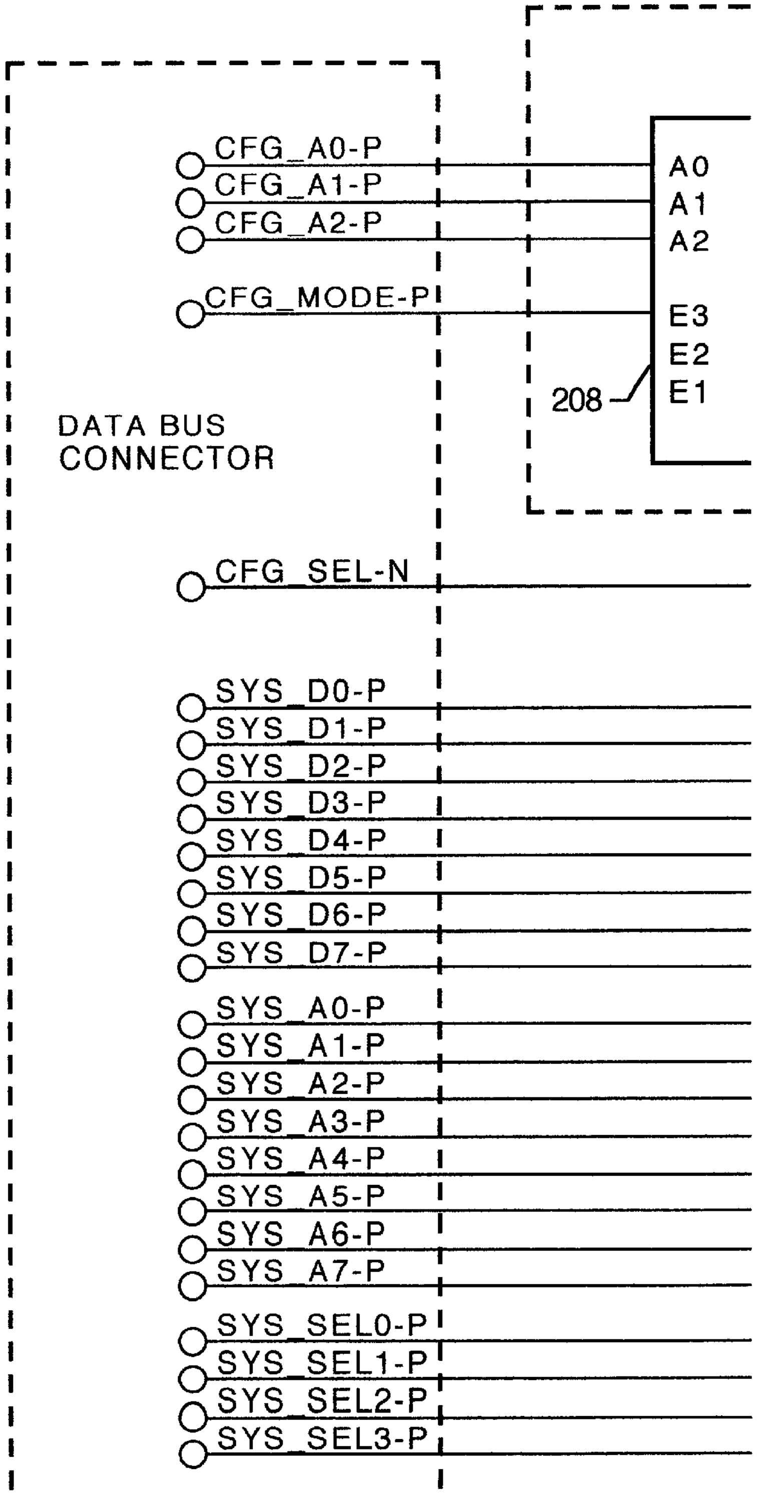
FIGS. 13*a*–13*o* illustrate a data distributor output electrical circuit schematic diagram.
Figure 13B:
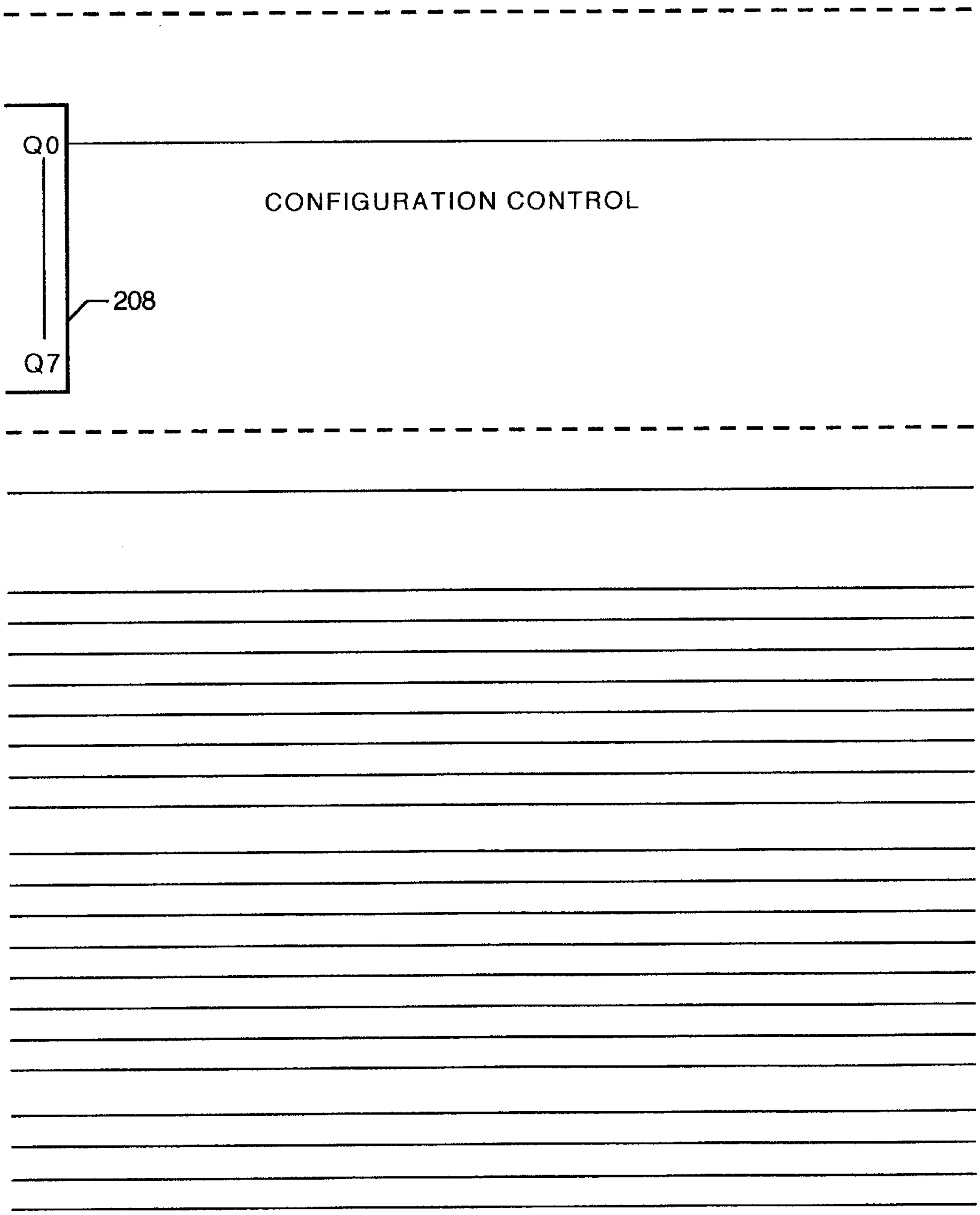
Figure 13C:
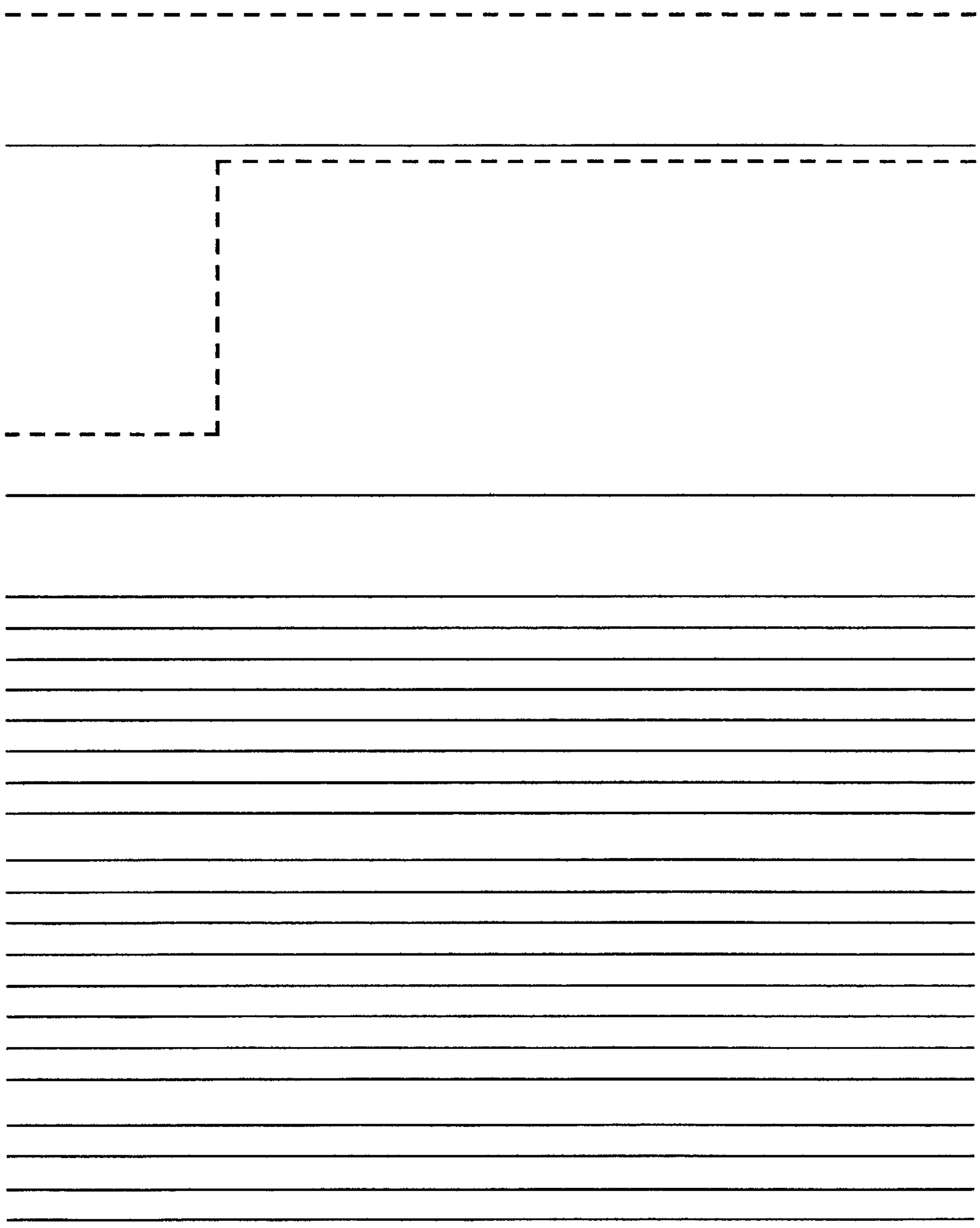
Figure 13D:
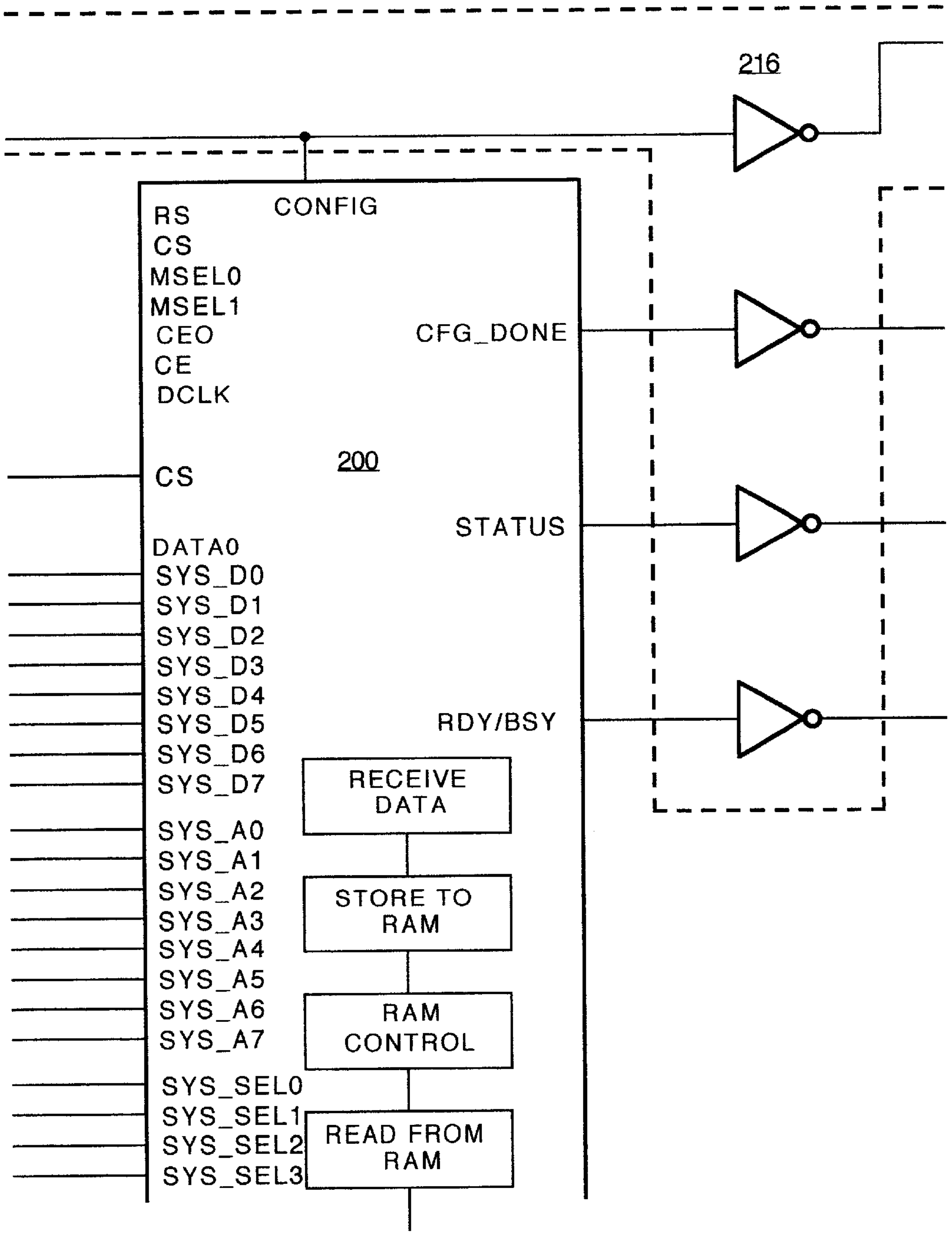
Figure 13E:
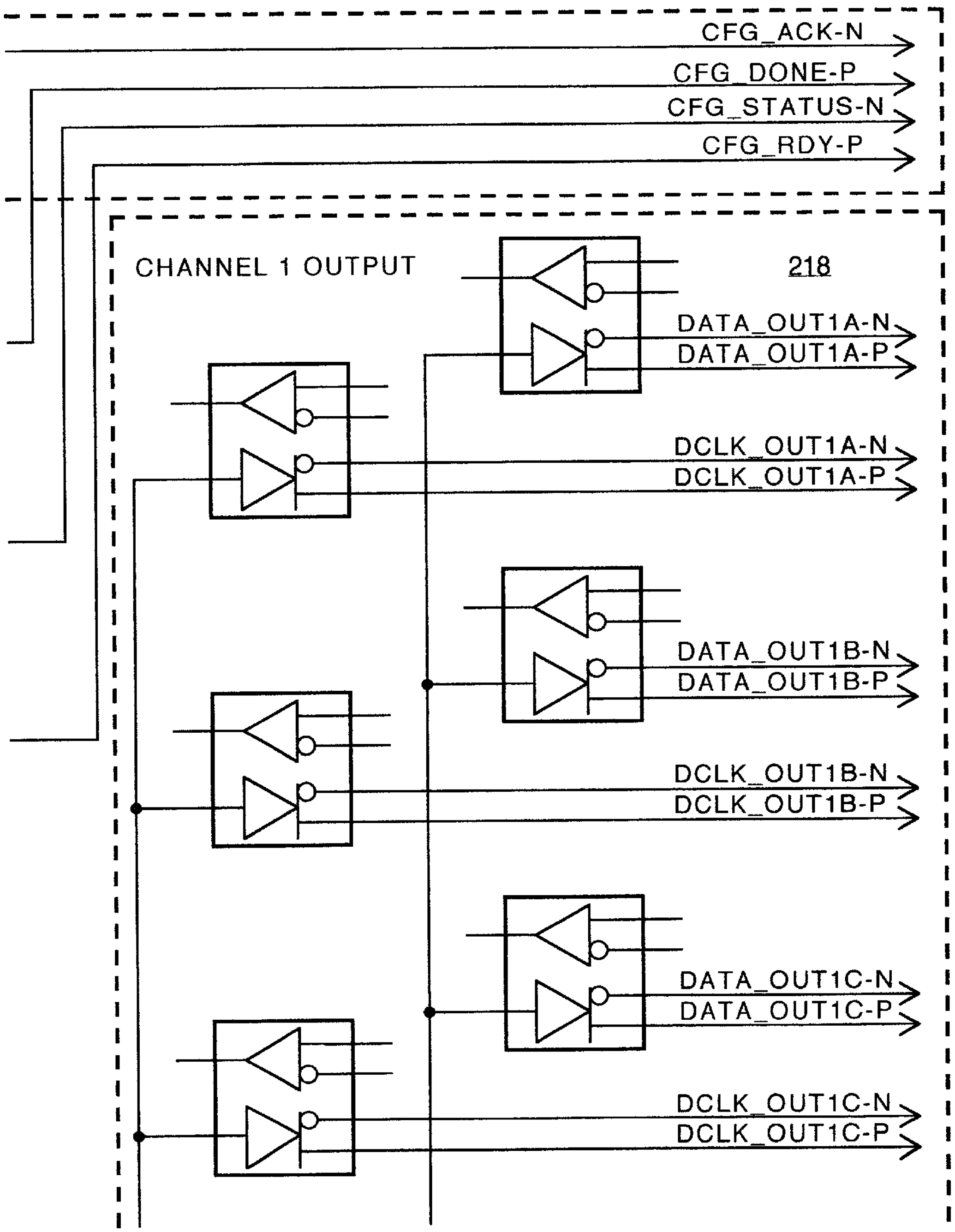
Figure 13F:
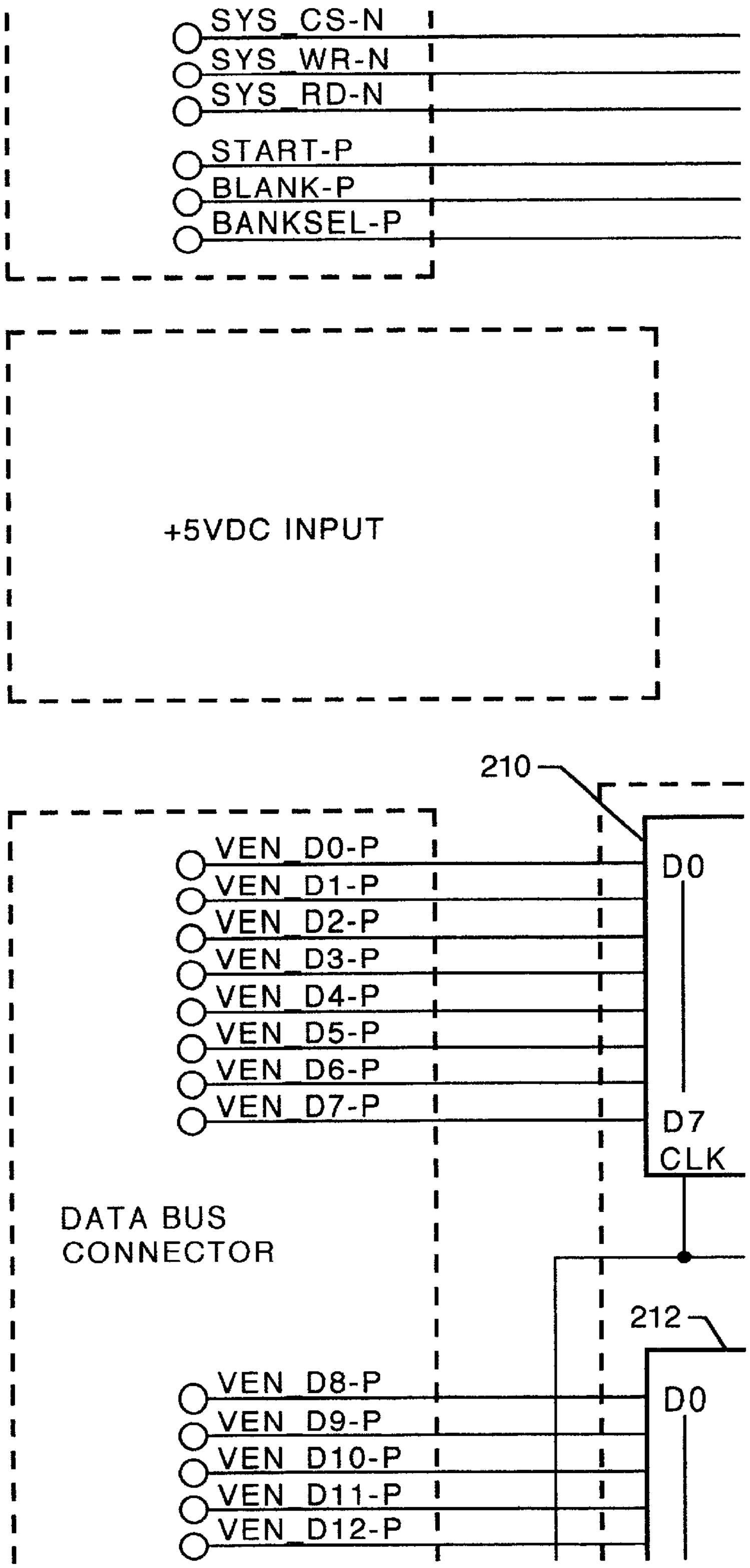
Figure 13G:
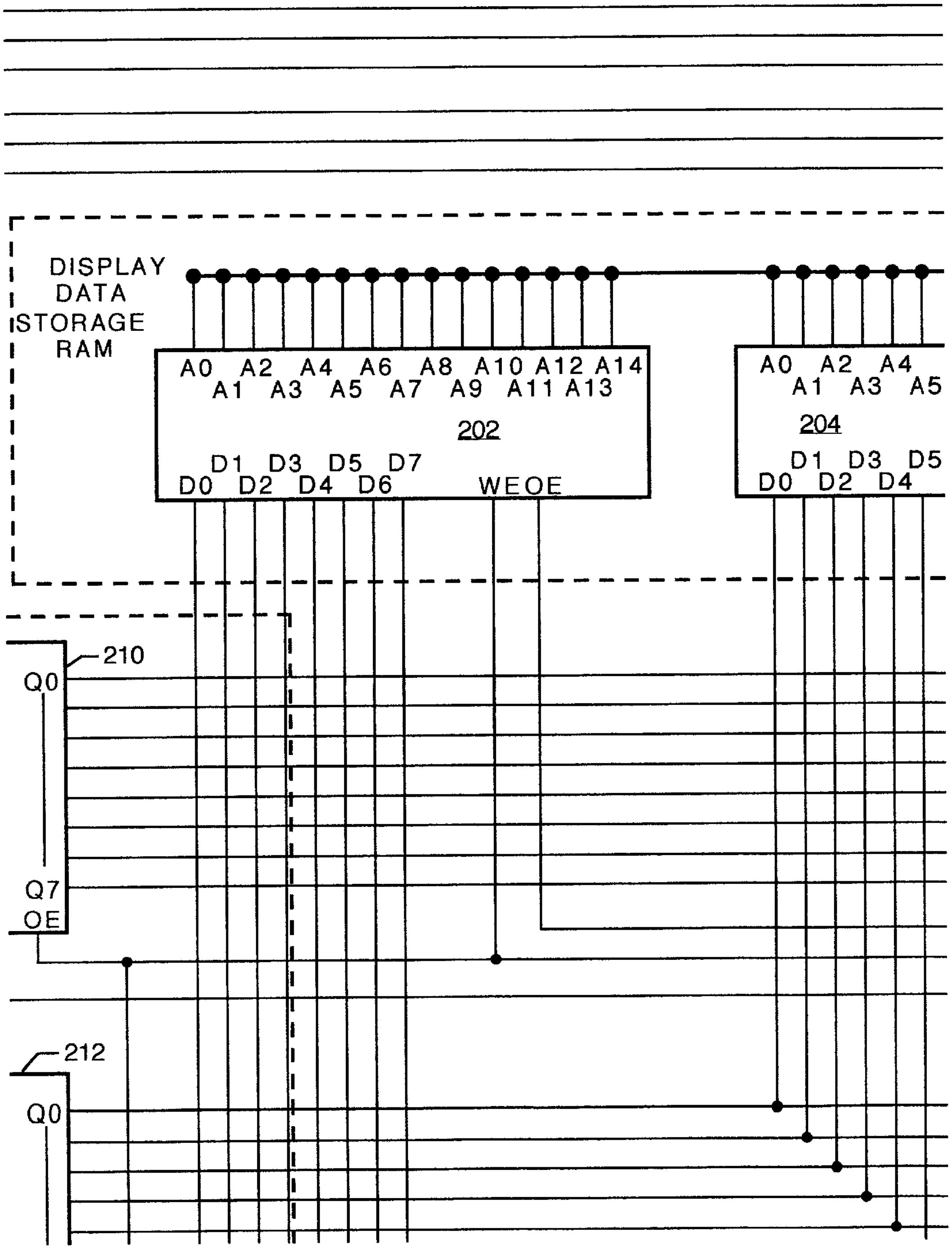
Figure 13H:
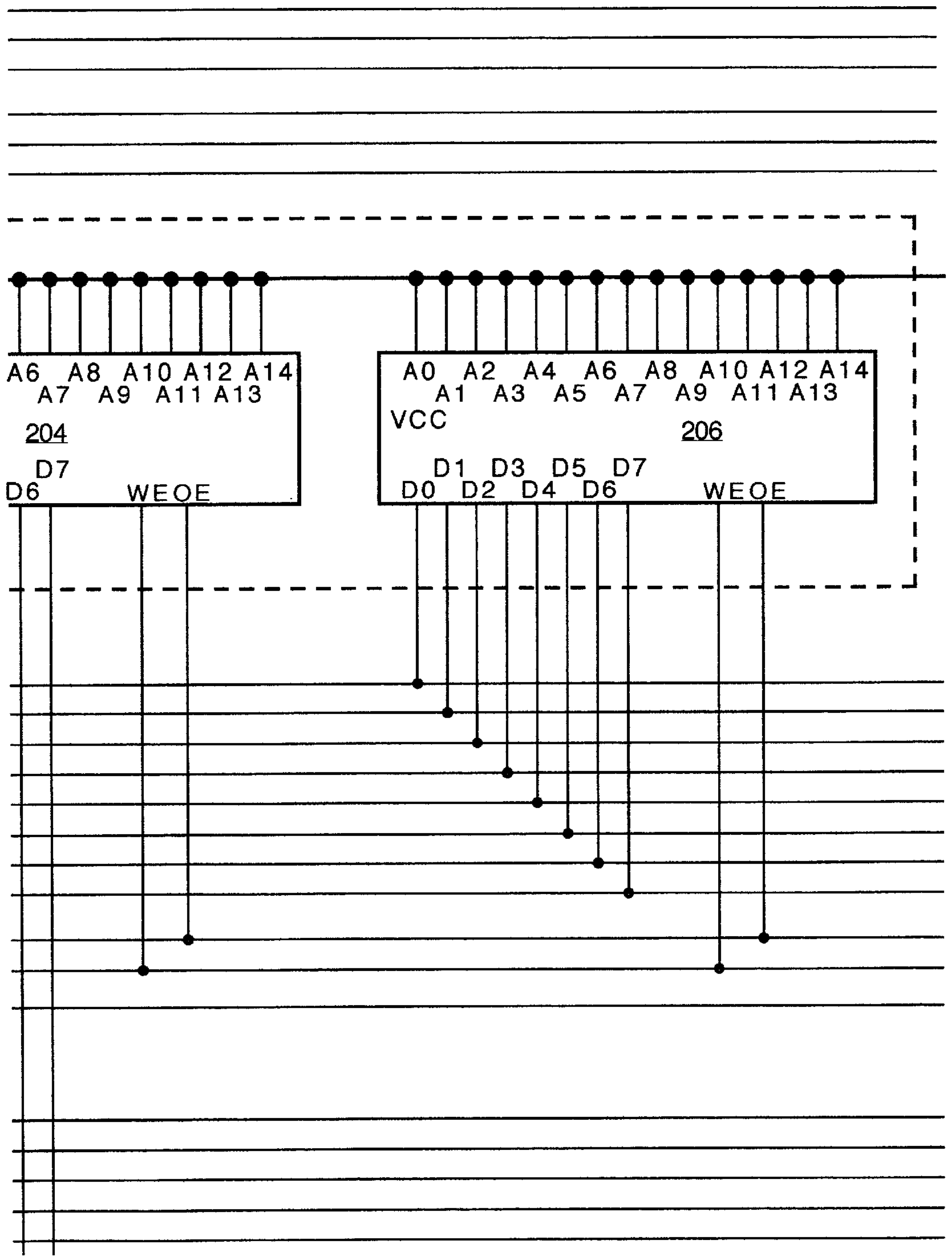
Figure 13I:
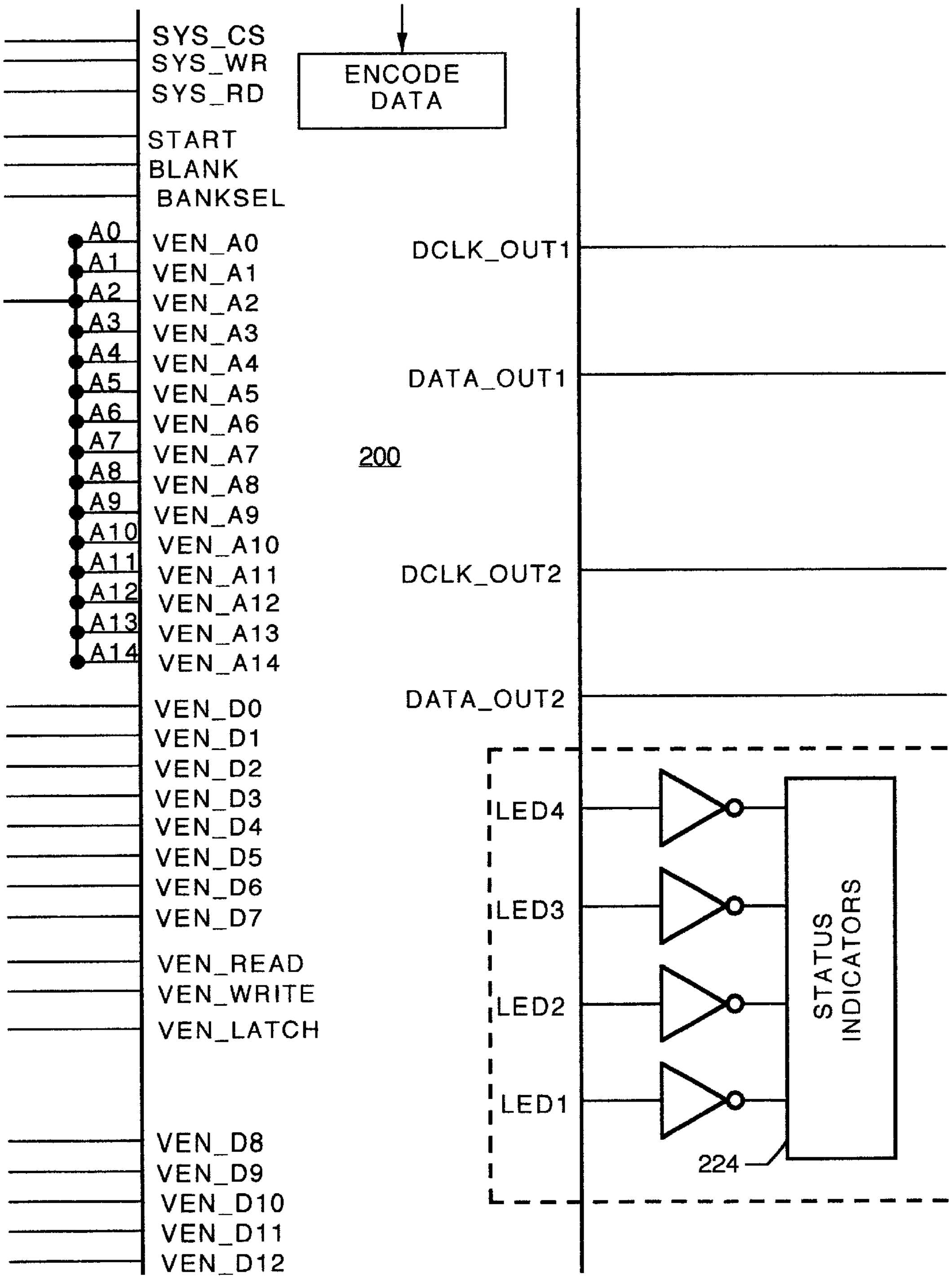
Figure 13J:
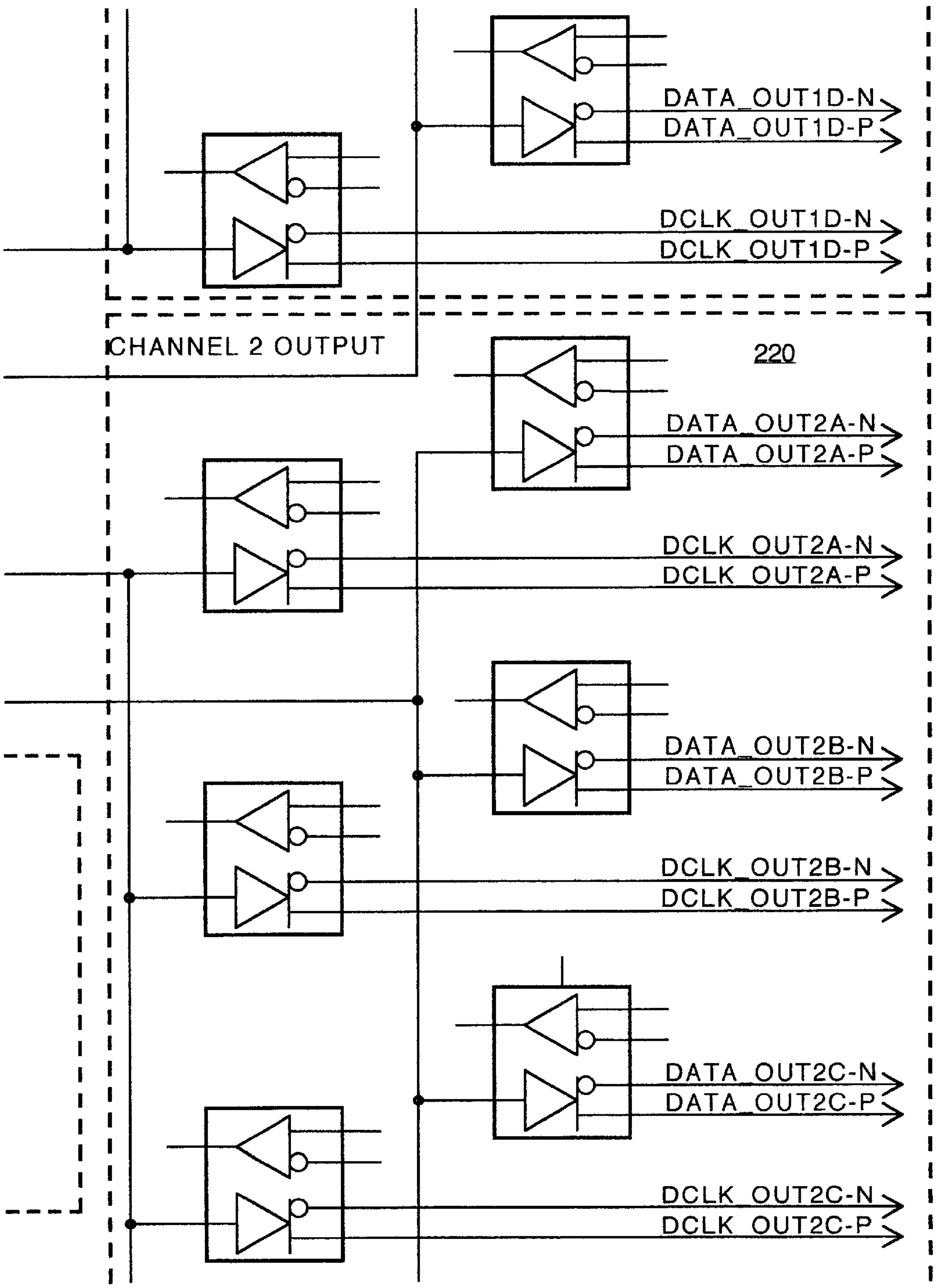
Figure 13K:
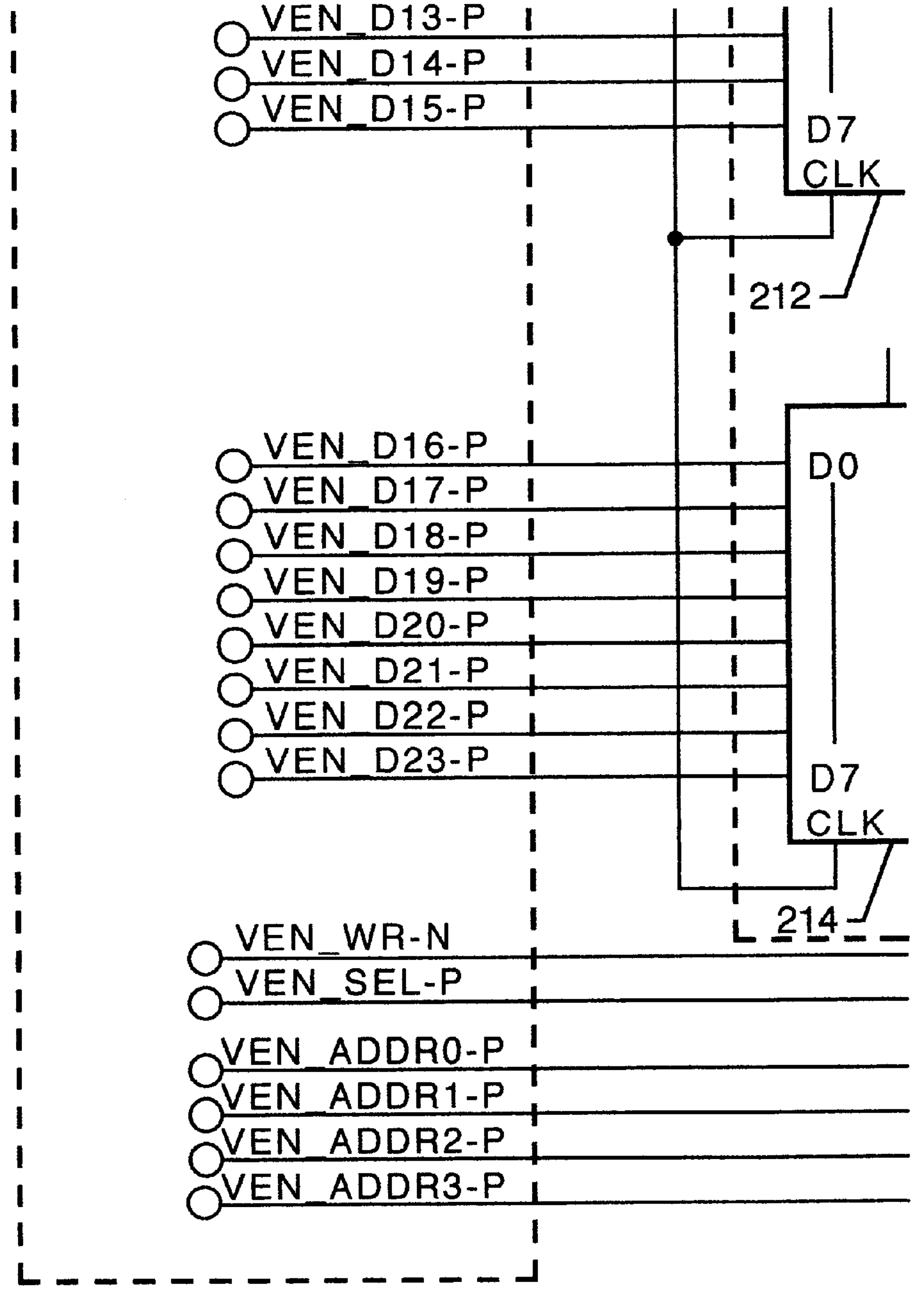
Figure 13L:
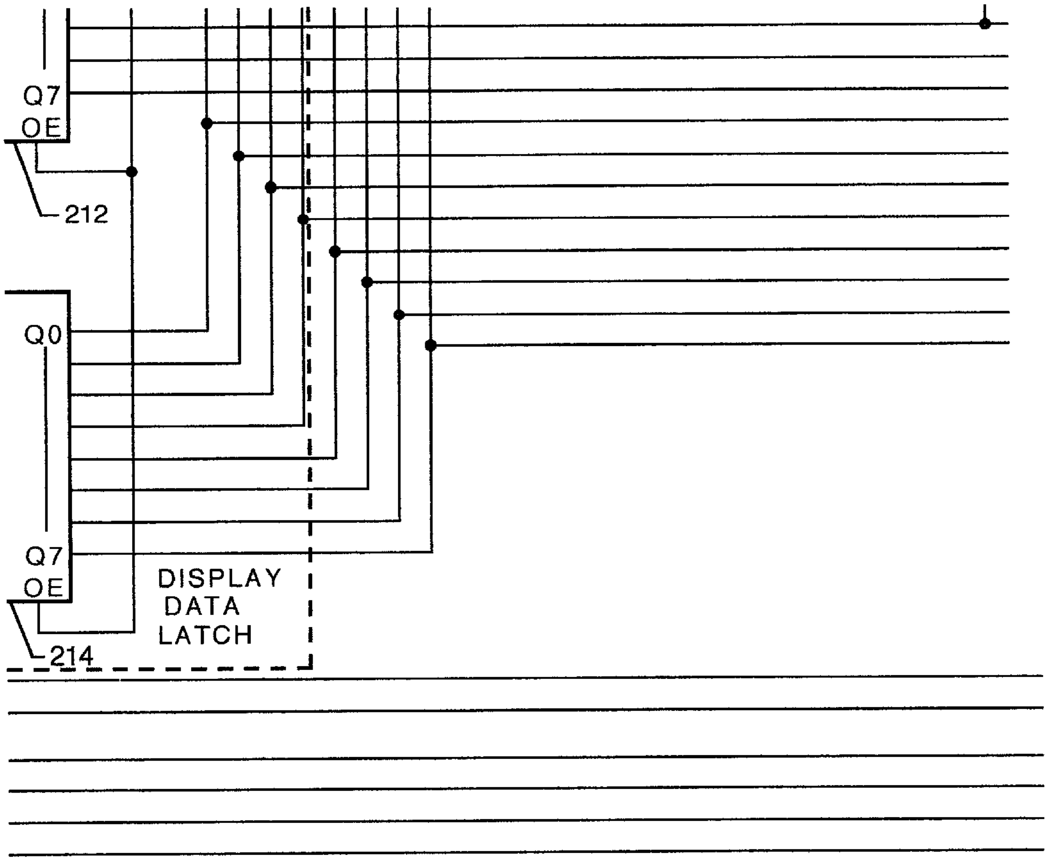
Figure 13M:
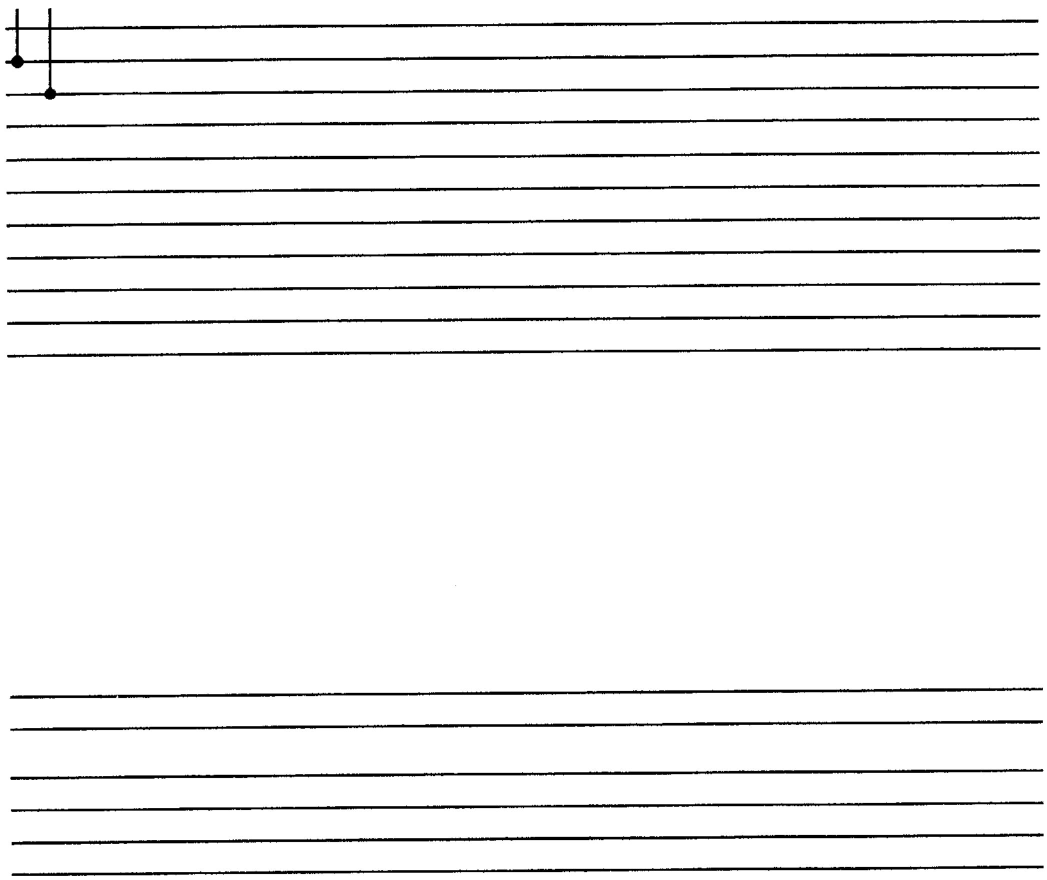
Figure 13N:
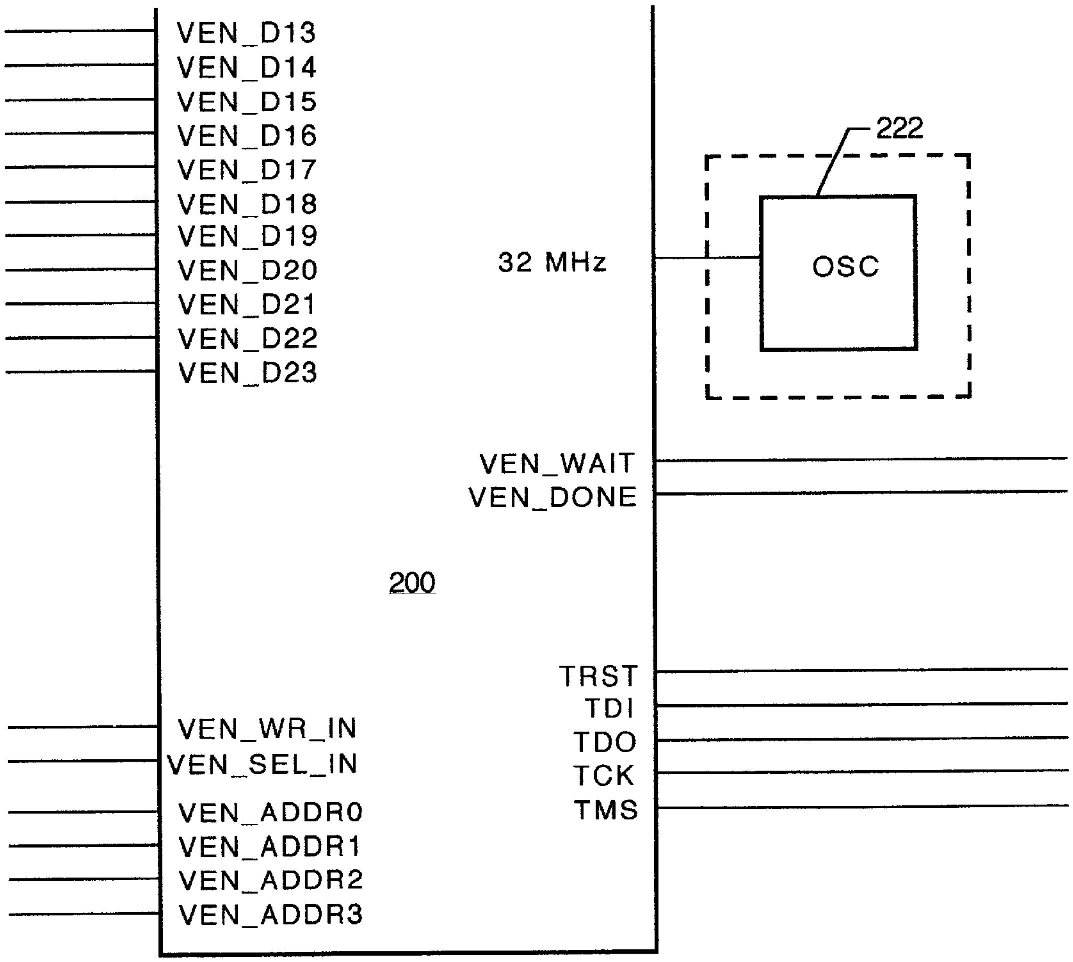
Figure 13O:
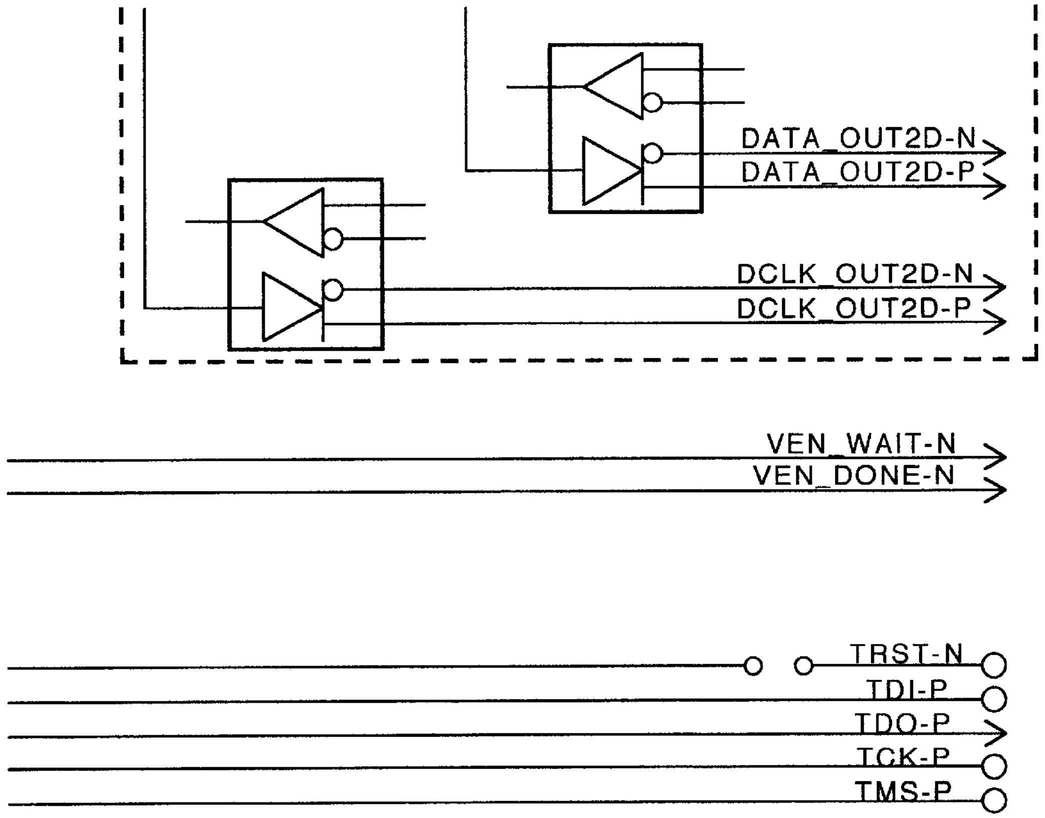

FIG. 12 is a layout of FIGS. 13*a*–13*o*.

FIGS. 13*a*–13*o* illustrate a data distributor electrical circuit schematic diagram which can be multiple circuits depending on the size of the sign and generating RS422 outputs, comprising a programmable logic device to generate encoded clock signals (receives program from 140) 200, display data storage (SRAM) 202, 204 and 206, configuration control 208, display data latches 210, 212 and 214, inverters 216, channel 1 output 218, channel 2 output 220, oscillator 222, and status indicators 224.

Figure 14:
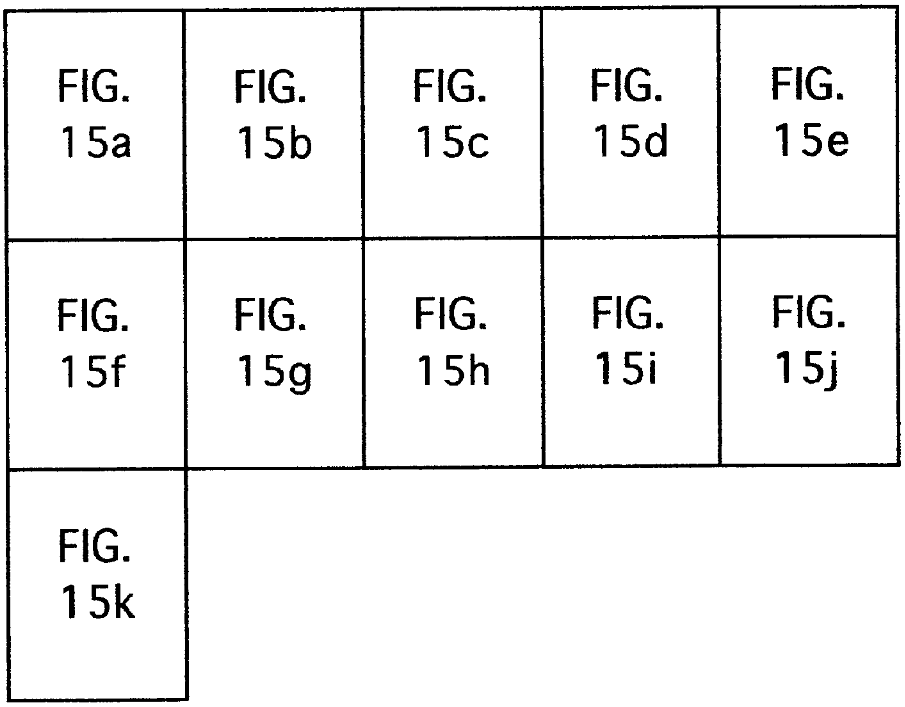
FIG. 14 illustrates a layout for FIGS. 15*a*–15*k* drawings.
Figure 15A:
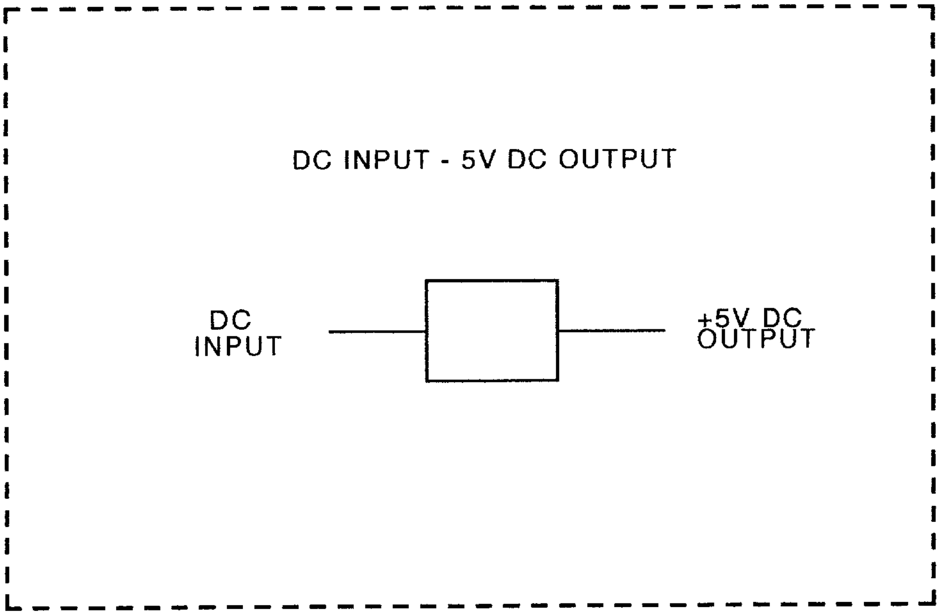
FIGS. 15*a*–15*k* illustrate a dual line controller electrical circuit schematic diagram.
Figure 15A:
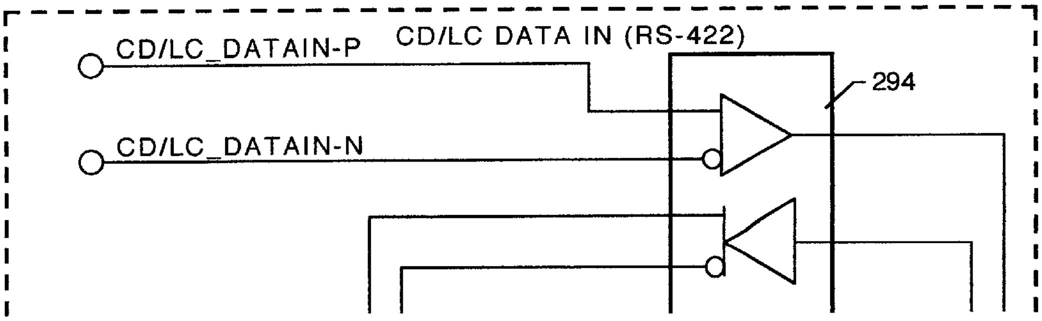
Figure 15B:
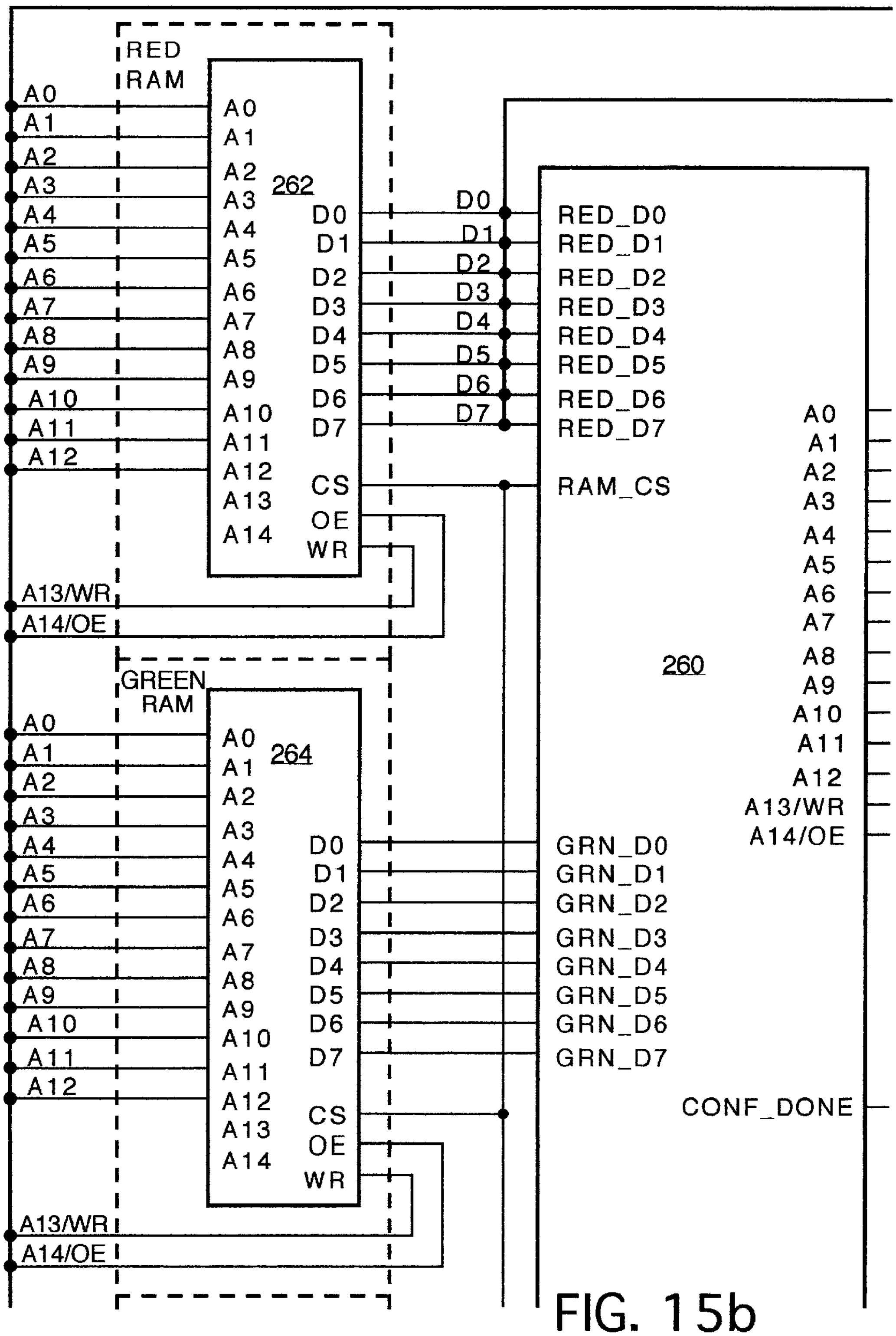
Figure 15C:
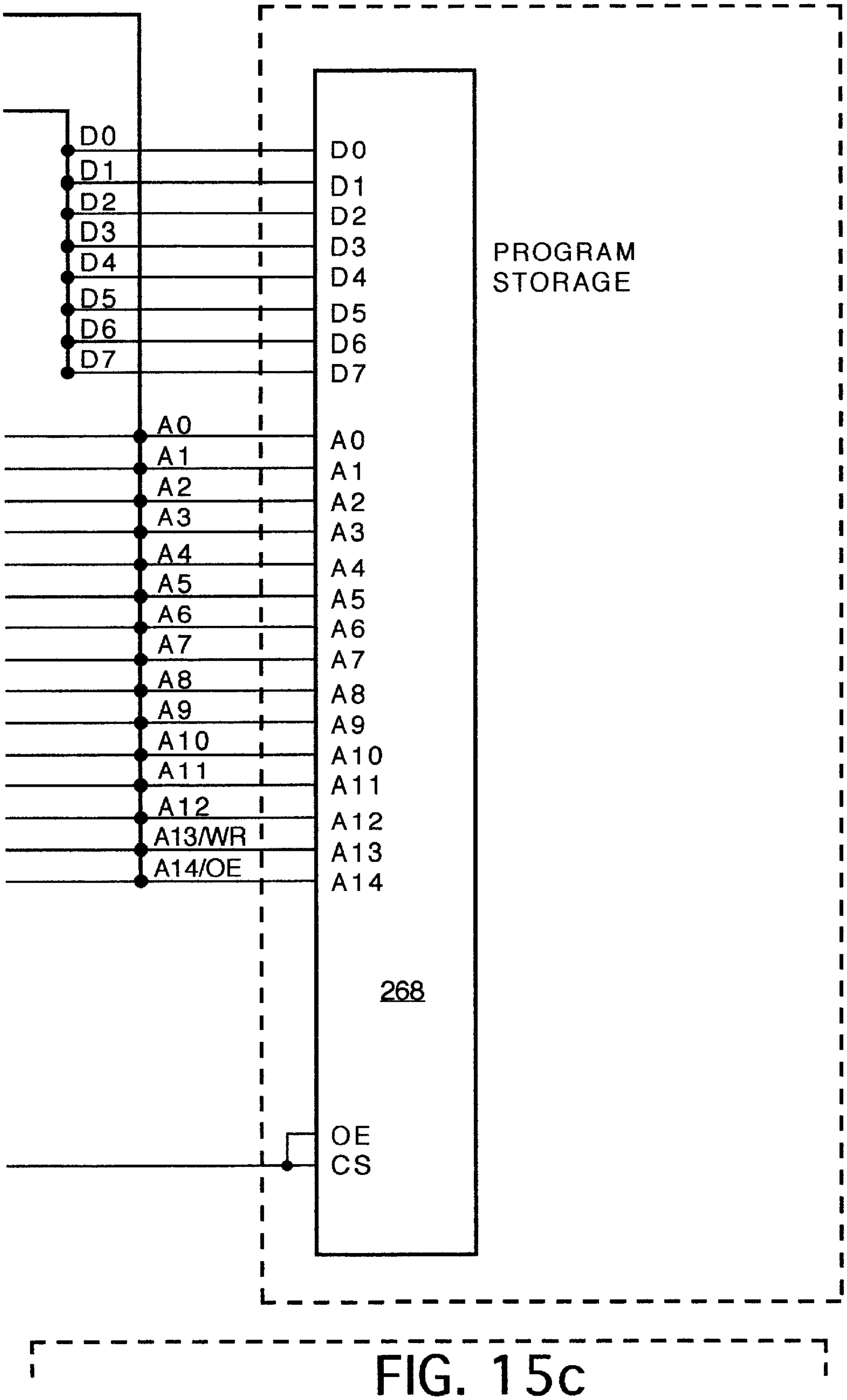
Figure 15D:
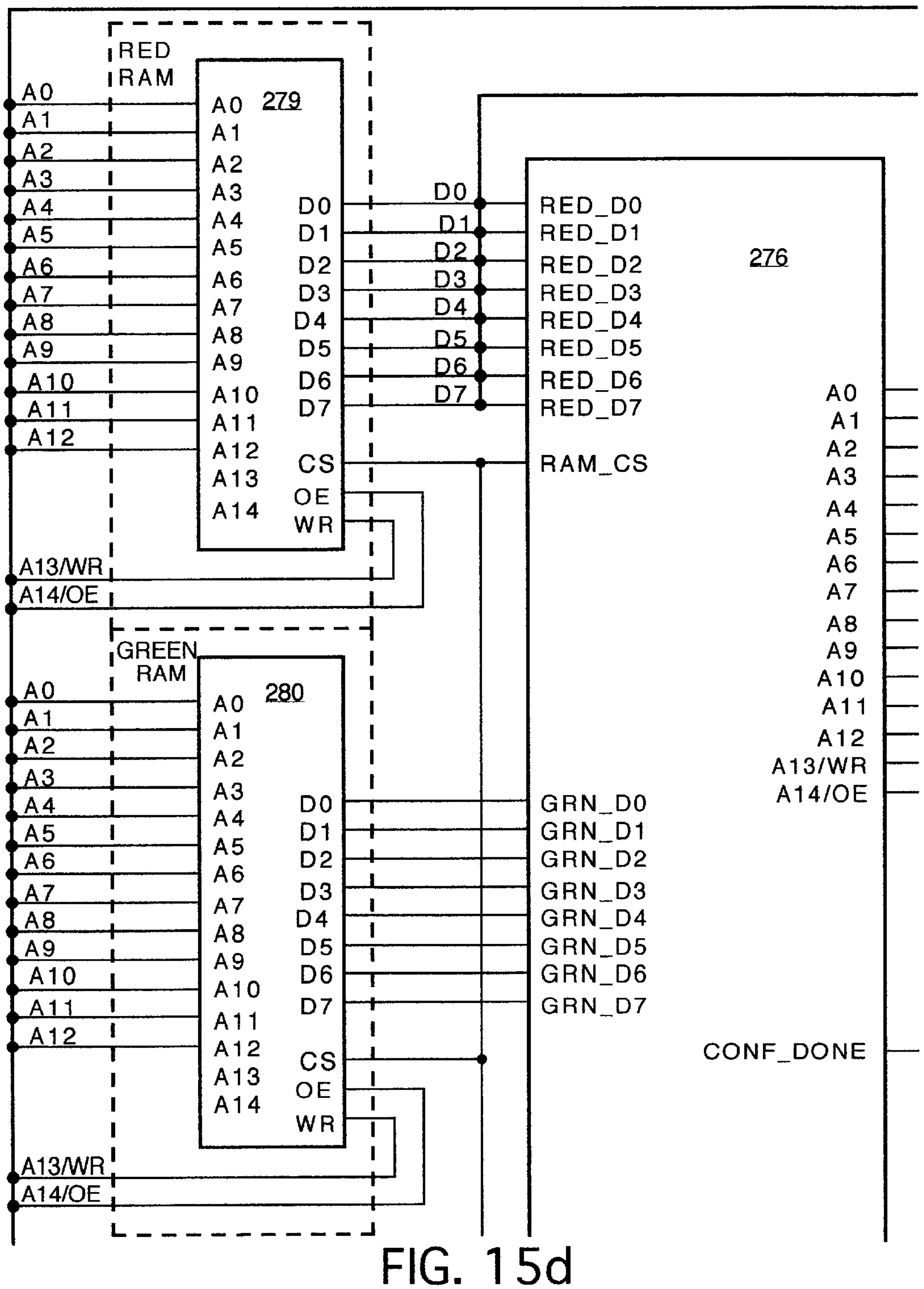
Figure 15E:
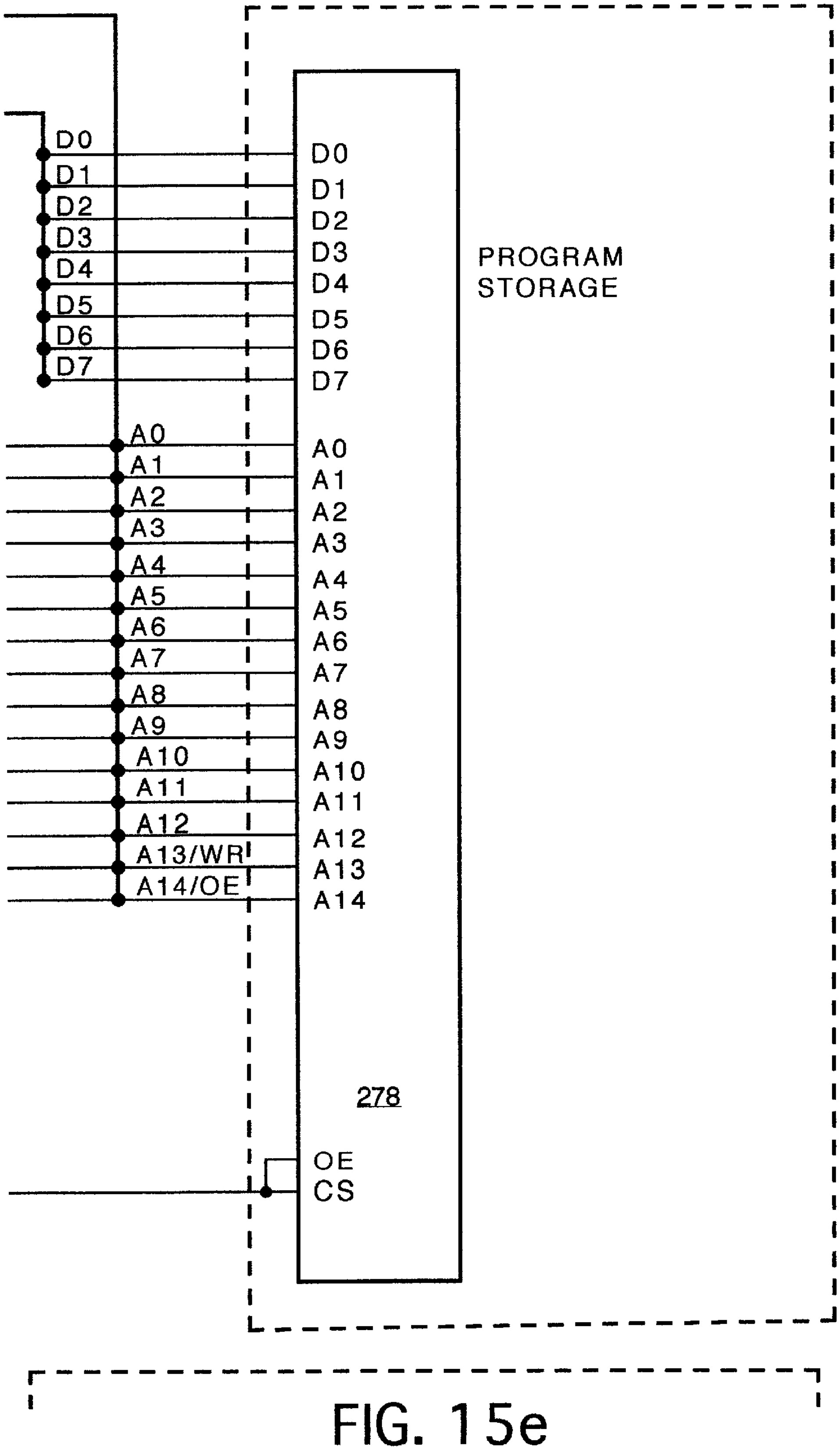
Figure 15F:
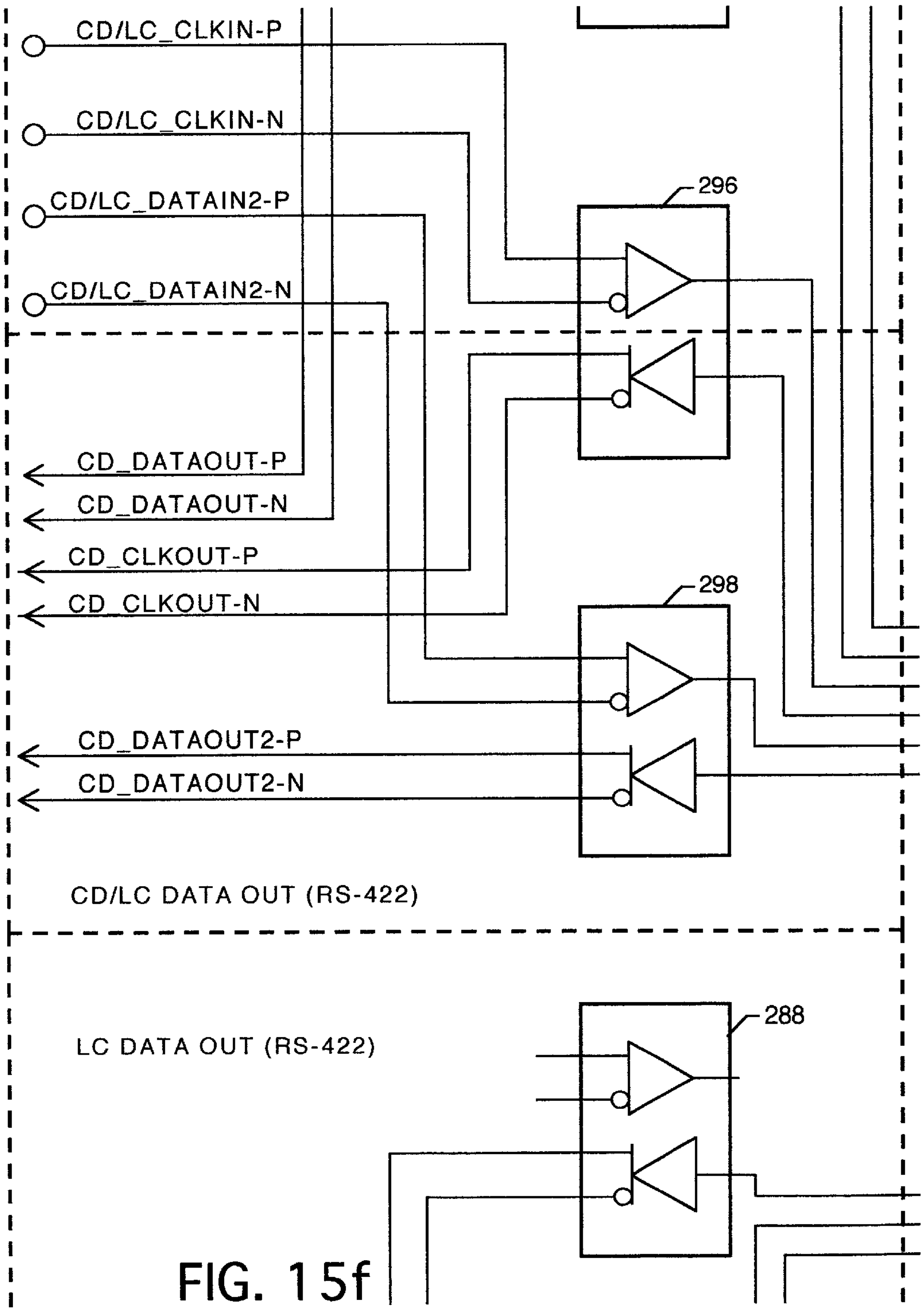
Figure 15G:
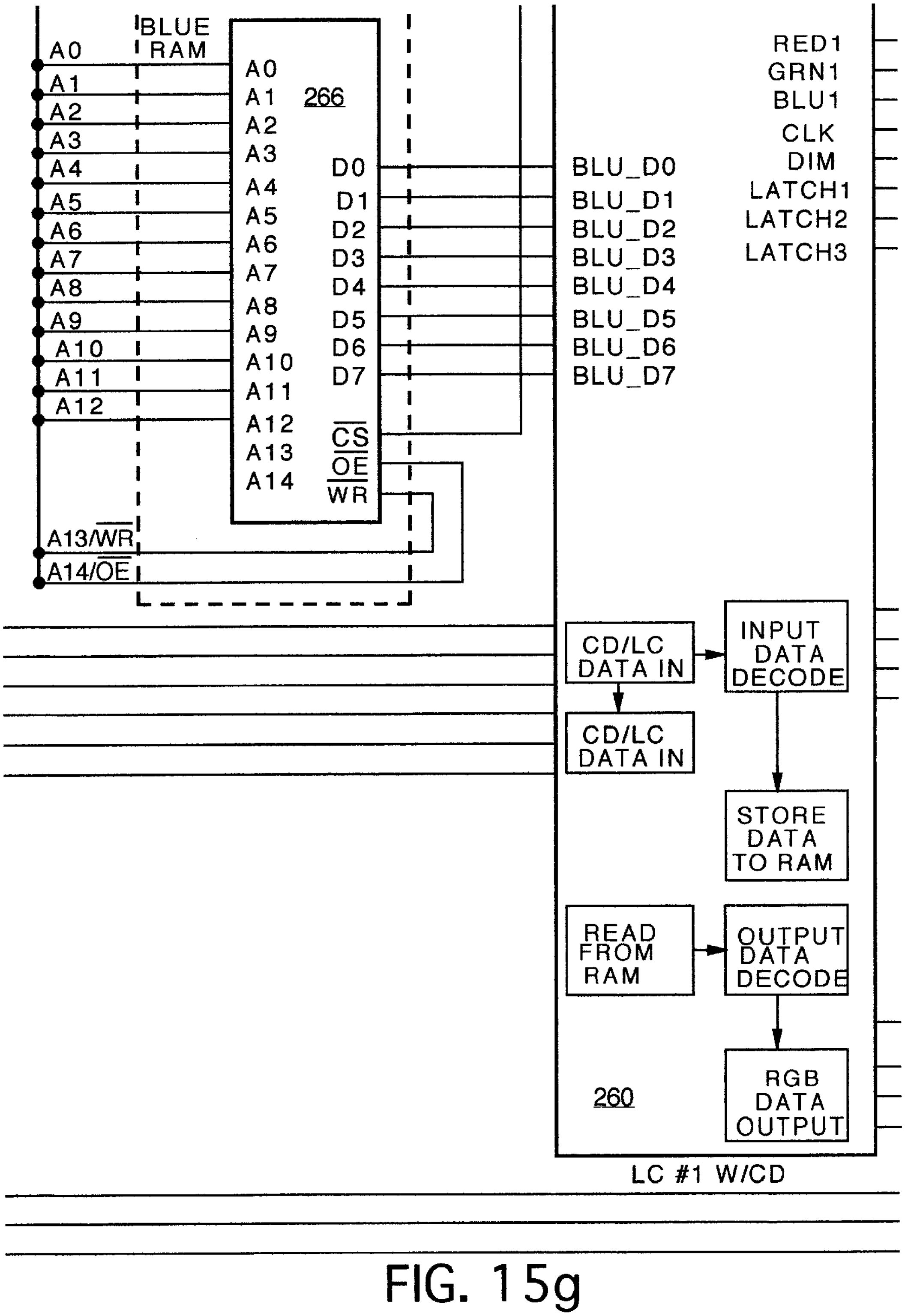
Figure 15H:
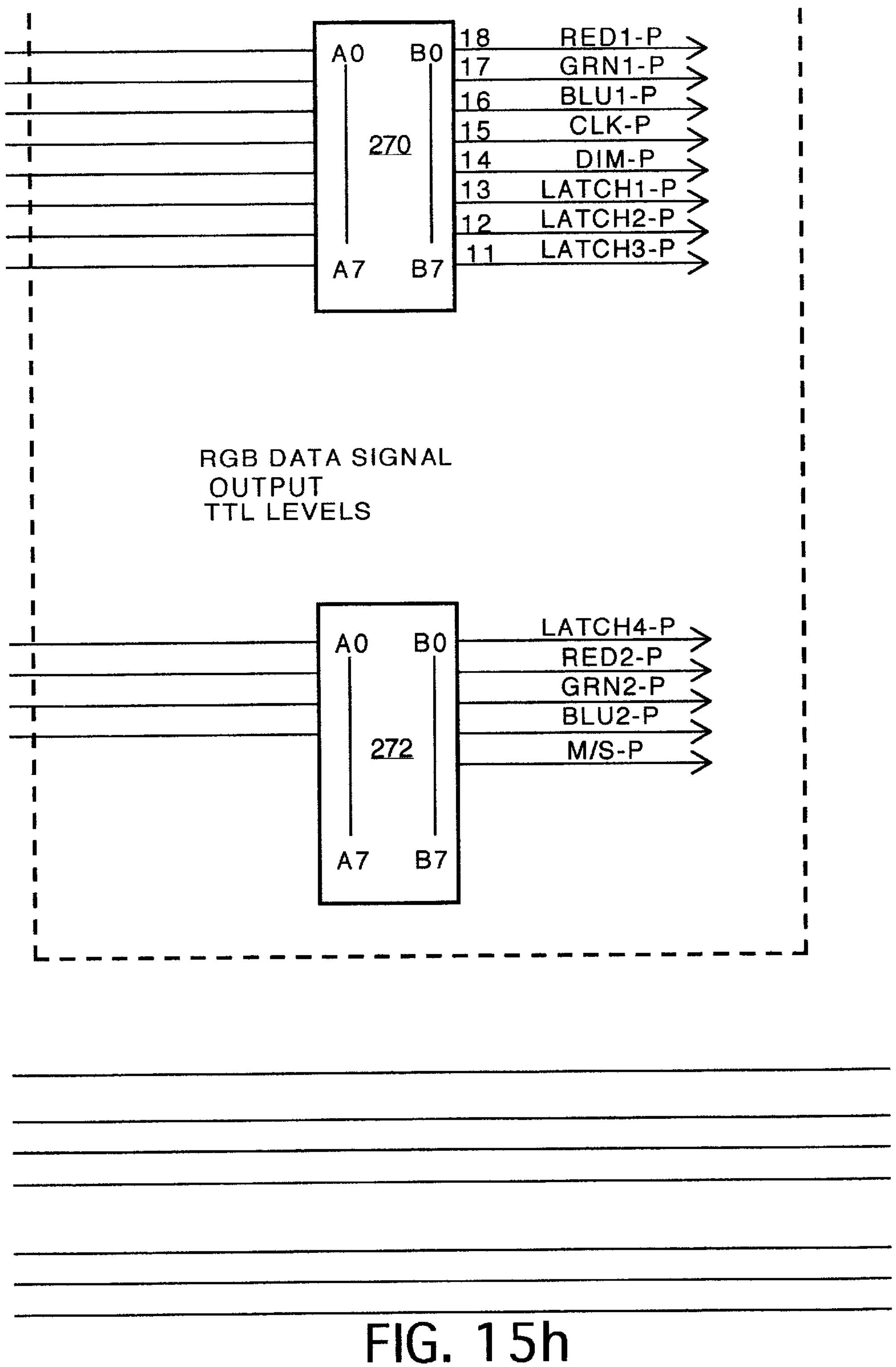
Figure 15I:
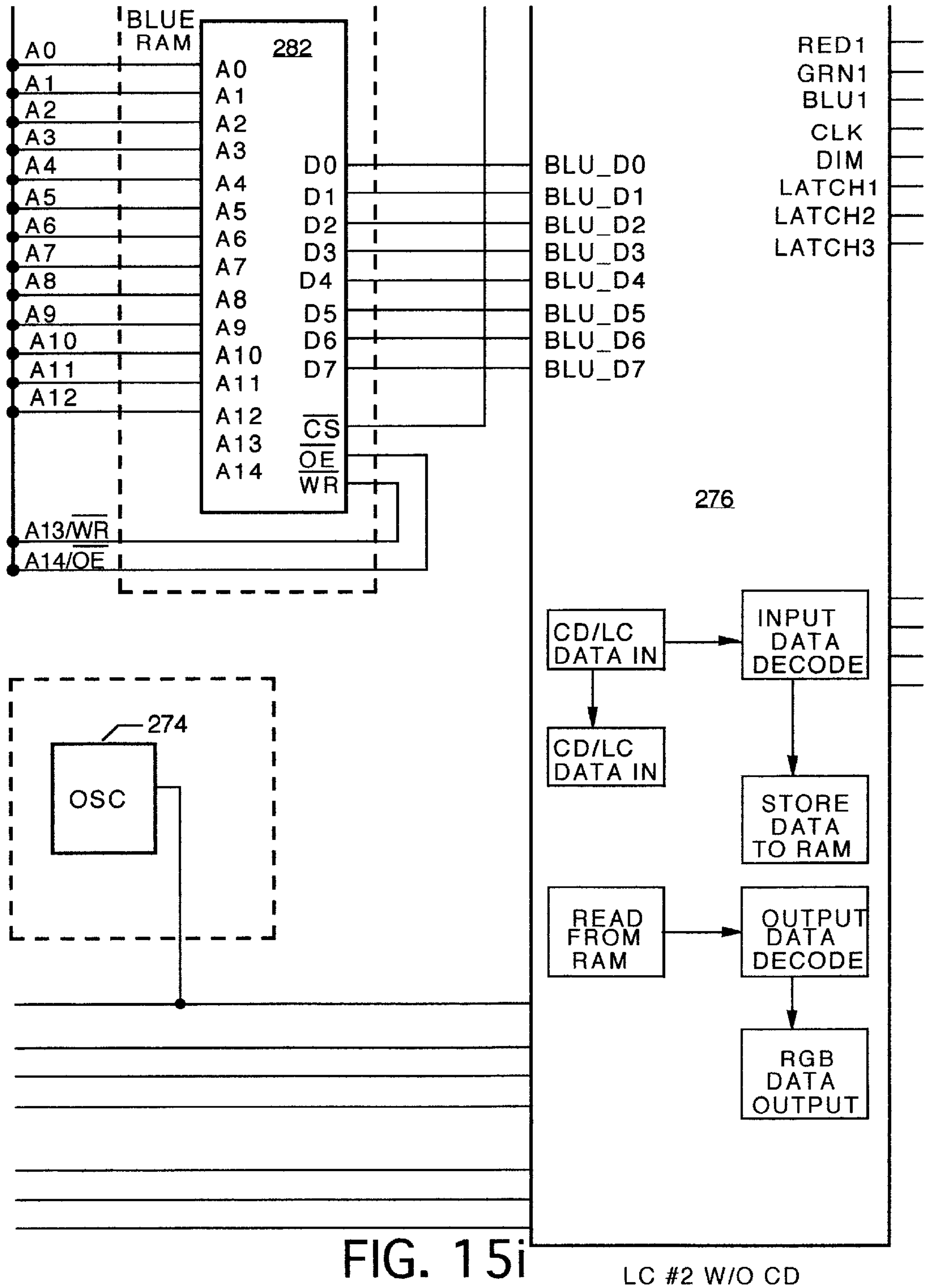
Figure 15J:
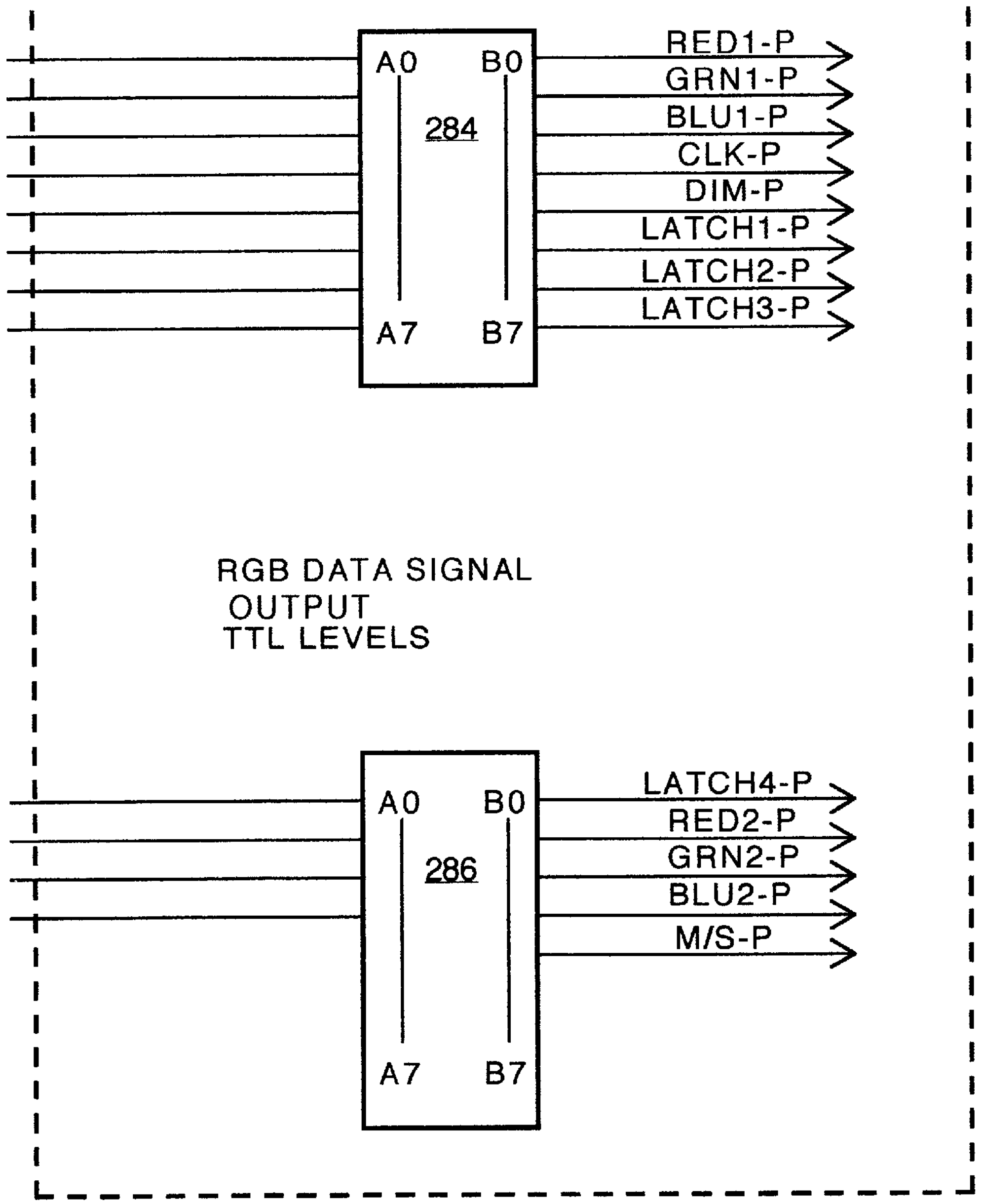
Figure 15K:
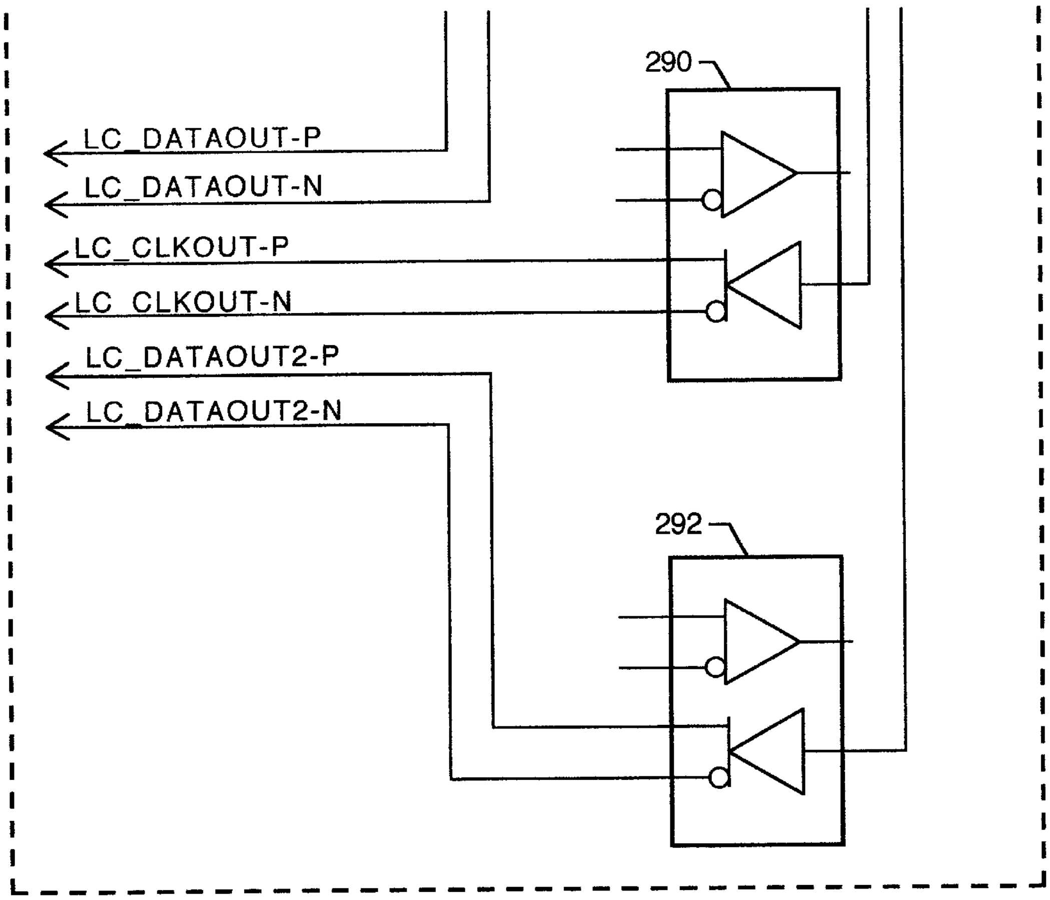

FIG. 14 is a layout of FIGS. 15*a*–15*k*.

FIGS. 15*a*–15*k* illustrate a dual line controller electrical circuit schematic diagram including programmable logic 260 with the column director and RAM 262–266, EPROM 268, red RAM 262, green RAM 264, blue RAM 266, latches 270 and 272 (RGB data signal output TTL levels), oscillator 274, programmable logic without column director and with line controller 276, EPROM program storage 278, red RAM 279, green RAM 280, blue RAM 282, latches 284 and 286 (RGB data signal output TTL levels), LC data out 288, 290 and 292, and CD/LC IN 294, 296 and 298.

Figure 17A:
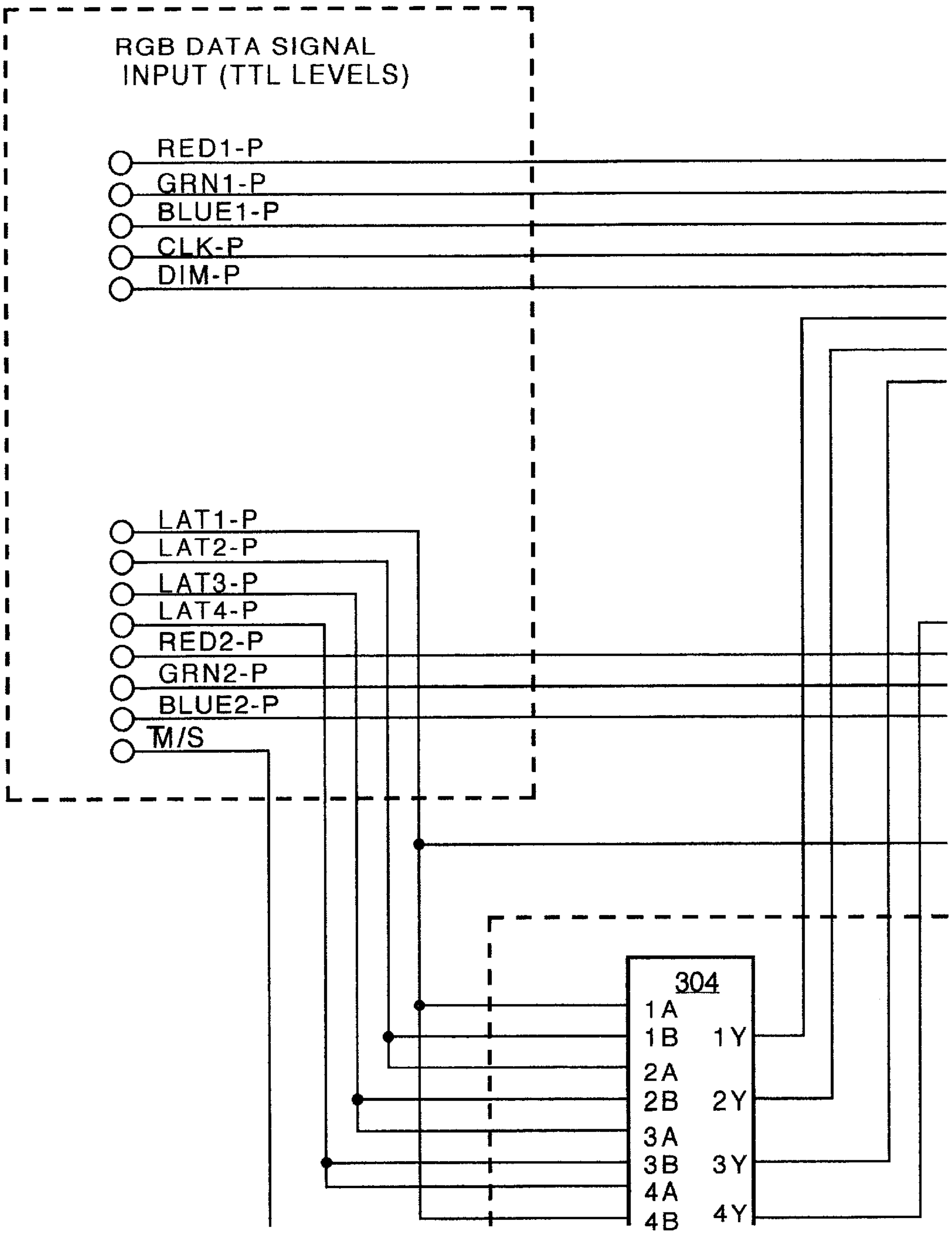
FIGS. 17*a*–17*u* illustrate a RGB driver electrical circuit schematic diagram.
Figure 17B:
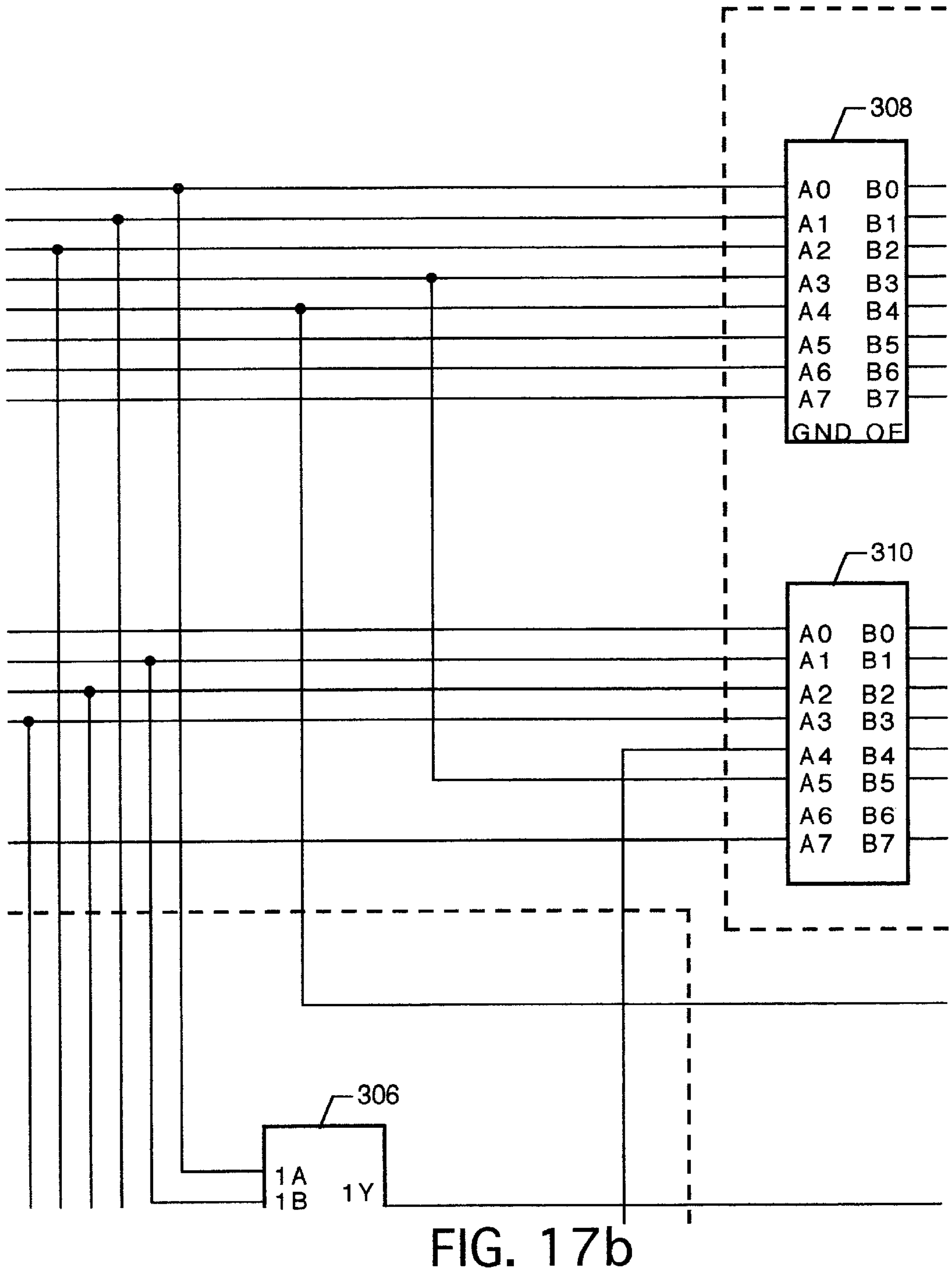
Figure 17C:
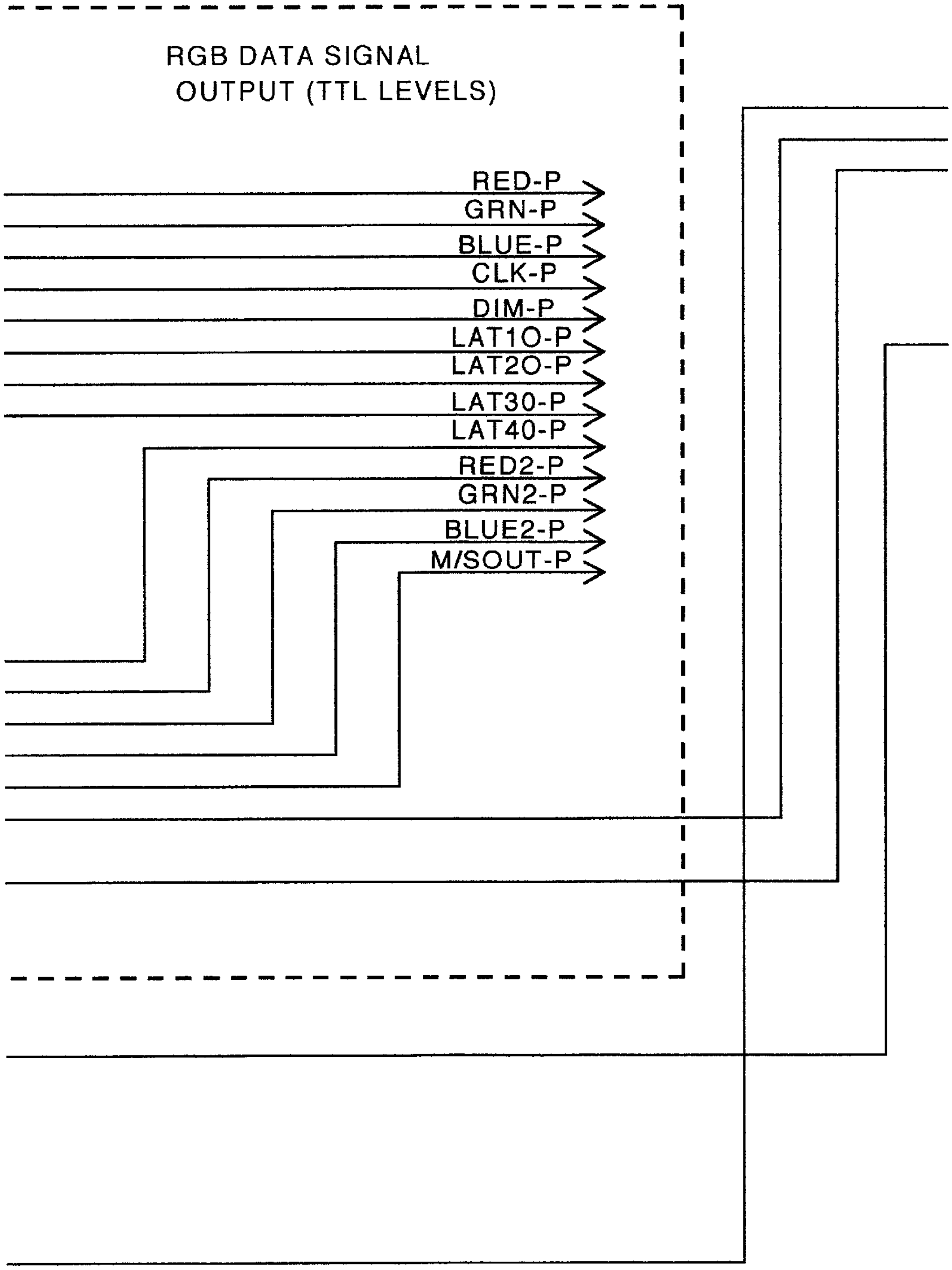
Figure 17D:
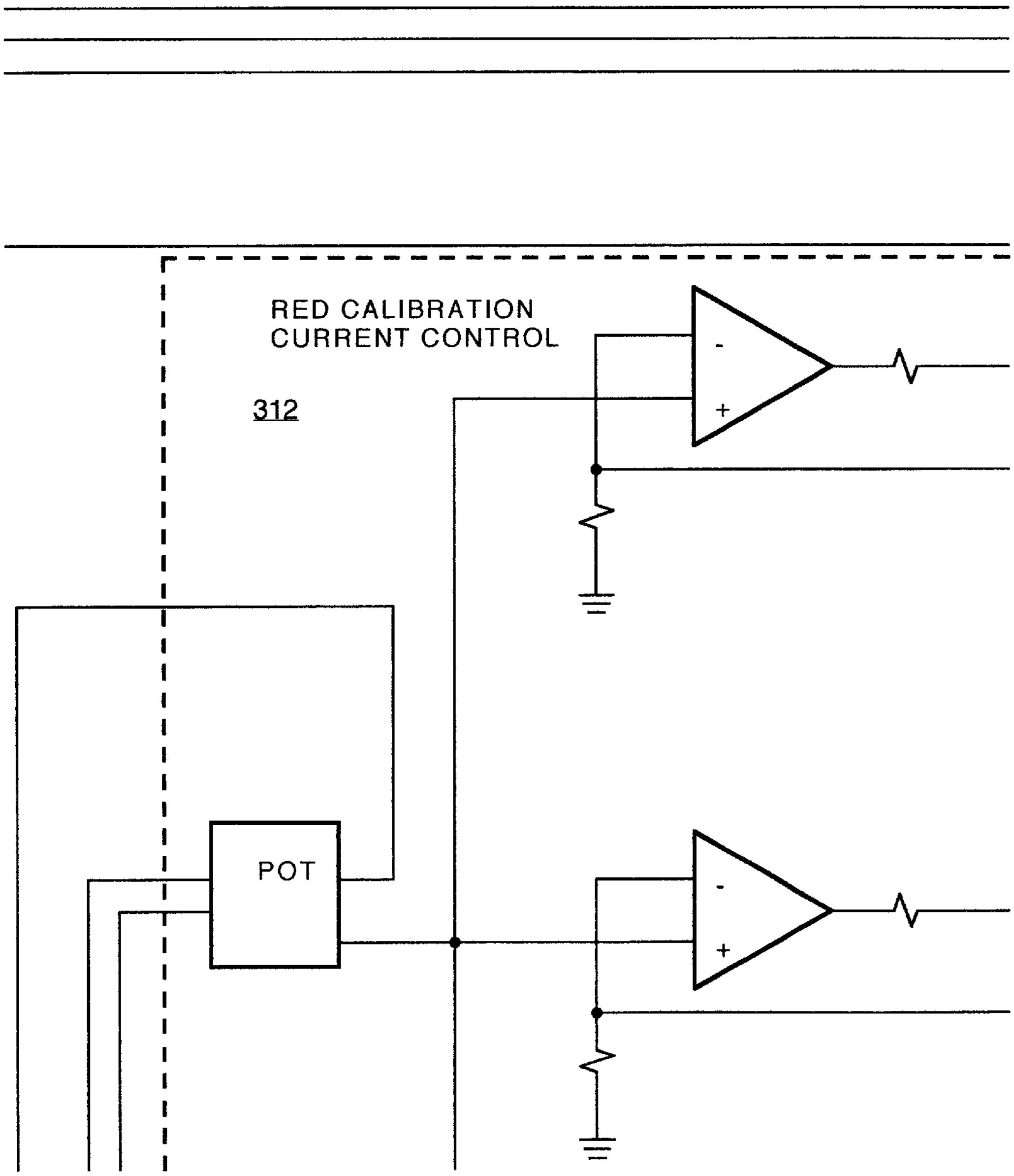
Figure 17E:
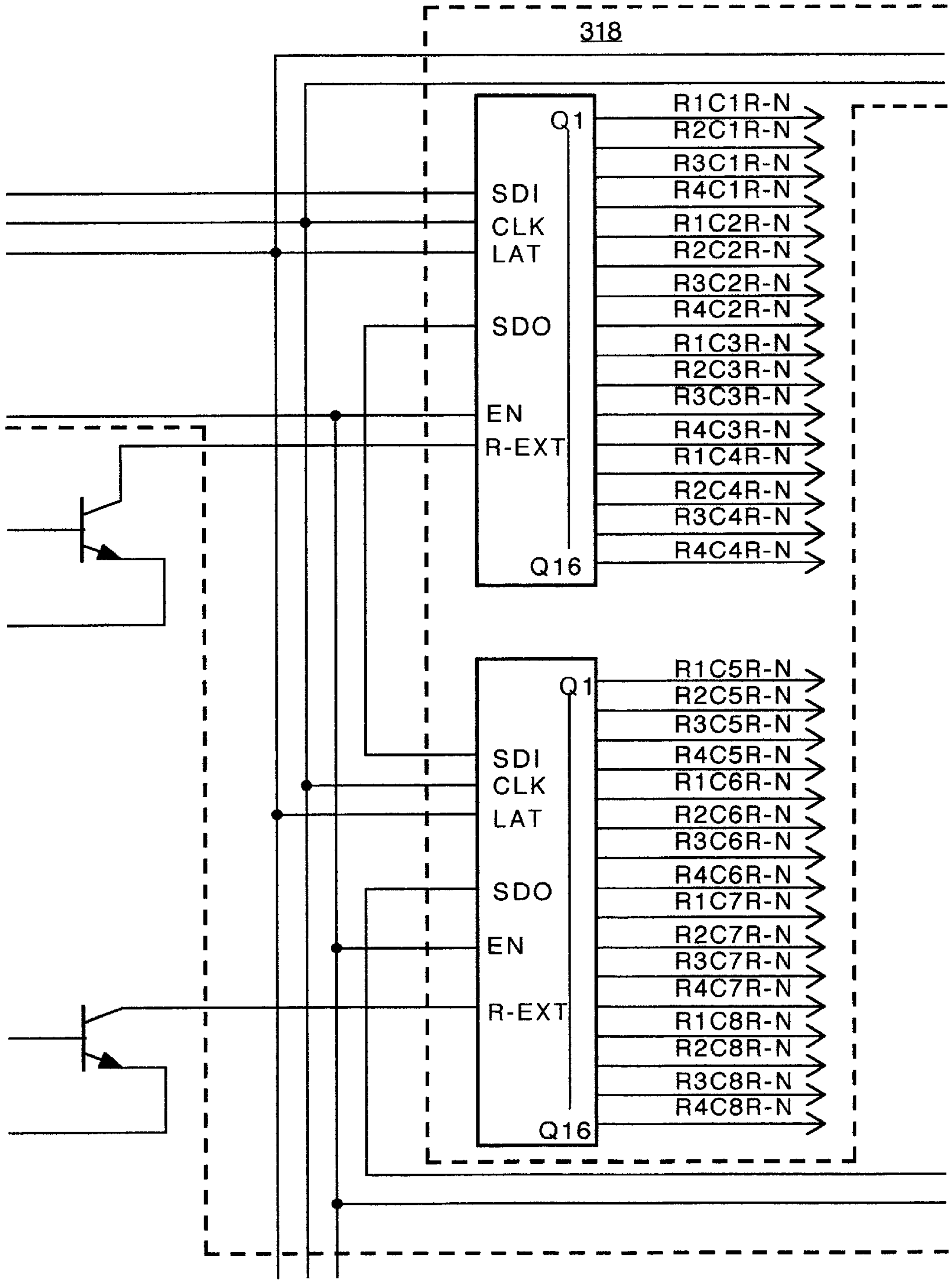
Figure 17F:
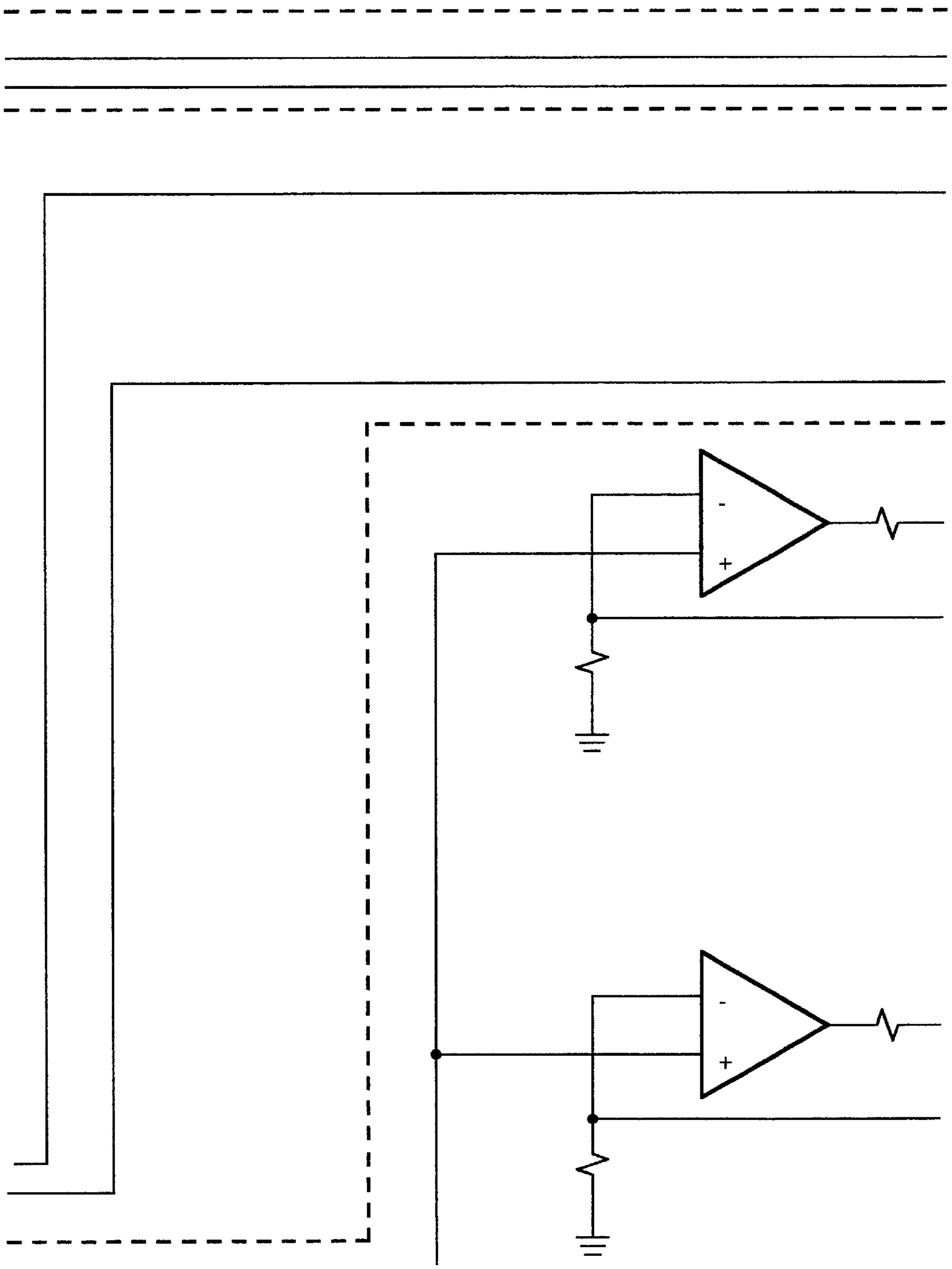
Figure 17G:
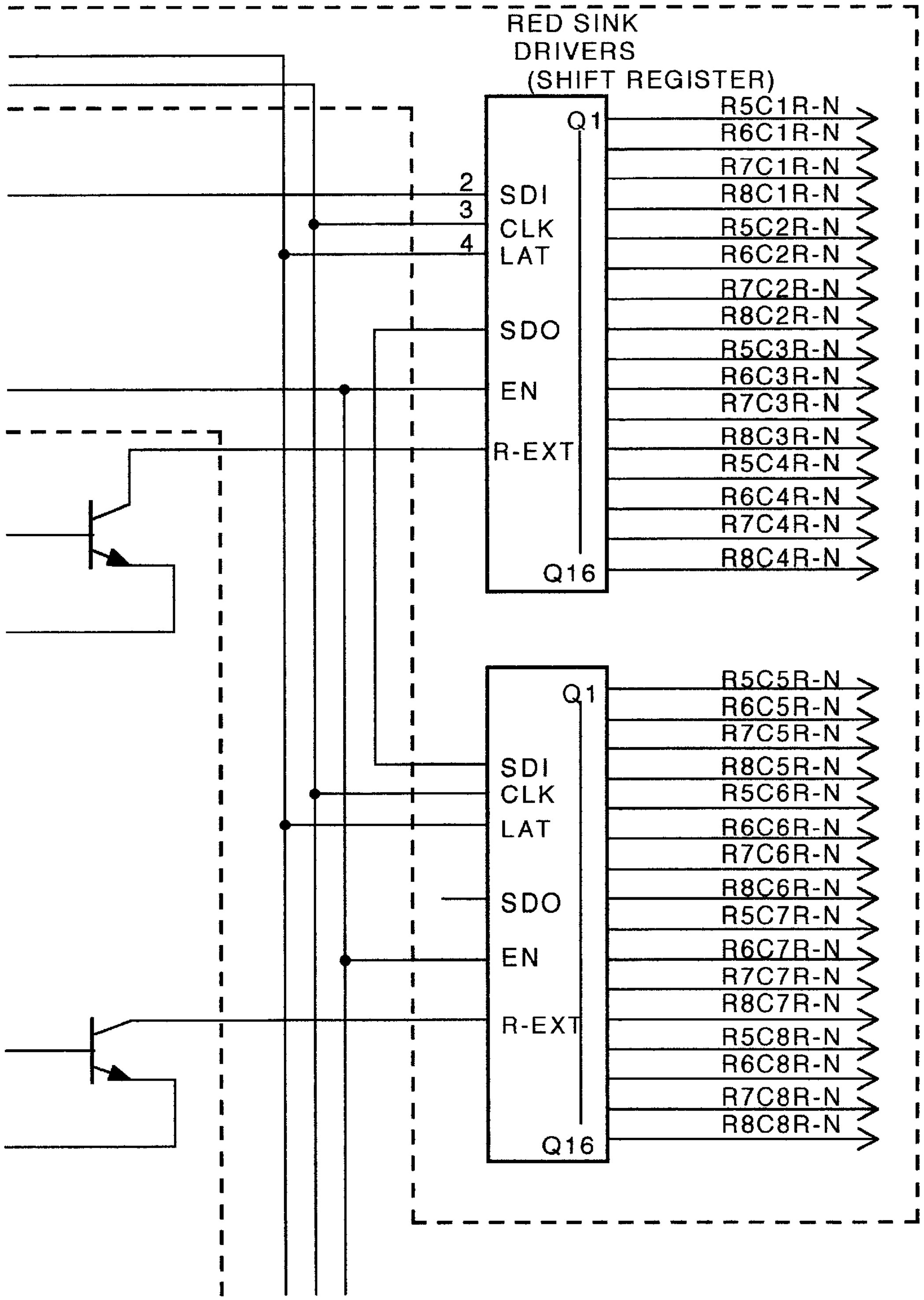
Figure 17H:
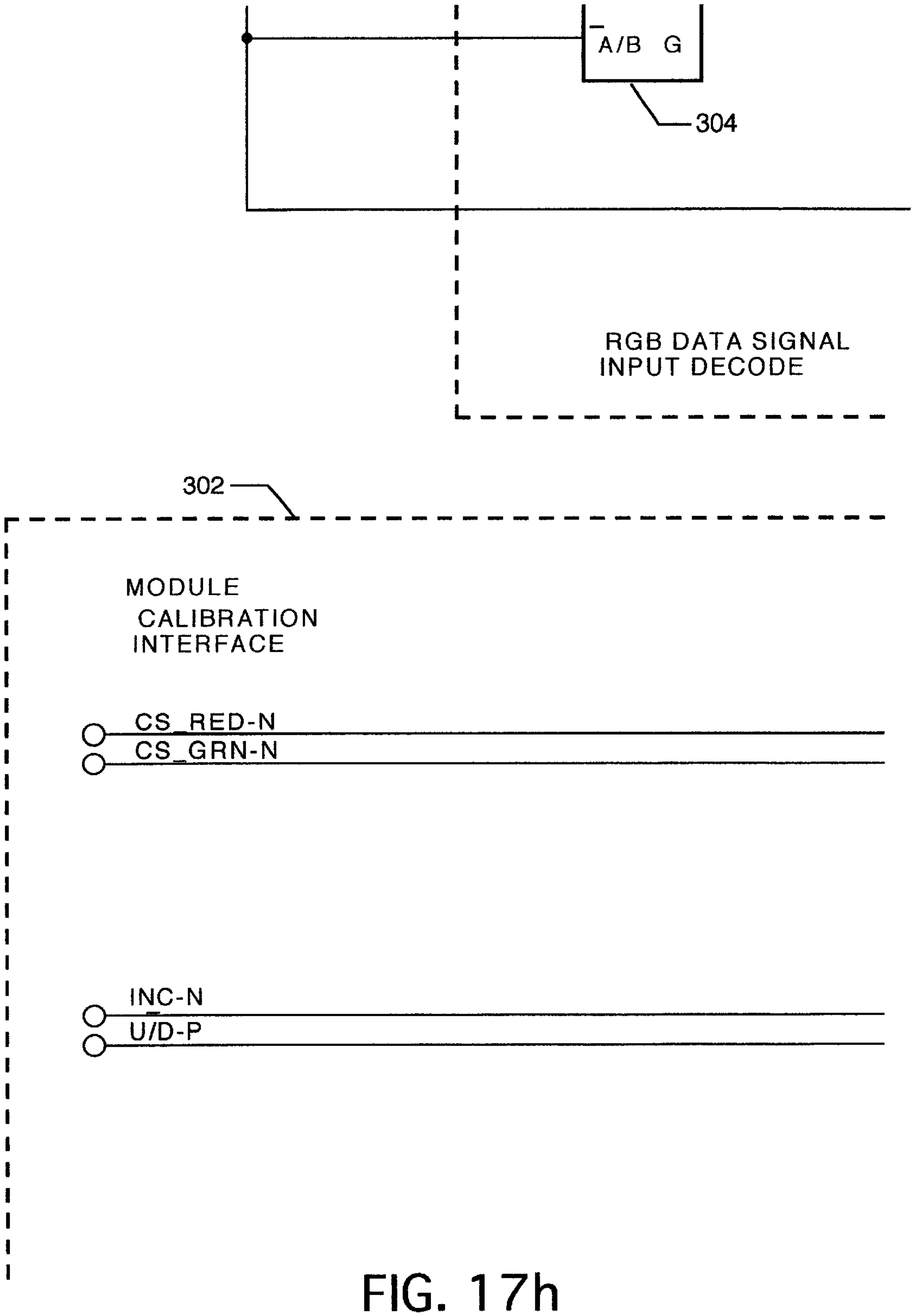
Figure 17I:
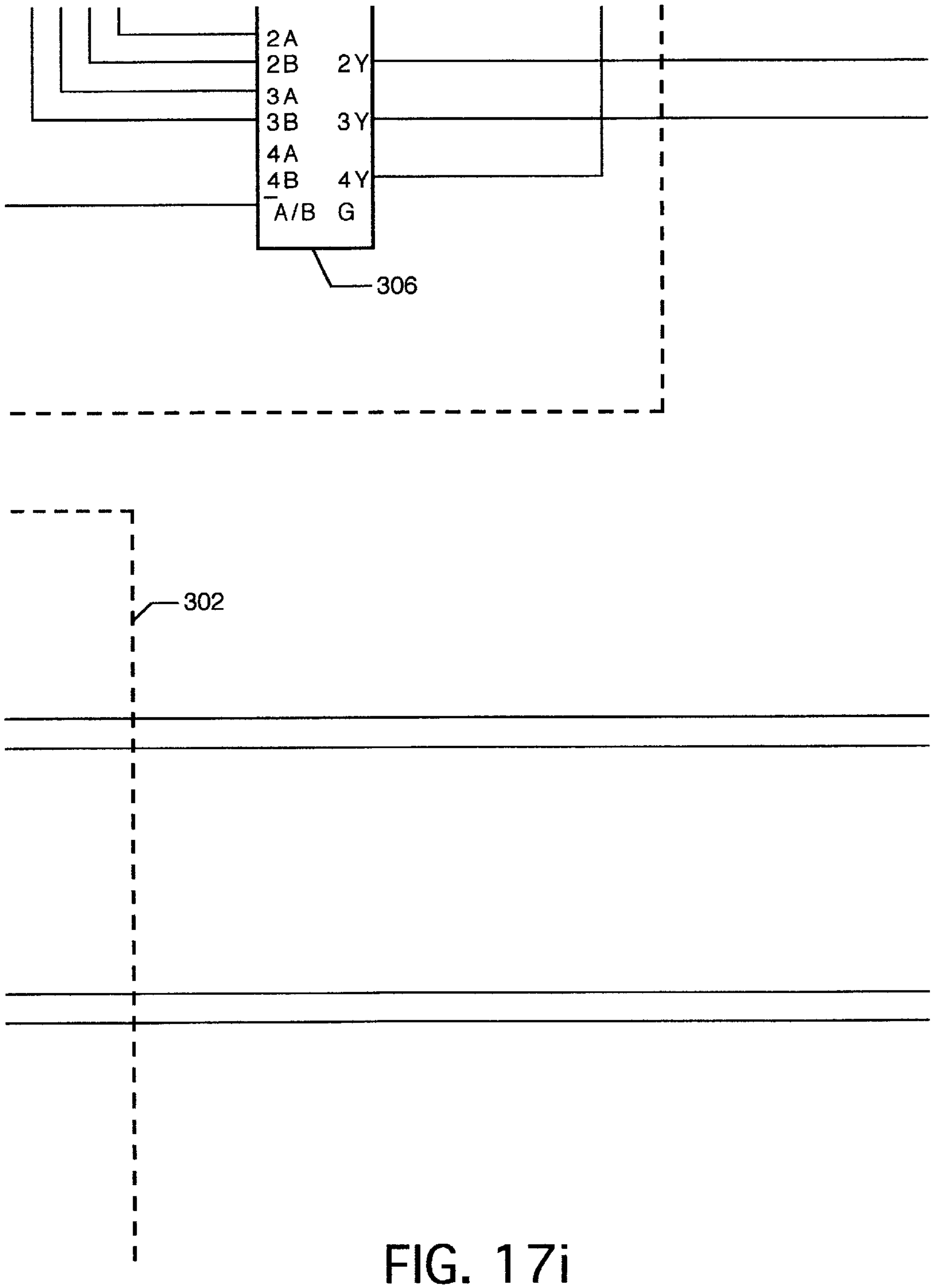
Figure 17J:
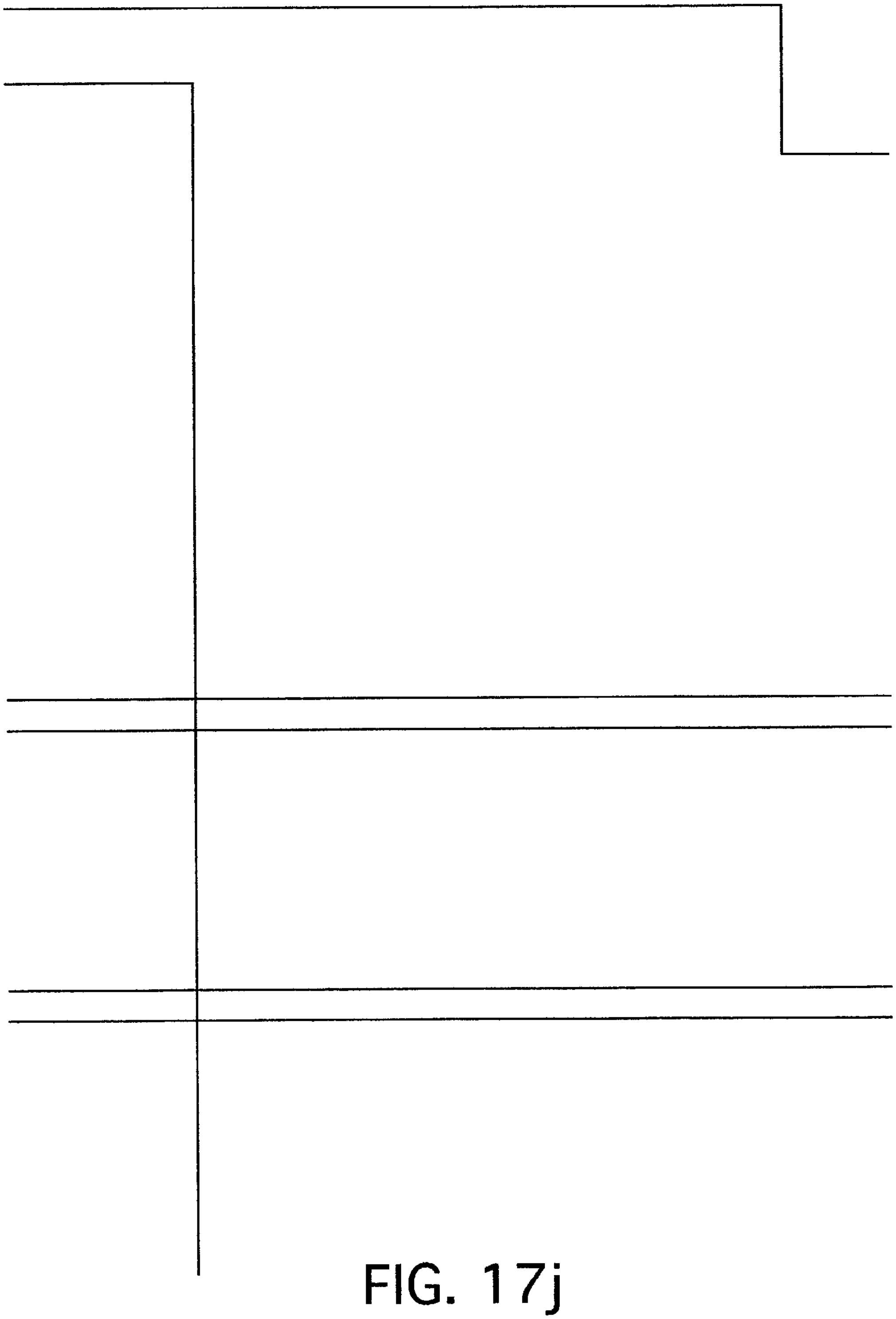
Figure 17K:
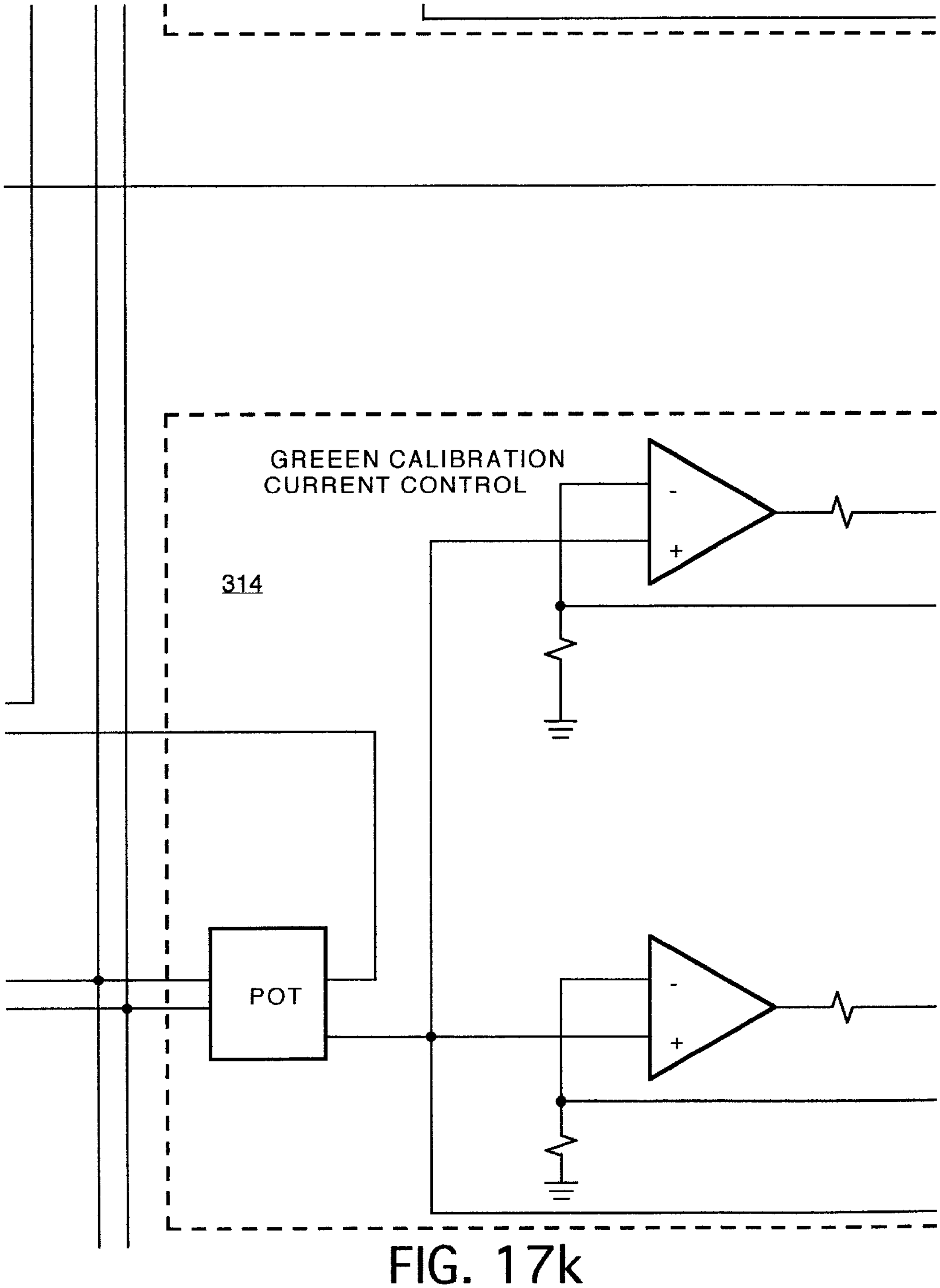
Figure 17L:
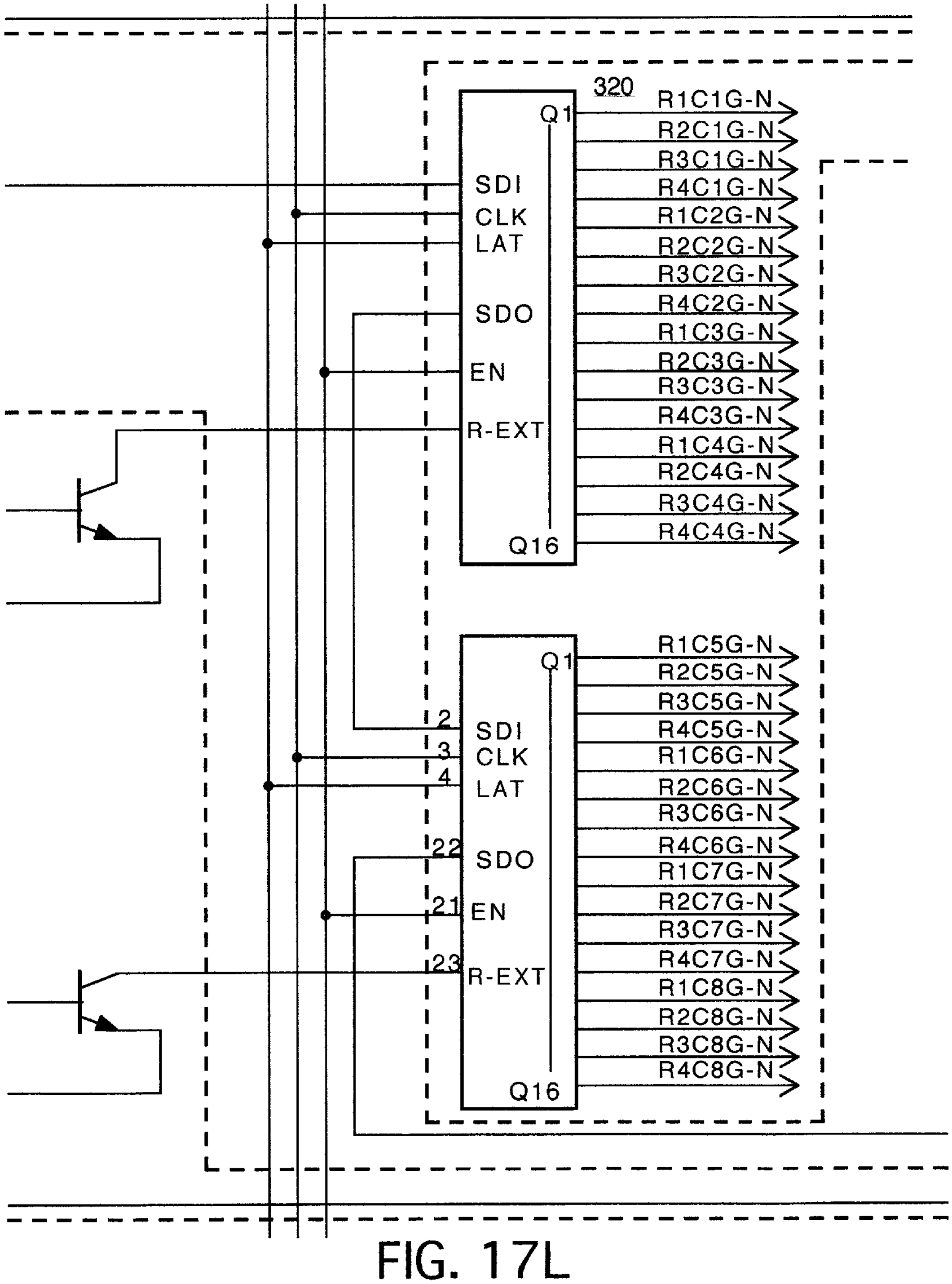
Figure 17M:
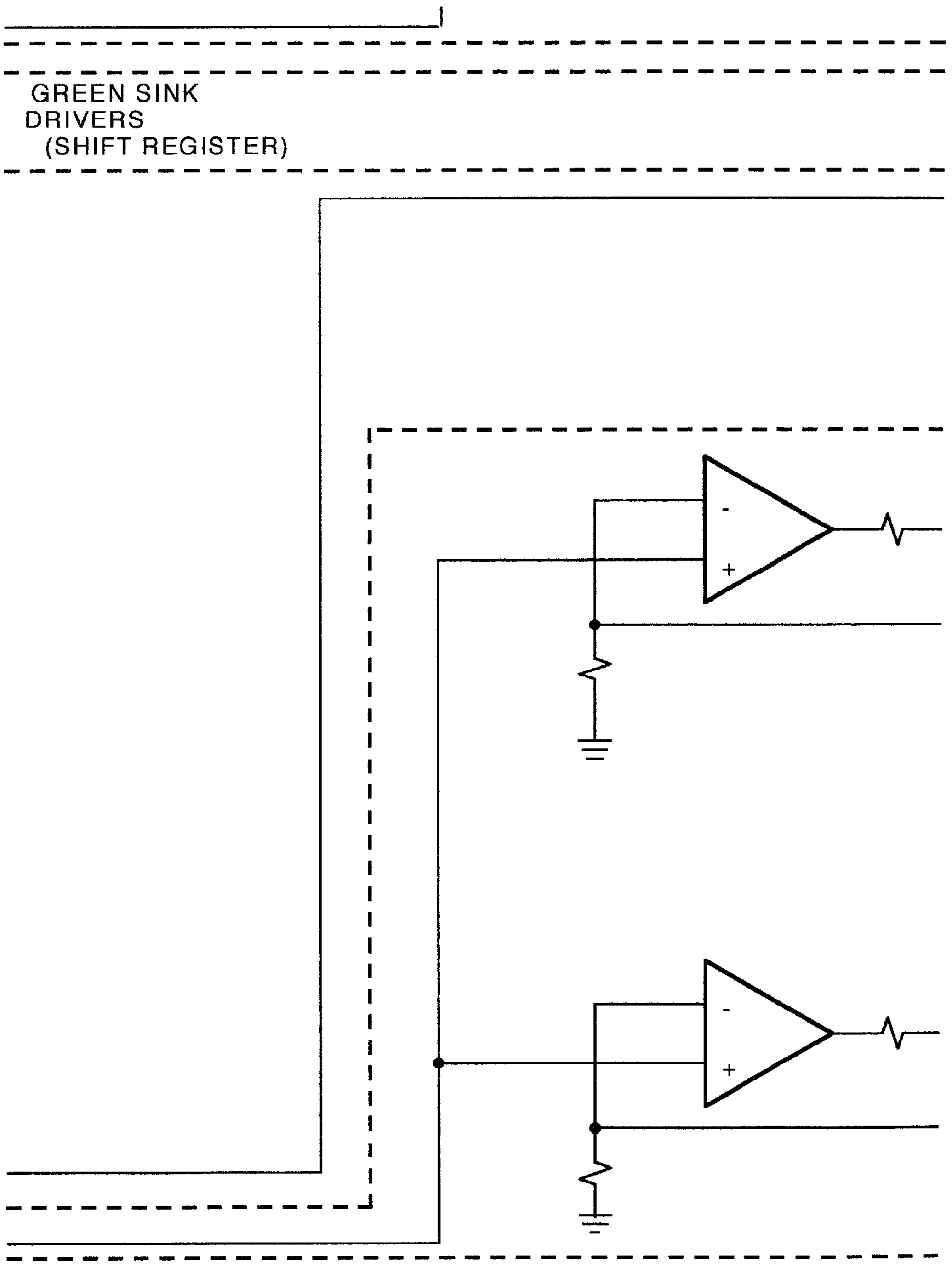
Figure 17N:
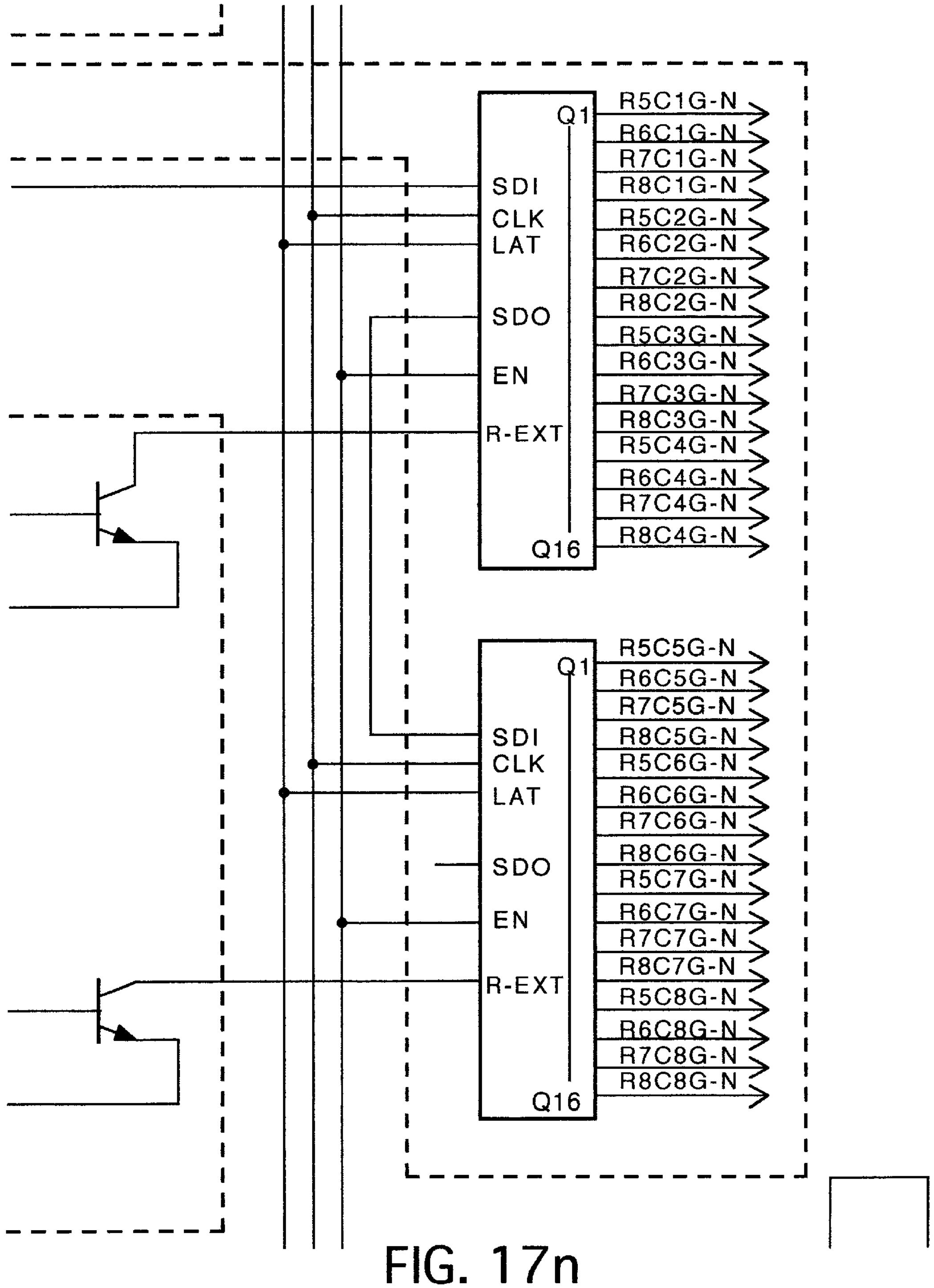
Figure 17O:
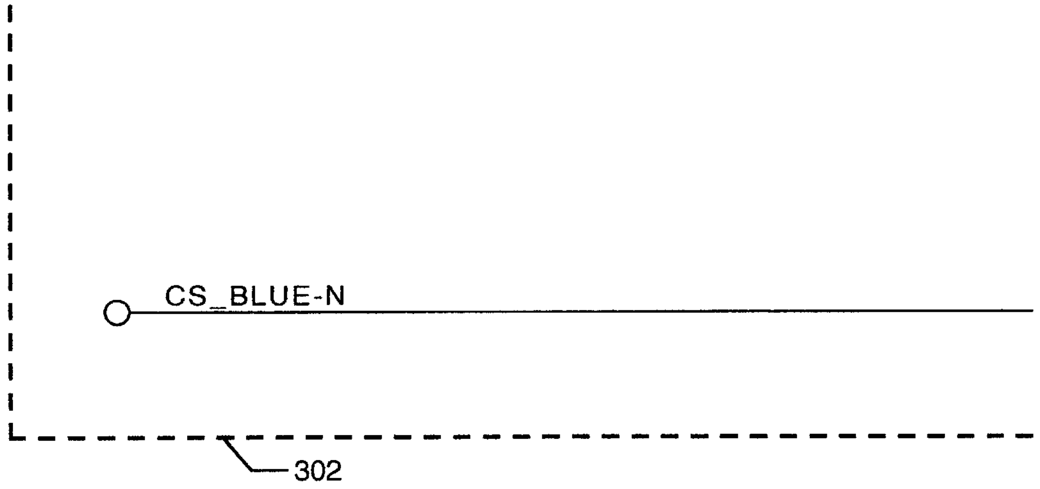
Figure 17O:
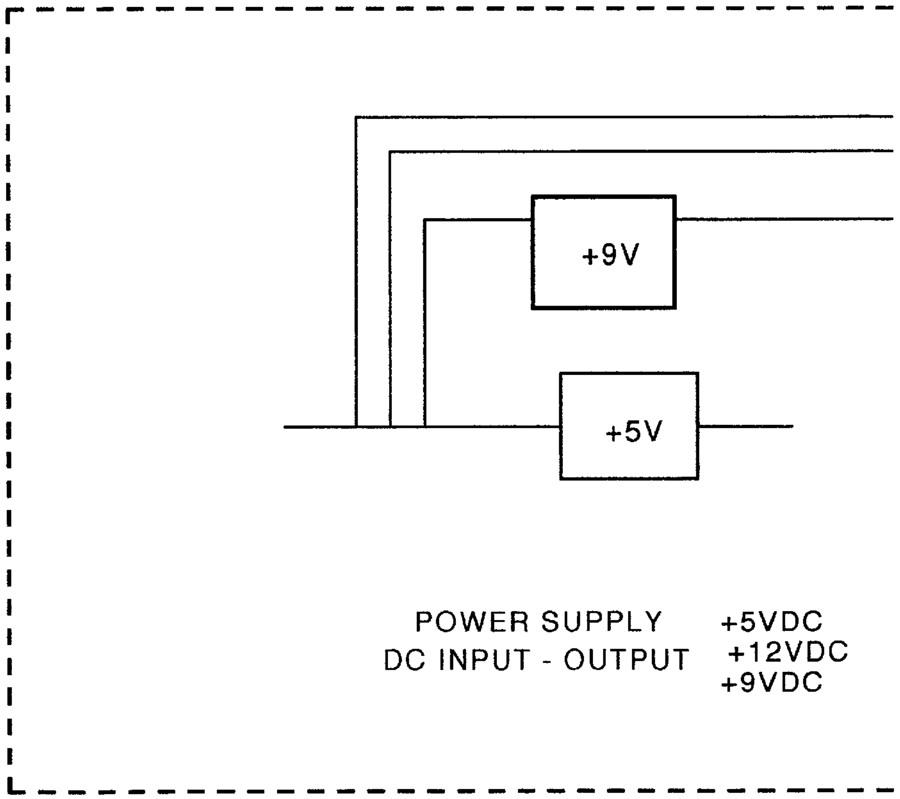
Figure 17P:
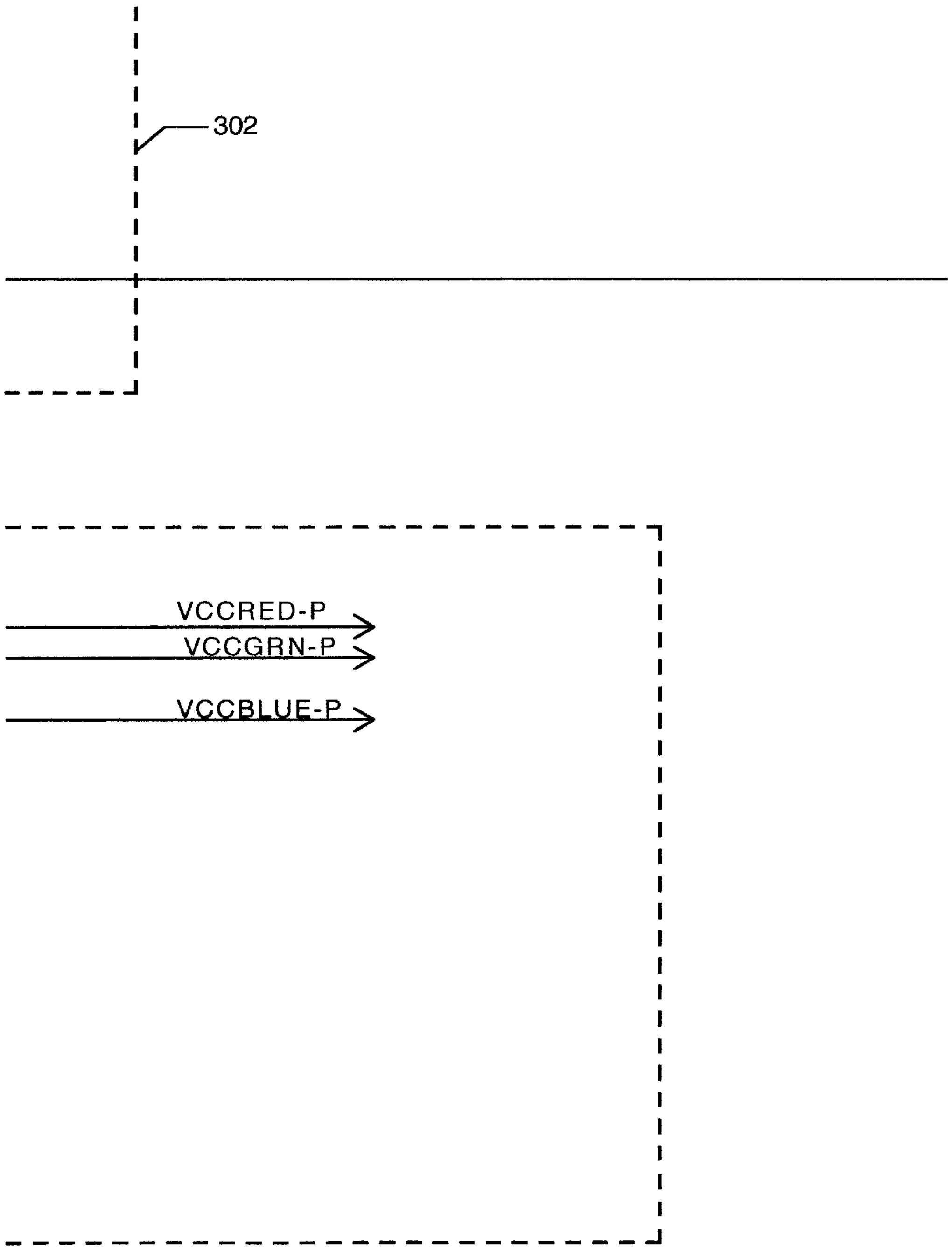
Figure 17Q:
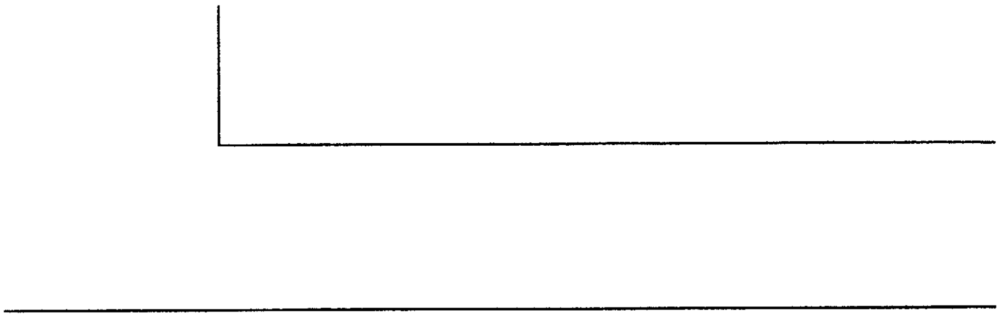
Figure 17R:
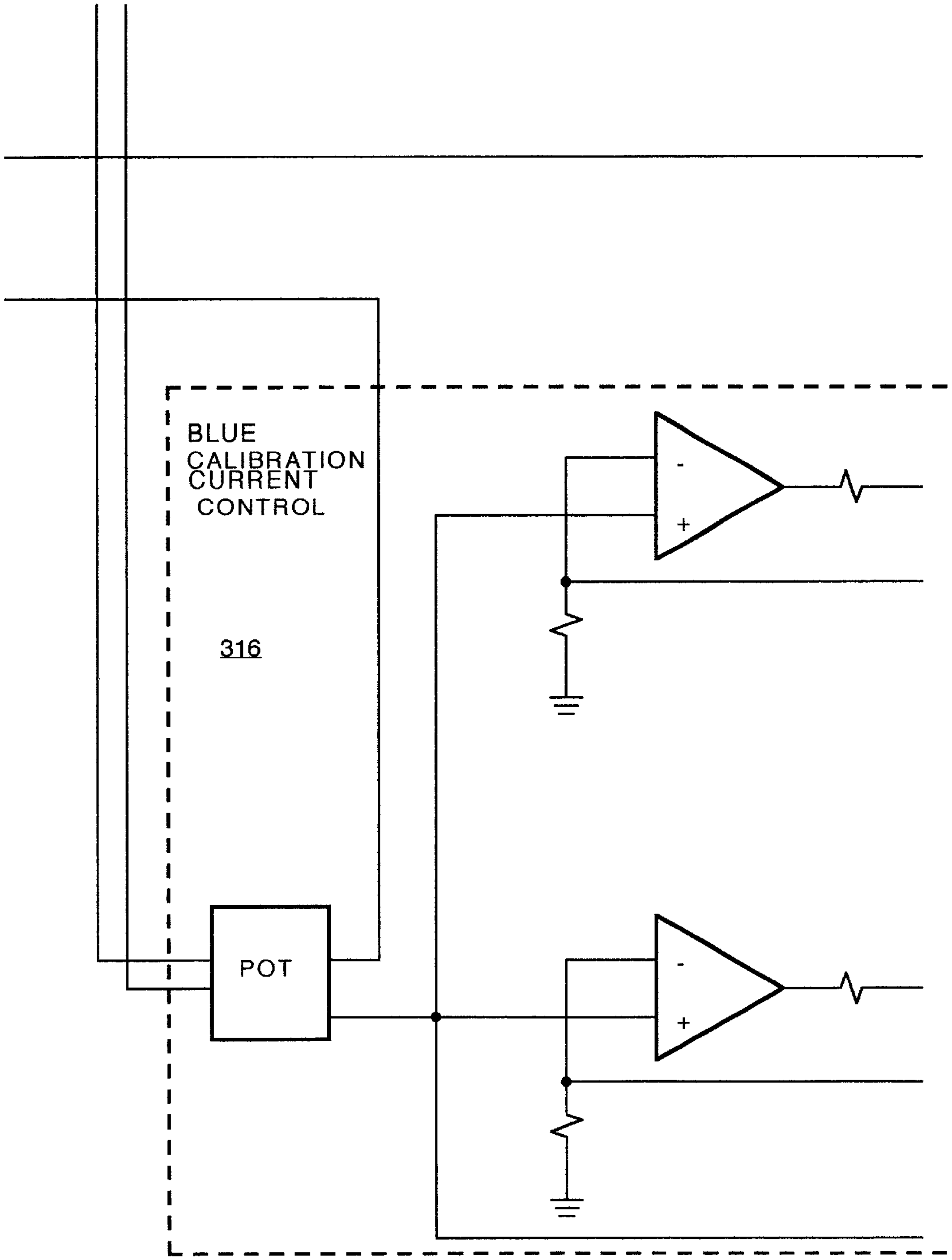
Figure 17S:
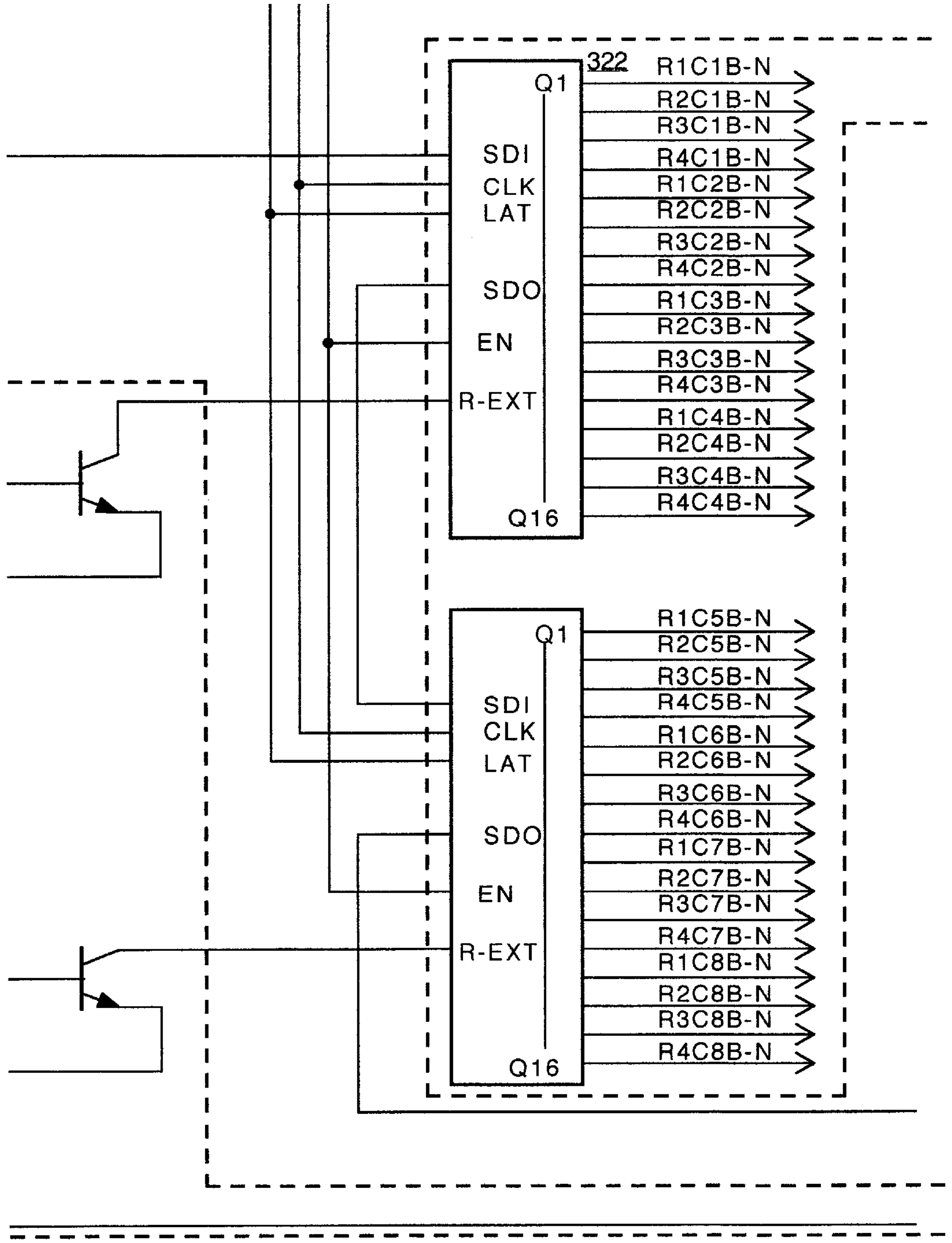
Figure 17T:
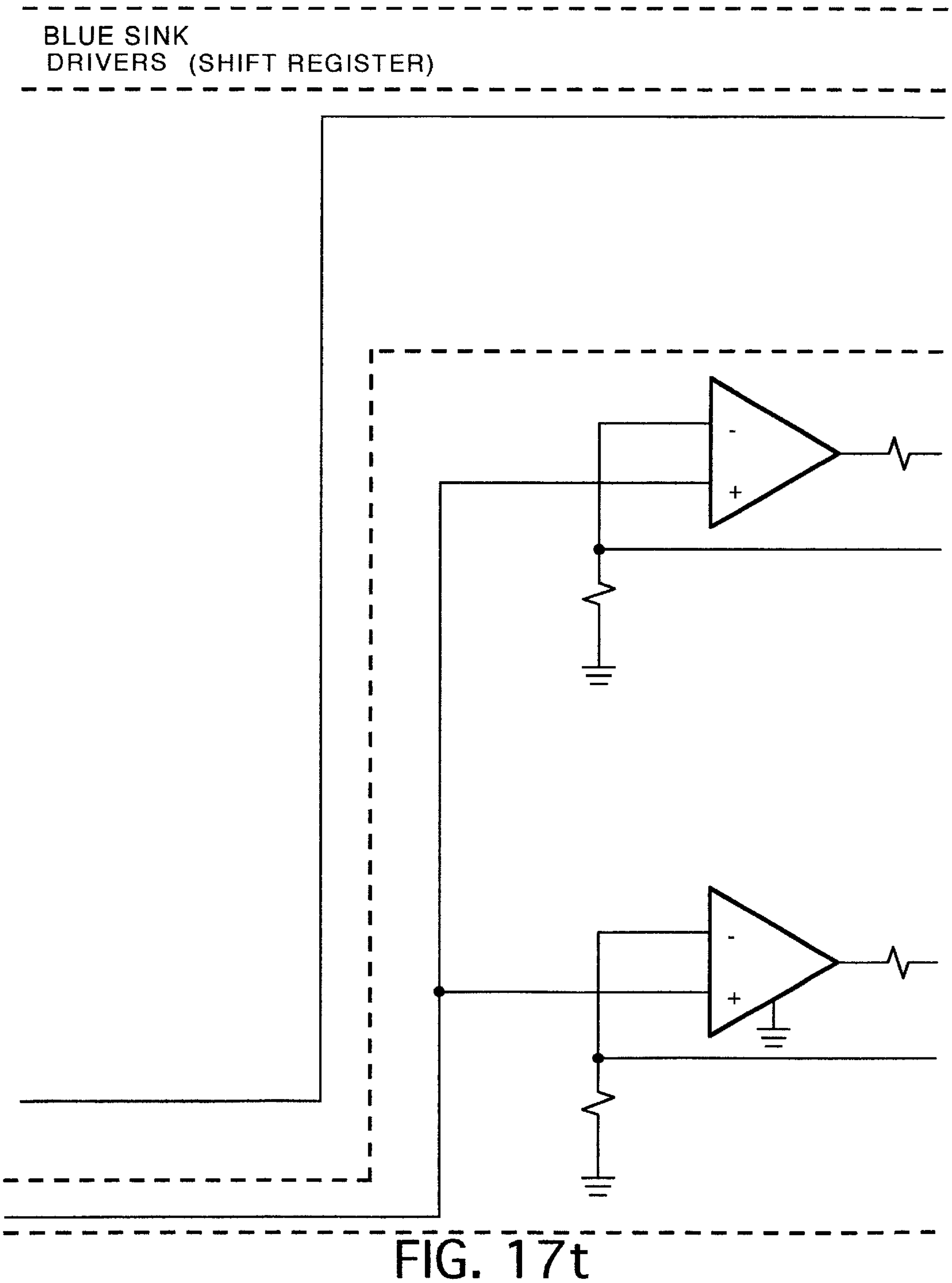
Figure 17U:
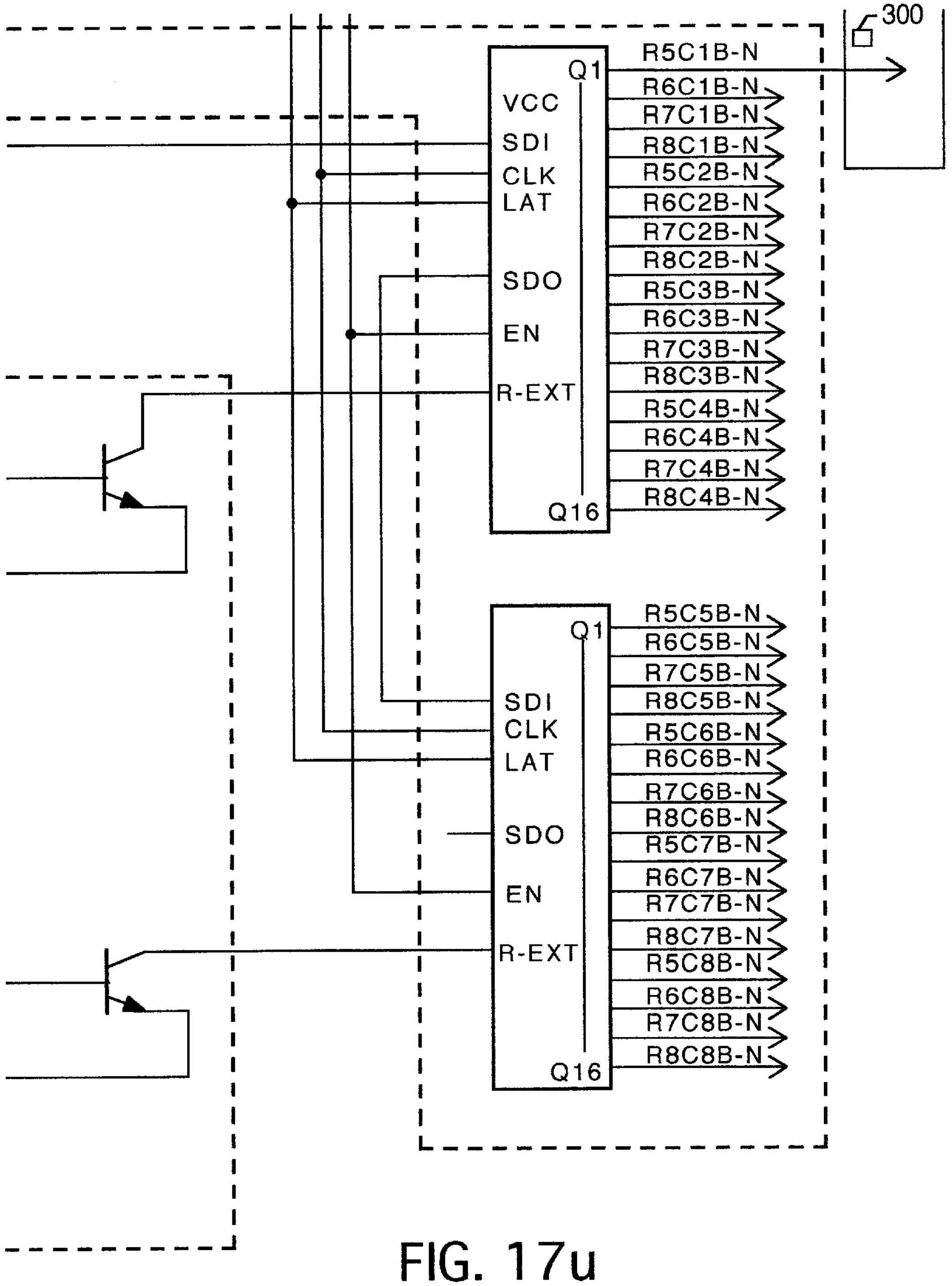

FIG. 16 is a layout of FIGS. 17*a*–17*u*.

FIGS. 17*a*–17*u* illustrate a RGB driver electrical circuit schematic diagram, comprising modulation calibration interface 302, 2:1 mix drives 304 and 306, octal bus transceivers 308 and 310, red calibration current control 312, green calibration current control 314, blue calibration current control 316, red sink drivers 318 (shift register), green sink drivers 320 (shift register), and blue sink drivers 322 (shift register).

Figure 18:
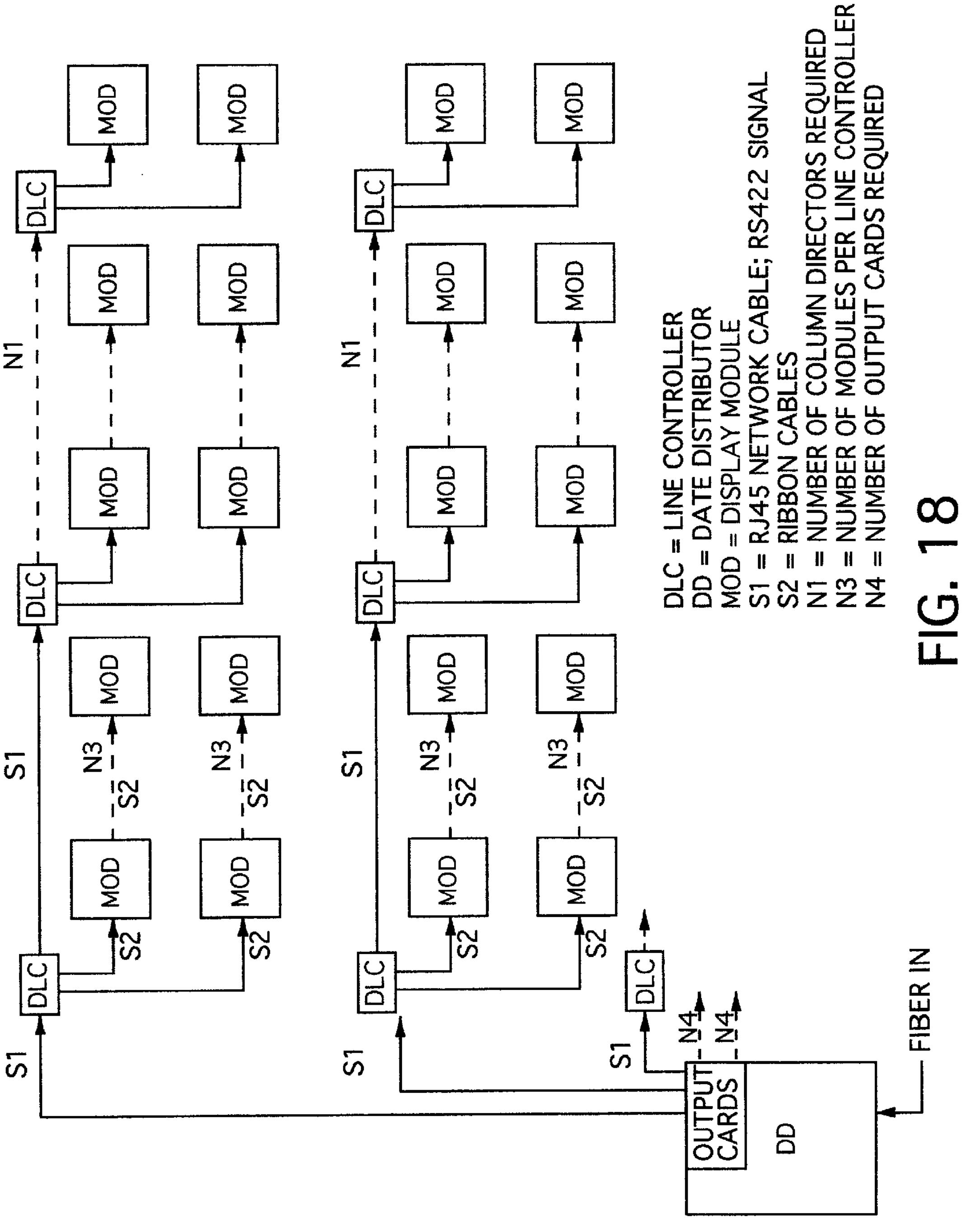
FIG. 18 illustrates a system architecture block RGB/LED diagram.

FIG. 18 illustrates a system architecture block RGB/LED diagram.

Figure 19:
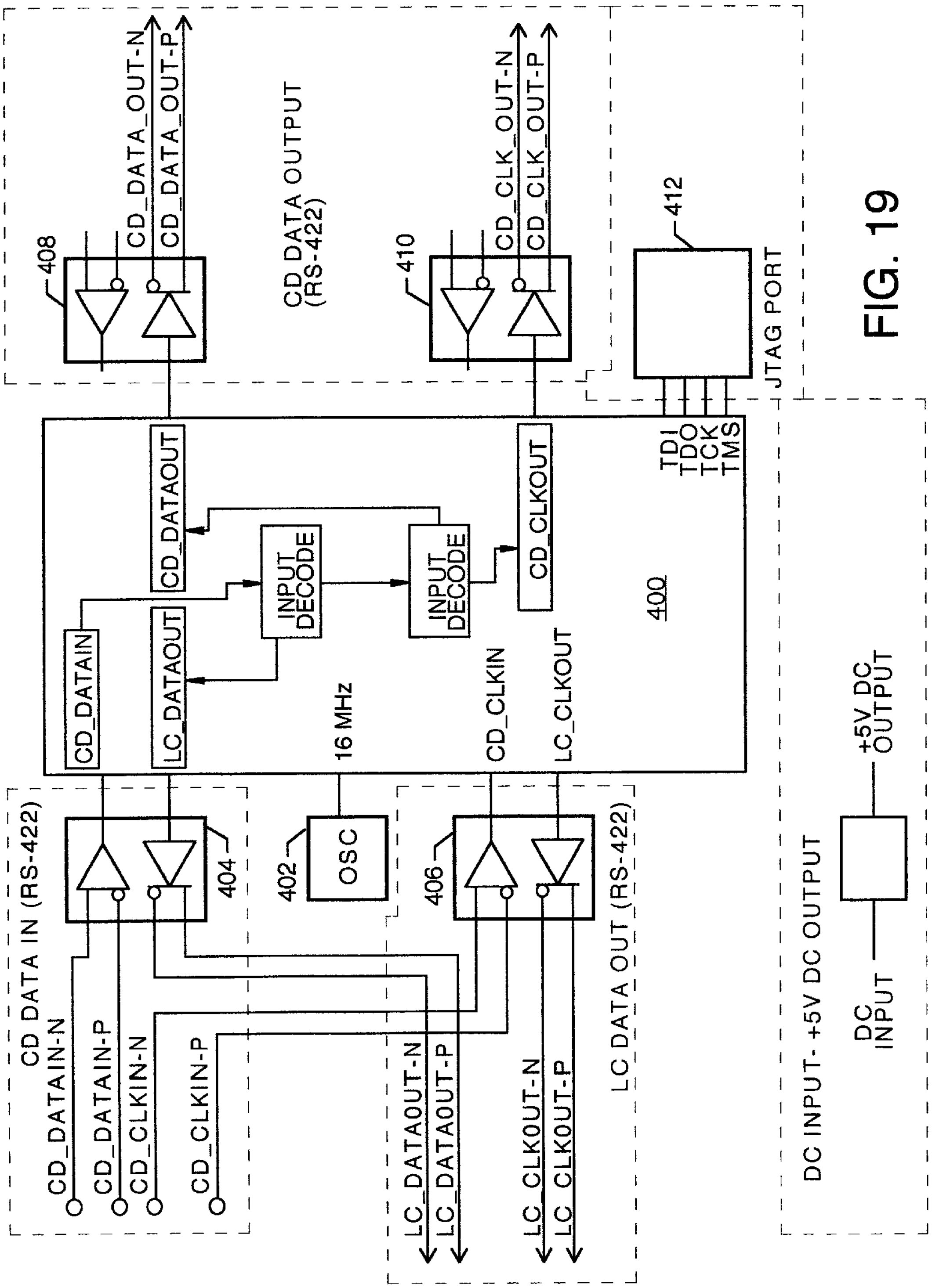
FIG. 19 illustrates an incandescent column director.
Figure 21A:
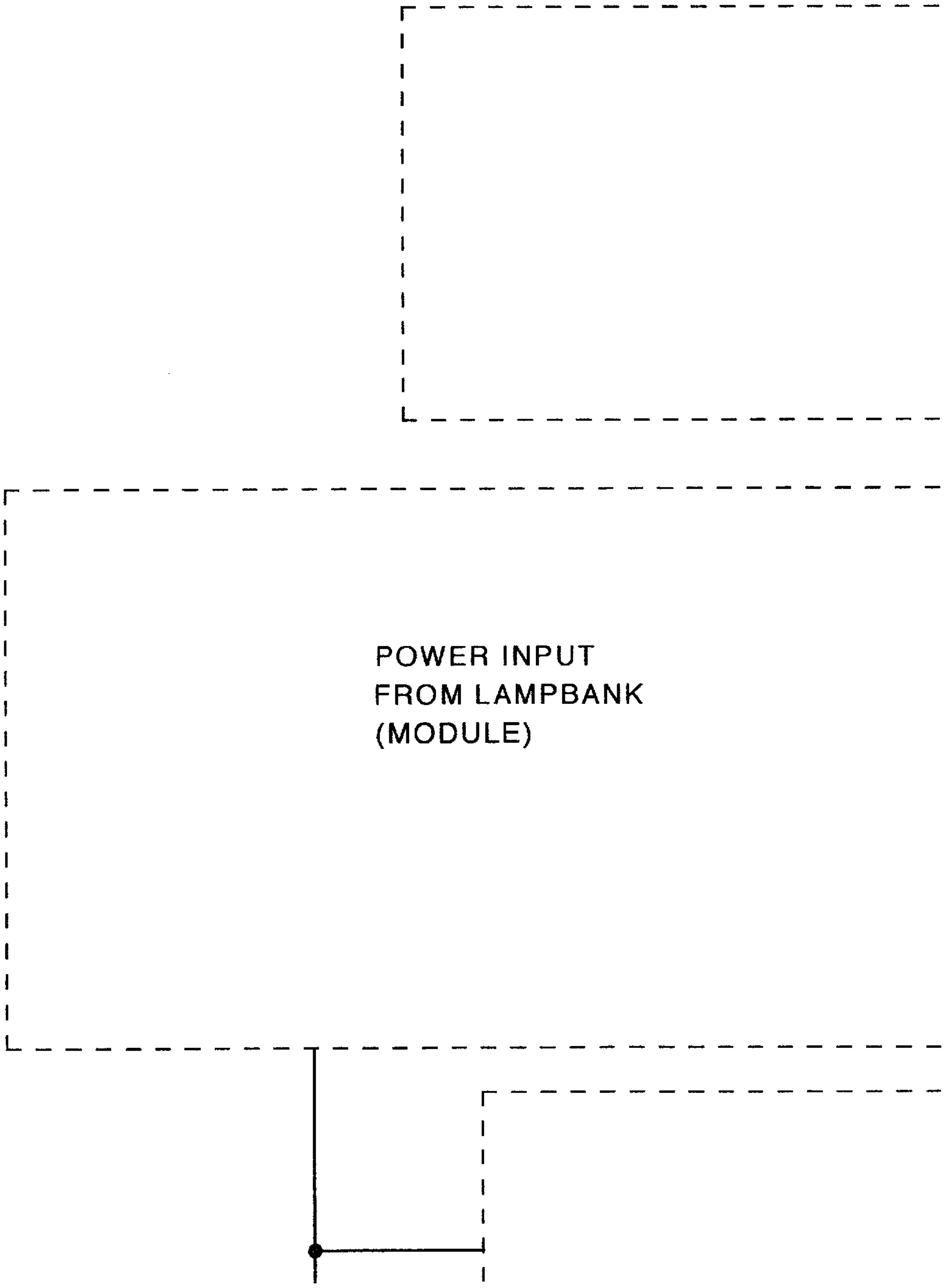
FIGS. 21*a*–21*h* illustrate an incandescent line controller electrical circuit schematic diagram.
Figure 21B:
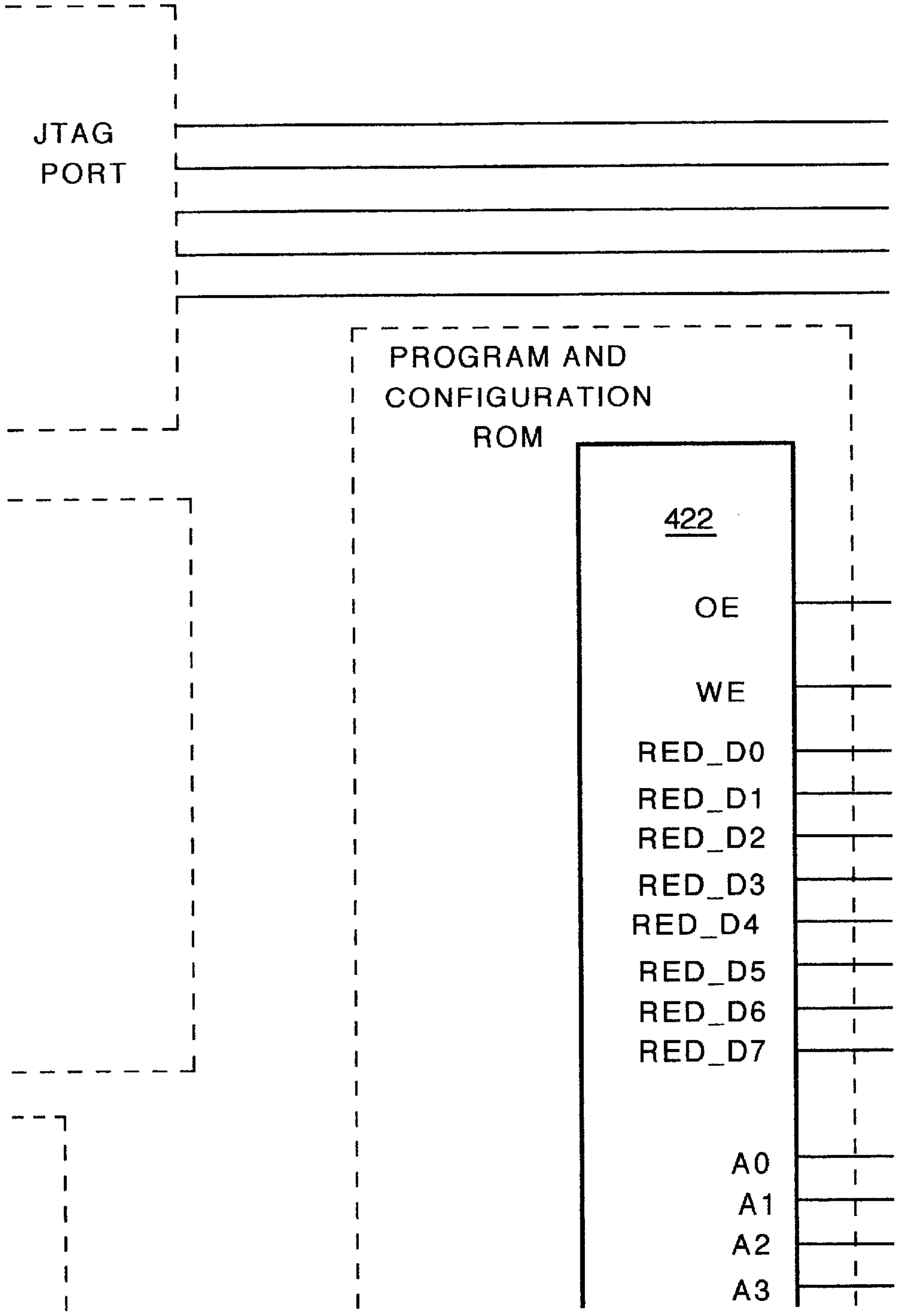
Figure 21C:
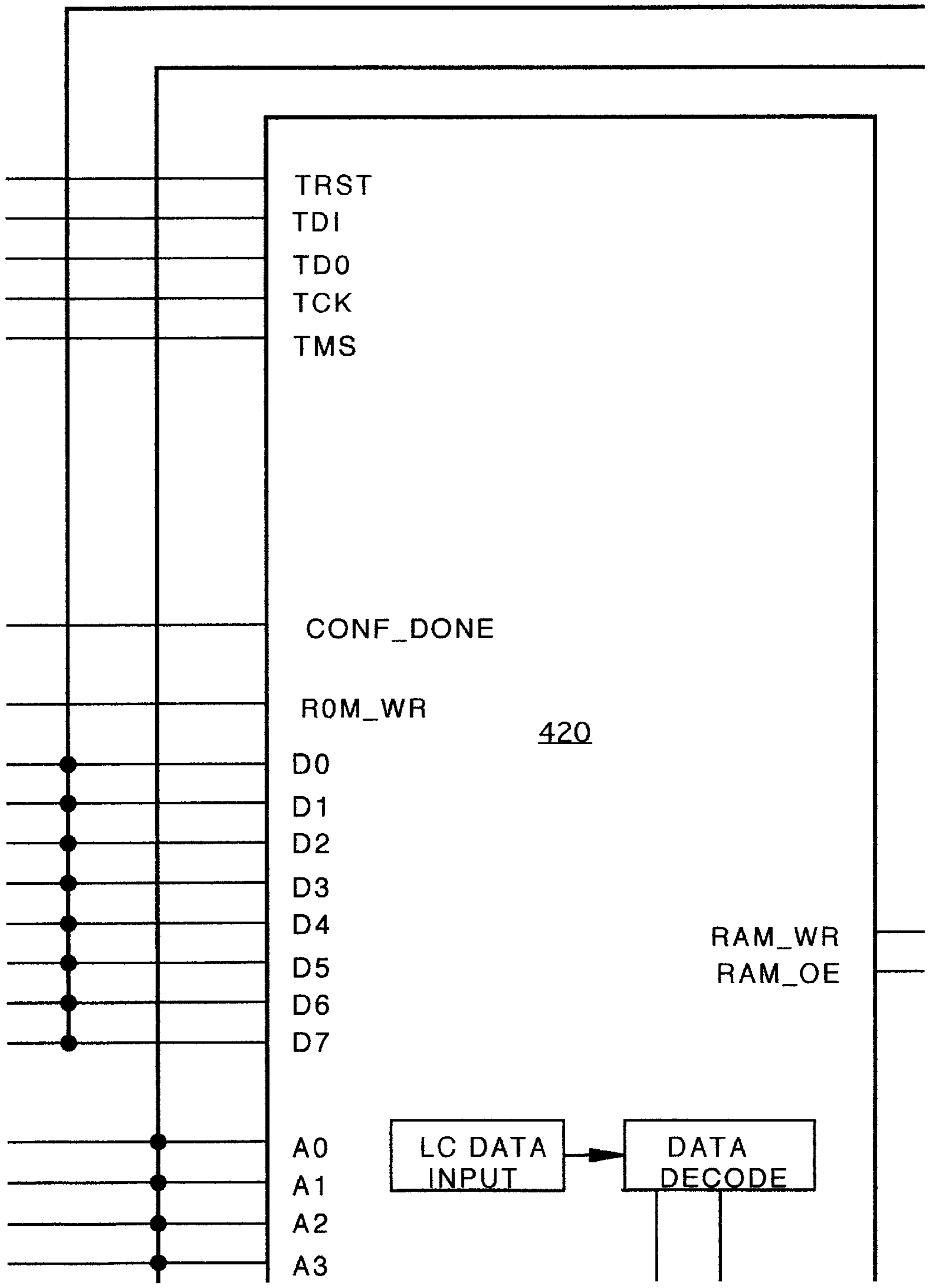
Figure 21D:
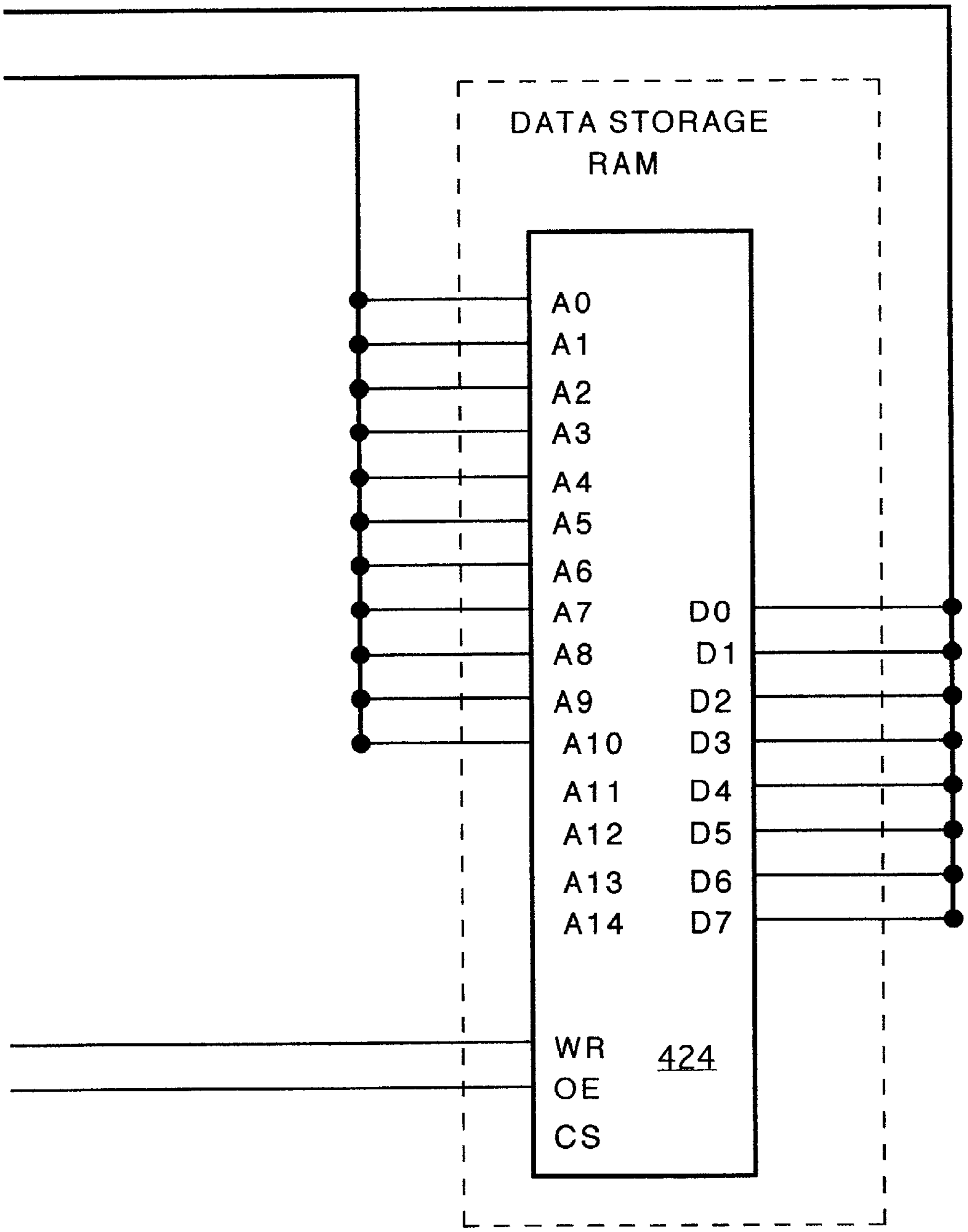
Figure 21E:
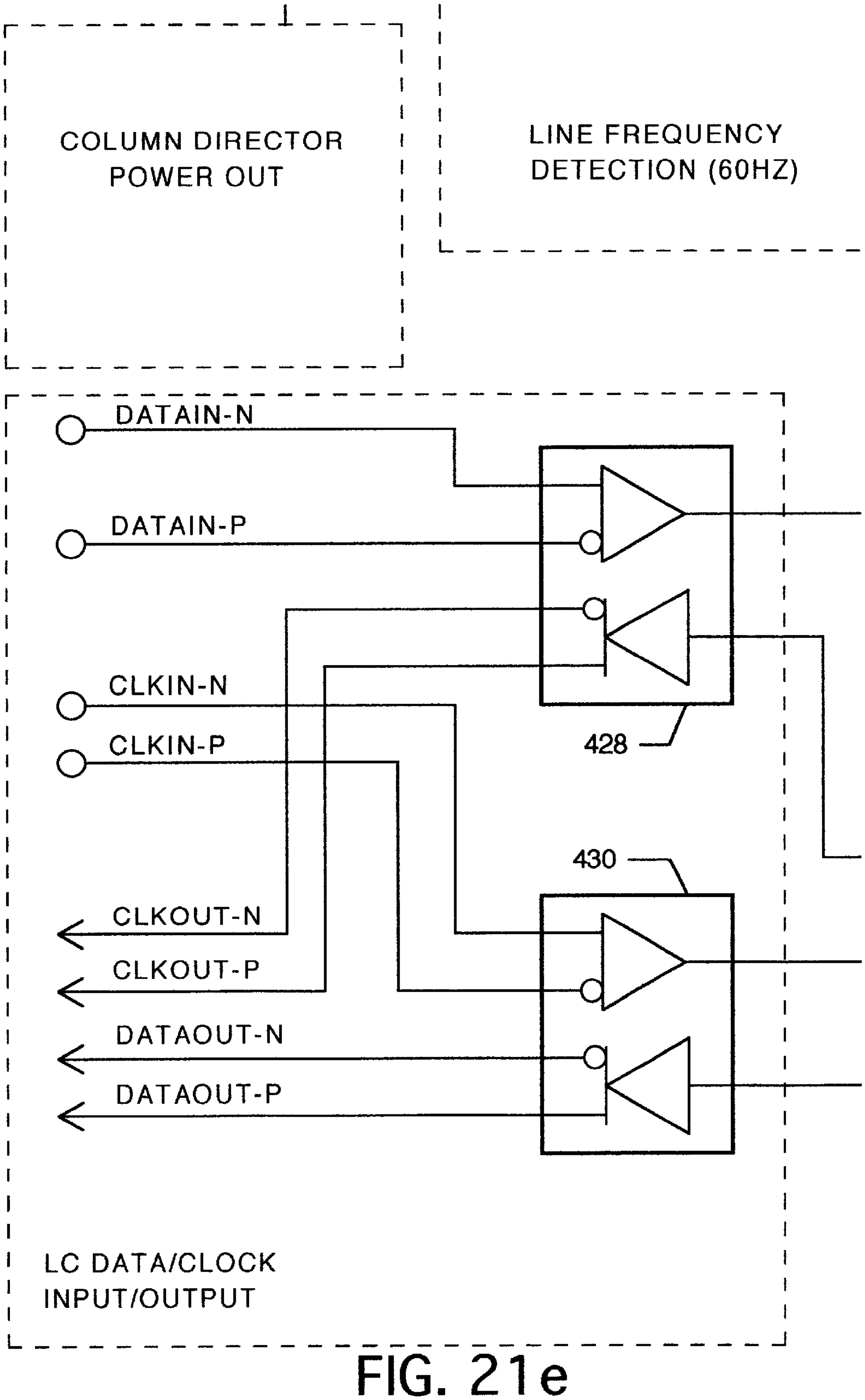
Figure 21F:
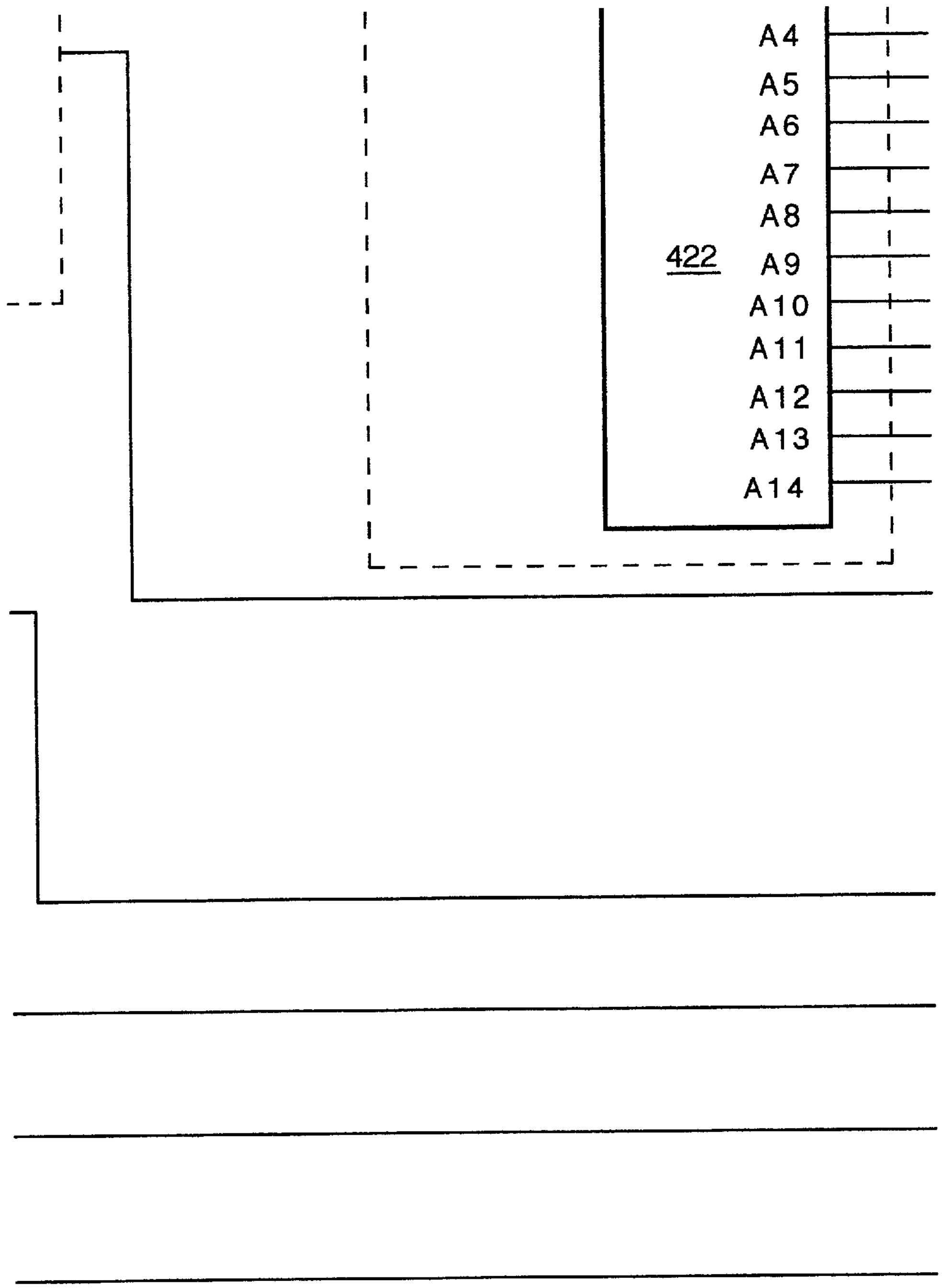
Figure 21G:
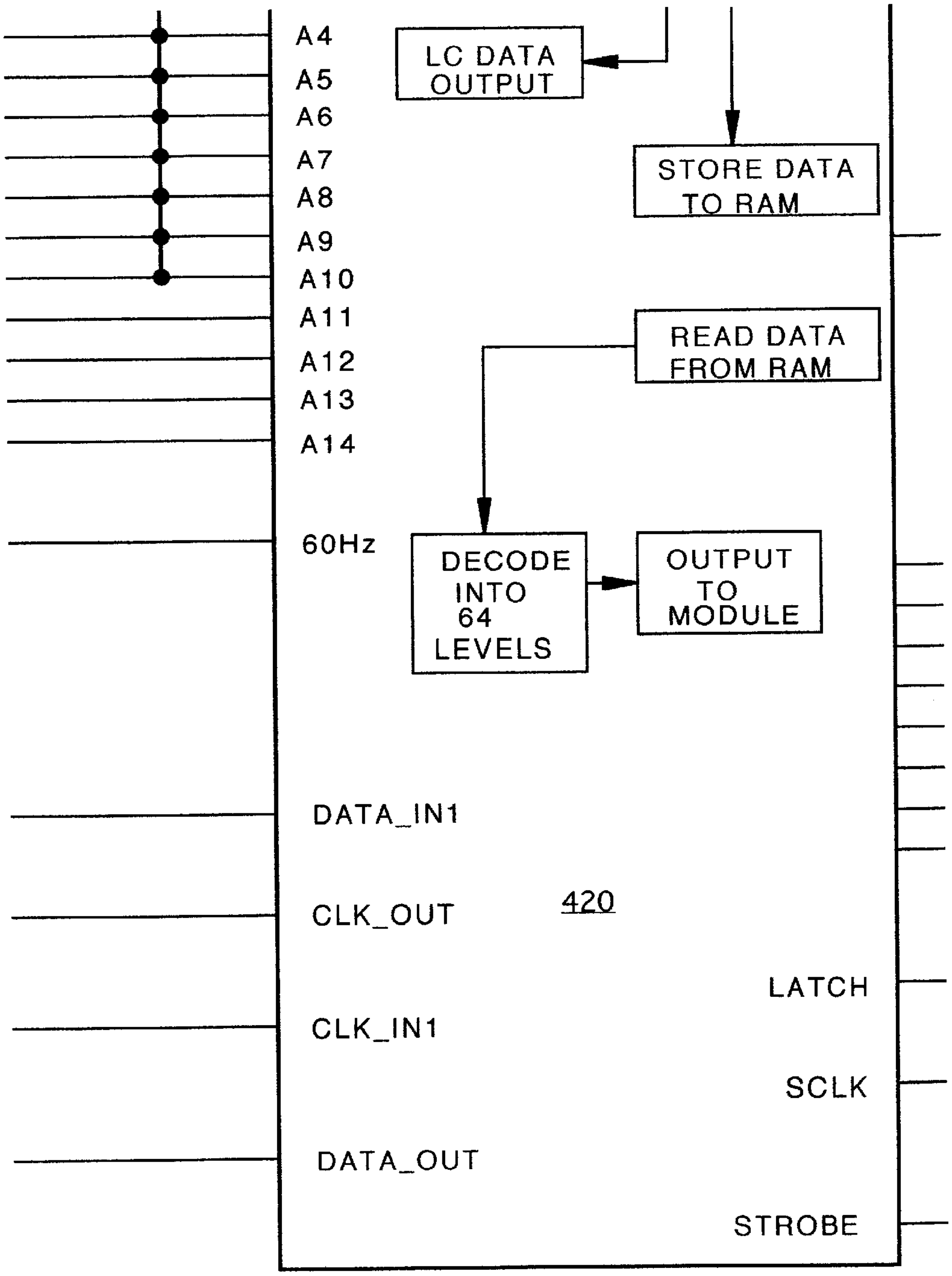
Figure 21H:
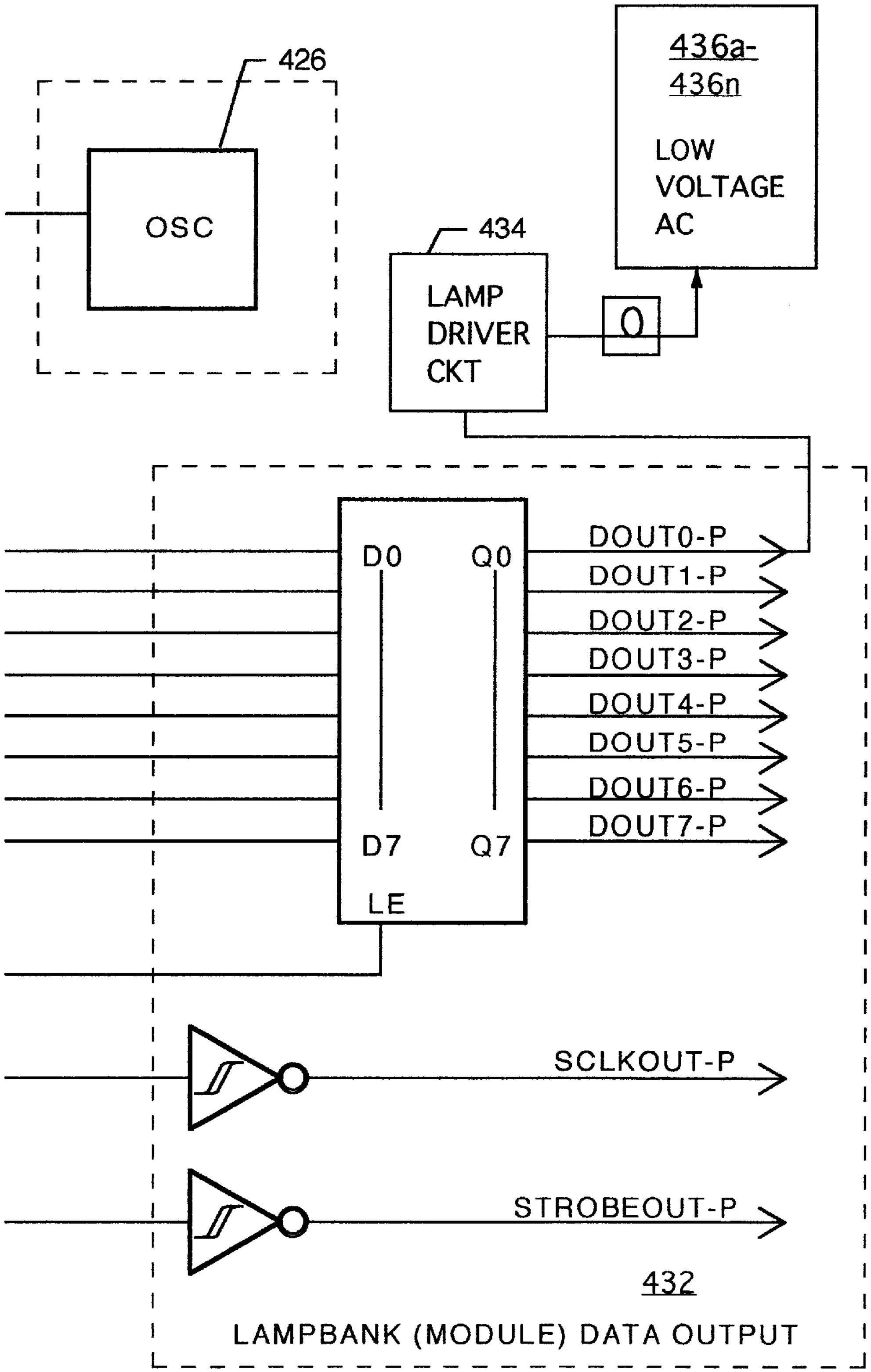

FIG. 19 illustrates an incandescent column director, comprising preprogrammed programmable logic 400, oscillator 402, RS-422 CD data in 404, RS-422 CD data out 406, CD data out 408 and 410, and JTAG port 412.

FIG. 20 illustrates a layout of FIGS. 21*a*–21*h*.

FIGS. 21*a*–21*h* illustrate an incandescent line controller, comprising programmable logic 420, EPROM program and configuration ROM 422, data storage RAM 424, oscillator 426, LC data/clock input/output 428 and 430, lamp bank module data 432, lamp driver circuit 434, and lamps 436*a*–436*n*.

Figure 22:
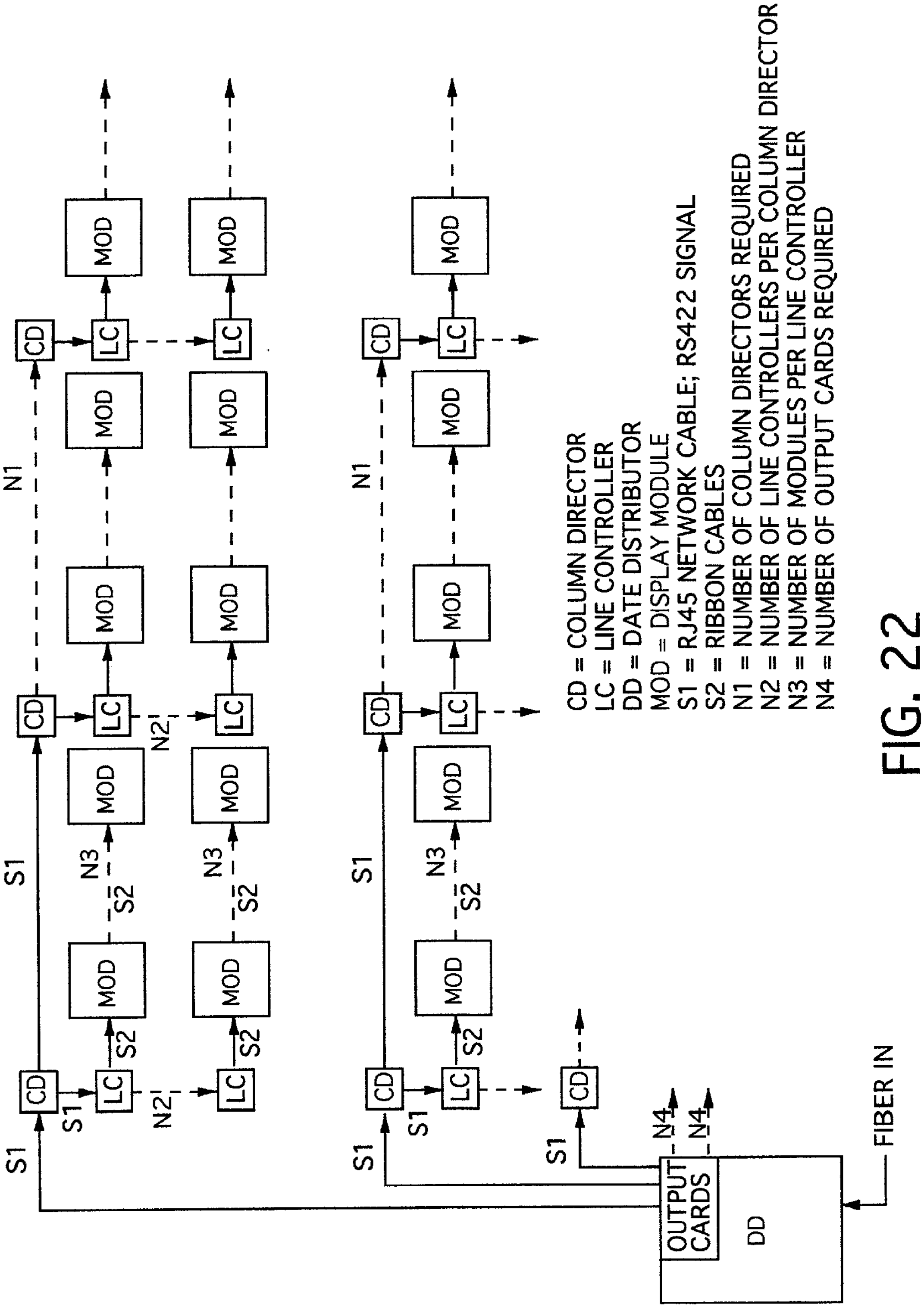
FIG. 22 illustrates a system architecture block incandescent diagram.

FIG. 22 illustrates a system architecture block incandescent diagram.

Figure 23B:
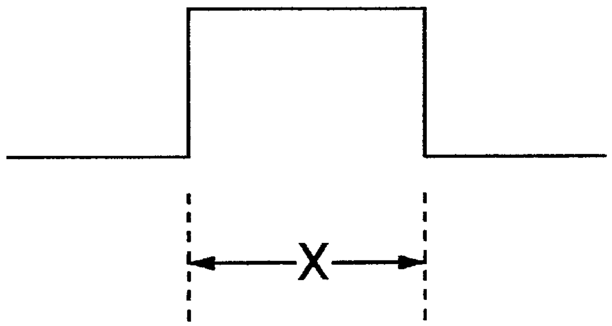

FIGS. 23*a*–23*b* illustrate signal timing diagrams.

Figure 24A:
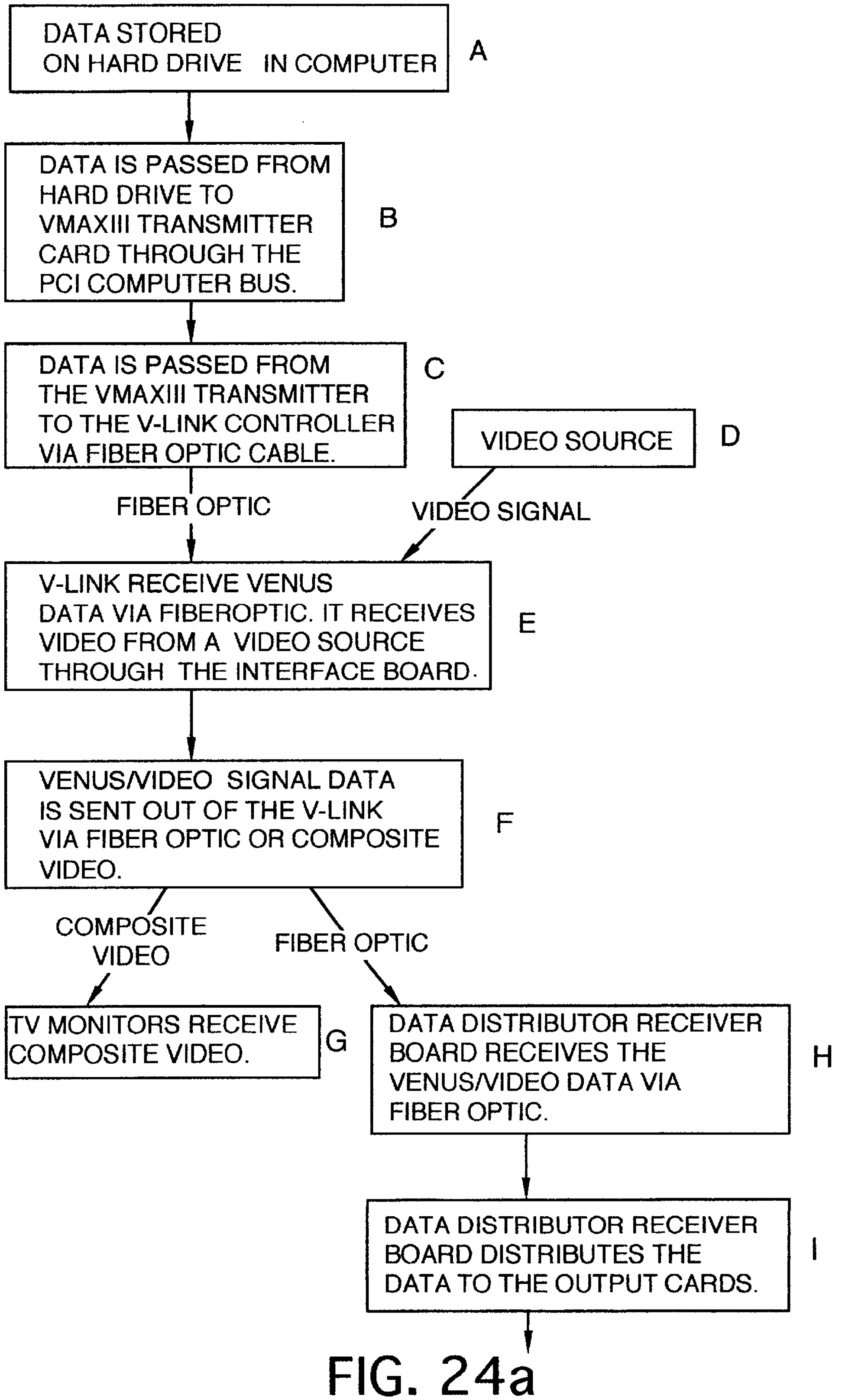
FIGS. 24*a*–24*b* illustrate a system flow chart for transmission of data; and, FIG. 25 illustrates a software system flow chart.
Figure 24B:
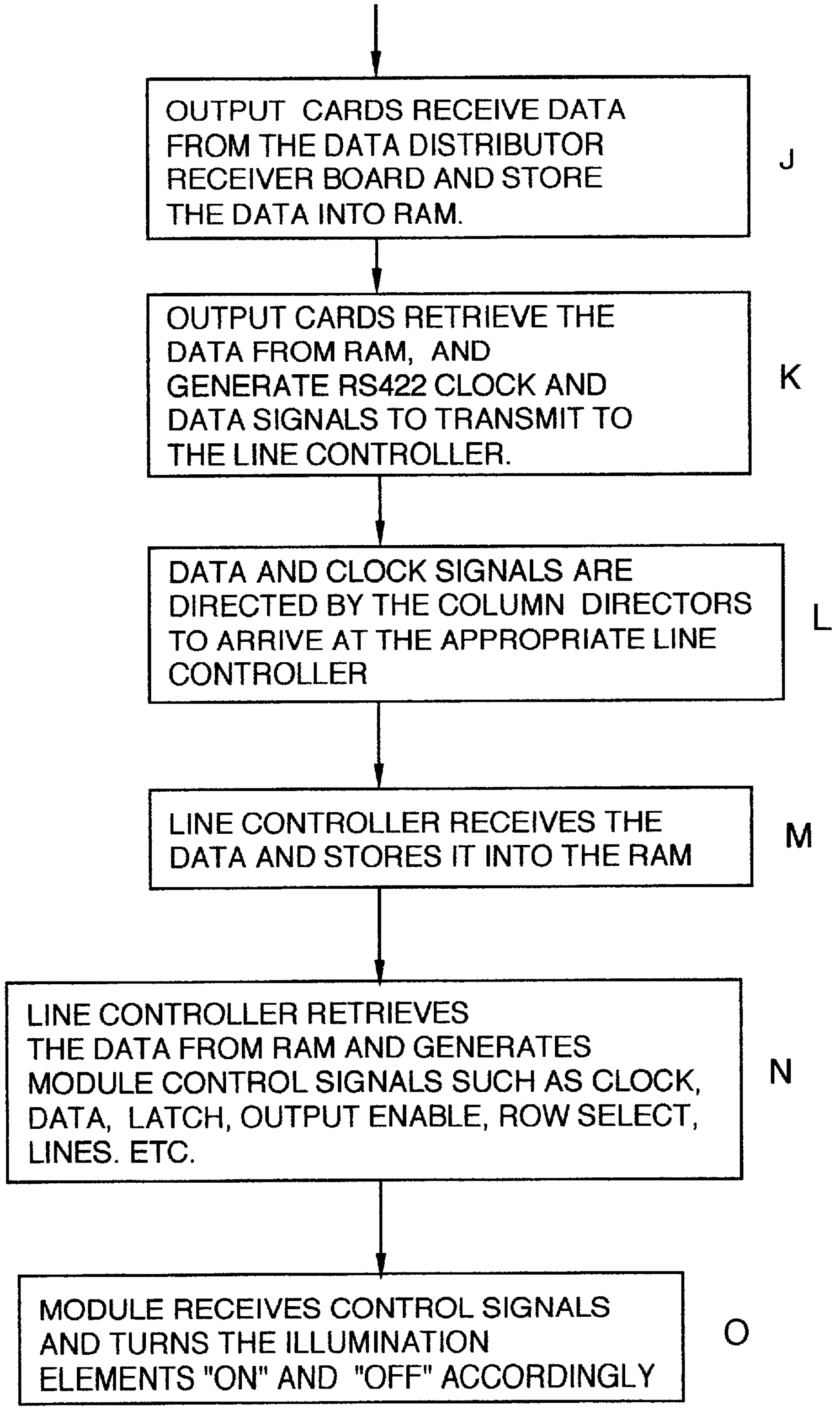

FIGS. 24*a*–24*b* illustrate a system flow chart for transmission of data.

Figure 25:
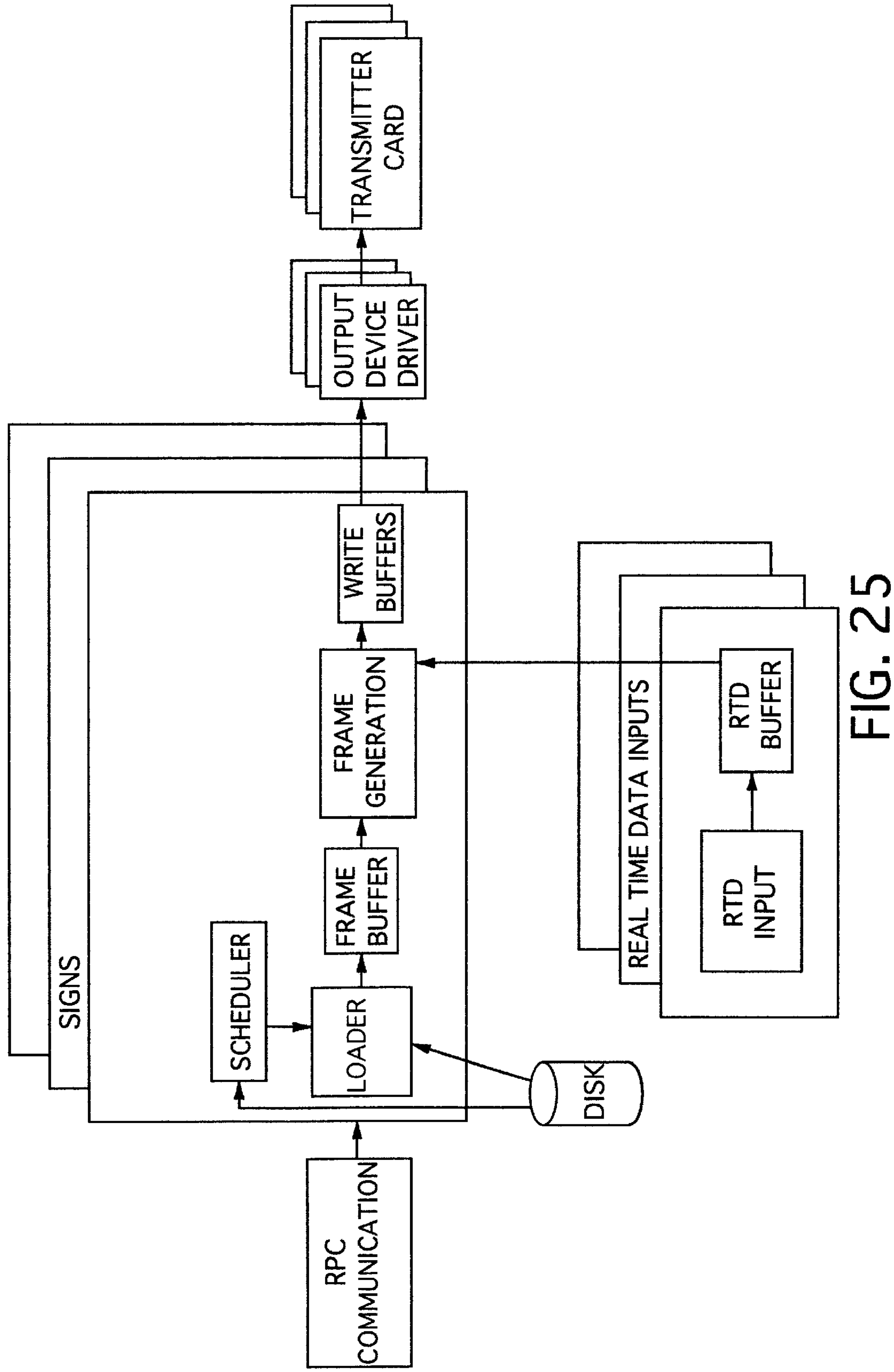

FIG. 25 illustrates a software system flow chart.

MODE OF OPERATION

Venus® 7000 Sign Service Operational Description

1. General Overview

The Venus® series controllers of FIGS. 24 and 25 are used to operation the large matrix displays produced by Daktronics, Inc. This family has migrated across several platforms an operating systems during the 15 years of its lifetime.

These controllers generally have four (4) major functions: create images for display, schedule the images for display, interface to external data sources, and send the image data to the display.

The Venus® 7000 controller is the most recent member of the Venus® family and is based on the Windows® NT operating system running on Intel based processor systems. It provides all of the functions of earlier Venus® controllers and extends the capabilities to support larger, video-type displays.

This document will describe the basic operations of the Venus® 7000 Sign Service. This module of the controller is responsible to receive display control information from other modules, retrieve the image data, format it for transmission to the display, and send the data.

These services are provided for multiple signs that could be controlled from a single system.

2. File Formats

The Venus® 7000 Sign Service uses two (2) file types to store and display data. These files use a RIFF file structure and are briefly described below.

2.1 Animation Sequence

String of graphic images that are retrieved by the sign service and displayed consecutively to the display. Shown below are some of the characteristics of the animation sequence.

① .sq7 file extension
② Long File Names
③ RIFF format
④ Frame Types:

Graphic Frame—the standard frame containing a header chunk describing the effects and timing with a graphic chuck which describes the data to be displayed. These chunks are contained in all frame types.

Real Time Data—allows external data to be sent to the display in real time. Contains a special chunk that tells the sign service to retrieve data from the correct external source and format the information for display.

Text—contains a special chunk that saves text messages and formatting information to allow the sign service to generate the frame at run time, but preserve the text data to be edited in the future.

Transmit Data Frames—a special frame that allows the operator to enter text or bit data to be transmitted across a serial port or pipe. Is generally used to synchronize to external computer systems.

Future Frame Types—the RIFF file structure allows for future frame types to be added in future releases without changing existing sequences. Daktronics anticipates that different frame types will be added in the future.

2.2 Scheduling File

List of sequences and specific times at which they should be displayed.

① .sc7 file extension
② Long File Names
③ Access database file format

3. RPC Communications

The Venus® 7000 Sign Service communicates to other modules using Remote Procedure Calls (RPC). By selecting RPC as the messaging service, it allows the Sign Service to simultaneously communicate to a variety of control programs that could be operating (a) on the same machine, (b) on a Local Area Network, or (c) through a remote dial-up connection.

Daktronics typically provides modules to allow an operator to interactively send images directly to the display or configure a schedule that changes the display images over time. However, it is possible for other programs to be written that communicate to the Sign Service through the RPC interface for different applications.

4. Scheduler

If the RPC communications requests a schedule to be displayed, the Sign Service evokes the scheduling function to retrieve the schedule file from disk and instructs to load the appropriate sequences.

5. Loader

If the RPC communications requests a sequence to be displayed, the Sign Service evokes the loader to parse out the frames contained in the file and send them sequentially to the frame buffer.

6. Frame Buffer

The frame buffer acts to smooth out performance differences between the loader and frame generation modules by allowing the loader to "work ahead" to ensure that once the frame generation module begins to construct the actual bit data it will not have to wait for subsequent frames to be loaded from disk (or other storage device). This is a circular buffer that can be sized by the Venus® 7000 controller configuration program.

7. Frame Generation

Assembles all of the chunks of the current frame and assembles the bitmap that will be transmitted to the sign. Depending on the frame type, the Frame Generation module will be required to create transition frames, read RTD buffers, construct characters from font information, assemble data to be transmitted, and other possible tasks on future frame types.

8. Write Buffers

The Write Buffers contain a series of fully assembled frames that are waiting to be read by the Output Device Driver.

9. Output Device Driver

This is a Windows® NT kernel mode device driver. It performs the final timing of when the frames are delivered to the sign and controls all communication to the transmitter card.

10. Transmitter Card

PCI based card that resides in the computer. Assembles data and control information and transmits it to the sign via fiber optic cable.

APPENDIX

1. Parts List
2. Electrical Schematic Diagrams
3. Installation Manual
4. Operation Manual and Transcript
5. Source Code 6. Executable Programs
7. Advertising Various modifications can be made to the present invention without departing from the apparent scope hereof.

It is claimed:

1. A process for generating data to switch a display light driver for a large video display electronic sign system comprising the steps of:

a. generating first data signals and clock signal by a data distributor output board;

b. receiving said data signals and clock signal by a line controller;

c. storing the signals of data and clock in RAM on the data distributor output board;

d. generating second data and clock signals, and latch signals on the data distributor output board;

e. receiving the data and clock signals by a display module for turning display light drivers on or off in a large video display electronic sign, whereby a data distributor sends the first data and clock signals to a column director;

f. generating an output enable signal by a line controller which output enable signal is sent to the display module for controlling intensity of a light driver; and, g. receiving configuration data at the data distributor, the configuration data coded in command bytes, the configuration data originating from a computer including, but not limited to, technology type and size of a display.

2. A large video display electronic sign system comprising:

a. a controller, wherein said controller is a computer and wherein said computer has an output port and said output port provides an optical signal;

b. data transmission means in said controller for establishing and defining transmission protocol;

c. video interface means connected to said data transmission means, wherein said video interface means receives, input data from said controller and from multiple video input sources with a switchable input to select at least one input which is sent to video display means;

d. data distributor means connected to said video interface means, wherein said data distributor receives configuration data from said controller over a fiber optic data transmission for configuring said system according to the technology type and size of a video display means to be driven;

e. column director means connected to said data distributor means, wherein said data distributor means transmits a data stream to said line controller means, a column director means, and a line controller means to locations of said video display means, and wherein said data stream includes one encoded clock line signal and at least one data signal line for fill in the blanks;

f. line controller means connected to said column director means, wherein said line controller includes a column director means;

g. driver means connected to said line controller means, wherein said drive means includes means for calibration of said video display means, wherein said calibration means is for a display module, and wherein said calibration means is for a pixel;

h. an LED video display means for a large video display electronic sign connected to said driver means; and, wherein said clock signals include at least one command clock signal in addition to said column director latch signals, and said clock signals are distinguished by their duration and a varying and distinguishing characteristic of said clock signals supplied to said clock signal decode means is the duration of said clock pulses, and a varying and distinguishing characteristic of said column director latch clock signal is a greater duration than the other of said signals, and wherein said column director latch clock signals have a greater pulse width than the other of said clock pulse signals, wherein each pulse of said signals of said column director latch clock signal has a greater duration than the other of said clock signals, and each pulse of said signals of said column director latch clock signal has a greater duration than the other of said signals, and each pulse of said signals of said column director latch clock signal has a greater duration than the other of said signals.

3. A process to switch drive electronics so as to allow information to be remotely displayed on a large video display electronic sign system, the process comprising the steps of:

a. providing a computer, the computer having a data bus with a video interface card, the video interface card having a buffered storage system for data, and a transmission link control card, the transmission link control card accepting data from the buffered storage system of the video interface card;

b. providing at least one large electronic video sign, the at least one large electronic video sign located, relative to the computer, at a remote site, the at least one large electronic video sign including at least one selectable sign, the at least one selectable sign of the at least one large electronic video sign having at least one column director and at least one line controller and further having a plurality of display modules, each of the display modules of the plurality of display modules having a plurality of pixel display elements, the pixel display elements of the plurality of pixel display elements arranged by row and column, and each display module of the plurality of display modules further including drive electronics for selective activation of each pixel display element of the plurality of pixel display elements in response to received data;

c. providing a data distributor at said remote site, the data distributor having a receiver board and at least one output card;

d. providing fiber optic communications between the transmission link control card of the computer and the receiver board of the data distributor at the remote site;

e. providing a communications link between the at least one output card of the data distributor and the at least one column distributor of the at least one selectable sign;

f. providing a communications link between the at least one column director and the at least one line controllers of the at least one selectable sign;

g. generating a first data signals set and a clock signal at the at least one output card of the data distributor, the first data signals set based upon fiber optic data received from the computer by the receiver board of the data distributor;

h. directing the first data signals set and clock signal from the at least one output card to the at least one column director and thence to the at least one line controller;

g. receiving the first data signals set and a clock signal at the at least one line controller;

h. storing the first data signals set and the clock signal in RAM at the at least one line controller;

i. generating a second data signals set and a new clock signal, and a latch signal at the at least one line controller, the second data signals set based upon the first set of data stored in RAM; and, j. receiving the second data signals set and the new clock signal by an intended one of the display modules of the plurality of display modules, thereby switching display electronics to activate selected individual pixels of the plurality of pixels of the intended one of the display modules, such that information is remotely displayed on the large video display electronic sign system.

4. The process of claim 3, wherein the at least one line controller is one of a plurality of line controllers, and wherein each additional line controller of the plurality of line controllers is in communication with a corresponding additional plurality of display modules.

5. The process of claim 3, wherein the at least one column director is one of a plurality of column directors, and wherein each additional column director of the plurality is in communication with a corresponding additional at least one additional line controller.

6. The process of claim 3, wherein the at least one output card is one of a plurality of output cards, and wherein each additional output card of the plurality is in communication with a corresponding additional at least one column director.

7. The process of claim 3, wherein the communications link between the at least one data distributor and the at least one column director is over an RJ-45 network cable.

8. The process of claim 3, wherein the communications link between the at least one data distributor and the at least one column director utilizes an RS422 signal.

9. The process of claim 3, wherein the communications link between the at least one column director and the at least one line controller is over an RJ-45 network cable.

10. The process of claim 3, wherein the communications link between the at least one column director and the at least one line controller utilizes an RS422 signal.

11. The process of claim 9, wherein the information is displayed as an incandescent display.

12. The process of claim 3, wherein the at least one column director and the at least one line controller are combined in a dual line controller.

13. The process of claim 12, wherein the information is displayed as an RGB display.

14. The process of claim 13, wherein the RGB display is selected from the group consisting of 256 color RGB and 16.7 million color RGB.

15. The process of claim 3, wherein the second data signal is received by the modules as an RS422 or TTL signal.

16. The process of claim 15, wherein the second data signal is communicated to the modules over a ribbon cable.

17. The process of claim 3, wherein the video interface card of the computer has an input for at least one of the group consisting of composite video input, S-video input, analog signals, digital signals, and overlay signals.

18. The process of claim 3, wherein the modules of the plurality of modules have a row (height) and column (width) arrangement of pixels selected from the groups consisting of 8×16, 8×4, 8×8, 16×32 and 16×16.

19. The process of claim 3, wherein the second signal further includes an intensity offset.

20. The process of claim 19, wherein the intensity offset for each display module is stored on a dual line controller.

21. The process of claim 20, wherein the intensity offset is adjustable by a signal from the computer.

22. The process of claim 21, wherein the intensity offset for each module of the plurality of modules is initially stored in drive electronics of the each module of the plurality of modules and retrieved by a dual line controller during system power up.

23. The process of claim 19, further comprising the steps of:

a. communicating a signal, from the computer to the data distributor, including configuration information concerning the at least one large electronic video sign; and, b. configuring the data distributor based upon the communicated signal including configuration information.

24. The process of claim 23, wherein the configuration information includes information concerning technology type present in the display modules.

25. The process of claim 23, wherein the configuration information includes information concerning the physical dimensions of the at least one large electronic video sign.

26. The process of claim 23, wherein the step of configuring the data distributor is an auto-configuration step in which the data distributor performs the steps of:

a. reading the signal including configuration information; and, b. configuring subsequent data generation appropriately based upon the configuration information read from the signal including configuration information.

27. The process of claim 6, wherein the plurality includes 16 output cards.

28. The process of claim 3, wherein the at least one selectable sign is one of a plurality of selectable signs, each additional selectable sign of the plurality having an additional plurality of modules, each module of the additional plurality of modules having an additional plurality of pixel display elements in arranged by row and column and having drive electronics for selective activation of each pixel display elements.

29. The process of claim 28, wherein each of the modules of the plurality of modules and each module of the another plurality of modules are calibrated to provide substantially similar intensity when activated.

* * * * *